United States Patent [19]

Hirai et al.

[11] Patent Number: 5,121,583
[45] Date of Patent: Jun. 16, 1992

[54] ROOF

[76] Inventors: Takashi Hirai, 4-22-10, Kitakasai, Edogawa-ku, Tokyo; Yoshio Kaneko, 27-1-202, Matsugaya, Hachioji-shi, Tokyo, both of Japan

[21] Appl. No.: 425,280

[22] Filed: Oct. 23, 1989

[51] Int. Cl.[5] .............................................. E04D 1/36
[52] U.S. Cl. ............................. 52/90; 52/573; 52/726; 52/543; 52/410
[58] Field of Search ............... 52/82, 90, 200, 410, 52/488, 573, 726, 543

[56] References Cited

U.S. PATENT DOCUMENTS

| | | | |
|---|---|---|---|
| 3,452,498 | 7/1969 | Kinsey | 52/90 |
| 4,594,823 | 6/1986 | Hague | 52/90 |
| 4,712,338 | 12/1987 | Trickel | 52/90 |
| 4,884,376 | 12/1989 | DeBlock et al. | 52/90 |

Primary Examiner—David A. Scherbel
Assistant Examiner—Wynn Wood
Attorney, Agent, or Firm—Lowe, Price, LeBlanc & Becker

[57] ABSTRACT

A roof structure suitable for use with solar energy collection elements has a wide lower width-adjusting section defined at a lateral lower portion of each of a number of connecting members disposed at predetermined intervals, while a wide intermediate width-adjusting section is defined at an intermediate portion of the side of the connecting member. The lower portion of the side edge of a lighting frame serving as a roofing member is inserted into the intermediate width-adjusting section, and the side edge of a water proof sheet is laid below the lighting frame to be received inside the lower width-adjusting section. When the total width of the roofing member is greater than the backing width of the roof, the side edge of the lighting frame and that of the waterproof sheet are located in positions close to the center of the connecting member. On the other hand, when the total width of the roofing member is smaller than the backing width of the roof, the side edge of the lighting frame and that of the waterproof sheet are located in positions close to the outer side of the connecting member.

3 Claims, 124 Drawing Sheets

FIG. 32
FIG. 33
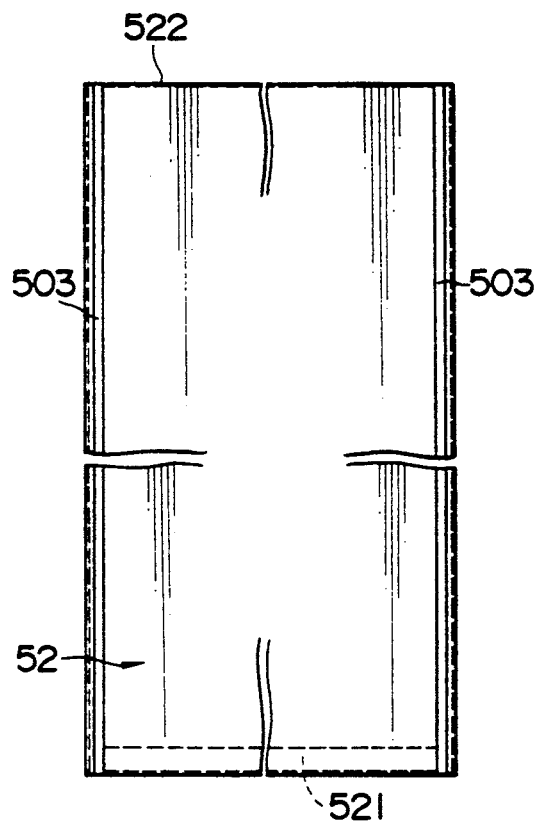
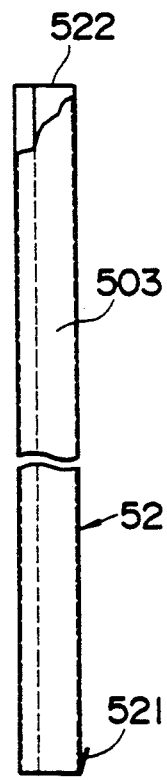
FIG. 34
FIG. 35
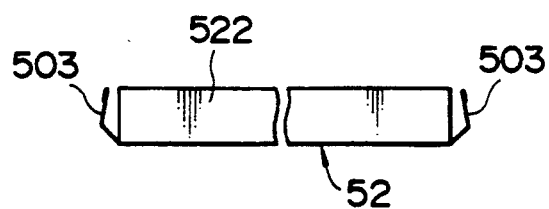
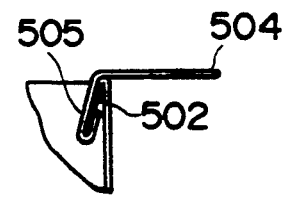

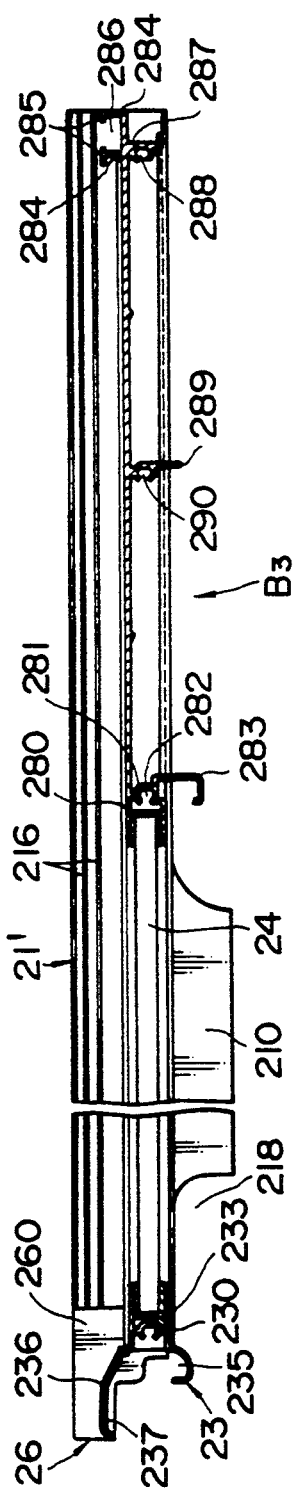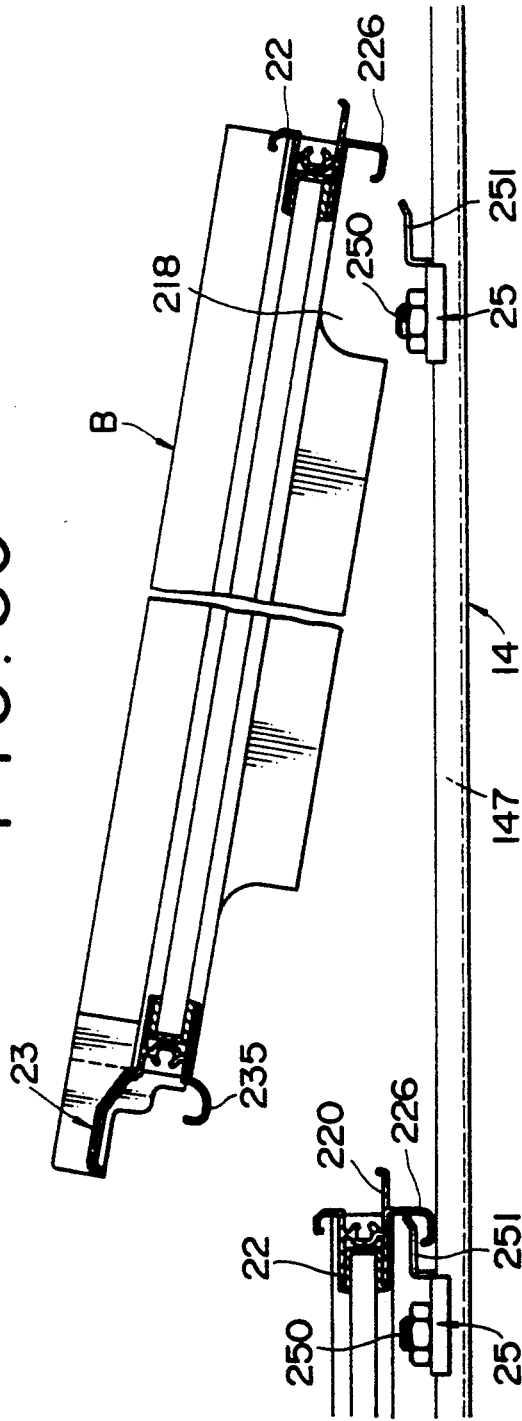

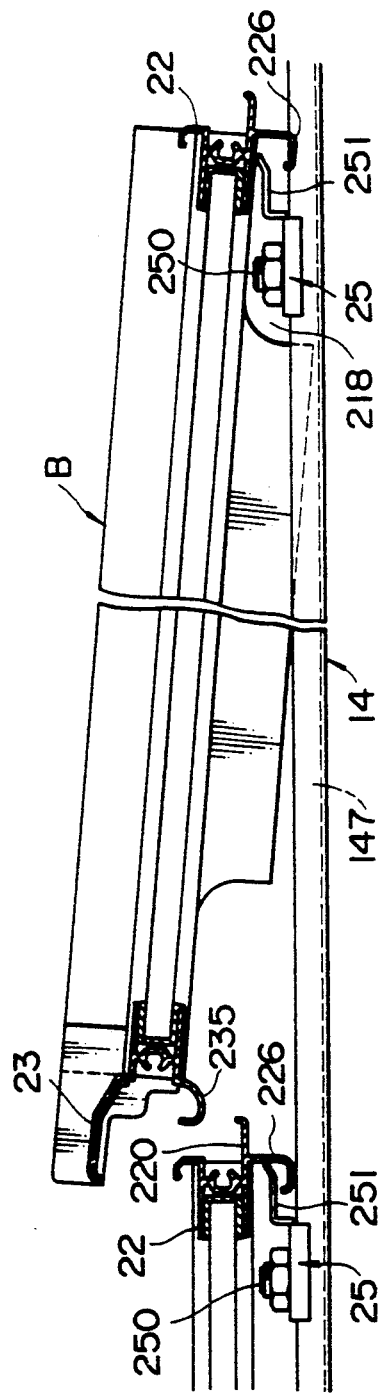
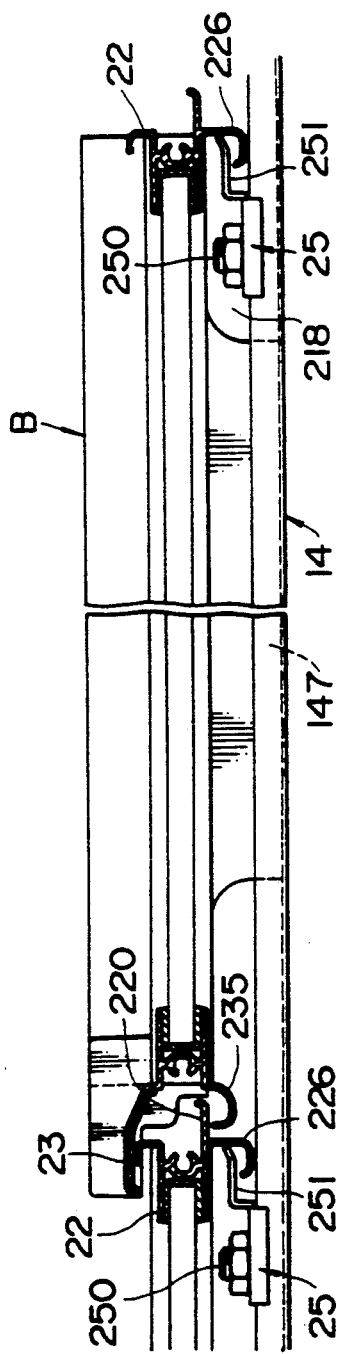

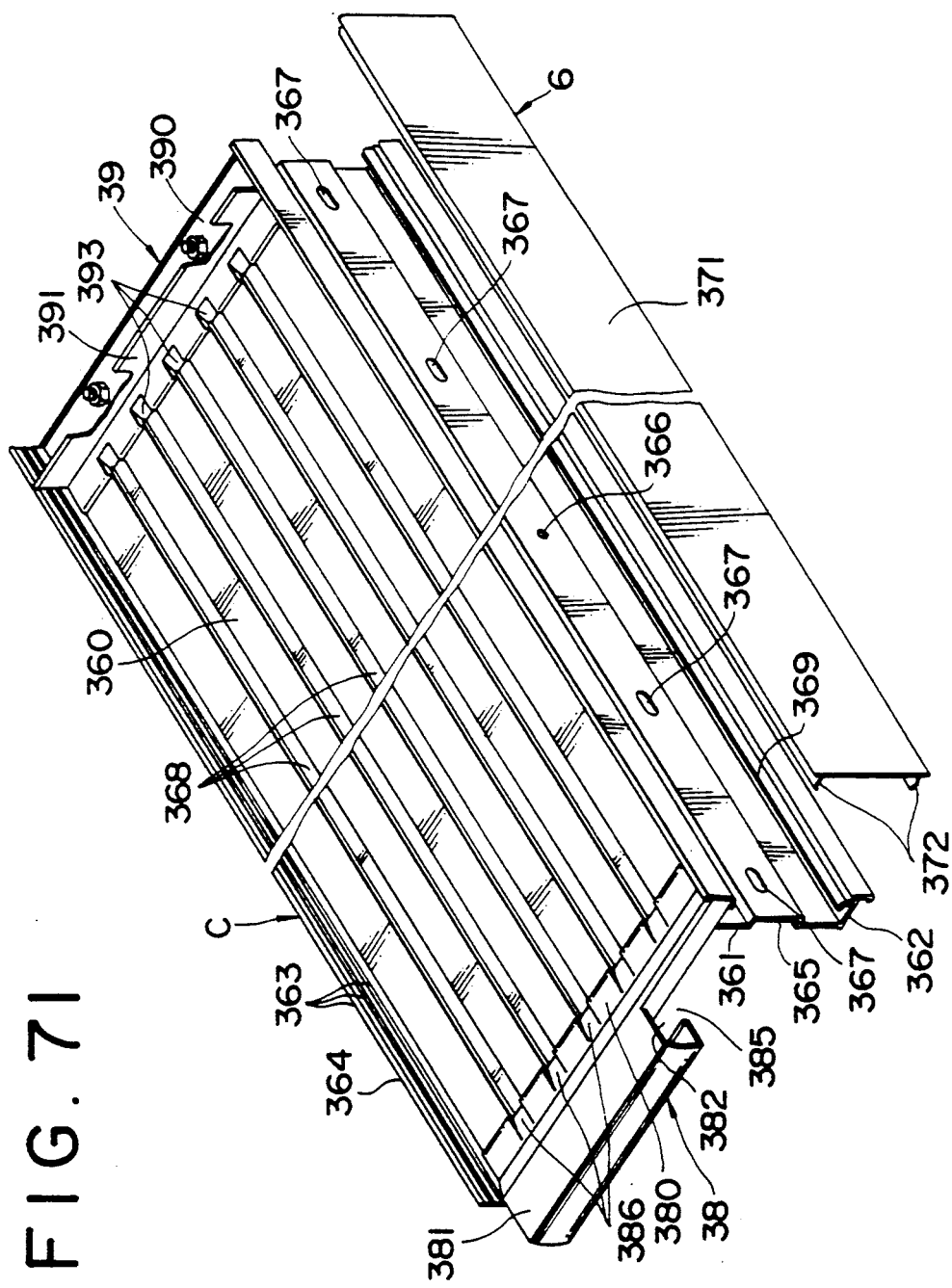

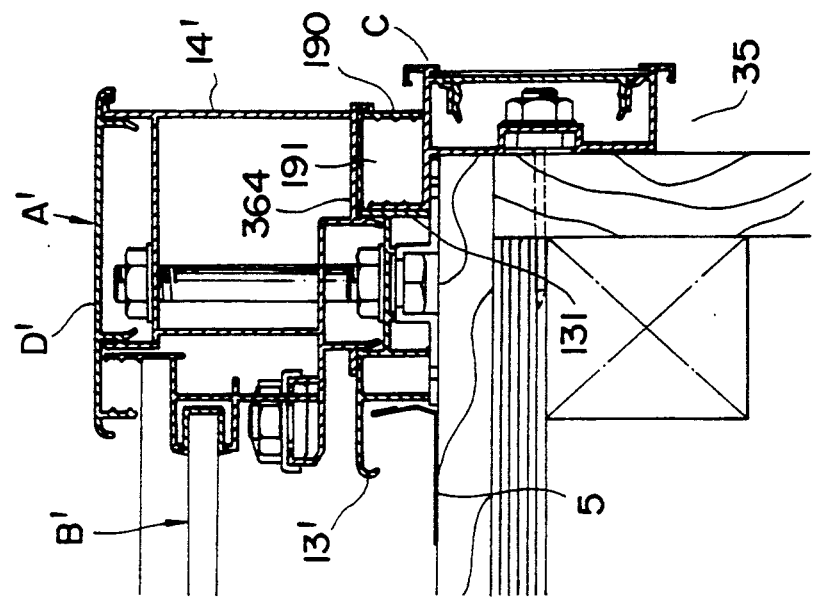
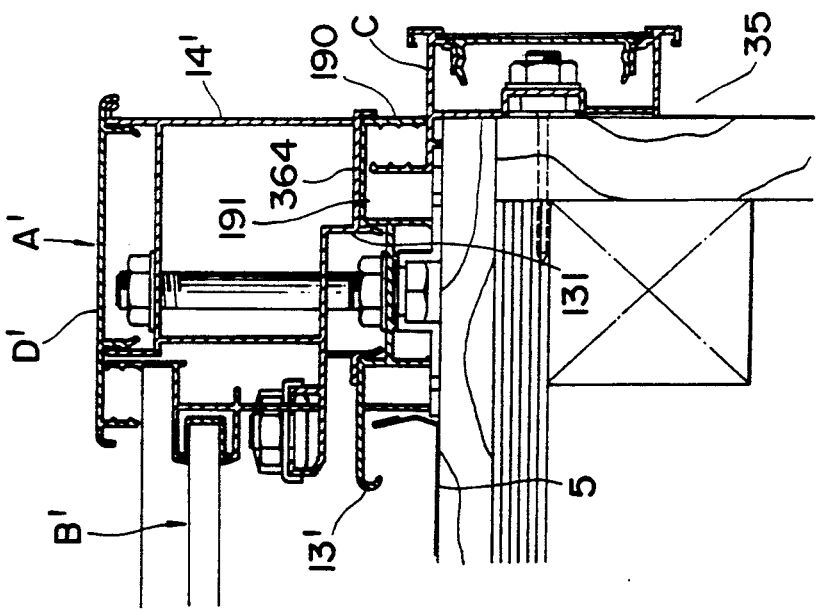

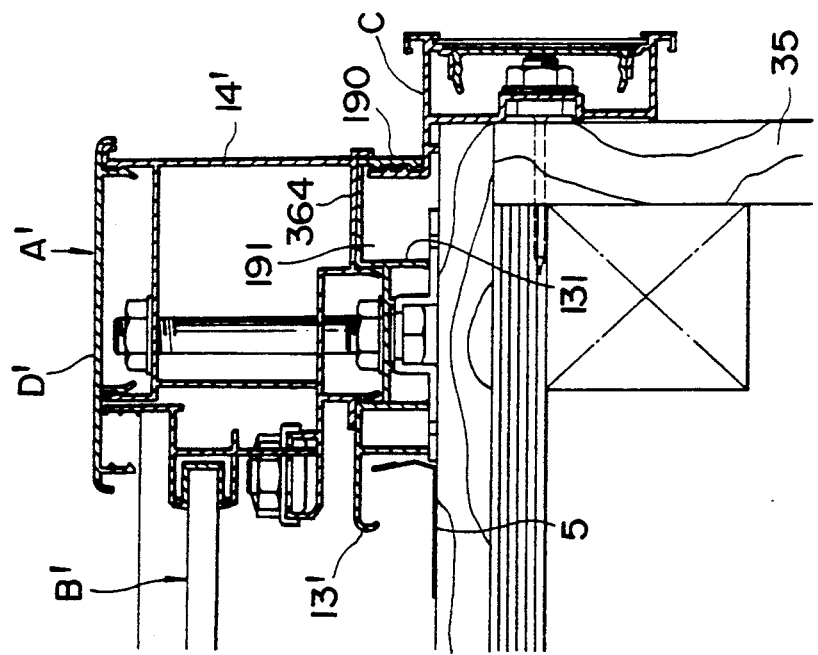
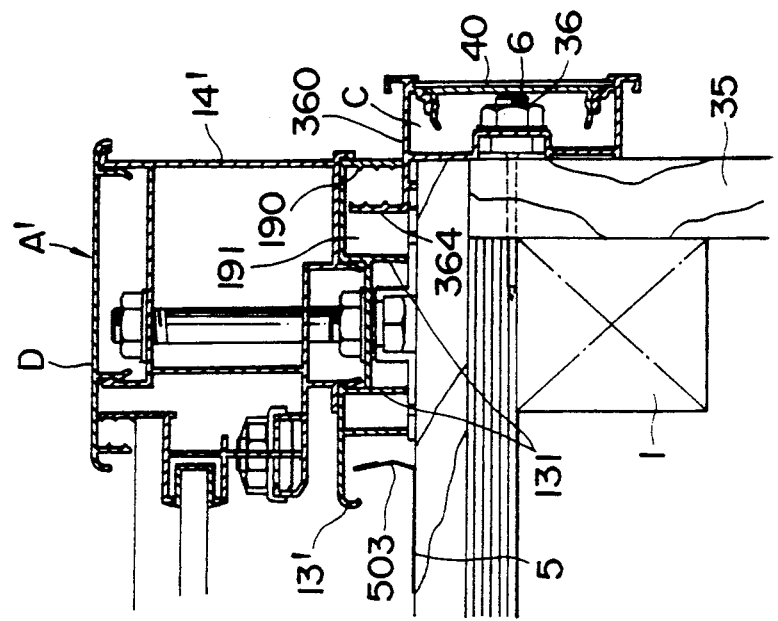

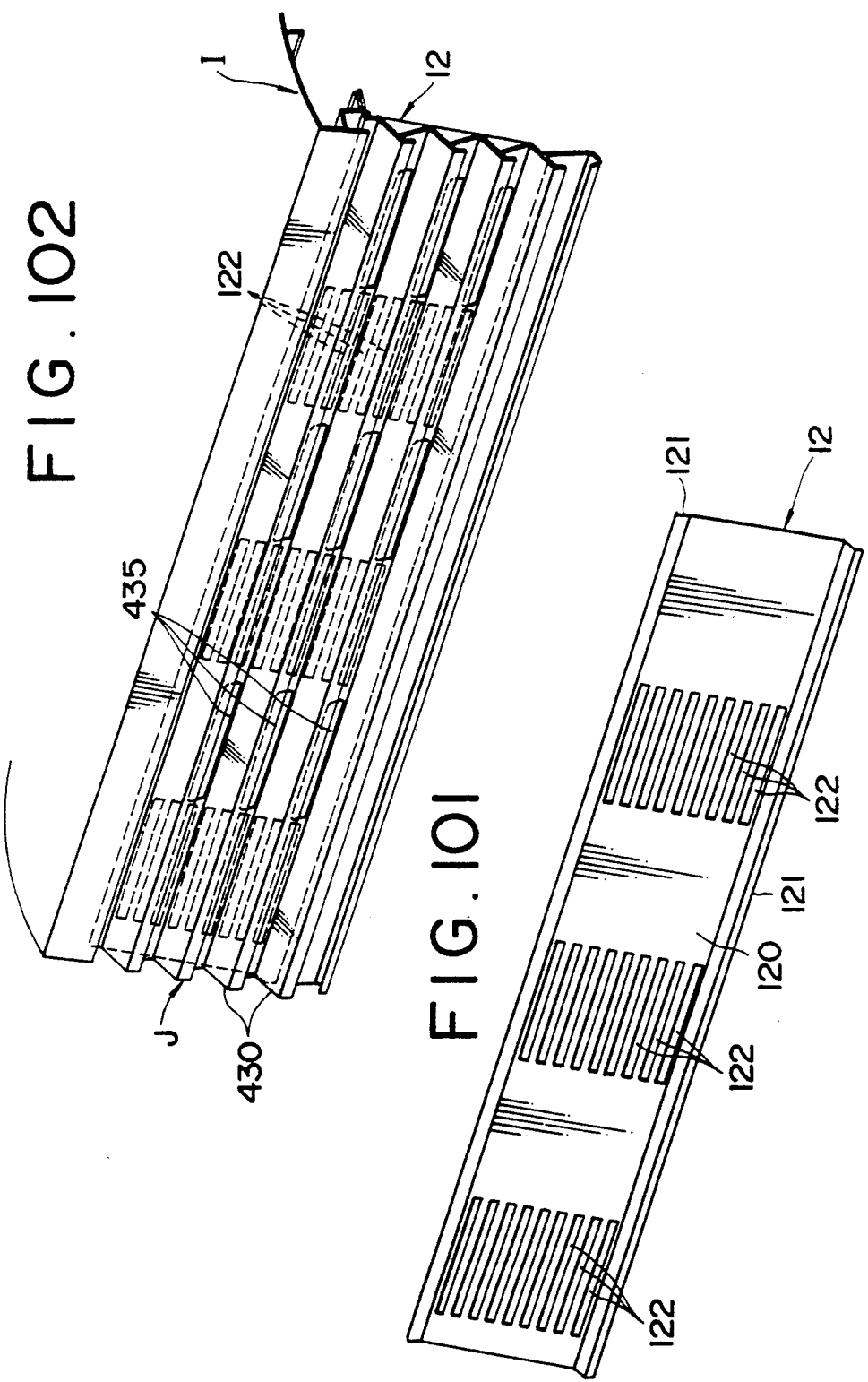

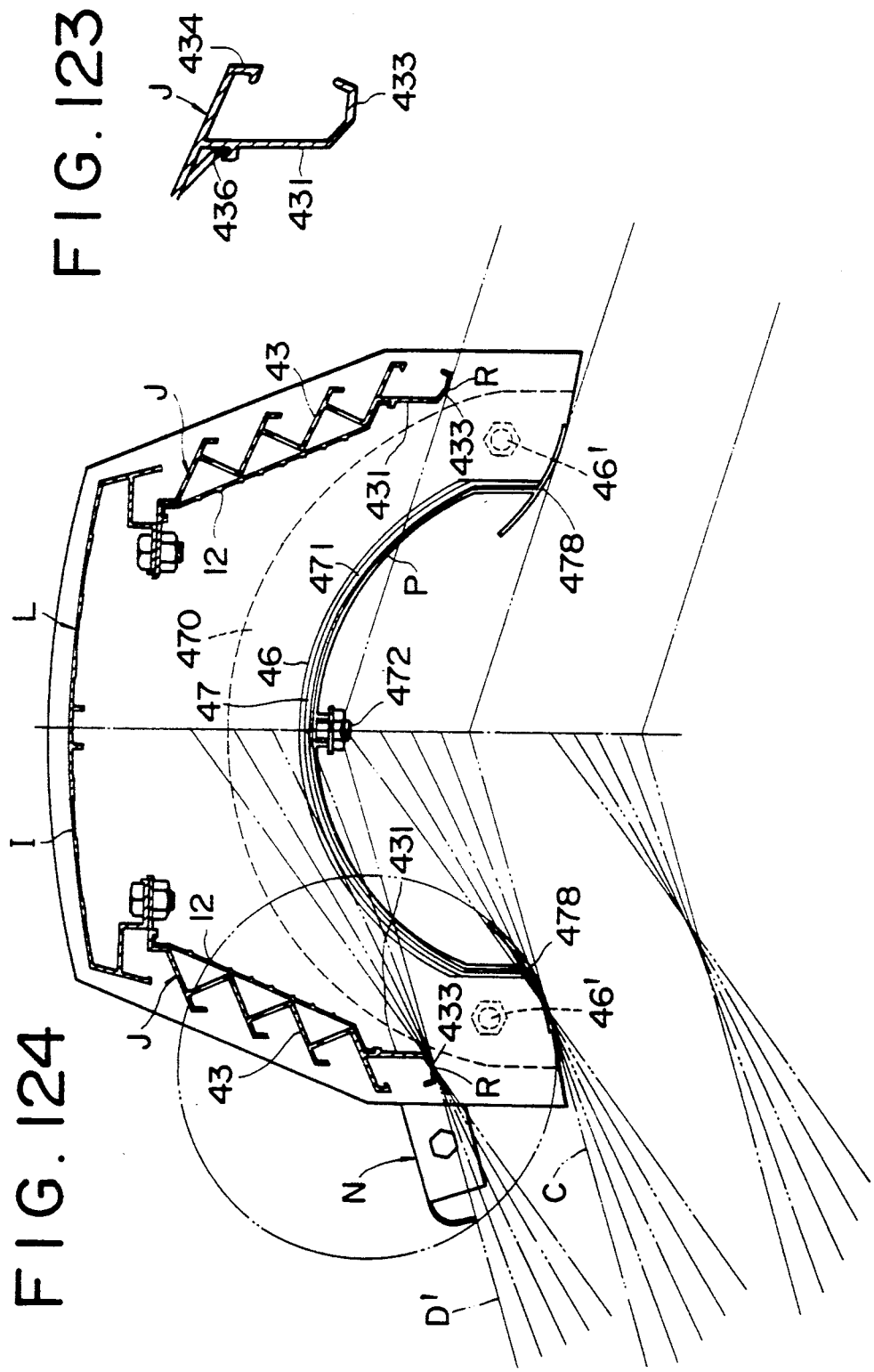

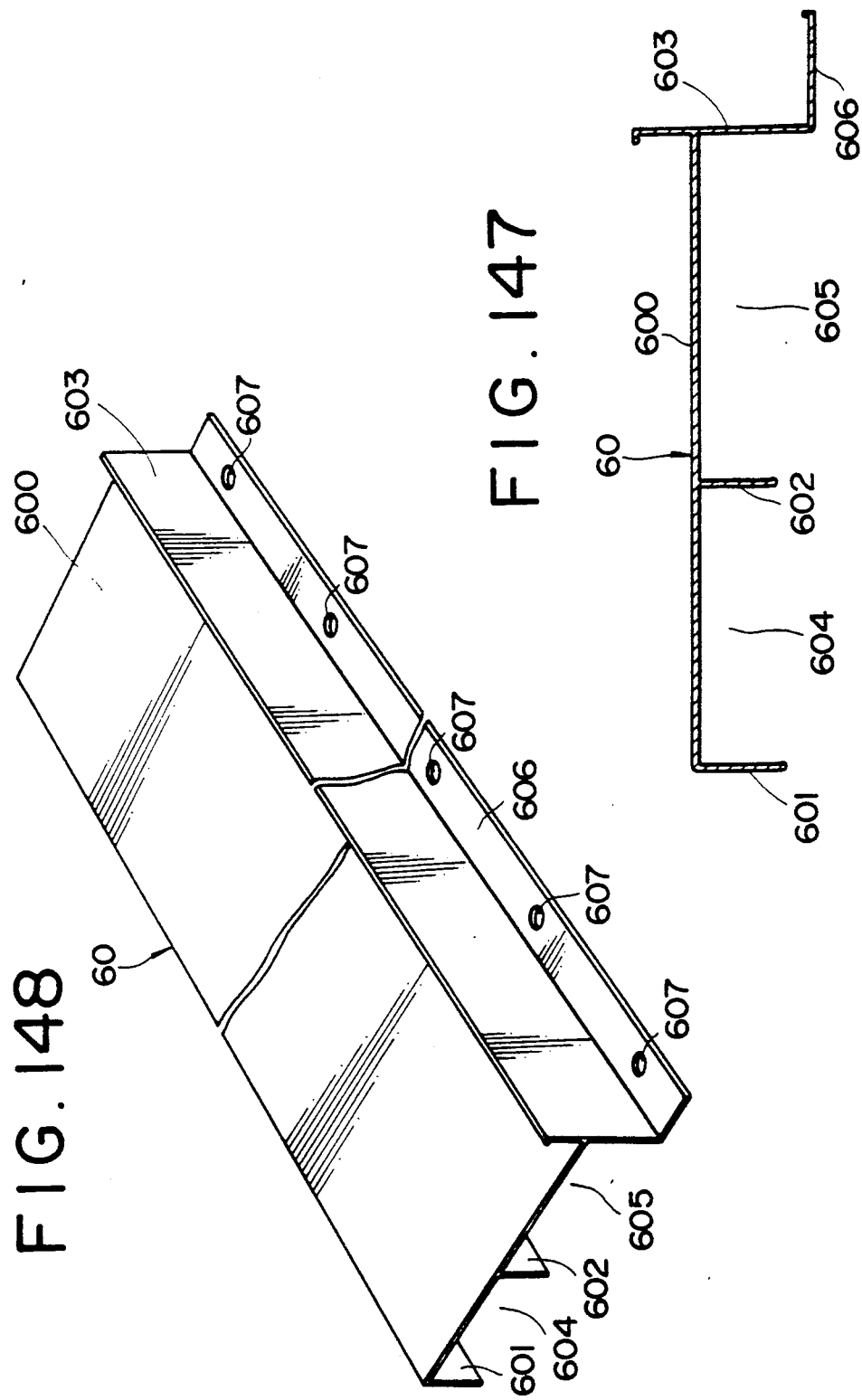

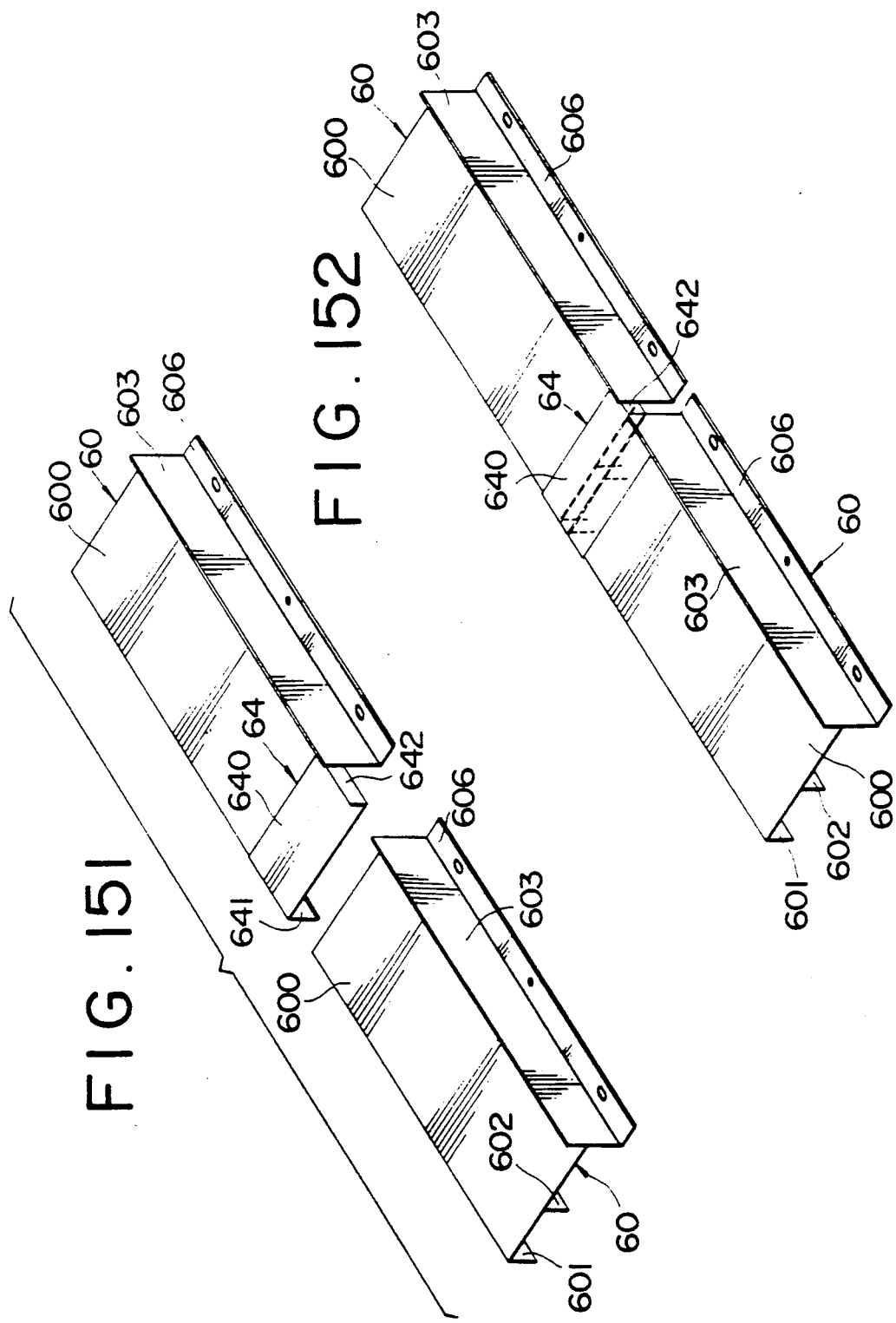

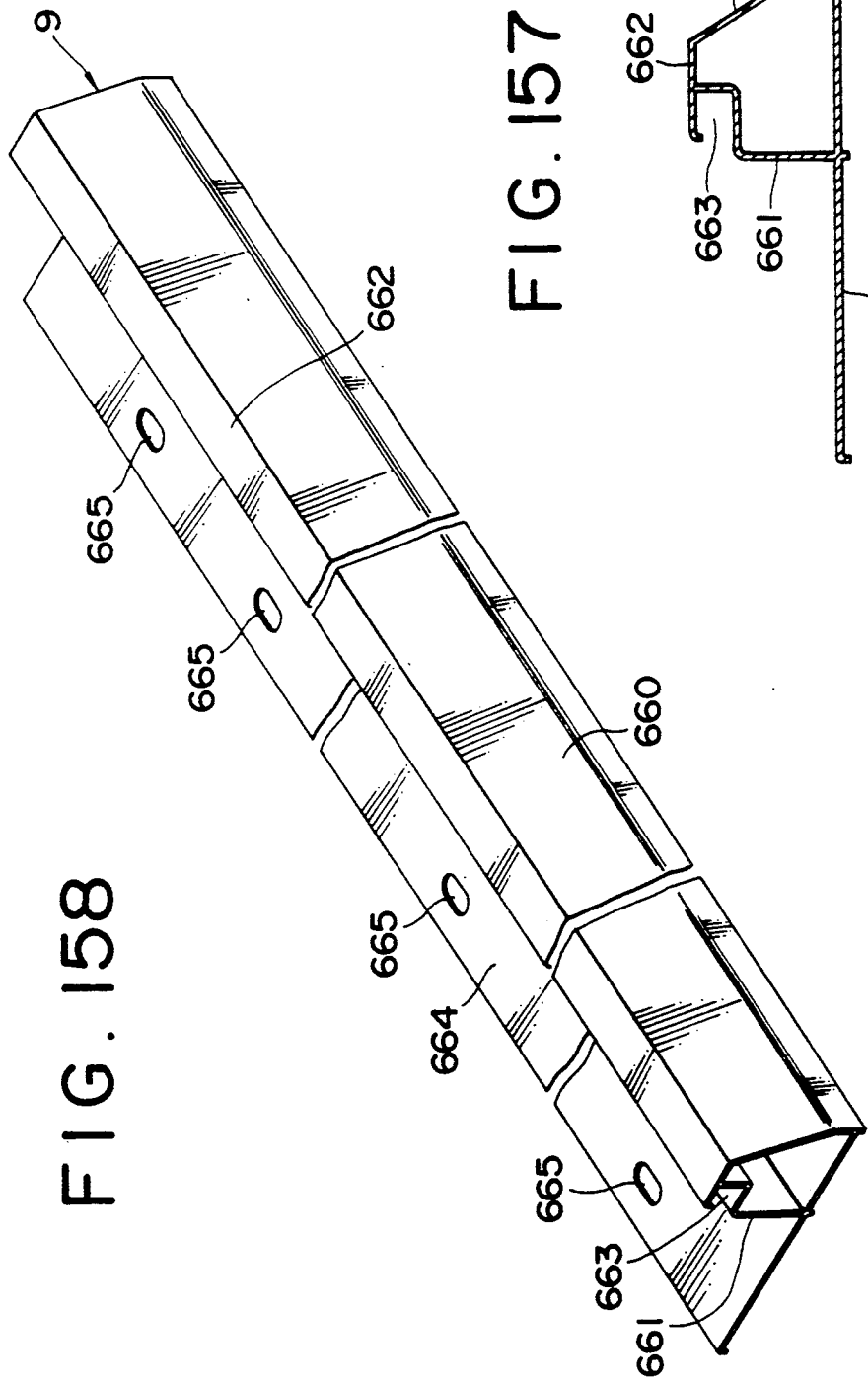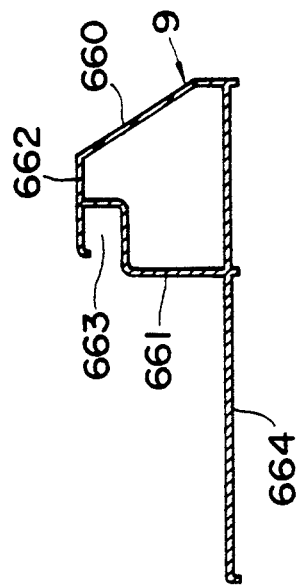
FIG. 157
FIG. 158

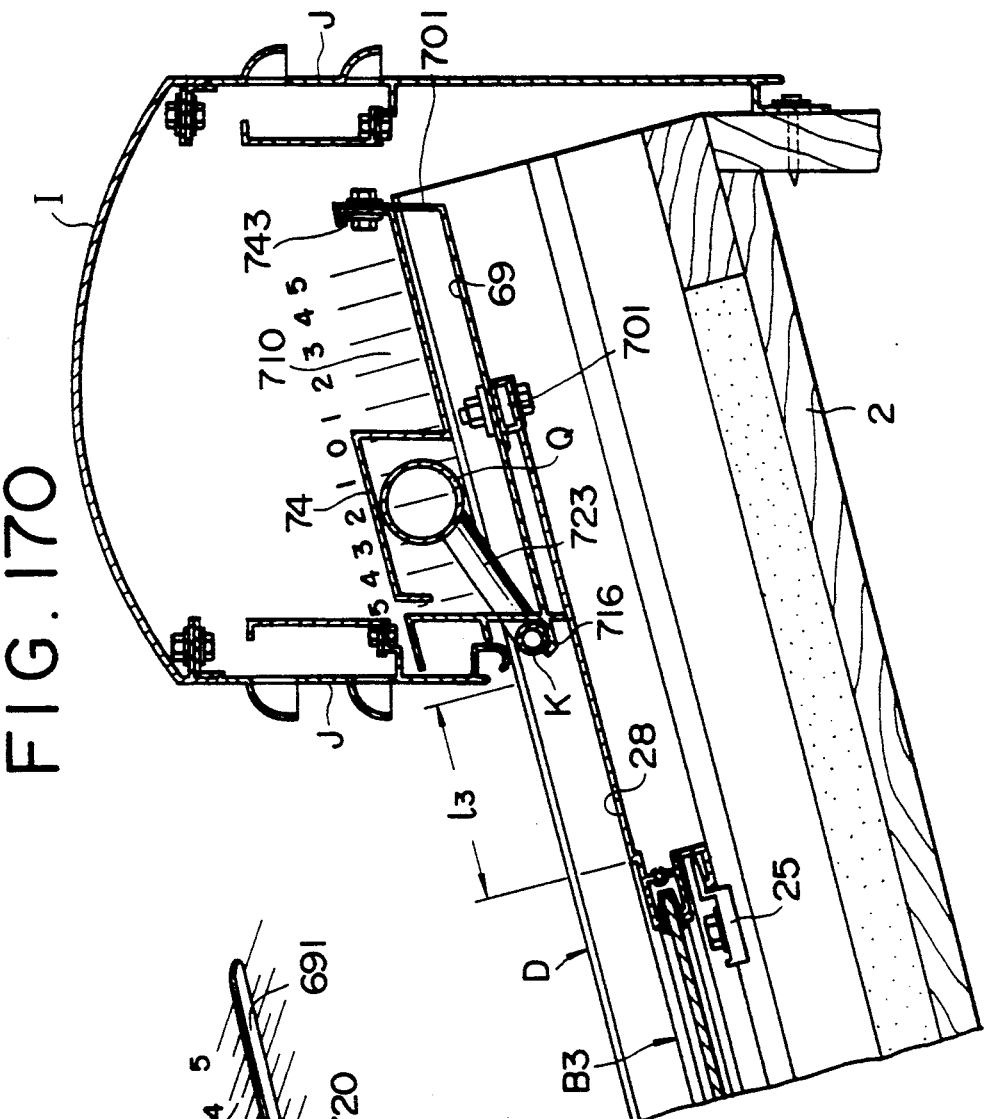
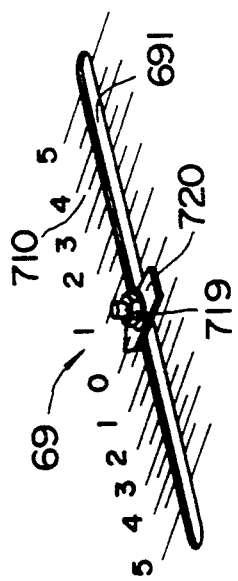
FIG. 170
FIG. 171

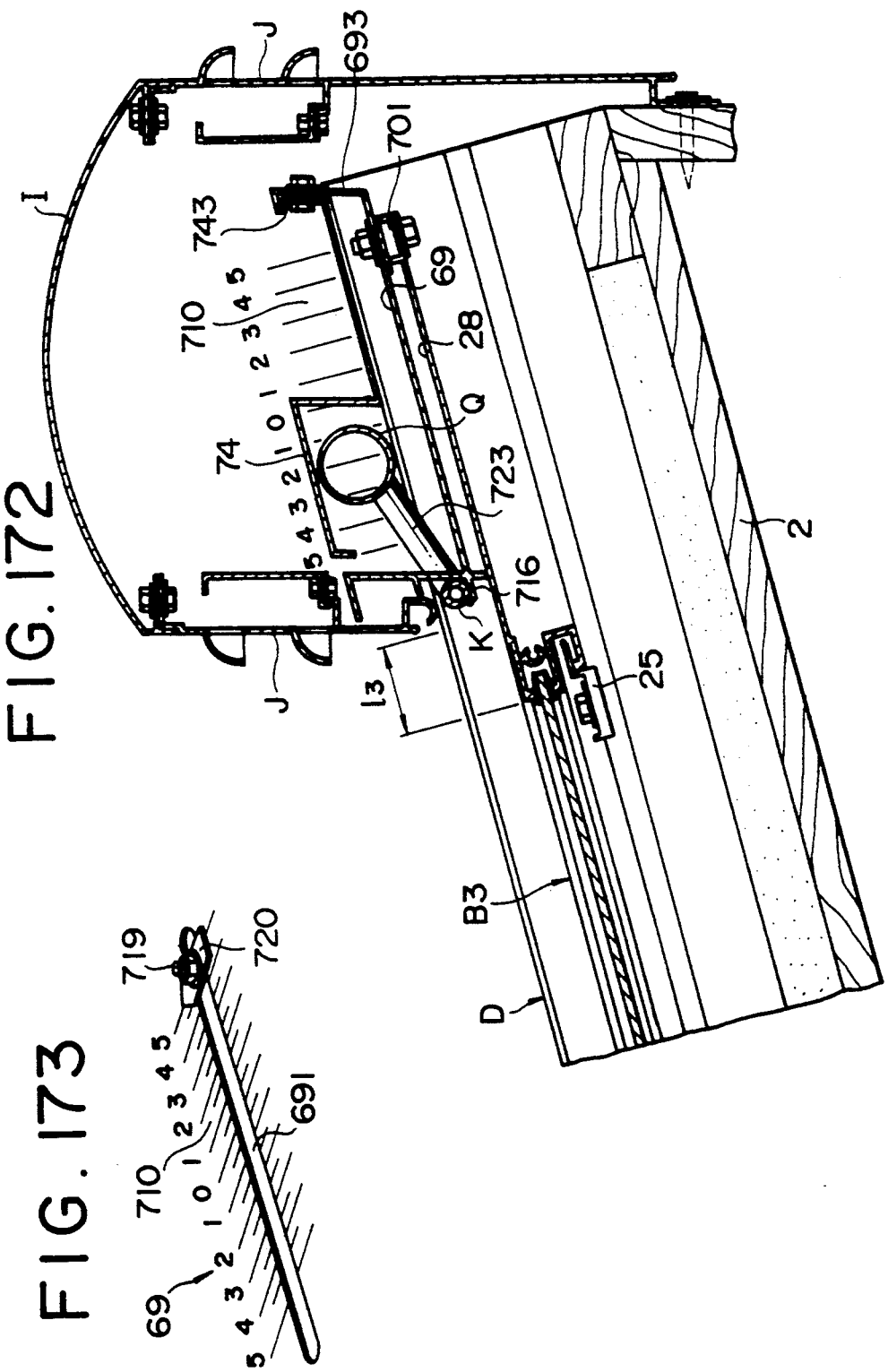

ROOF

BACKGROUND OF THE INVENTION

1. Field of the Invention

This invention relates to a roof and, more particularly, to a roof for useful for collection of solar energy.

2. Description of the Prior Art

A roof for the collection of solar energy, in which a heating medium sealed in a transparent roof sheet is heated by means of solar energy to make use of the resultant heat, and a roof in which a solar energy collector made of amorphous silicon or crystalline silicon is mounted on the back surface of a transparent roof sheet, are well known.

However, since each of these conventional roofs is complicated in structure, and includes a large number of members, construction of such conventional roofs is troublesome, and further the operation of adjusting the error in dimension of a roof when produced is troublesome, so that it has been impossible to provide a roof with a large-scale roof surface for collection of solar energy.

SUMMARY OF THE INVENTION

It is an object of the present invention to provide a roof, which permits the absorption of an error in dimension of a roof and an error in dimension of a roof member due to thermal expansion, and which is simple in execution of works to be easily capable of providing a large-scale roof.

In order to attain the above object, a roof according to the present invention comprises a lighting frame serving as a roofing member, a waterproof sheet laid under the lighting frame and a connecting member for laterally interconnecting the lighting frames and the water proof sheets, wherein the connecting member has an overhang portion provided at a lower portion at least on one side thereof and, the overhang portion is provided at the tip with a curved portion downwardly bent and outwardly curved into a convex shape. A wide lower width adjusting section for receiving a side edge of the water proof sheet is defined below the overhang portion, and a wide groove-like intermediate width-adjusting section for supporting a lower end of the side edge of the lighting frame is defined at an intermediate portion of the connecting member at least on the one side.

As described above, since the roof of the present invention is provided with the wide lower and intermediate width adjusting sections, and the side edge of the water proof sheet and that of the lighting frame, are respectively brought into engagement with these adjusting sections, the total finished width of the roof may be easily changed by sliding the side edge of the water proof sheet and that of the lighting frame toward the center or the side edge of the connecting member within the width adjusting section, so that any dimensional error of the backing of the roof may be absorbed.

Furthermore, even if a change in temperature occurs after the execution of works to expand or contract the roofing member in the width direction, the side edge of the lighting frame and that of the water proof sheet may be respectively moved within the intermediate and lower width adjusting sections to adjust the width of the roofing member, so that there is no possibility of an occurrence of distortion.

Furthermore, since the curved portion is provided at the tip of the overhang portion, it is possible to lay the waterproof sheet by making use of the curvature of the curved portion after mounting the connecting members on the backing through distribution of the connecting member intervals corresponding to the backing width, so that any dimensional error in execution of works may be reduced as small as possible.

BRIEF DESCRIPTION OF THE DRAWINGS

The foregoing and other objects and features of the invention will become apparent from the following description of embodiments of the invention with reference to the accompanying drawings, in which:

FIG. 26 is a front view showing the eaves water proof sheet;

FIG. 32 is a plan view showing a ridge water proof sheet;

FIG. 33 is a side view showing the ridge water proof sheet;

FIG. 34 is a front view showing the ridge water proof sheet;

FIG. 35 is a fragmentary sectional view showing the eaves water proof sheet and the intermediate water proof sheet;

FIG. 49 is a longitudinal cross-sectional view showing the ridge-side lighting frame;

FIG. 50 is a longitudinal cross-sectional view showing the first stage of mounting a lighting glass window frame;

FIG. 51 is a longitudinal cross-sectional view showing the second stage of mounting the lighting glass window frame;

FIG. 52 is a longitudinal cross-sectional view showing the final stage of mounting the lighting glass window frame;

FIG. 71 is a perspective view showing the surface of the lateral front base member;

FIG. 72 is a cross-sectional view showing the side of the roof, in the case where the adjustment in width is not necessary in the side of the roof;

FIG. 73 is a cross-sectionald view showing the side of the roof, in the case where the minus adjustment in width is done in the side of the roof;

FIG. 74 is a cross-sectional view showing the side of the roof, in the case where the plus adjustment in width is done in the side of the roof;

FIG. 75 is a cross-sectional view showing the side of the roof, in the case where the amount of the adjustment in width results in 0 in the sdie of the roof;

FIG. 101 is a perspective view showing the ridge water proof sheet;

FIG. 102 is a perspective view showing the ridge side member after the ridge water proof sheet is mounted thereon;

FIG. 123 is a fragmentary cross-sectional view showing a ridge side member;

FIG. 124 is a cross-sectional view of the end of the ridge showing the mounting of the ridge front member and the slide connector with respect to the pitch of the roof;

FIG. 125 is a cross-sectional view showing the intermediate connecting member;

FIG. 126 is a perspective view, partly broken-away, showing an eaves-side closing member;

FIG. 127 is a perspective view showing the intermediate connecting member;

FIG. 128 is a sectional view showing an intermediate connecting member cover mounted on the intermediate connecting member;

FIG. 129 is a perspective view showing the back surface of the intermediate connecting member prior to mounting;

FIG. 130 is a perspective view showing the adjacent intermediate connecting members before the connection thereof;

FIG. 131 is a perspective view showing the adjacent intermediate connecting members during the step of connection thereof;

FIG. 132 is a perspective view showing the adjacent intermediate connecting members after the connection thereof;

FIG. 133 is a perspective view showing the adjacent intermediate connecting member covers before the connection thereof;

FIG. 134 is a perspective view showing the adjacent intermediate connecting member covers after the connection thereof;

FIG. 135 is a cross-sectional view showing the side connecting member;

FIG. 136 is a perspective view showing the side connecting member;

Figure 137:
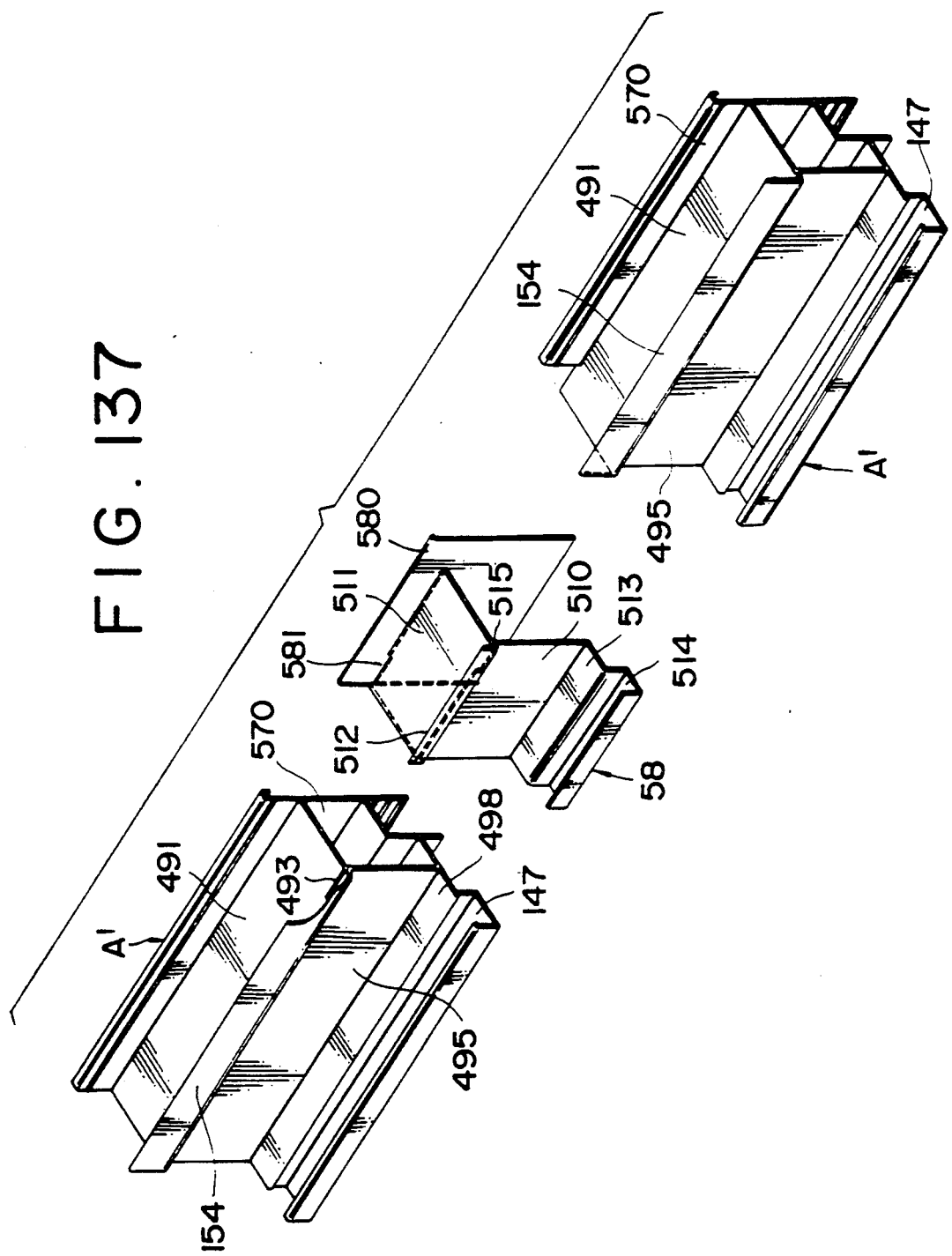
Figure 138:
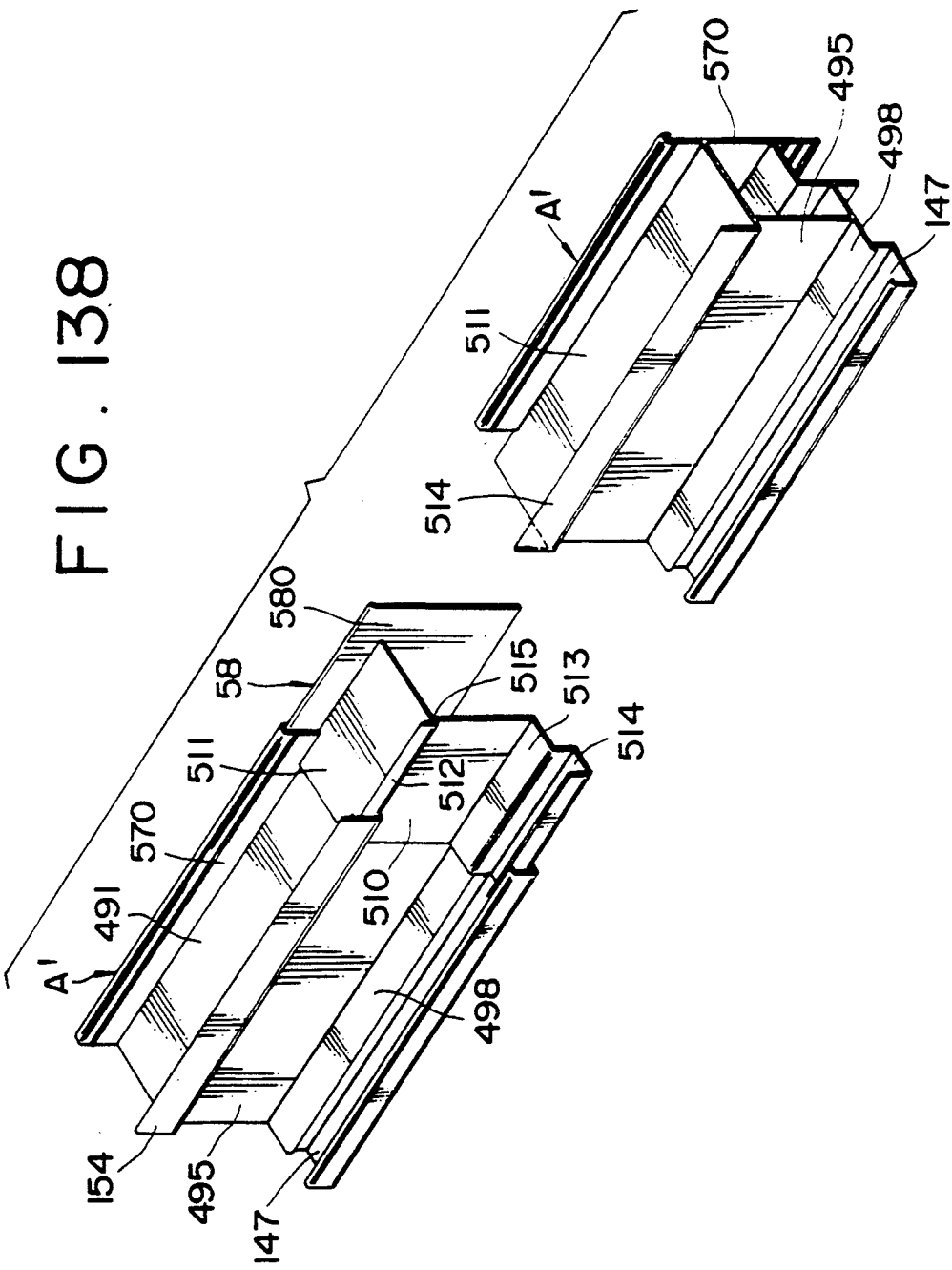
Figure 139:
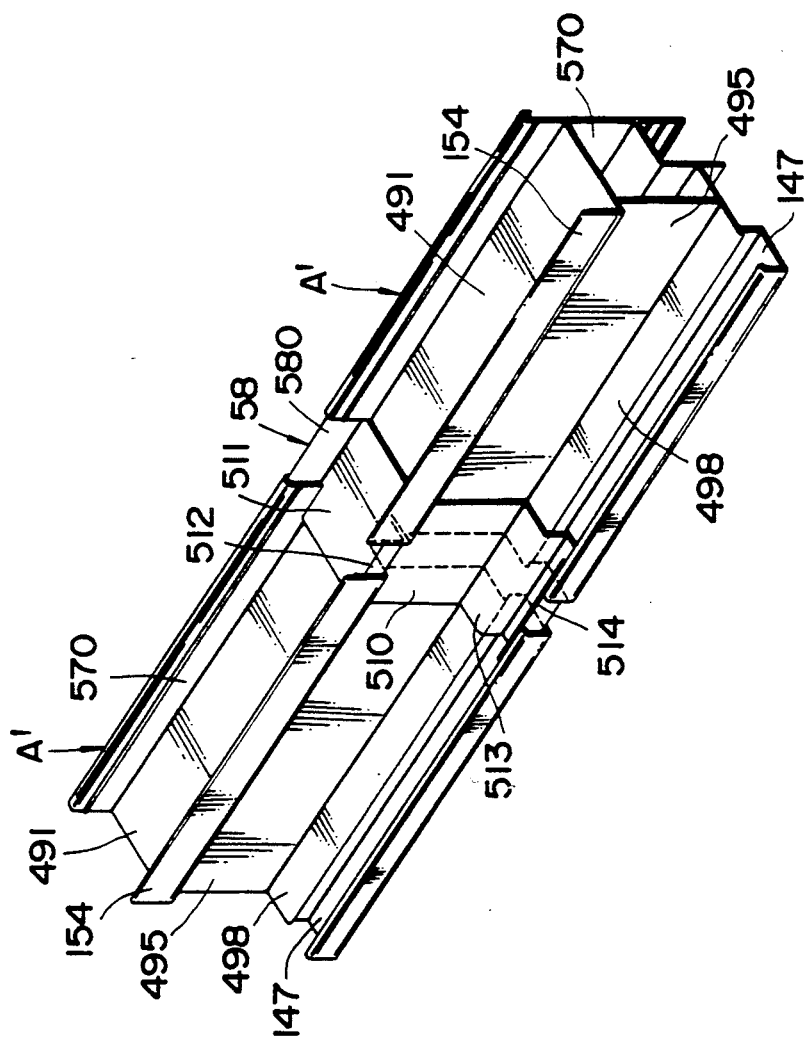
Figure 140:
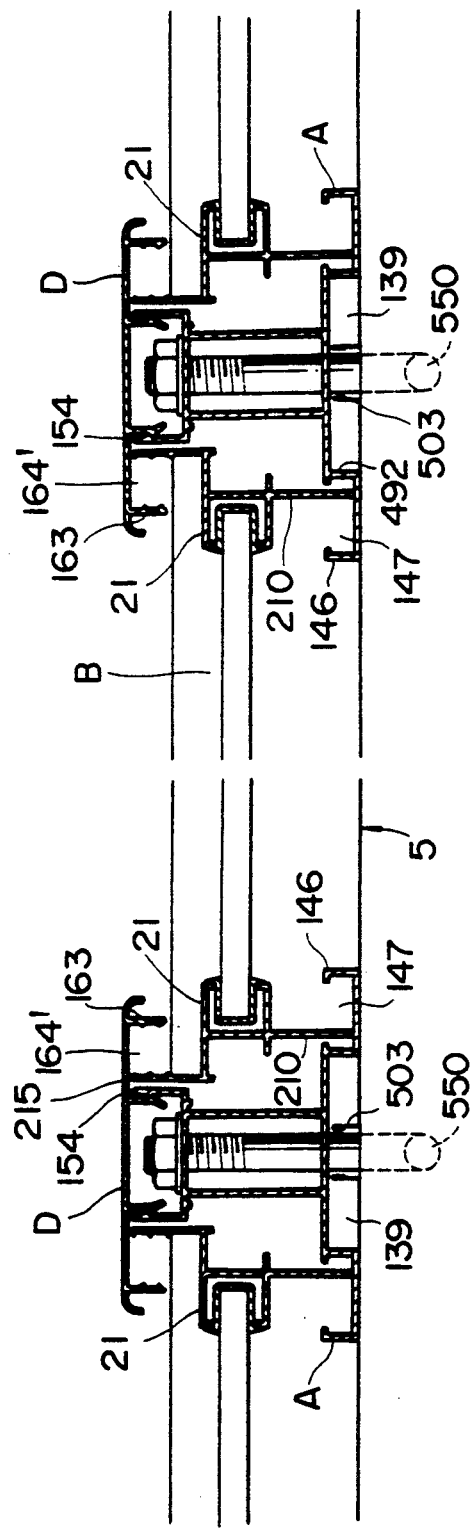
Figure 141:
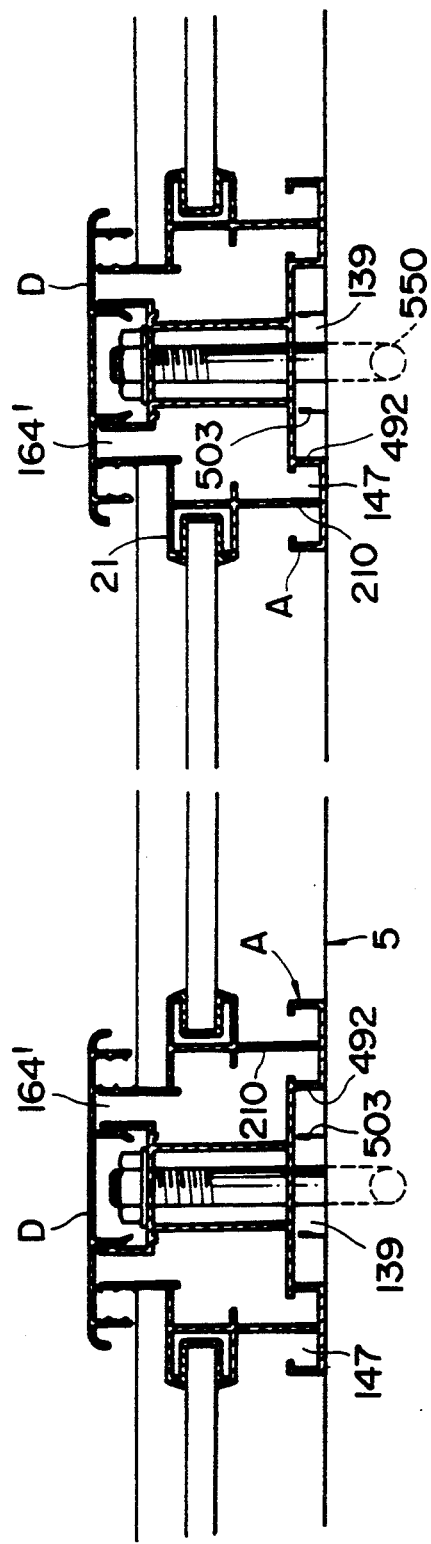
Figure 142:
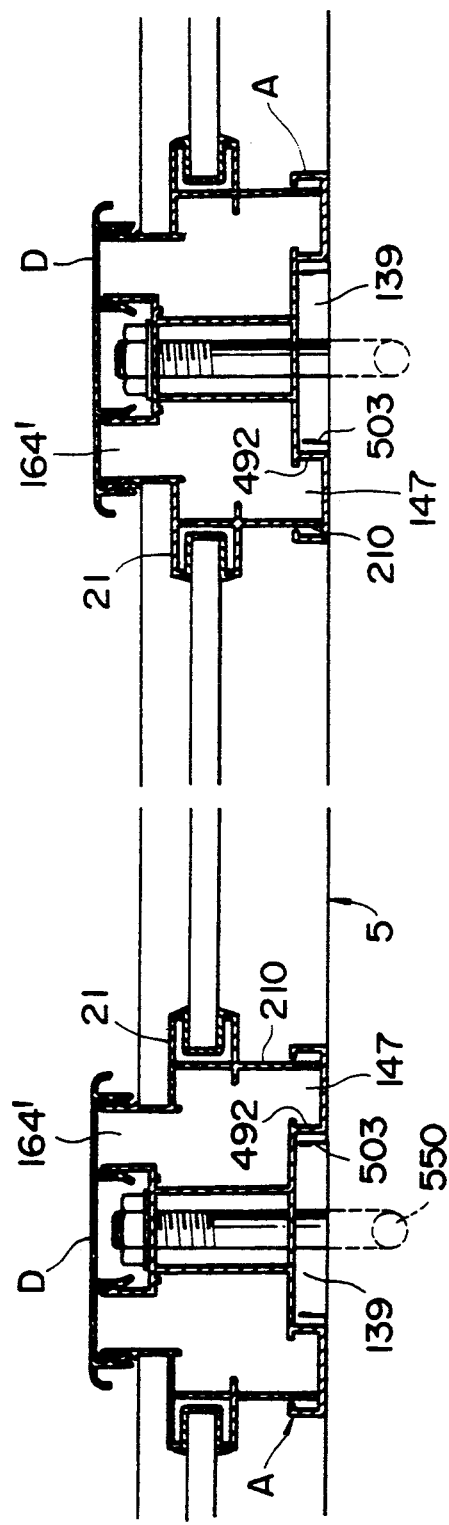
Figure 143:
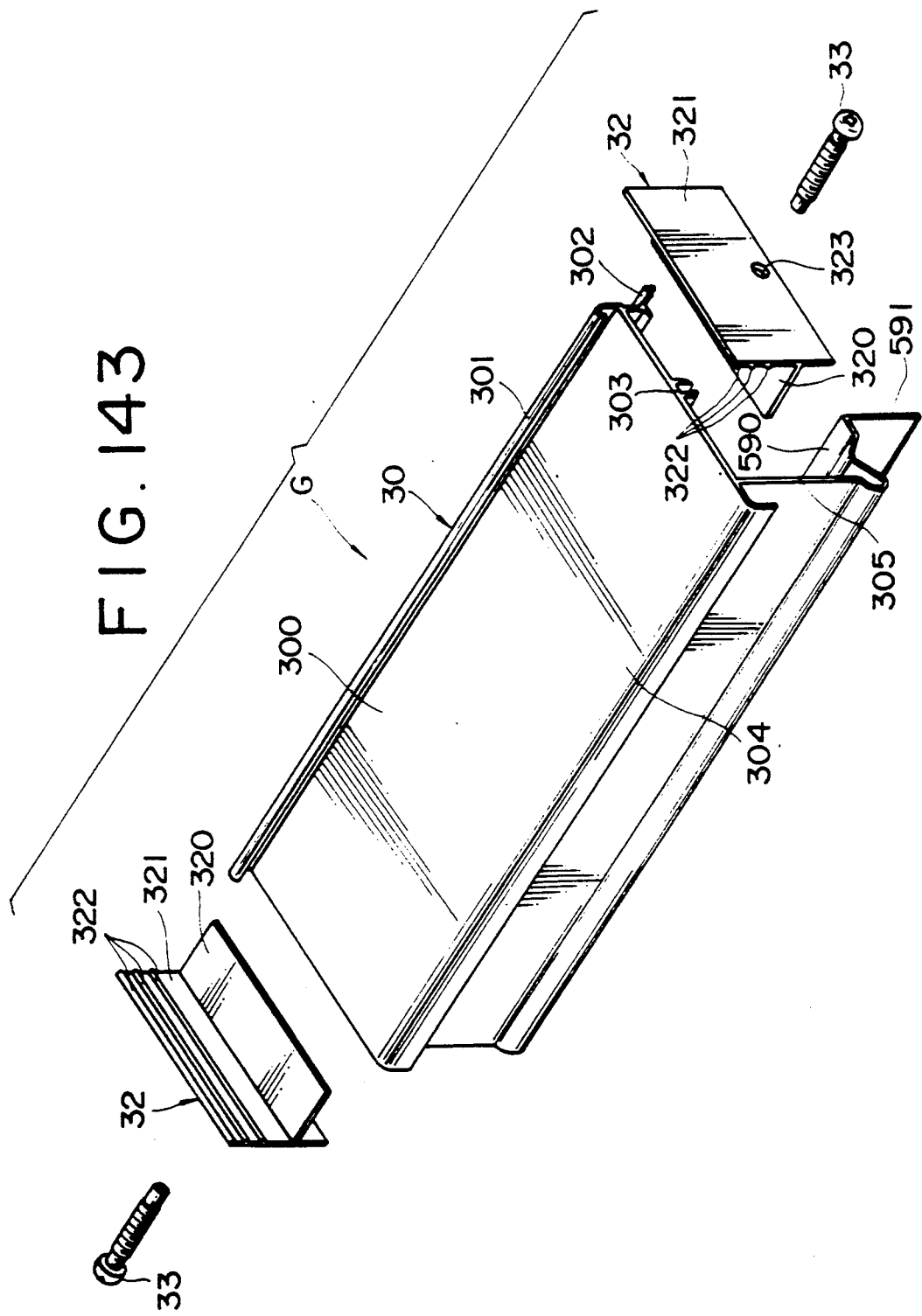
Figure 144:
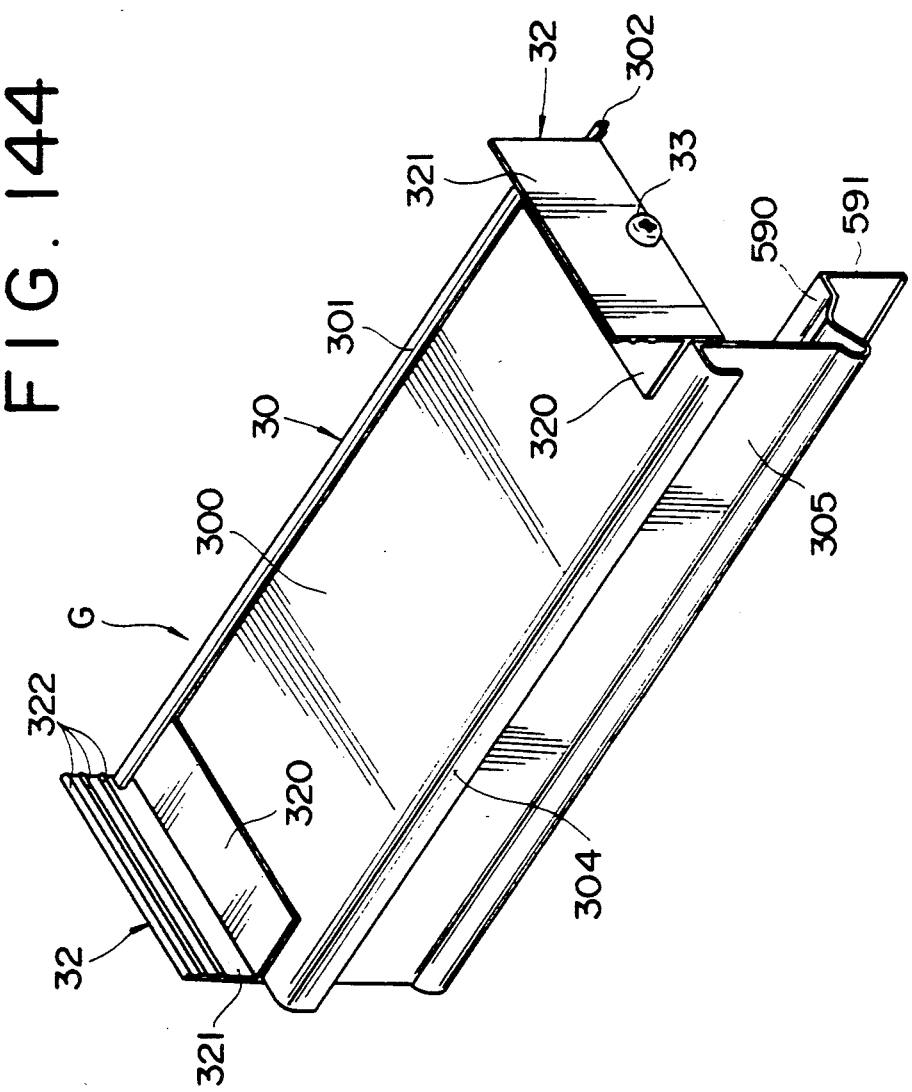
Figure 145:
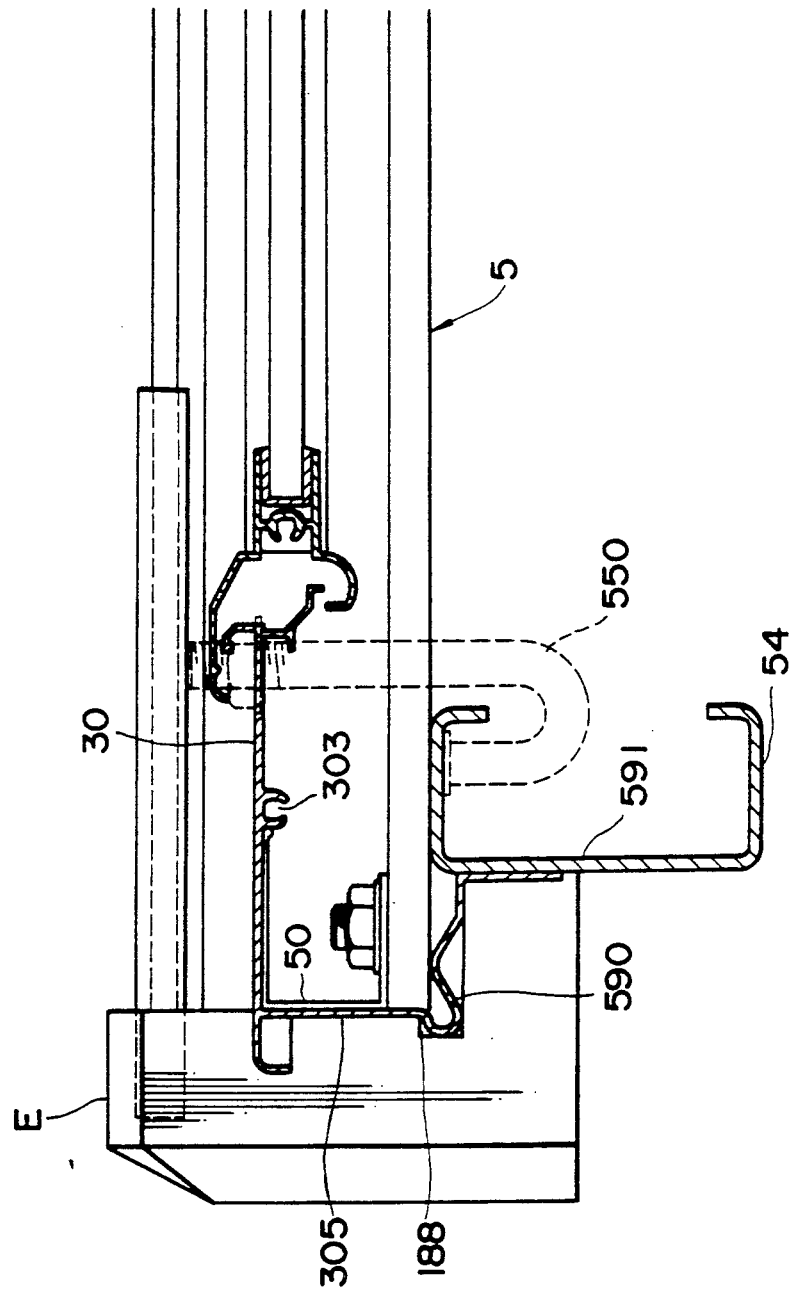
Figure 146:
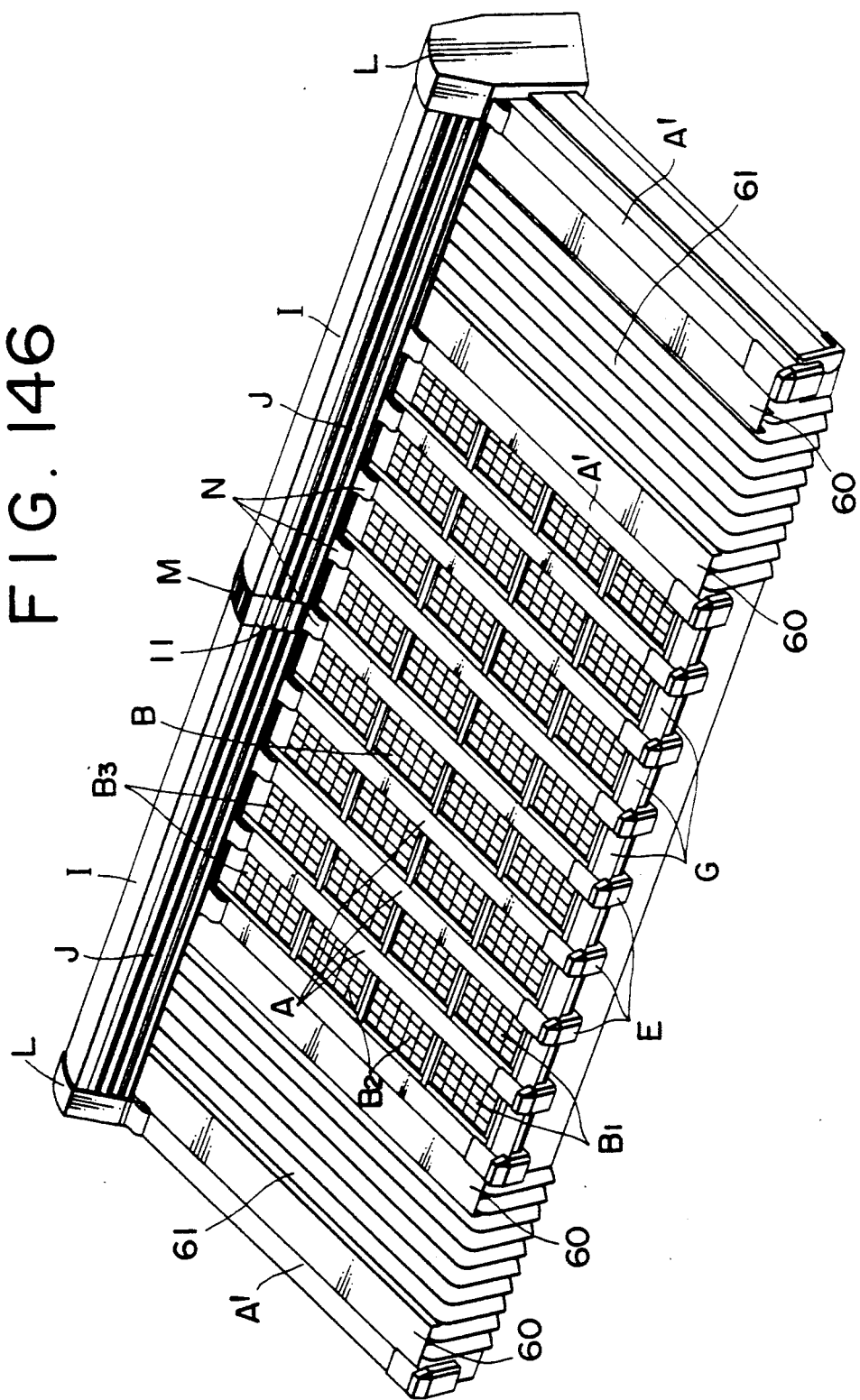
Figure 149:
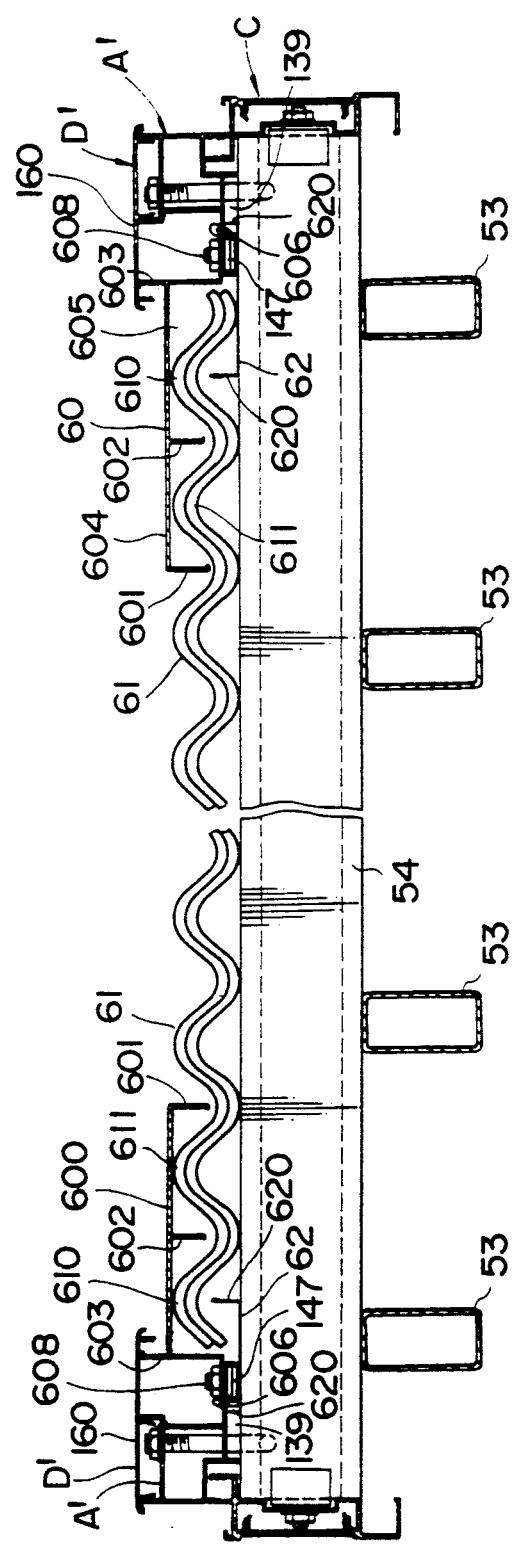
Figure 150:
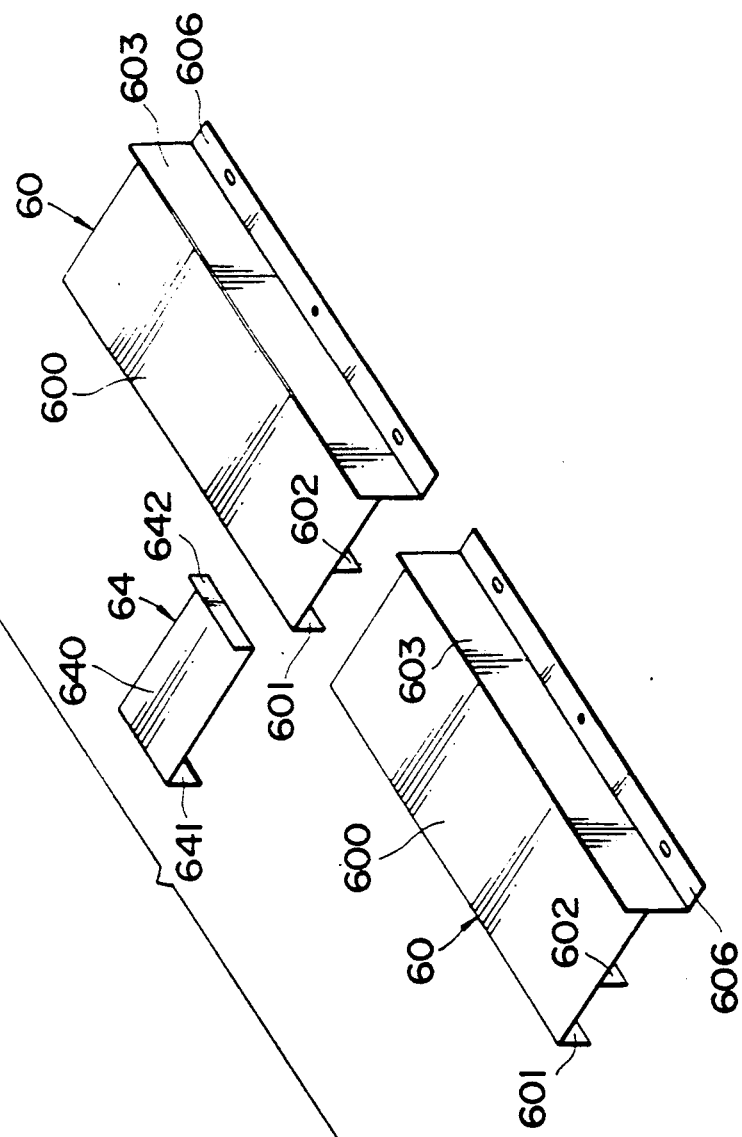
Figure 153:
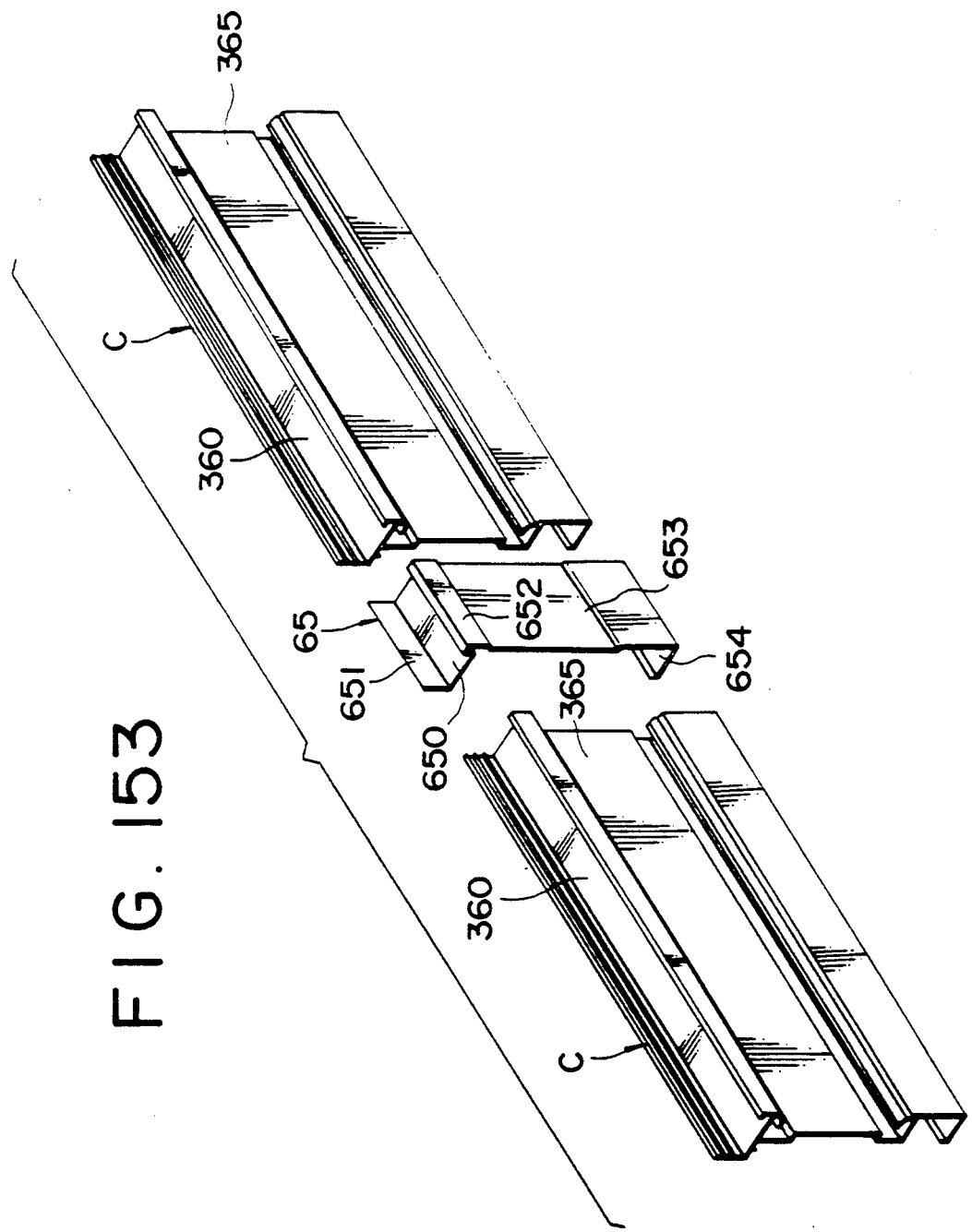
Figure 154:
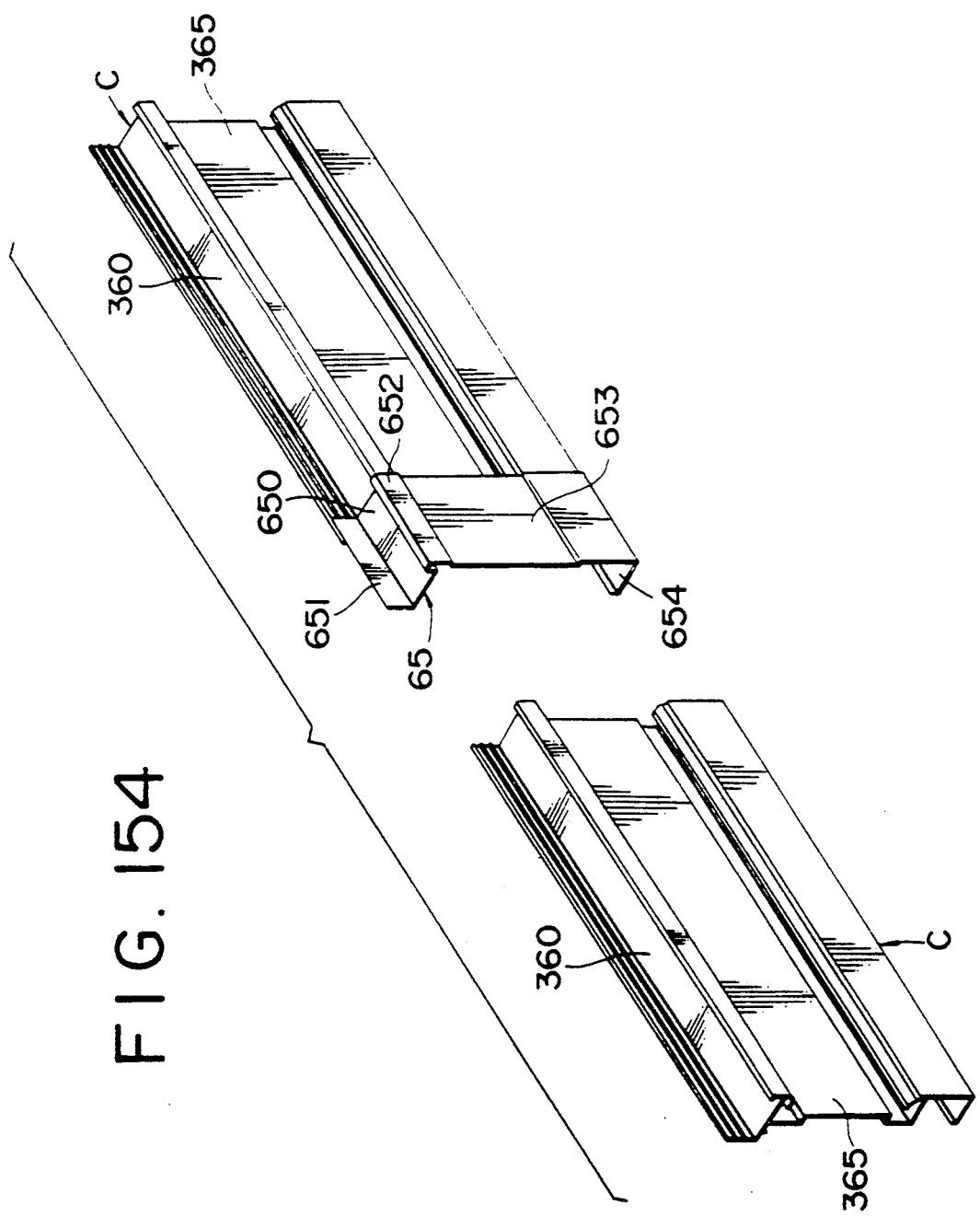
Figure 155:
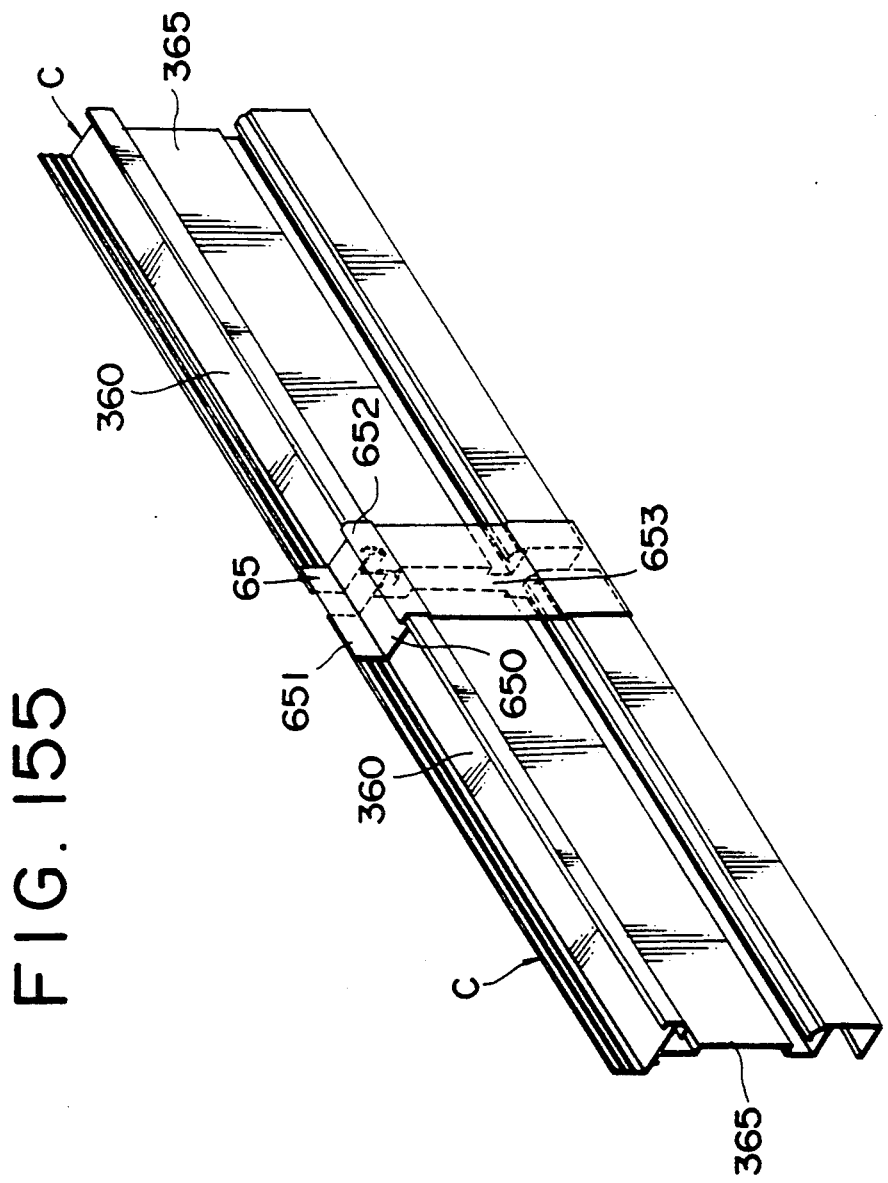
Figure 156:
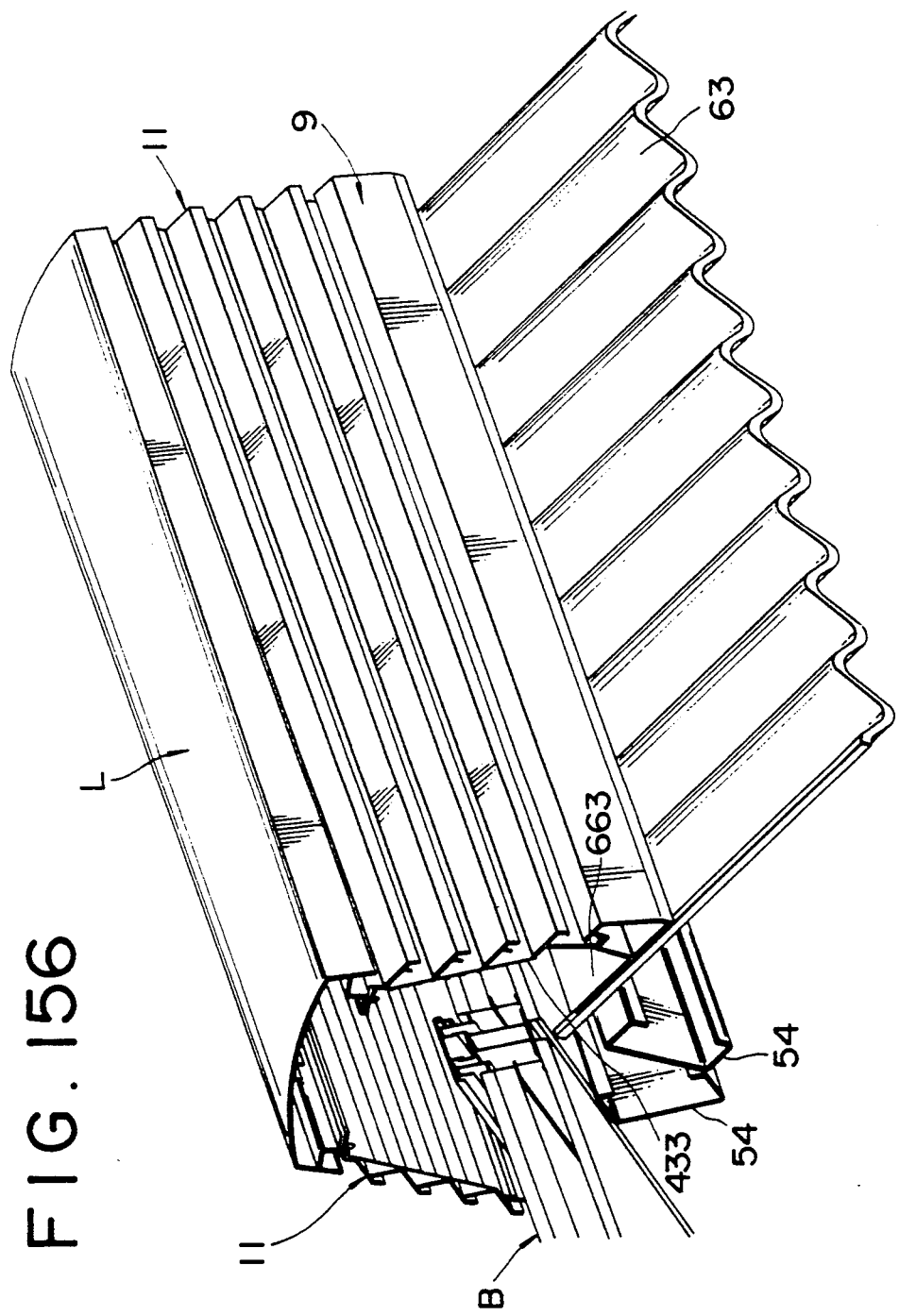
Figure 159:
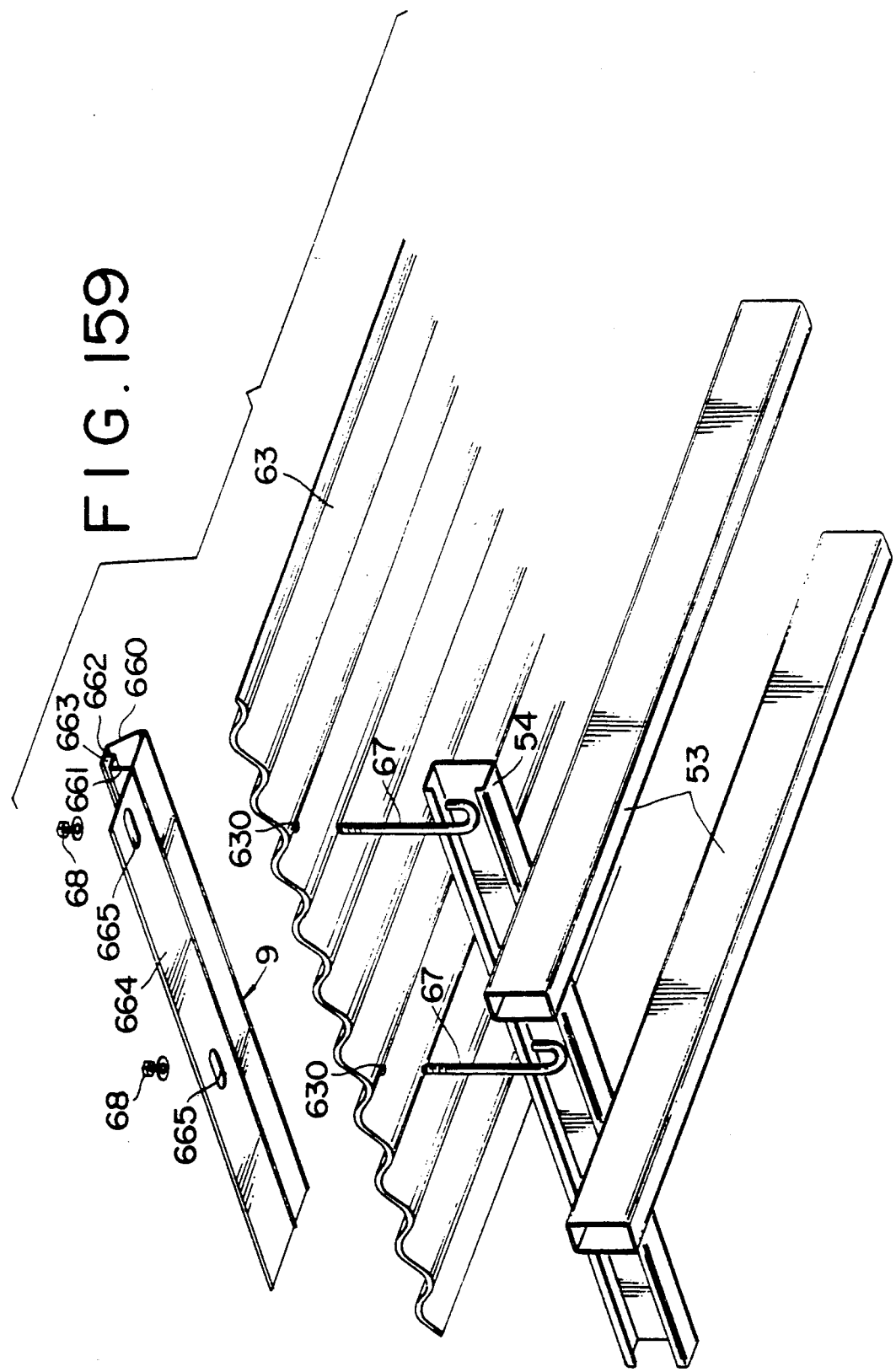
Figure 160:
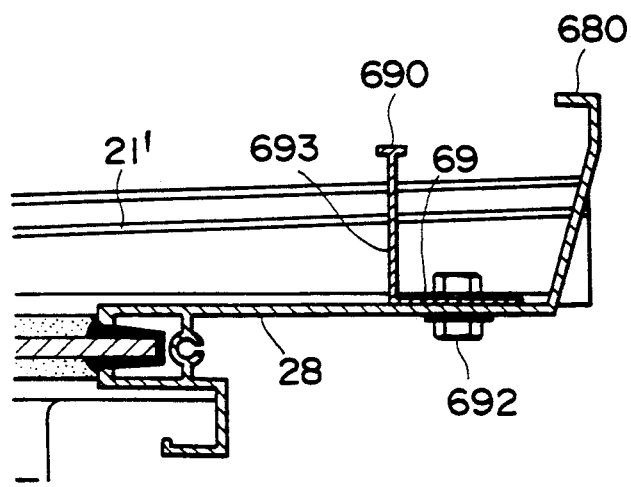
Figure 161:
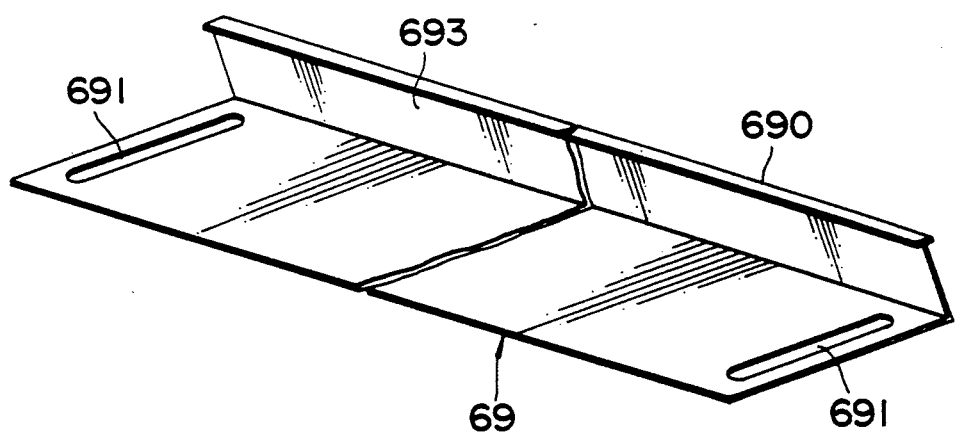
Figure 162:
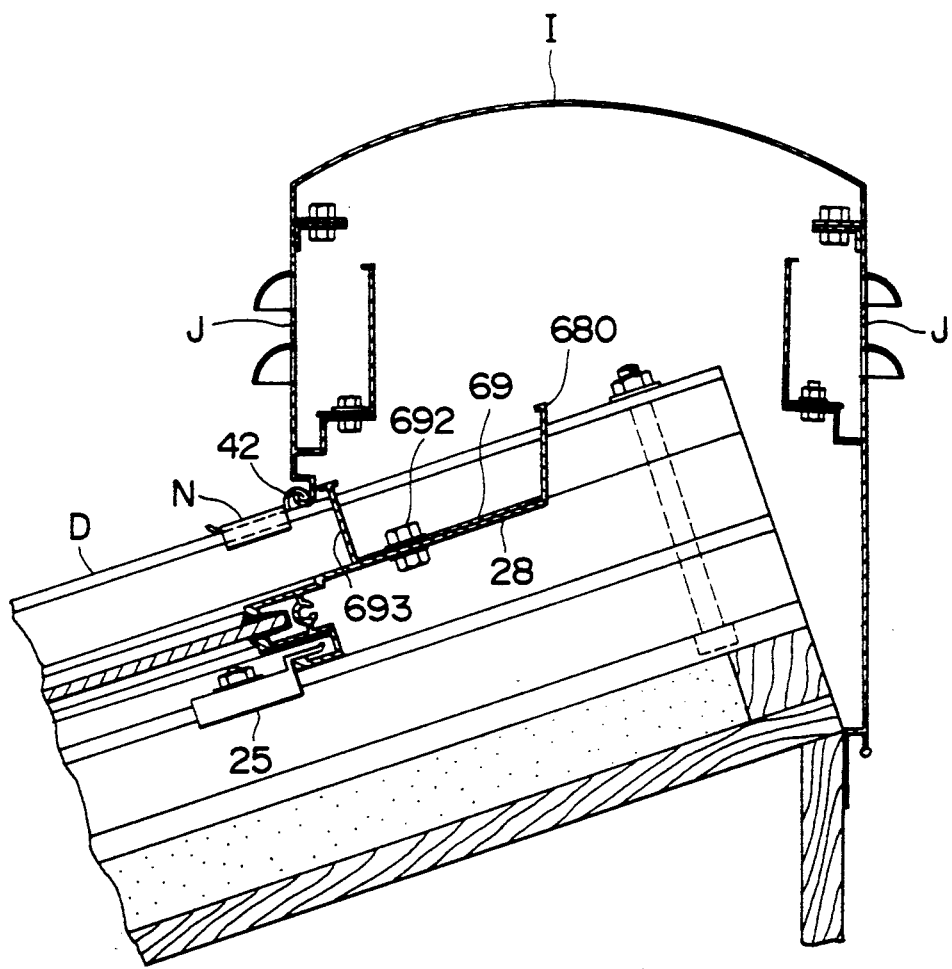
Figure 163:
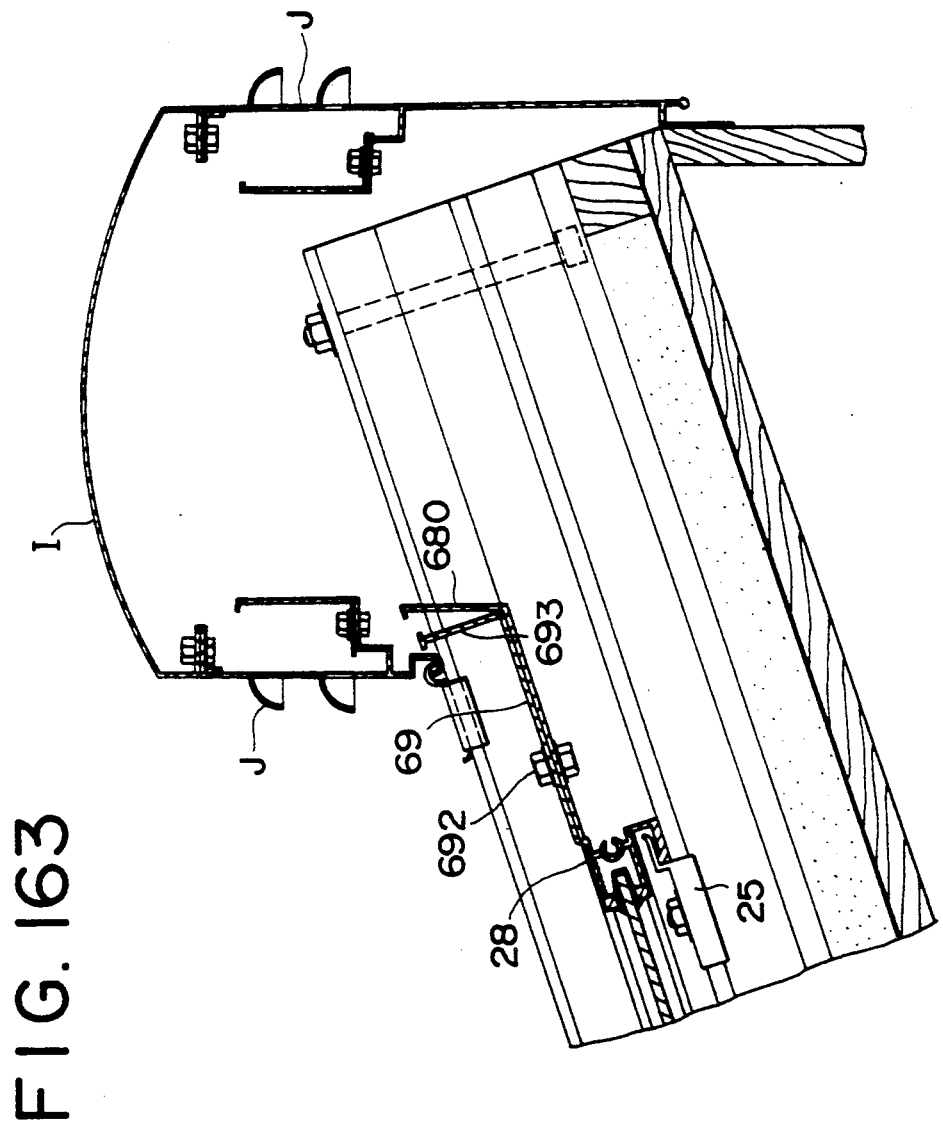
Figure 164:
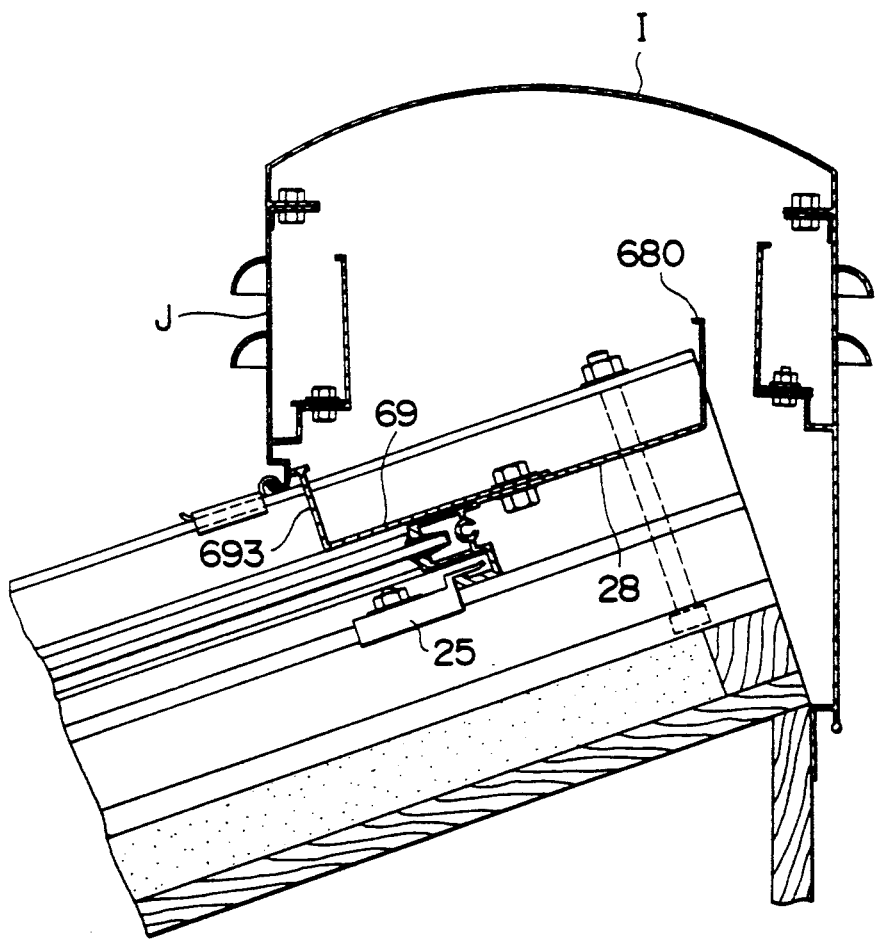
Figure 165:
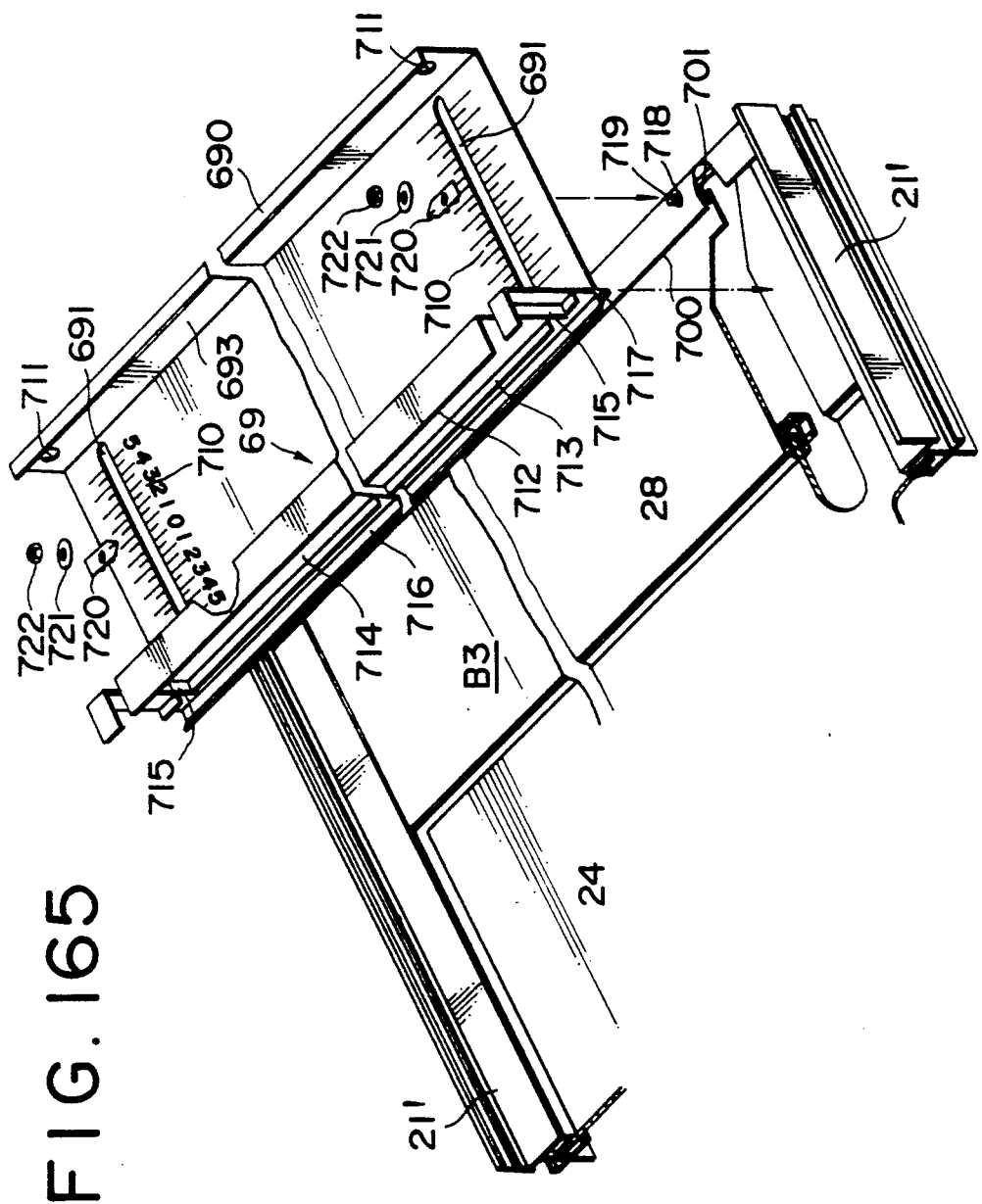
Figure 166:
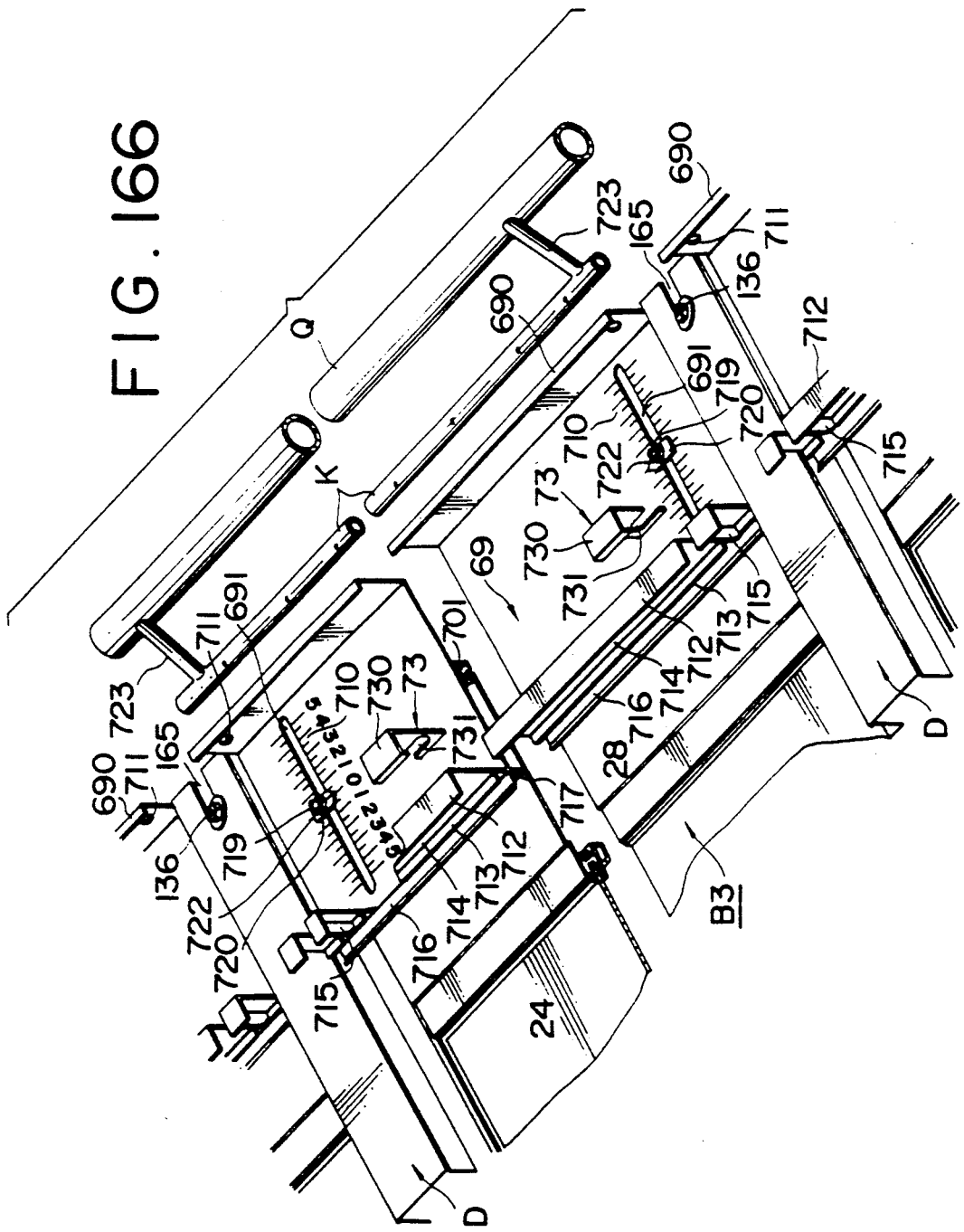
Figure 167:
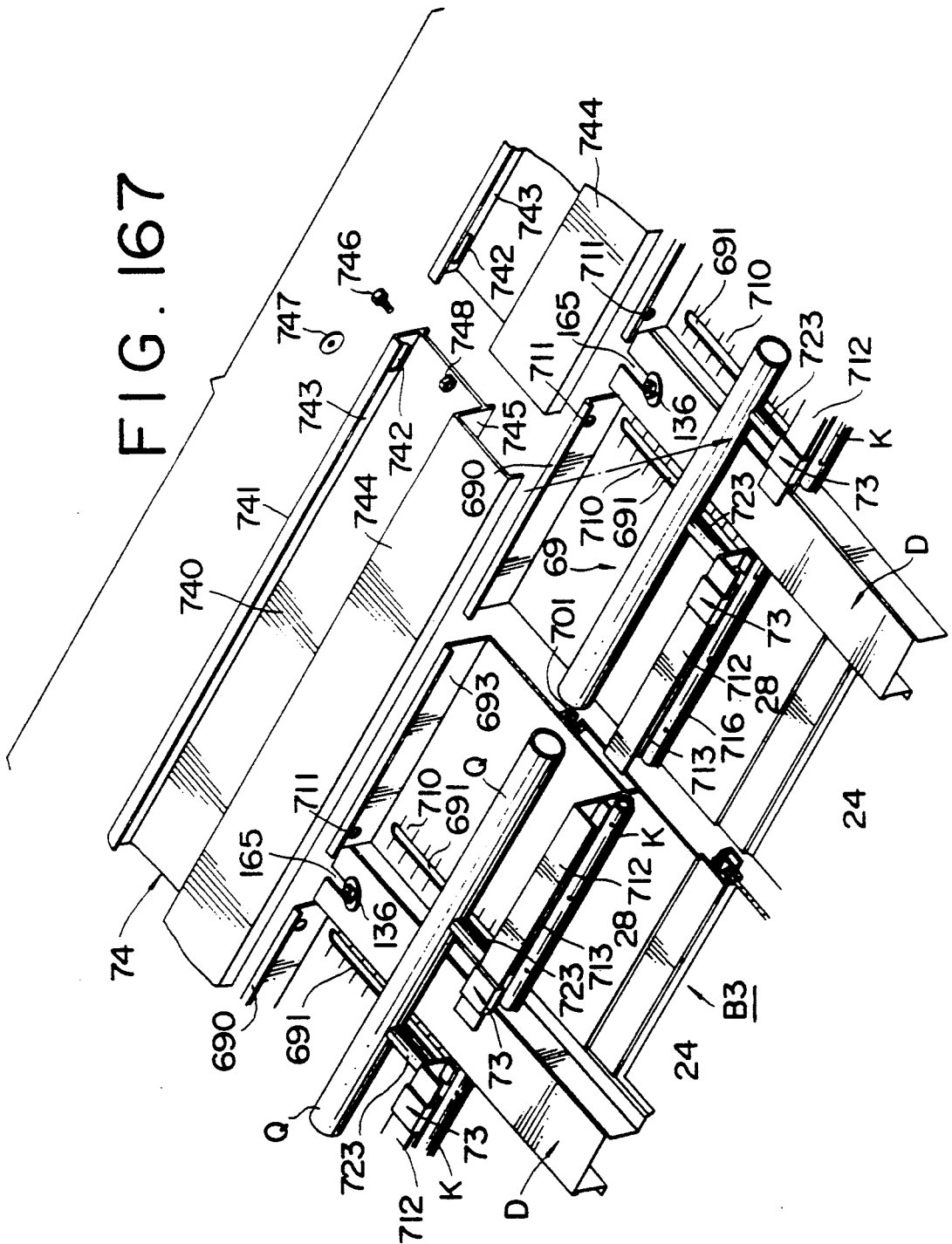
Figure 168:
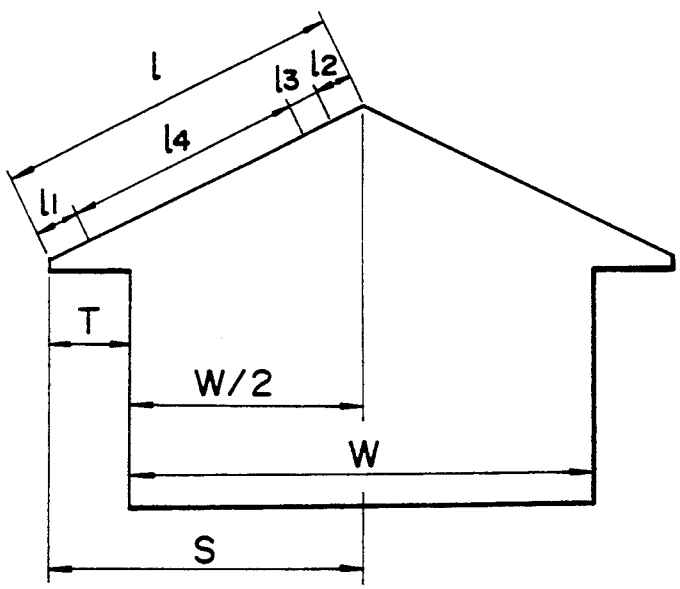
Figure 169:
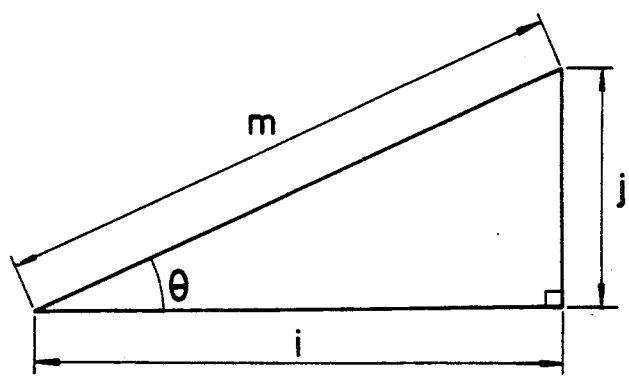
Figure 174:
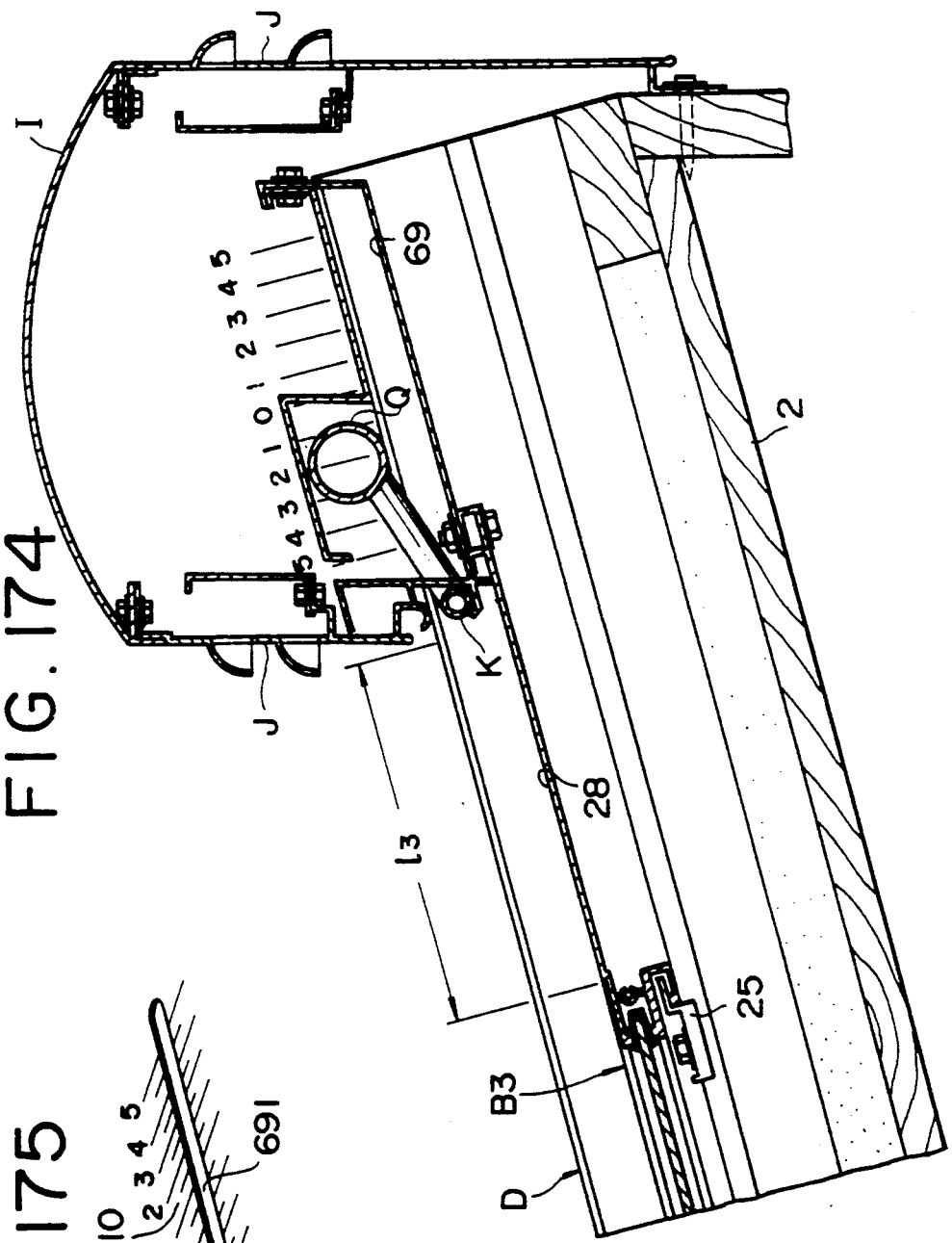
Figure 175:
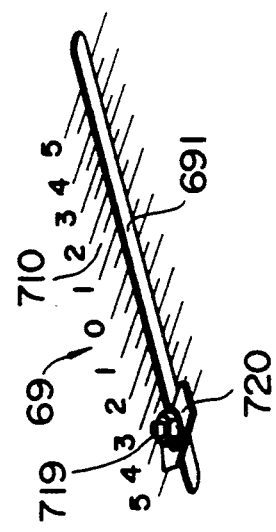

FIG. 137 is a perspective view showing the adjacent side connecting members before the connection thereof;

FIG. 138 is a perspective view showing the adjacent side connecting members during the step of connection thereof;

FIG. 139 is a perspective view showing the adjacent side connecting members after the connection thereof;

FIG. 140 is a cross-sectional view showing an intermediate connecting member portion of the roof, in which the amount of adjustment intermediate width is large;

FIG. 141 is a cross-sectional view showing the intermediate connecting member portion of the roof, in which the amount of adjustment in intermediate width is normal;

FIG. 142 is a cross-sectional view showing the intermediate connecting member portion of the roof, in which the amount of adjustment in intermediate width is small;

FIG. 143 is a perspective view showing an eaves cover before a flashing water proof wall is mounted thereon;

FIG. 144 is a perspective view showing the eaves cover after the flashing water proof wall is mounted thereon;

FIG. 145 is a longitudinal cross-sectional view showing an eaves portion of the roof;

FIG. 146 is a cross-sectional view showing the side of the roof, in which the lighting frame is provided only on the center of the roof surface;

FIG. 147 is a cross-sectional view showing a flashing cover;

FIG. 148 is a perspective view showing the flashing cover;

FIG. 149 is a cross-sectional view showing the side of the flashing cover;

FIG. 150 is a perspective view showing the adjacent flashing covers before the connection thereof;

FIG. 151 is a perspective view showing the adjacent flashing covers during the step of connection thereof;

FIG. 152 is a perspective view showing the adjacent flashing covers after the connection thereof;

FIG. 153 is a perspective view showing the adjacent lateral front members before the connection thereof;

FIG. 154 is a perspective view showing the adjacent lateral front members during the step of connection thereof;

FIG. 155 is a perspective view showing the adjacent lateral front members after the connection thereof;

FIG. 156 is a cut-out perspective view showing the ridge portion;

FIG. 157 is a cross-sectional view showing a ridge member support bed;

FIG. 158 is a perspective view showing the ridge member support bed;

FIG. 159 is an exploded perspective view showing an essential portion of the back of another roof surface;

FIG. 160 is a perspective view showing another embodiment of a ridge flashing device;

FIG. 161 is a perspective view showing the back board;

FIG. 162 is a sectional view showing the ridge of the roof, in which the backing is normal in length;

FIG. 163 is a sectional view showing the ridge of the roof, in which the backing is longer than the normal;

FIG. 164 is a sectional view showing the ridge of the roof, in which the backing is smaller than the normal;

FIG. 165 is a fragmentary perspective view showing the ridge-side lighting frame before the back board in accordance with a further embodiment of the ridge flashing device is mounted thereon;

FIG. 166 is a fragmentary perspective view showing the ridge-side lighting frame before a cleaning device is mounted thereon;

FIG. 167 is a fragmentary perspective view showing the ridge-side lighting frame before the water proof cover is mounted thereon;

FIG. 168 is a schematic view of a house showing the relation in dimension of various parts of the house;

FIG. 169 is a schematic view showing the relation in dimension of a roof;

FIG. 170 is a cross-sectional view showing the ridge of the roof when normally mounted;

FIG. 171 is a perspective view showing the adjusting scale indication in the case shown in FIG. 170;

FIG. 172 is a cross-sectional view showing the ridge of the roof when minus adjustment is done;

FIG. 173 is a perspective view showing the adjusting scale indication in the case shown in FIG. 172;

FIG. 174 is a cross-sectional view showing the ridge of the roof the plus adjustment is done; and FIG. 175 is a cross-sectional view showing the adjusting scale indication in the case shown in FIG. 174.

DETAILED DESCRIPTION OF THE PREFERRED EMBODIMENTS

Figure 2:
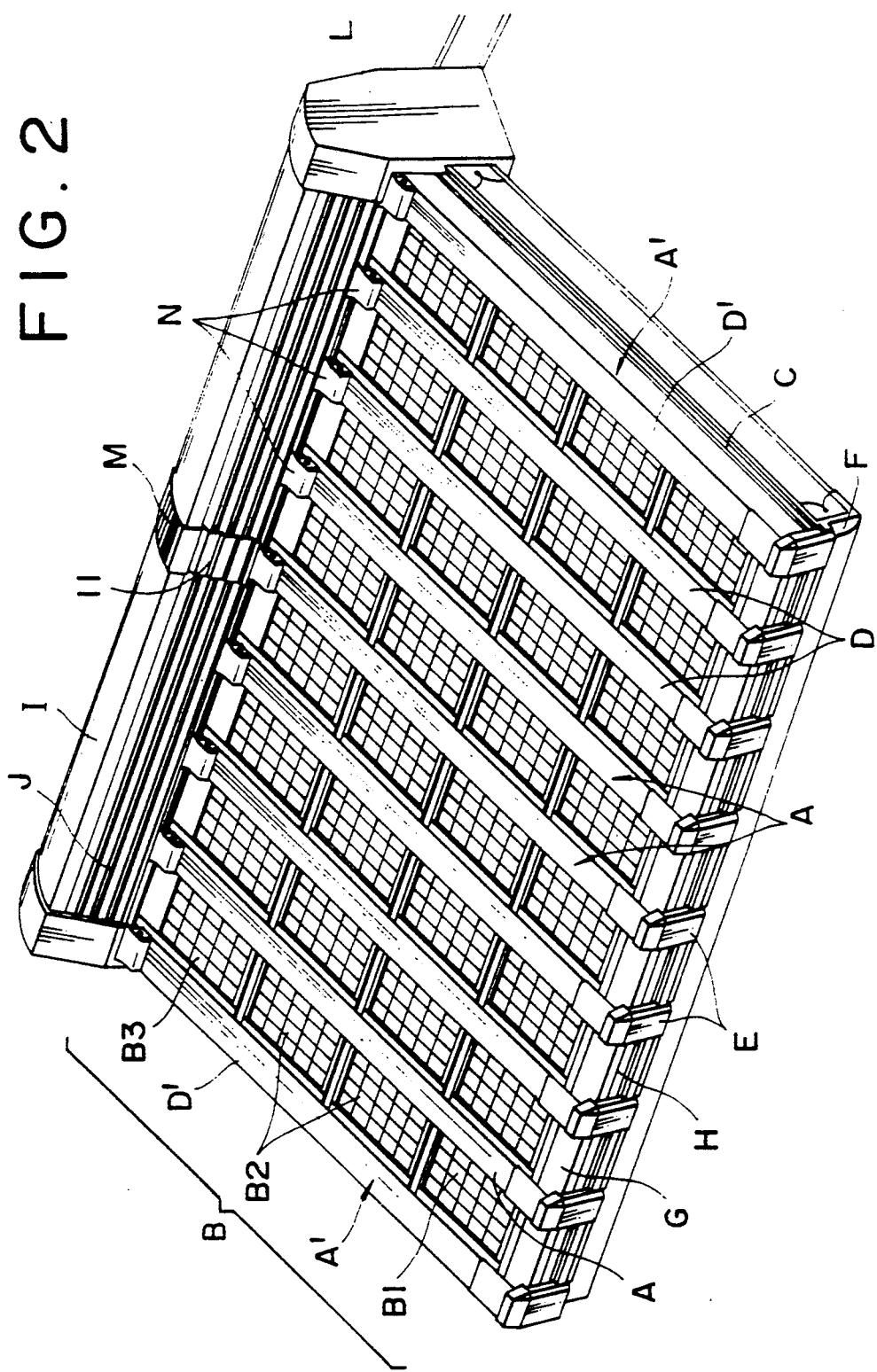
FIG. 2 a general perspective view showing the roof for the use of collection of solar energy according to the present invention.

FIG. 2 is a perspective view showing a complete roof for the use of collection of solar energy. In FIG. 2, reference symbol A designates an intermediate connecting member provided on the roof except either side thereof, and B a lighting frame mounted between the adjacent intermediate connecting members A, A to serve as a roofing member of the roof. A photoelectric generating element for transducing solar energy into electric energy is provided under the lighting frame. Further, the lighting frame B is composed of an eaves-side frame B1 provided at the eaves of the roof, an intermediate frame B2 provided between the eaves and the ridge of the roof, and a ridge-side frame B3 provided at the ridge of the roof. Reference symbol A' designates a side connecting member provided at either side of the roof, and on one side of the side connecting member A' is mounted a lateral front base member C, instead of the lighting frame B. Reference symbol D designates an intermediate connecting member cover, and D' a side connecting member cover. Each of these covers D, D' is approximately equal in length with the lighting frame B. Reference symbol E designates a dust proof cap, F a decorative cover mounted in the lower corner of the side of the roof, G an eaves cover used for dust proof and inspection of a wiring, and H an eaves intake port provided in the eaves cover G. Further, reference symbol I designates a ridge cap, J a ridge side member provided at the ridge, L an eaves front member provided at the edge of the eaves, M a ridge cap connecting member for connecting the ridge caps I with each other, and N a ridge mounting member.

Figure 3:
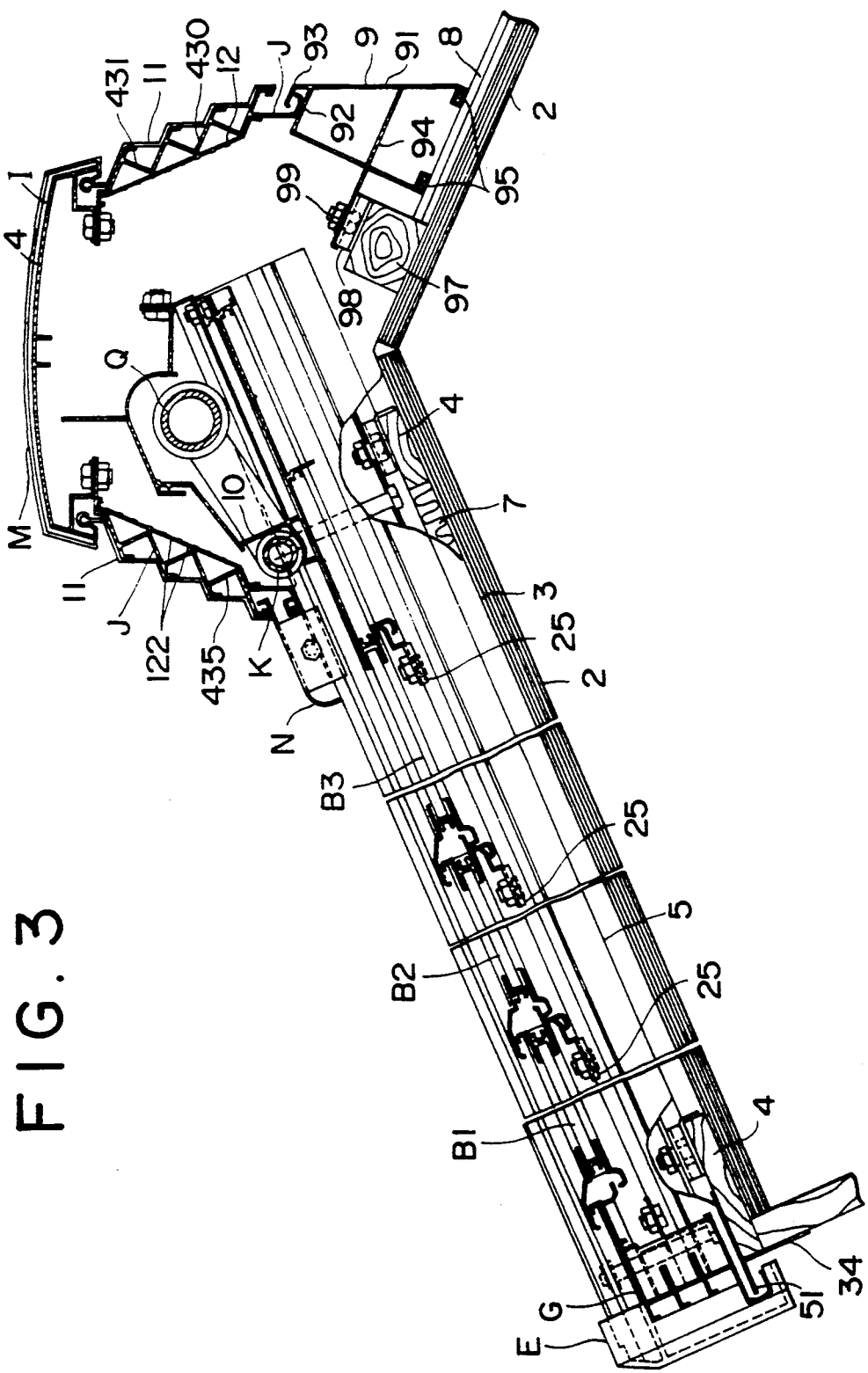
FIG. 3 is a fragmentary longitudinal cross-sectional view showing the roof for the use of collection of solar energy according to the present invention.

FIG. 3 is a longitudinal cross-sectional view of the solar energy collecting roof according to the present invention. In FIG. 3, reference numeral 2 designates battens, which are laid on rafters 1 (see FIG. 1). The batten 2 is covered with a building paper 3, and a plurality of crosspieces 4 extending in parallel with a line of the eaves are disposed on the building paper 3 at proper intervals. On these crosspieces, a plurality of water proof sheets 5 are mounted between the eaves and the ridge of the roof to be successively connected with each other in the lateral direction by the use of the respective intermediate connecting members A, as shown in FIG. 2. An upright engaging water proof wall 503 is provided at either side of each water proof sheet 5, and a downwardly bent throating portion 51 is provided at an eaves portion of the water proof sheet 5. A heat insulating material 7 (glass wool, foaming resin or the like) is filled in a portion between the adjacent crosspieces 4 at the underside of each water proof sheet 5. The eaves cover G, the eaves-side lighting frame B1, the intermediate lighting frame B2, and the ridge-side lighting frame B3 are interconnected successively from the eaves side toward the ridge on a plurality of water proof sheets 5, which are successively connected with each other in the lateral direction by the use of the respective intermediate connecting members A. The dust proof cap E closes each eaves edge portion of the connecting members A, A'. Reference symbol K designates a sprinkling pipe connected with a cleaning device Q used for melting snow.

Reference numeral 8 designates a roof sheet such as a metal sheet and a slate sheet, which covers the other inclination surface of the roof. A ridge member support bed 9 is mounted to an end of the roof sheet 8 on the ridge side, and the ridge side member J is brought into engagement with the upper surface of the ridge member support bed 9. Then, the ridge cap I is provided astride an upper end of the ridge side member J brought into engagement with the ridge member support bed 9 and an upper end of another ridge side member J mounted to an end of the ridge-side lighting frame B3 located at the side close to the ridge.

Reference numeral 10 designates a partition sheet, which is mounted on the upper surface of the ridge-side lighting frame B3 at a ridge-side end, thereof, and on which the sprinkling pipe K is placed. Reference numeral 11 designates a ridge side connecting member for closing the connection of the adjacent ridge side members J, and brought into engagement with the ridge cap connecting member M, and 12 a ridge water proof sheet.

Figure 1:
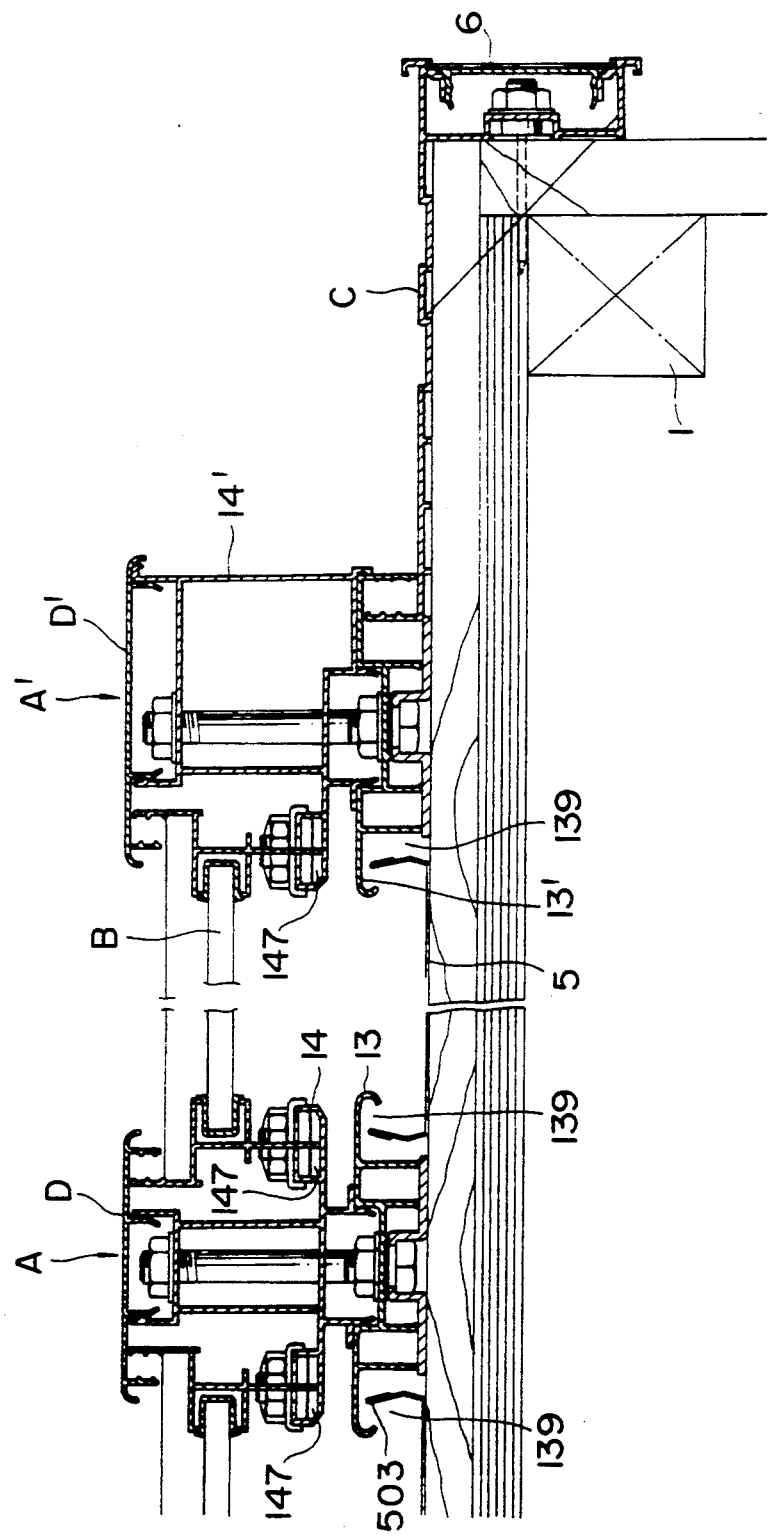
FIG. 1 is a fragmentary cross-sectional view showing an embodiment of a roof for the use of collection of solar energy according to the present invention.

FIG. 1 is a cross-sectional view showing a roof, which has the wide backing, and the backing of a lateral front portion of this roof is covered with the wide lateral front base member C.

Further, each intermediate connecting member A consists of a lower connecting member 13 for interconnecting the water proof sheets 5 and an upper connecting member 14 for interconnecting the lighting frames B.

Figure 4:
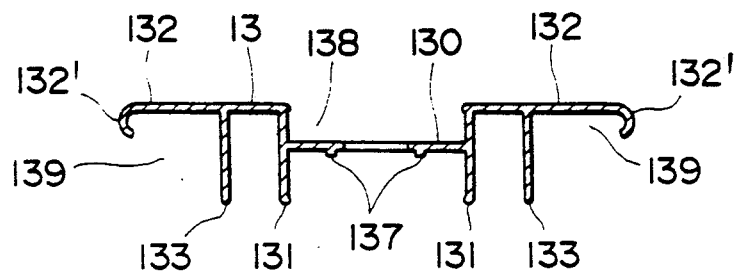
FIG. 4 is a cross-sectional view showing a lower connecting member.
Figure 5:
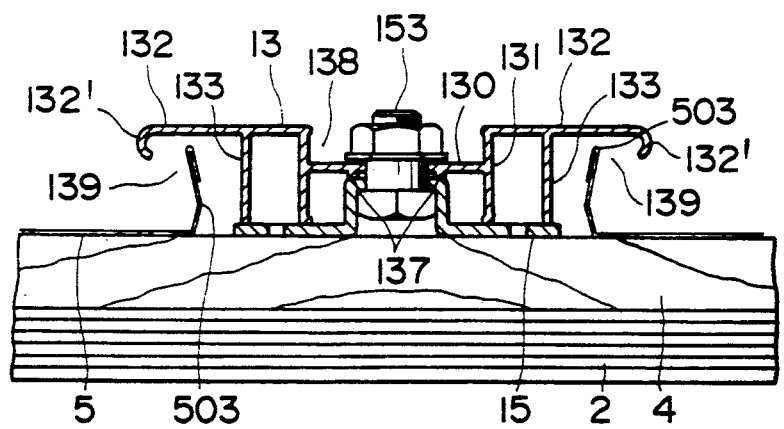
FIG. 5 is a cross-sectional view showing the lower connecting member when fixed.

As shown in FIGS. 4 and 5, the lower connecting member 13 has a horizontal fixing portion 130, and a pair of vertical walls 131 are respectively provided at opposite ends of the horizontal fixing portion 130 so as to extend from the horizontal fixing portion 130 upward and downward, so that a recess 138 is defined by both vertical walls 131 and the upper surface of the horizontal fixing portion 130. Further, a pair of overhang portions 132 are respectively provided so as to outwardly project from the respective upper ends of the vertical walls 131 rightward and leftward, respectively. The tip of each overhang portion 132 is curved downward to form a curved portion 132', and the lower surface of each overhang portion 132 is provided with a suspending piece 133 as being widely spaced apart from the curved portion 132', so that a lower width adjusting section 139 is defined by the outer surface of each suspending piece 133 and the lower surface of each overhang portion 132.

Figure 6:
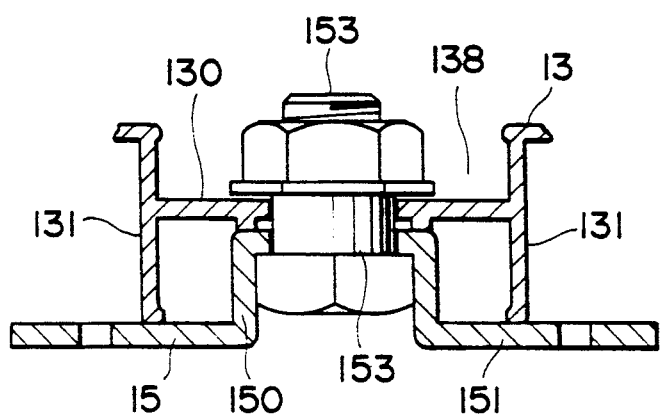
FIG. 6 is an enlarged-scale sectional view of a portion of the lower connecting member shown in FIG. 5.
Figure 9:
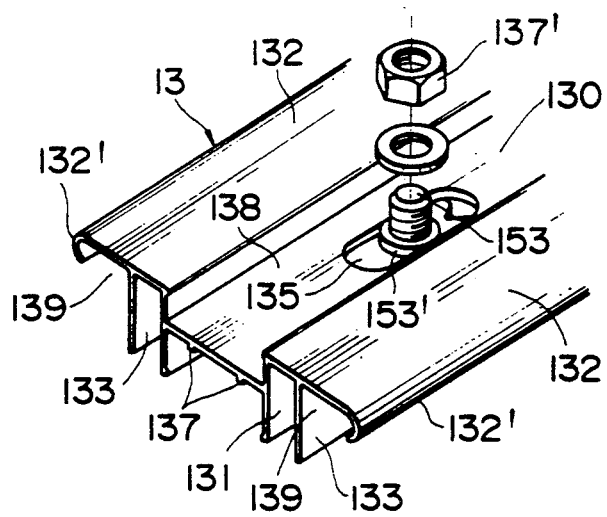
FIG. 9 is a perspective view showing the lower connecting member and the fitting for fixing the lower connecting member when incorporated with each other.

Two contact pieces 137 to be mounted on the upper surface of a fitting 15 for fixing the lower connecting member 13 as shown in FIG. 6 are formed on the lower surface of the horizontal fixing portion 130 in the longitudinal direction. A connection bolt 136 is inserted through the lower connecting member 13 upward from the lower surface of the horizontal fixing portion 130 to be fixed to the lower connecting member 13 by the use of a nut 137' such that the head of the connection bolt 136 is fitted between the contact pieces 137, 137 and an external thread portion 136' projects upward from the horizontal fixing portion 130, as shown in FIG. 9.

Figure 10:
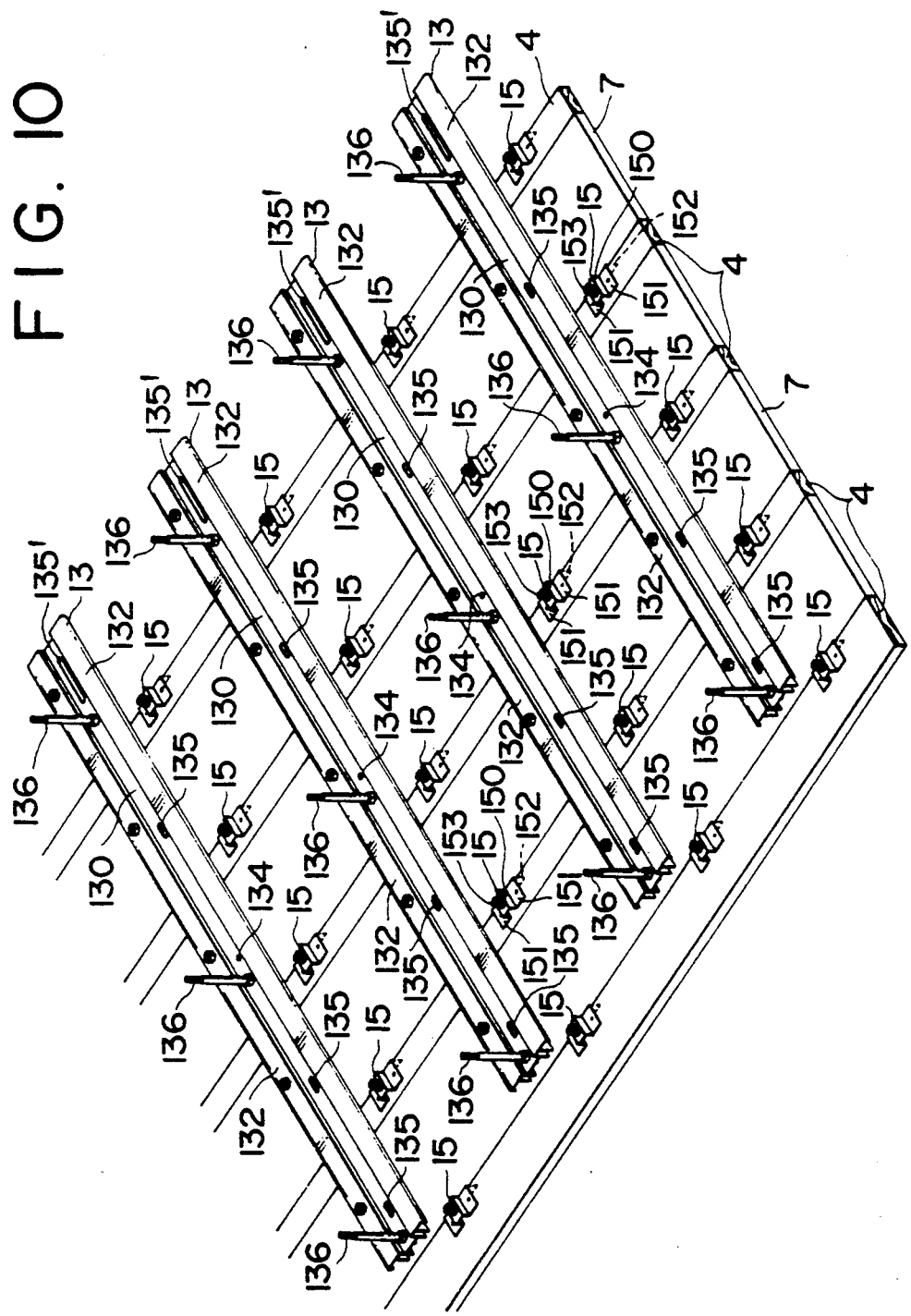
FIG. 10 is a perspective view showing the lower connecting member prior to fixing.

A circular hole for the use in fixing of the lower connecting member 13 is bored in the substantially longitudinal center of the horizontal fixing portion 130, and a plurality of elongate holes 135, each of which has a long axis extending in parallel with a line connecting the eaves and the ridge and is also used in fixing of the lower connecting member 13, are also bored at intervals in the horizontal fixing portion 130 such as to be located respectively at the ridge side and the eaves side of the circular hole 134. Among the plurality of elongate holes 135, an elongate hole 135' closest to the ridge is formed to be longer in long axis than the other elongate holes 135. (see FIG. 10)

Figure 8:
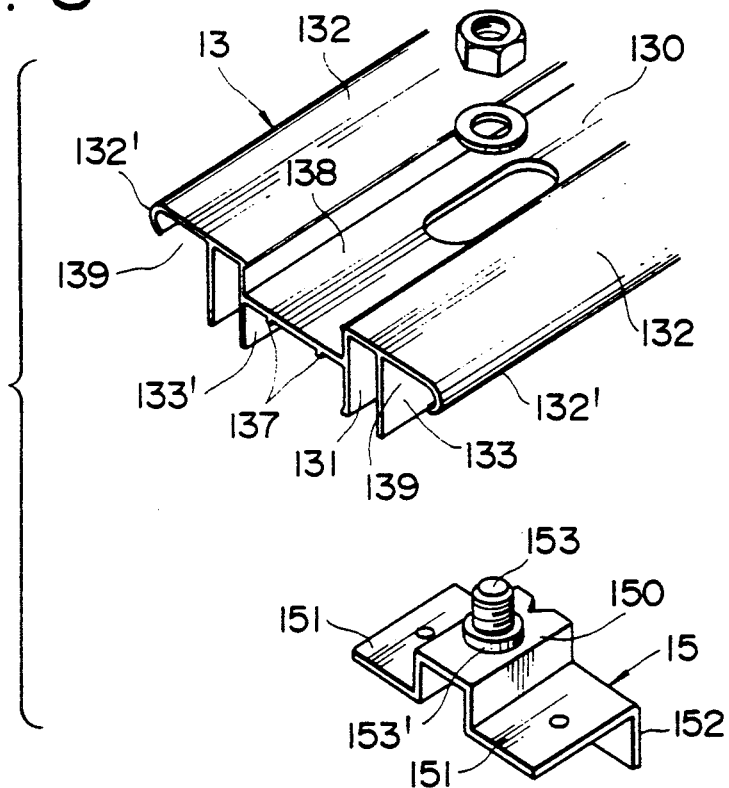
FIG. 8 is a perspective view showing the lower connecting member and a fitting for fixing the lower connecting member when separated from each other.

As shown in FIG. 8, the fitting 15 for fixing the lower connecting member 13 consists of an upwardly protuberant portion 150 and a pair of tongue-like portions 151 outwardly extending respectively from both lower ends of the protuberant portion 150 leftward and rightward. The head of a bolt 153 having the external thread portion is fitted to the lower surface of the protuberant portion 150 through a sliding shaft portion 153, and the external thread portion of the bolt 153 projects from the upper surface of the protuberant portion 150. The ridge-side edge of each tongue-like portion 151 is bent downward to form a hitch portion 152 engaging the ridge-side front of the crosspiece 4.

The fittings 15 are fixed to each crosspiece 4 at proper intervals with the respective tongue-like portions 151, and each lower connecting member 13 is mounted to these fittings 15 so as to be in parallel with a line connecting the eaves and the ridge. Then, the bolts 153 of these fittings 15 are respectively inserted into the circular hole 134 and elongate holes 135 of the lower connecting member 13 to be fastened by the use of nuts, so that the lower connecting member 13 is fixed by the fittings 15, as shown in FIG. 9.

Figure 11:
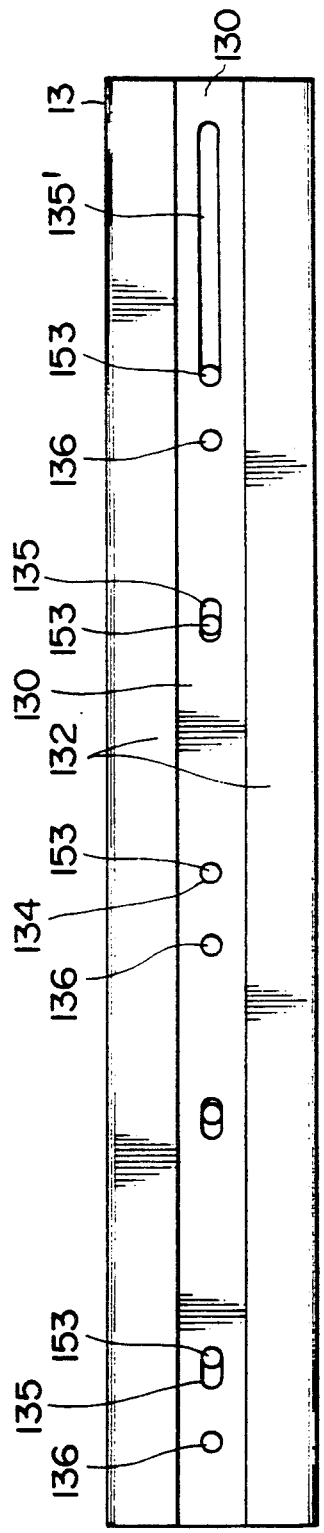
FIG. 11 is a plan view showing the mounting of the lower connecting member which is in an expanded state.
Figure 12:
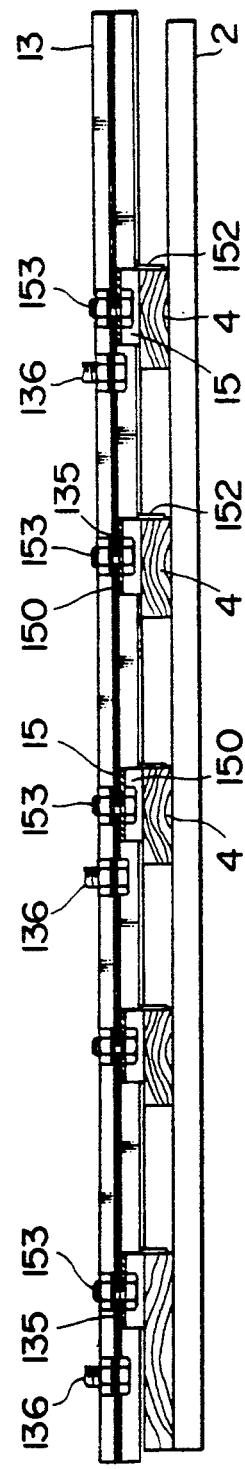
FIG. 12 is a longitudinal cross-sectional view of the lower connecting member shown in FIG. 11.
Figure 13:
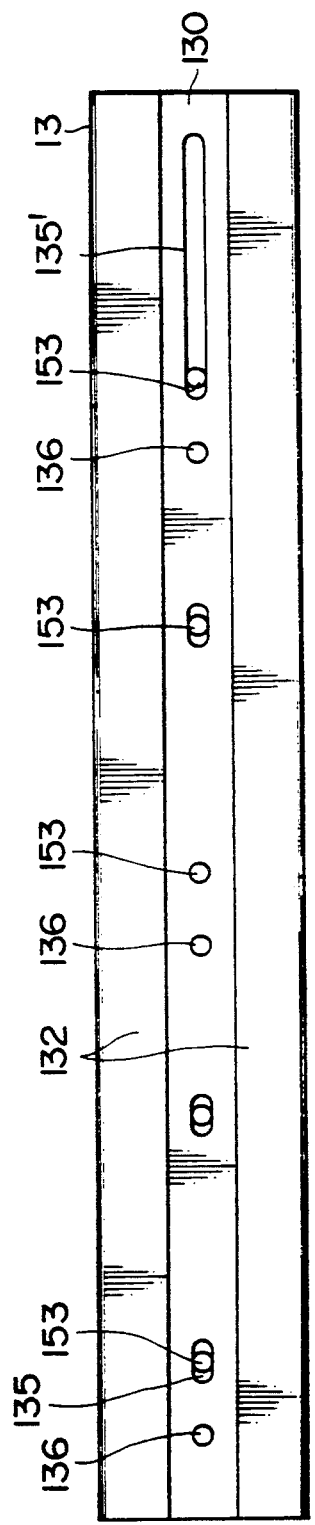
FIG. 13 is a plan view showing the lower connecting member which is normally mounted.
Figure 14:
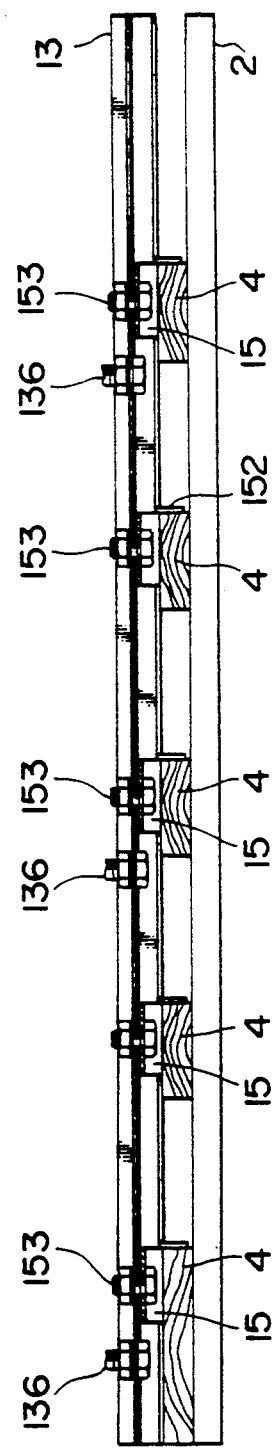
FIG. 14 is a longitudinal cross-sectional view showing the lower connecting member shown in FIG. 13.
Figure 15:
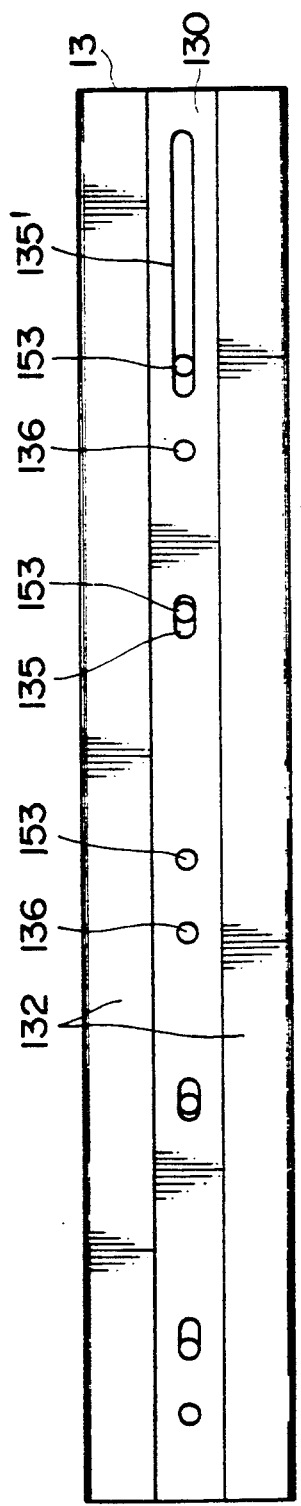
FIG. 15 is a plan view showing the mounting of the lower connecting member which is in a contracted state.
Figure 16:
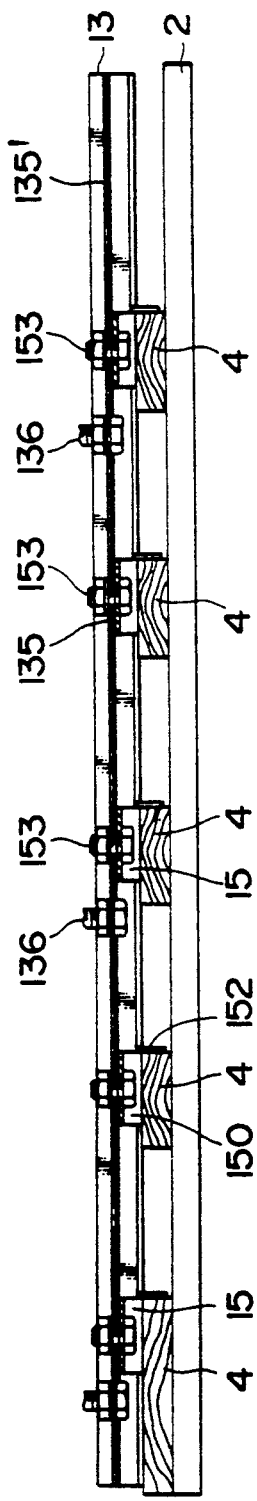
FIG. 16 is a longitudinal cross-sectional view of the lower connecting member shown in FIG. 15.

The lower connecting member 13 is so structured that the thermal expansion is absorbed by the elongate holes 135 and the sliding shaft portion 153. When the lower connecting member 13 is normally mounted, the bolt 153 of each fitting 15 is located in the center of each elongate hole 135 of the lower connecting member 13, as shown in FIGS. 13 and 14, and the opposite ends of the lower connecting member 13 are aligned with the opposite ends of the batten to be located at the fixed positions, respectively. When the lower connecting member 13 is expanded due to thermal expansion to provide a plus extended portion, in comparison with the normal state, the bolt 153 of each fitting 15 is located close to the longitudinal center of the lower connecting member 13 relative to each elongate hole 135 as shown in FIGS. 11 and 12, and the opposite ends of the lower connecting member 13 project from the opposite ends of the batten to result in the plus sliding mounting. Further, when the lower connecting member 13 is contracted to provide a minus reduced portion, in comparison with the normal state, the bolt 153 of each fitting 15 is located close to the end of the lower connecting member 13 relative to each elongate hole 135, as shown in FIGS. 15 and 16, and the opposite ends of the batten project from the opposite ends of the lower connecting member 13 to result in the minus sliding mounting.

Figure 17:
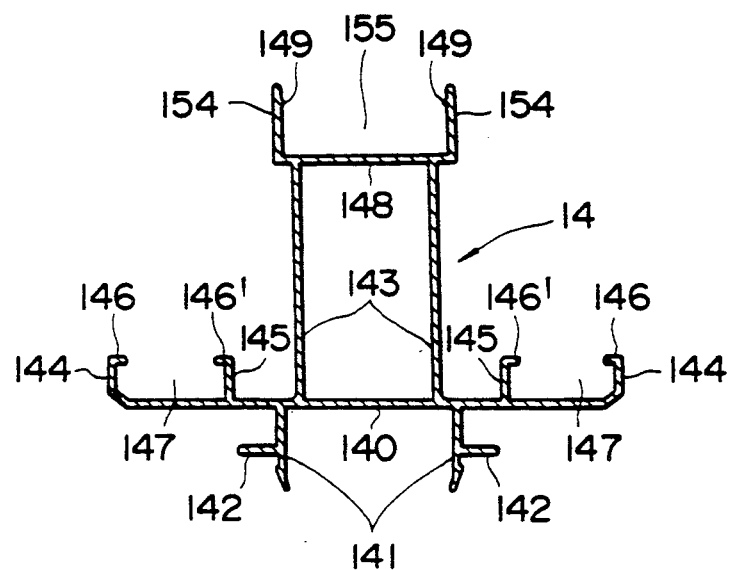
FIG. 17 is a cross-sectional view showing an upper connecting member.

As shown in FIG. 17, the upper connecting member 14 has a horizontal base portion 140, and the lower surface of the horizontal base portion 140 is provided with a pair of suspending walls 141 inserted into the recess 138 of the lower connecting member 13. A lower end of each suspending wall 141 is inwardly inclined, and a horizontal contact piece 142 mounted on the overhang portion 132 of the lower connecting member 13 outwardly projects from the outer surface of each suspending wall 141.

A pair of vertical pieces 143 are respectively provided in the substantial center of the upper surface of the horizontal base portion 140 at an interval, and a pair of end rising walls 144 are respectively provided at opposite edges of the horizontal base portion 140.

An intermediate rising wall 145 is provided between the vertical wall 143 and the end rising wall 144, and an outer projection 146 and an inner projection 146', which inwardly confront each other, are respectively formed at an upper end of each end rising wall 144 and an upper end of each intermediate rising wall 145. The outer projection 146 and the inner projection 146' are widely spaced apart from each other to define an intermediate width adjusting section 147 by each intermediate rising wall 145 and each end rising wall 144.

Further, the intermediate width adjusting section 147 takes the shape of a channel, and supports the lighting frame B to serve as a drain groove.

A horizontal receiver piece 148 is provided so as to be laid across both the upper ends of the vertical pieces 143, and an engaging projection piece 154 having an engaging projection 149 formed on its inner surface near the tip is provided at each of the opposite ends of the horizontal receiver piece 148, so that an upward opening 155 is defined by the horizontal receiver piece 148 and both engaging projection pieces 154.

Figure 18:
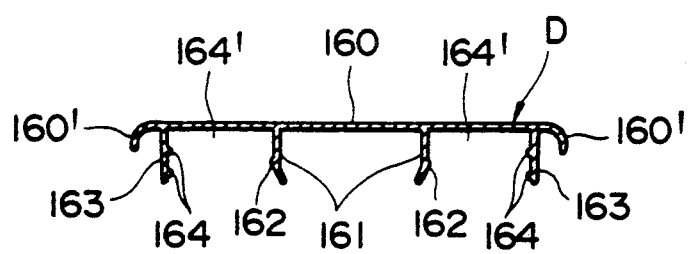
FIG. 18 is a cross-sectional view showing an intermediate connecting member cover.

As shown in FIG. 18, the intermediate connecting member cover D has a horizontal cover 160, which is provided at each of the opposite ends with a downwardly bent engaging piece 160' and on the lower surface near the center with two engaging legs 161 spaced apart from each other and inserted into the upward opening 155 of the upper connecting member 14.

The tip of each engaging leg 161 is slightly bent inward, and an engaging portion 162 engaging the engaging projection 149 of the upper connecting member 14 is formed on the outer surface of each engaging leg 161.

The horizontal cover 160 is provided at a portion near each of the opposite ends with a throating suspending pieces 163 having a plurality of throating projections 164 formed on the inner surface of each throating suspending piece 163.

Further, the engaging leg 161 and the throating suspending piece 163 are widely spaced apart from each other to define an upper width adjusting section 164' therebetween.

Figure 20:
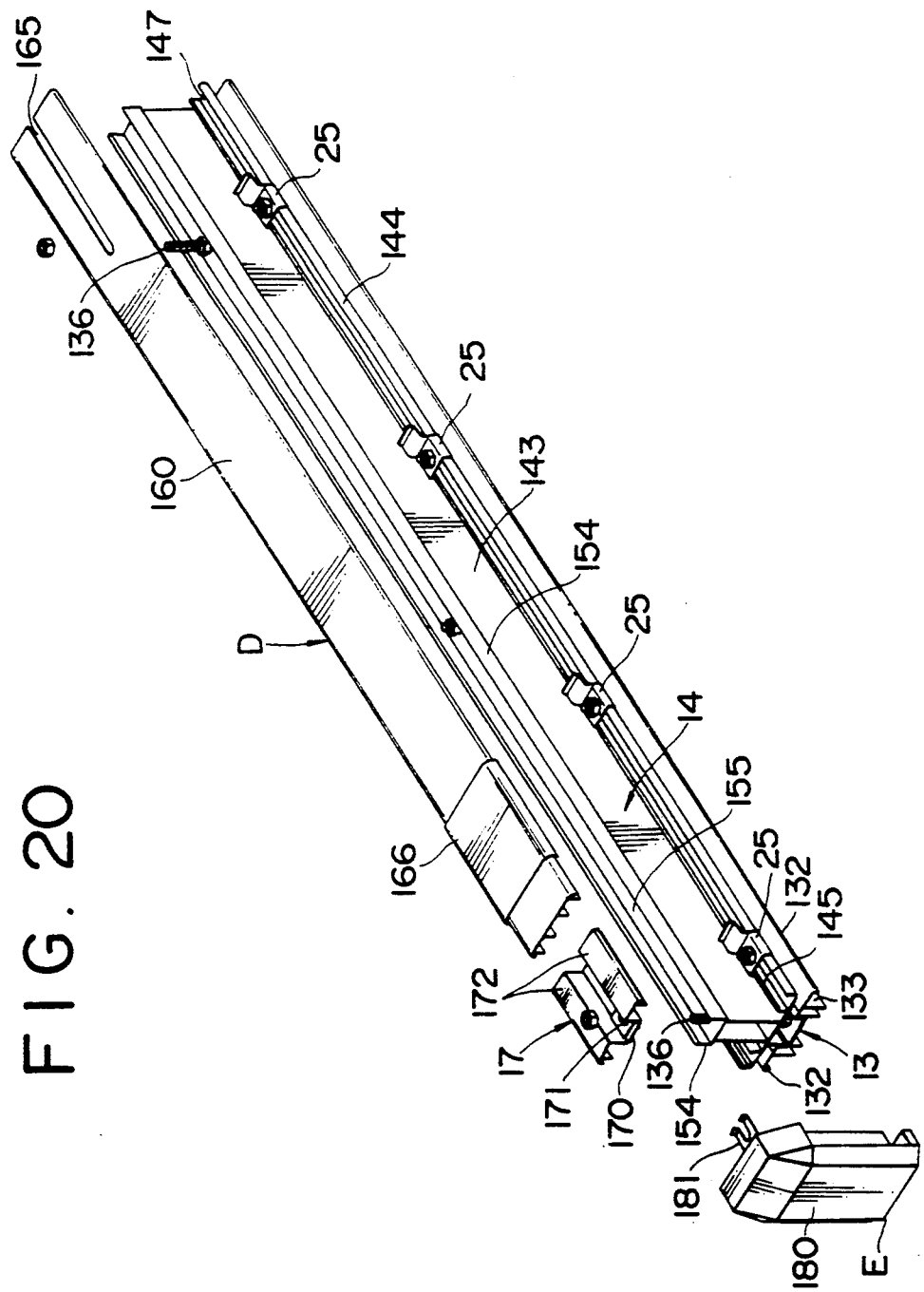
FIG. 20 is a perspective view showing the intermediate connecting member, in which the upper connecting member is fixed to the lower connecting member.
Figure 21:
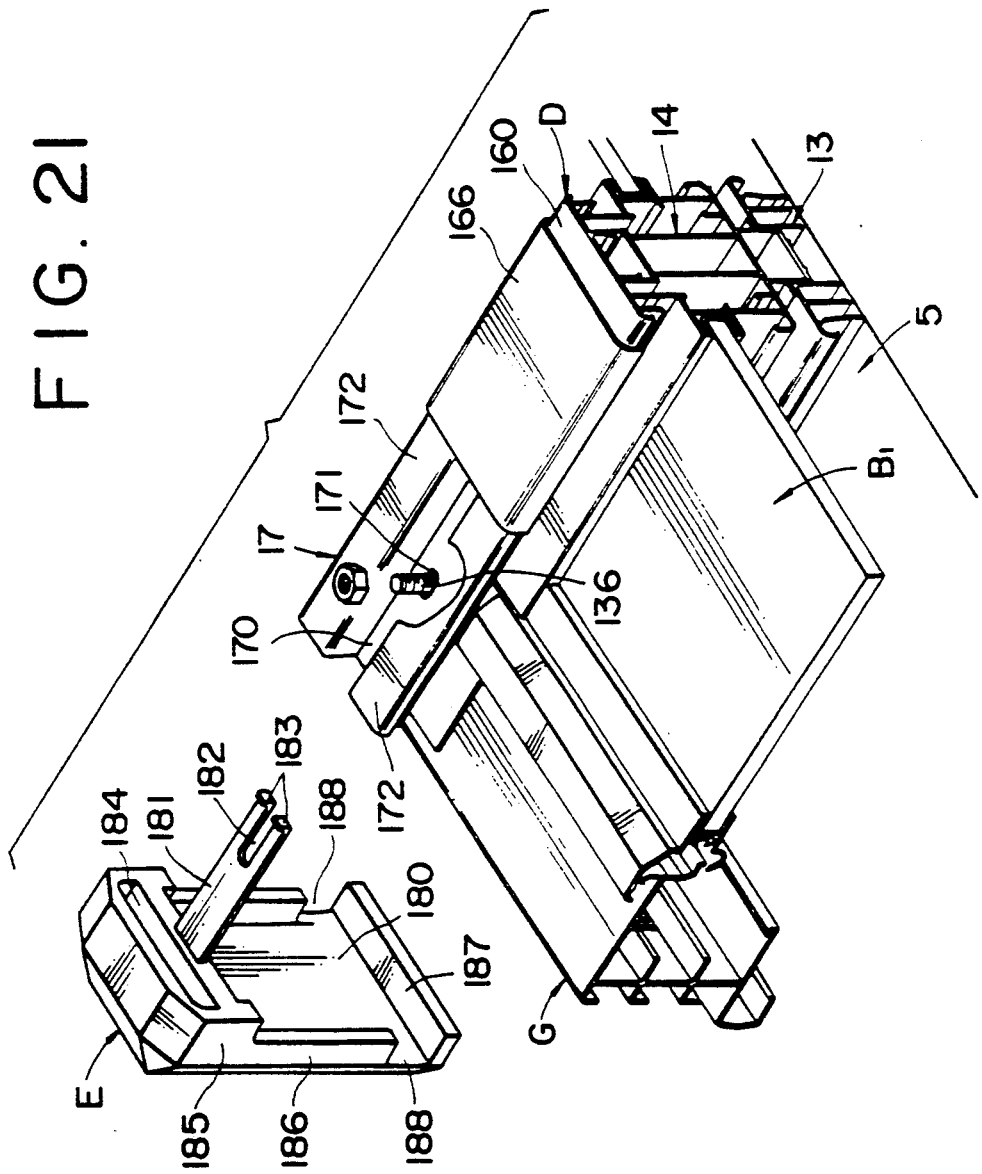
FIG. 21 is a perspective view showing an eaves portion before a dust proof cap is mounted thereon.

As shown in FIGS. 20 and 21, a fastening insertion notch 165 is longitudinally formed in the horizontal cover portion 160 at the end close to the ridge, and a longitudinally slidable cover 166 is fitted on the upper surface of the horizontal cover 160 at the end close to the eaves.

The upper connecting member 14 is mounted on the upper surface of the lower connecting member 13 by the steps of inserting the suspending pieces 141 of the upper connecting member 14 into the recess 138 of the lower connecting member 14, then respectively inserting the connection bolts 136 of the lower connecting member 13 through the holes bored in the horizontal base portion 410 and the horizontal receiver piece 148 of the upper connecting member 14 and also through the notch 165, and then fastening the connection bolts 136 by the use of nuts within the upper opening 155 to thereby fix the upper connecting member 14 to the lower connecting member 13.

An eaves-side fit member 17 is mounted on the upper surface of the upper connecting member 14 at the eaves-side end. In this case, a recessed groove 170 projecting downward in the center of the eaves-side fitting member 17 is fitted into the upward opening 155 of the upper connecting member 14, and then the connection bolt 136 is inserted into an elongate hole 171 bored in the bottom of the recessed groove 170.

Referring to FIG. 21, the dust proof cap E is provided with a dust proof sheet 180 for closing the front surface of each of the connecting members A, A' on the eaves side. A mounting projection piece 181 projects from the upper portion of the back surface of the dust proof sheet 180 toward the ridge, and an elongate insertion notch 182 is provided in the center of the tip of the mounting projection piece 181, and an upward bent portion 183 is provided at each of the opposite sides of the insertion notch 182. A cavity 184, into which the tip of the slidable cover 166 on the eaves side is fitted, is formed above the mounting projection 181 provided on the back surface of the dust proof sheet 180, and a wide side wall 185 is provided at each of the upper opposite sides of the back surface of the dust proof sheet 180, while a narrow side wall 186 slightly narrower in width than the side wall 185 is provided below each wide side wall 185 so as to be continuous with the wide side wall 185. A bent edge 187 is provided so as to project from the lower edge of the back surface of the dust proof sheet 180 toward the ridge, and a recess 188, into which the lower edge of the eaves cover G is fitted, is defined between the bent edge 187 and the lower end of each narrow side wall 186.

Figure 22:
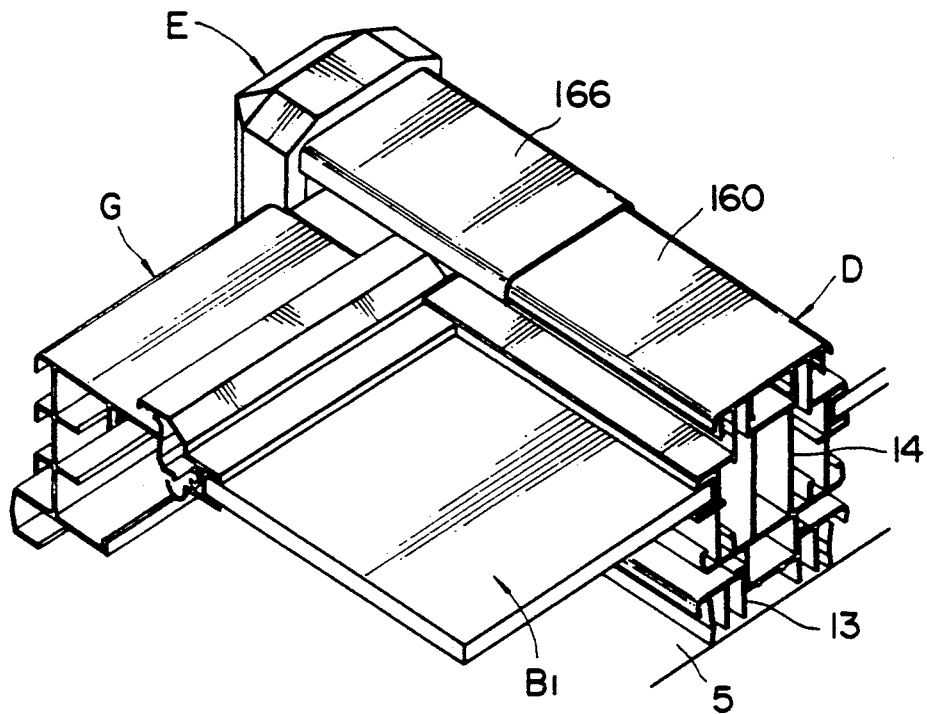
FIG. 22 is a perspective view showing an eaves portion after the dust proof cap is mounted thereon.

The tip of the connection bolt 136 projecting from the upper surface of the eaves-side fit member 17 is inserted into the notch 182 of the dust proof cap E, and this connection bolt 136 is fastened by the use of a nut to thereby mount the dust proof cap E on each front surface of the connecting member A, A' on the eaves side, as shown in FIG. 22.

Next, the slidable cover 166 of the connecting member cover D is slidably moved along a pair of horizontal wing pieces 172 outwardly projecting from the upper opposite ends of the recessed groove 170 of the eaves-side fit member 17, so that the upper portion of the eaves-side fit member 17 is covered with the slidable cover 166. At this time, the end of the slidable cover 166 at the eaves side is fitted into the cavity 184 of the dust proof cap E. Accordingly, the eaves members are unified to provide a reinforced structure resistant to wind pressure, and the mounting of the eaves members may be simply and easily done. In addition, since any bolt is out of sight, the eaves members are excellent in external appearance.

Figure 23:
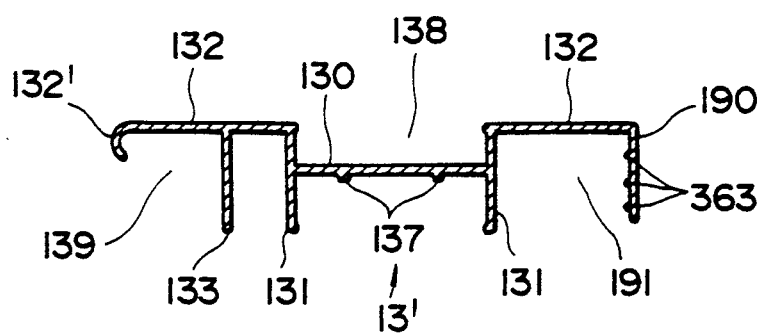
FIG. 23 is a cross-sectional view showing a side lower connecting member.
Figure 24:
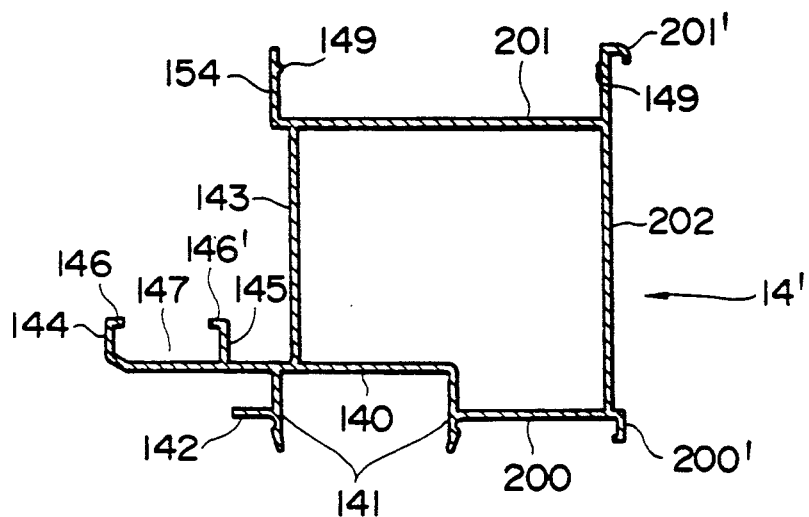
FIG. 24 is a cross-sectional view showing a side upper connecting member.
Figure 25:
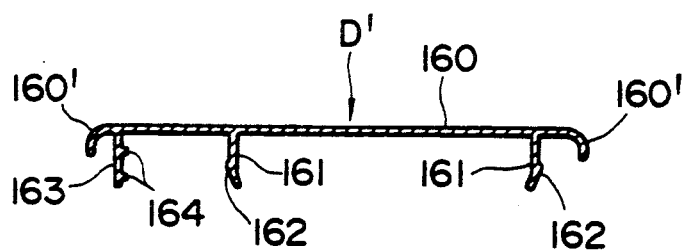
FIG. 25 is a cross-sectional view showing a side connecting member cover.

Next will be explained the side connecting member A' with reference to the accompanying drawings FIGS. 23 through 25. The side connecting member A' consists of a lower side connecting member 13' and an upper side connecting member 14'.

Since one half part of the side connecting member A' is so structured to be identical with that of the intermediate connecting member A, the description thereof will be omitted by designating the corresponding portions with the same reference numerals. The lighting frame B and the water proof sheet 5 are not mounted to the other half part of the side connecting member A'. Therefore, the lower side connecting member 13' on the side corresponding to the other half part of the side connecting member A' is provided, instead of the suspending piece 133, with an outer suspending leg piece 190 formed by suspending the end of the overhang portion 132 and brought into contact with the upper portion of the lateral front base member C. The suspending leg piece 190 and the vertical wall 131 provided at the other half of the lower side connecting member 13' are widely spaced apart from each other to define a lower side width adjusting section 191 therebetween. A plurality of throating projections 363 are formed on the inner wall of the suspending leg piece 190 in the longitudinal direction.

Further, the upper side connecting member 14' on the side corresponding to the other half part of the lower side connecting member 13' is provided, instead of the vertical piece 143, with a lower connecting member contact piece 200 formed at a slightly downward position of the horizontal base portion 140 and mounted on the upper surface of the overhand portion 132 of the lower side connecting member 13'. The horizontal receiver piece 148 is outwardly extended to be formed into a horizontal extending portion 201. And, a lateral front vertical wall 202 is provided so as to upwardly extend from the tip of the lower connecting member contact piece 200 through the tip of the horizontal extending portion 201. The lateral front vertical wall 202 has an engaging projection 201' formed by outwardly bending the upper end of the vertical wall 202 and a suspending projection piece 200° formed at the lower end of the vertical wall 202 and engaging the suspending leg piece 190 of the lower side connecting member 13'.

The side connecting member cover D' corresponds in structure to the side connecting member A'. The side connecting member cover D' on the side corresponding to the horizontal extending portion 201 is not provided with the throating suspending piece 163. However, the horizontal cover 160 slightly extends to cover the upper portion of the horizontal extending portion 201 of the upper side connecting member 14', and the engaging piece 160' of the horizontal cover 160 is brought into engagement with the engaging projection 201'.

Figure 26:
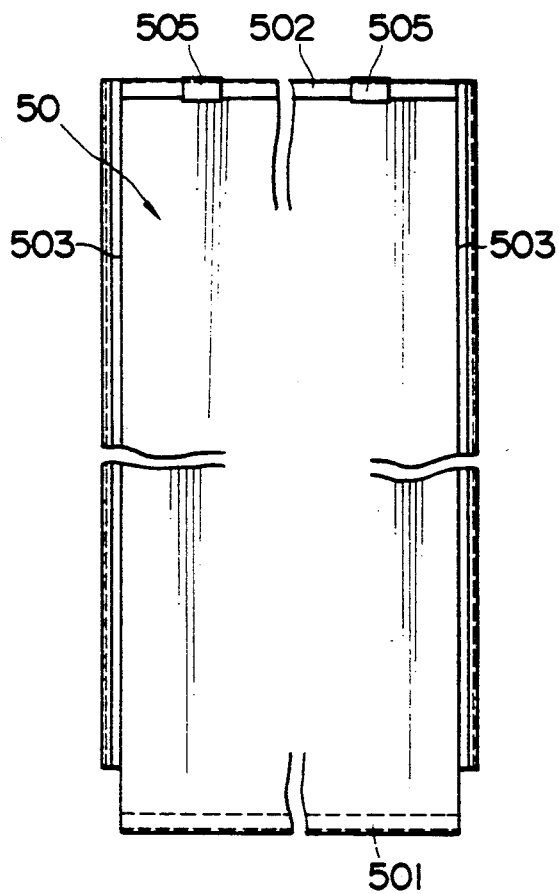
FIG. 26 is a plan view showing an eaves water proof sheet.
Figure 27:
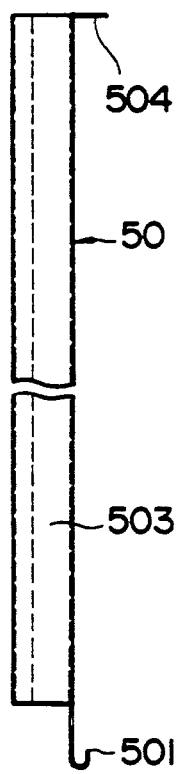
FIG. 27 is a side view showing the eaves water proof sheet.
Figure 28:
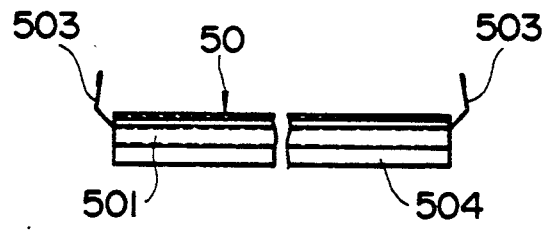

FIGS. 26 through 35 show the structure of the water proof sheet 5, respectively. The water proof sheet 5 is made of metal, synthetic resin or the like, and has an eaves throating portion 501 formed by upwardly bending the tip of the water proof sheet on the eaves side toward the ridge, and a flashing engagement wall 502 formed by bending the other end of the water proof sheet 5 toward the upper eaves, as shown in FIGS. 26 through 28. An engaging water proof wall 503, which is a rise portion inserted into the lower width adjusting section 139 of the lower connecting member 13, is provided at each of the opposite sides of the water proof sheet 5.

After the engaging water proof wall 503 is bent outwardly upward, the intermediate portion thereof is bent inwardly upward and the tip thereof is folded back outward.

Figure 29:
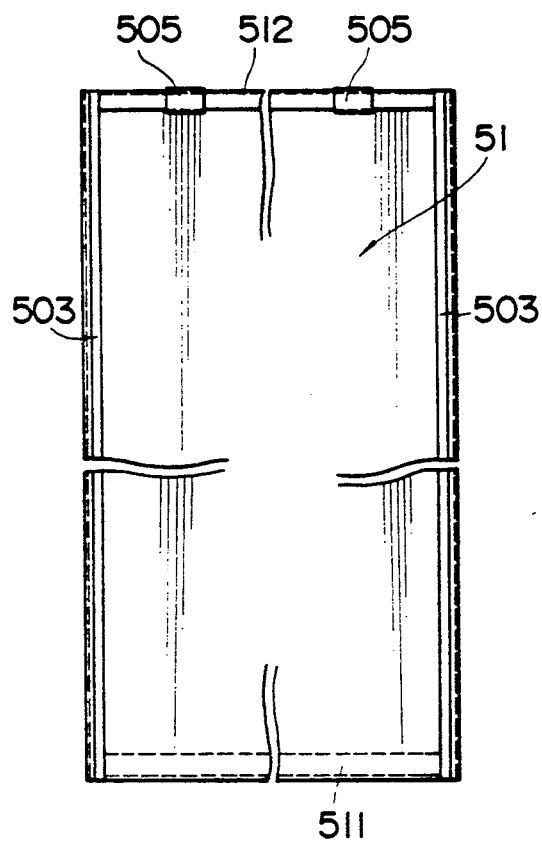
FIG. 29 is a plan view showing an intermediate water proof sheet.
Figure 30:
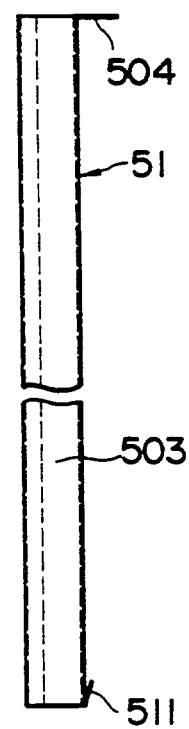
FIG. 30 is a side view showing the intermediate water proof sheet.
Figure 31:
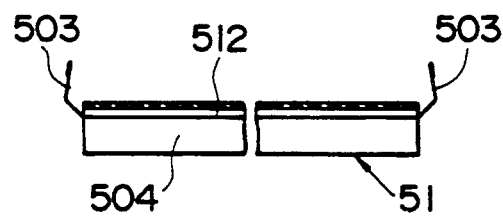
FIG. 31 is a front view showing the intermediate water proof sheet.

Referring to FIGS. 29 through 31, an intermediate water proof sheet 51 is provided at the eaves-side tip with a throating portion 511 engaging the flashing engagement wall 502, at the other end with a flashing engagement wall 512, and at opposite sides with engaging water proof walls 503 similar to the case of the eaves water proof sheet 50.

A downwardly extending crosspiece engaging member 504 is mounted on each of the eaves water proof sheet 50 and the intermediate water proof sheet 51 on the ridge side so as to extend along the edge thereof. A proper number of caulking portions 505 formed at the upper end of the engaging member 504 are fastened to both flashing engagement walls 502, 512 to be mounted thereon, as shown in FIG. 35.

Referring to FIGS. 32 through 34, a ridge water proof sheet 52 is provided at the eaves-side tip with an engagement throating portion 521 engaging the flashing engagement wall 512 of the intermediate water proof sheet 51, at the other end with an upwardly vertically bent water proof wall 522, and at opposite sides with engaging water proof walls 503, each of which is a rise portion.

Figure 36:
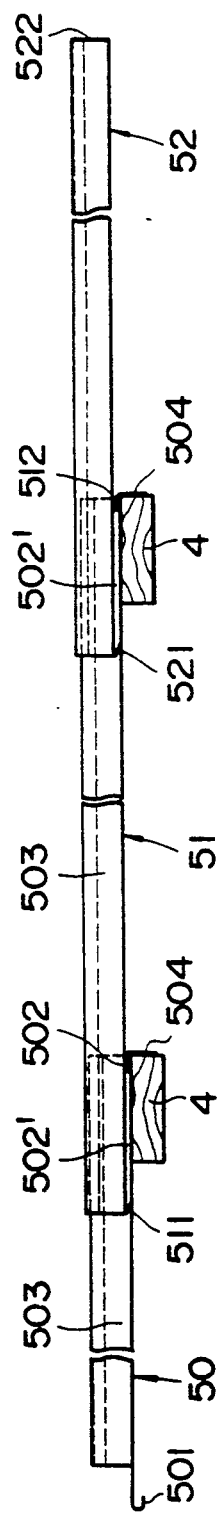
FIG. 36 is a longitudinal cross-sectional view showing the water proof sheet after laid.
Figure 37:
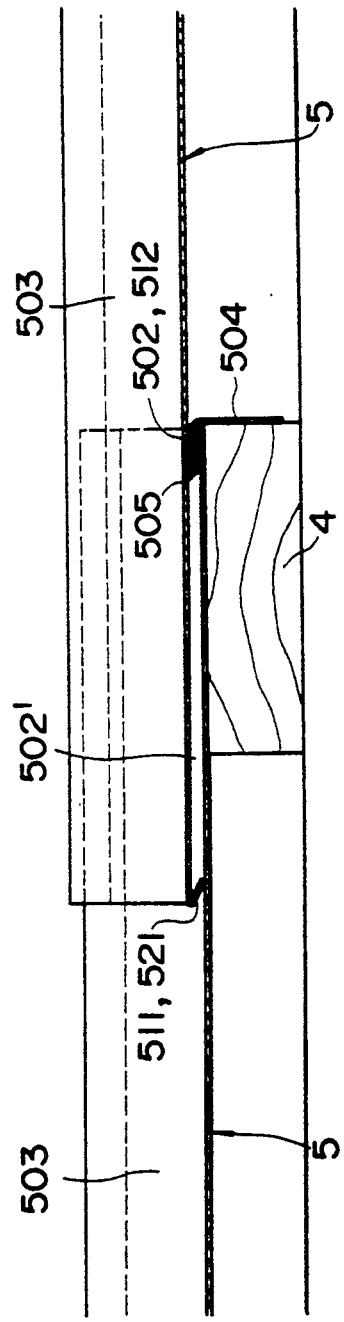
FIG. 37 is an enlarged-scale sectional view showing a portion of the water proof sheet shown in FIG. 36.

FIGS. 36 and 37 show the connection of respective water proof sheets 5. The eaves throating portion 501 of the eaves water proof sheet 50 is mounted on the backing of the roof toward the eaves, and the edge of the intermediate water proof sheet 51 at the side of the throating portion 511 is overlapped with the edge of the eaves water proof sheet 50 at the side of the flashing engagement wall 502.

When overlapping the intermediate water proof sheet 51 with the eaves water proof sheet 51, the flashing engagement wall 502 is widely spaced apart from the throating portion 511 to form a space which defines a length adjusting section 502'. Further, the edge of the intermediate water proof sheet 51 is similarly overlapped with that of the ridge water proof sheet 52 to form a space which defines a length adjusting section 502', so that the length adjusting section 502' facilitates the adjustment of error in length of the backing of the roof to thereby simplify the mounting of the water proof sheets.

Then, the edge of the ridge water proof sheet 52 at the side of the throating portion 521 is overlapped with the edge of the intermediate water proof sheet 51 at the side of the flashing engagement wall 512 to be connected with each other.

When connecting the intermediate water proof sheet 51 with the ridge water proof sheet 52, the crosspiece engaging member 504 of each of the eaves water proof sheet 50 and the intermediate water proof sheet 51 is fastened to the upper end of the crosspiece 4 to thereby prevent the eaves water proof sheet 50 and the intermediate water proof sheet 51 from sliding down.

Figure 38:
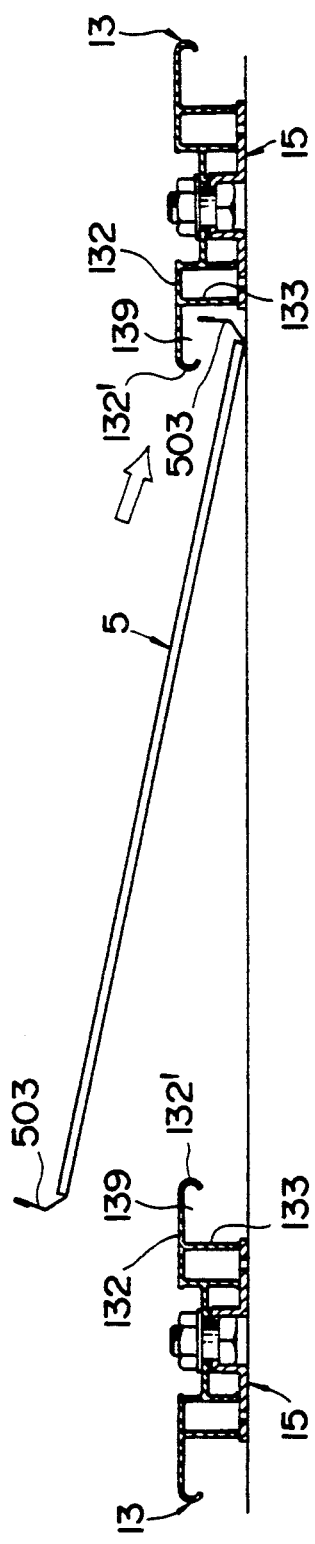
FIGS. 38 through 41 are cross-sectional views showing steps of laying the water proof sheet, respectively.
Figure 39:
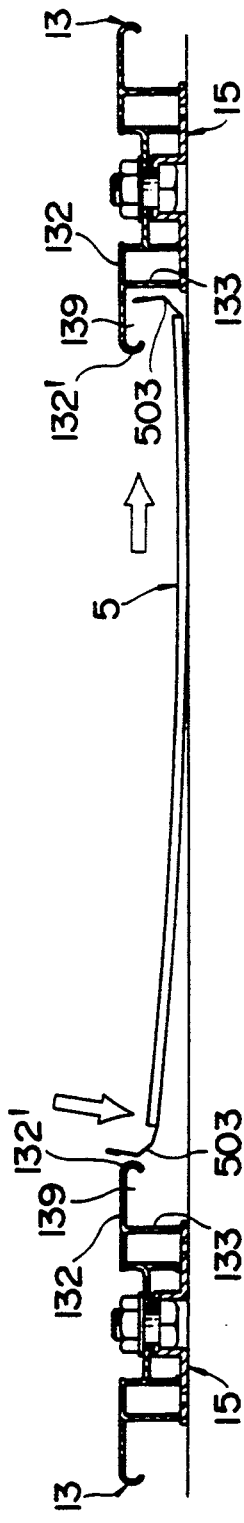
Figure 40:
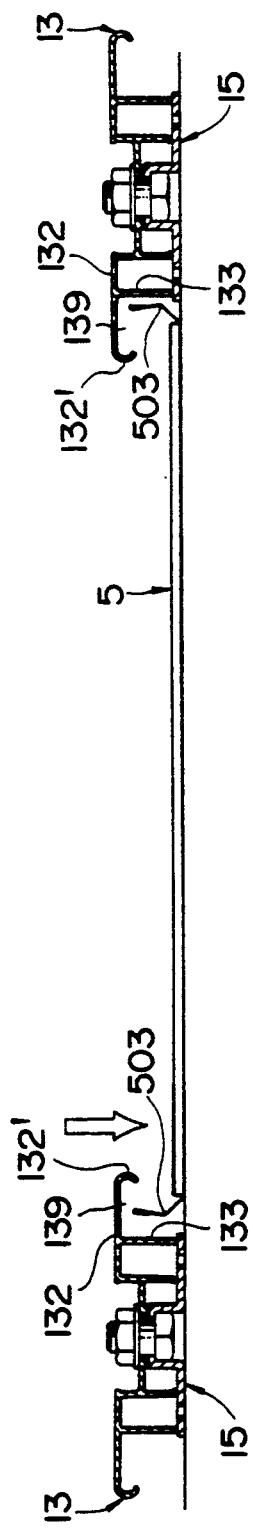
Figure 41:
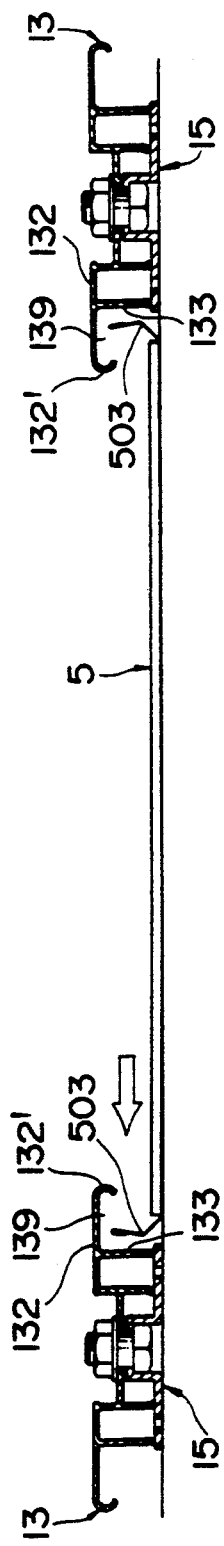

FIGS. 39 through 41 show the steps of mounting the water proof sheet 5 to the lower connecting member 13, respectively. First, the water proof sheet 5 is inclined as shown in FIG. 38, and then the lower engaging water proof wall 503 is inserted into the lower adjusting section 139 by making use of the function of the curved portion 132' of the lower connecting member 13. Next, as shown in FIG. 39, when the end of the water proof sheet 5 near the opposite engaging water proof wall 503 is downwardly pressed, the opposite engaging water proof wall 503 is fitted into the corresponding lower adjusting section 139 along the outer curved surface of the curved portion 132', and then the water proof sheet 5 becomes horizontal, as shown in FIG. 40. Finally, as shown by an arrow in FIG. 41, the water proof sheet 5 is moved in the lateral direction to be adjusted the position of the water proof sheet 5.

Of course, the water proof sheet 5 is possible to mount on the crosspiece prior to the mounting of the lower connecting member 13. In addition, the water proof sheet 5 is easily mounted by making use of the adjusting function of adjusting plus or minus the error in length and width of the backing of the roof to provide a water proof sheet of a complete flashing structure.

Next will be explained the lighting frame B.

The lighting frame B has opposite vertical sash members 21, an upper horizontal sash membe 22, a lower horizontal sash member 23, and a transparent sheet 24 made of glass, plastic or the like and fitted to the inside of a square frame constituted by the above sash members.

Figure 42:
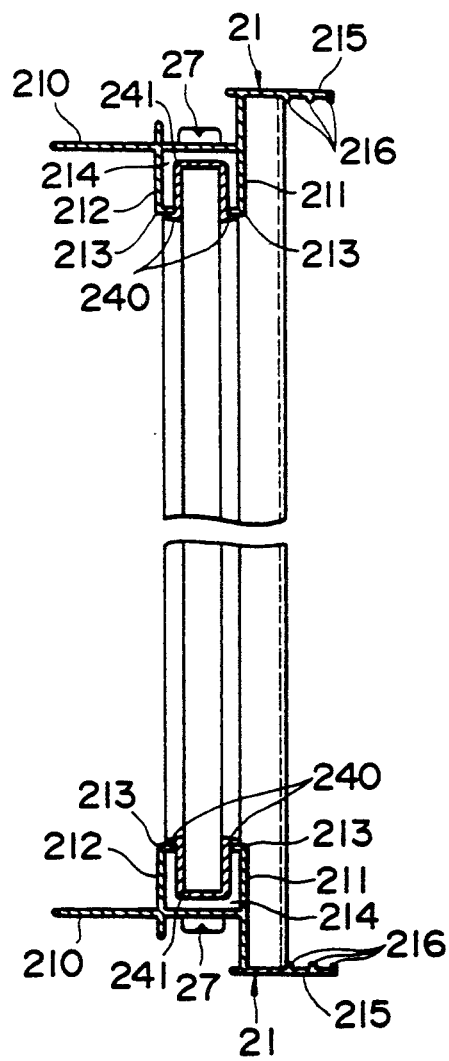
FIG. 42 is a cross-sectional view showing a lighting frame.

As shown in FIG. 42, the vertical sash member 21 is provided at the lower end with a vertical insertion wall 210 inserted into the groove 147 of the upper connecting member 14. The vertical insertion wall 210 is provided at the upper end with an upper horizontal wing piece 211 extending leftward and rightward, and at the intermediate portion with a lower horizontal wing piece 212, respectively. An inwardly bent projection 213 provided at the tip of the upper horizontal wing piece 211 and another inwardly bent projection 213 provided at the tip of the lower horizontal wing piece 212 are faced to each other. A transparent sheet insertion groove 214 is defined by the vertical insertion wall 210, an inner portion of the upper horizontal wing piece 211, and an inner portion of the lower horizontal wing piece 212.

A vertical fit piece 215 fitted to the lower surface of the connecting member cover D is provided to upwardly extend from the outer end of the upper horizontal wing piece 211, and a plurality of throating projections 216 are formed on the inner side of the vertical fit piece 215 in the longitudinal direction.

Figure 45:
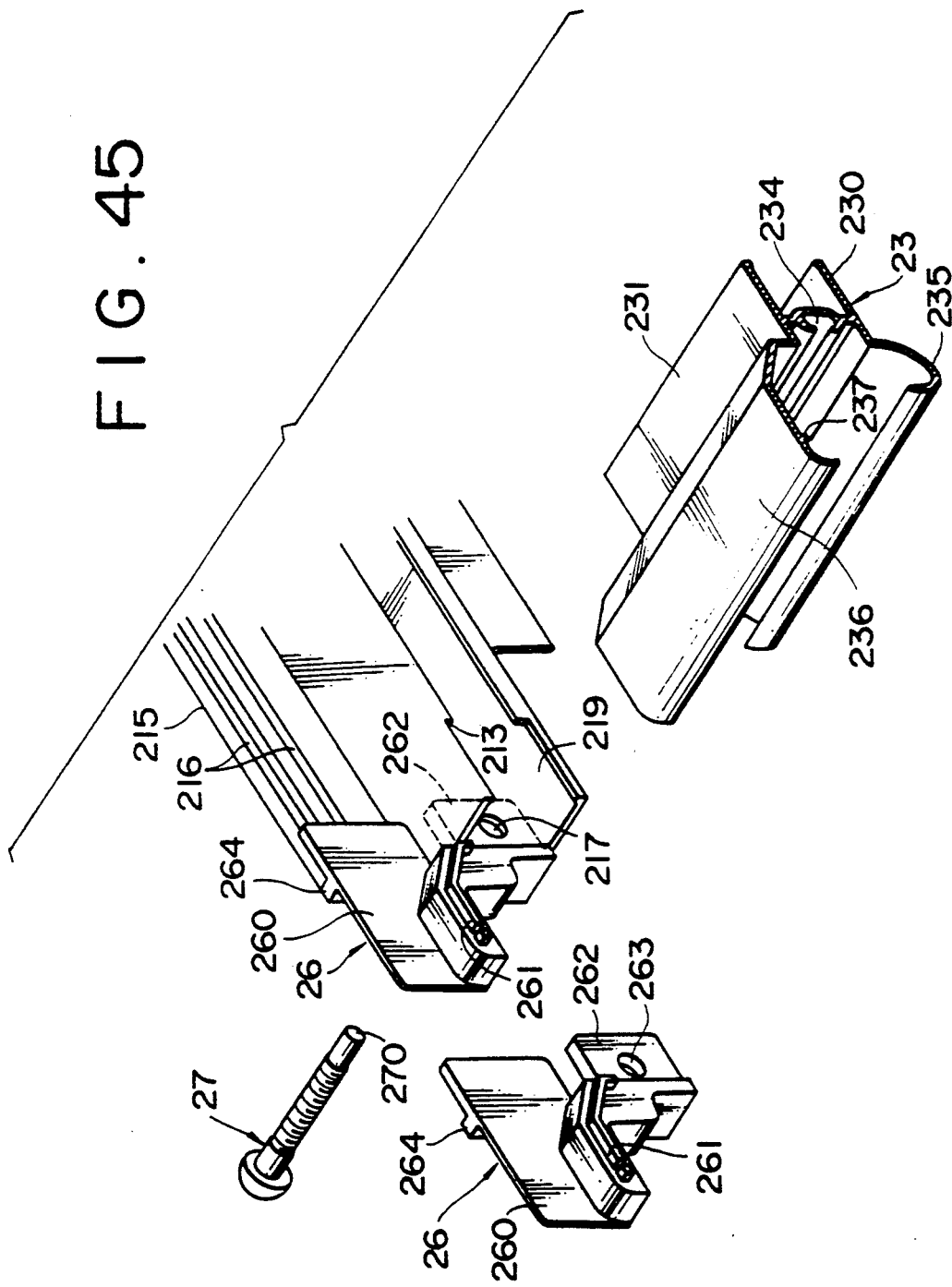
FIG. 45 is a fragmentary exploded perspective view showing the lighting frame.

As shown in FIG. 45, a through hole 217 is bored in the vertical insertion wall 210 near the end of a portion of the transparent sheet insertion groove 214 on the ridge side and the eaves side, and a notch 218 (see FIG. 47), which is fitted to a later described lighting frame fastener 25 to serve as a side air outlet, is formed in the lower end of the vertical insertion wall 210 on the ridge side. Instead of the bent projection 213, a horizontal sash member fitting portion 219 is formed at the tip of the vertical sash member 21 on the ridge side and the eaves side.

Figure 44:
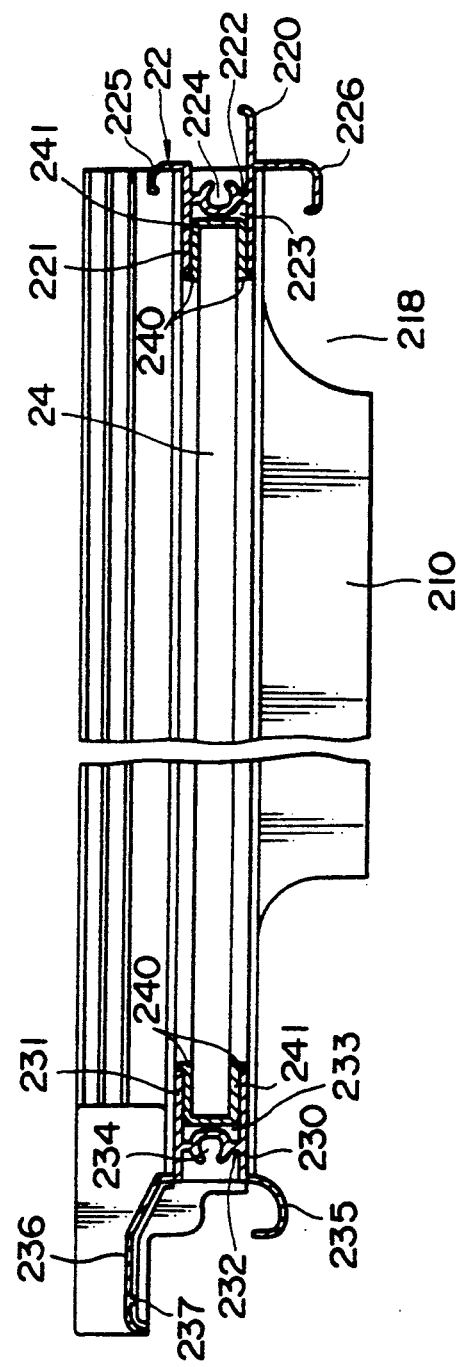
FIG. 44 is a longitudinal cross-sectional view showing the lighting frame.

As shown in FIG. 44, the upper horizontal sash member 22 has a wing piece 220 for mounting the upper horizontal sash member 22 thereon, and a transparent sheet keep piece 221 provided on an upper portion of the wing piece 220. The wing piece 220 and the keep piece 221 are connected with each other through an upper horizontal sash member connecting wall 222 extending in parallel with the edge of the transparent sheet 24 at the ridge side, and a transparent sheet insertion groove 223 is defined by the wing piece 220, a portion of the keep piece 221 on the eaves side and the connecting wall 222.

The upper horizontal sash member connecting wall 222 is provided with a longitudinal hollow curved portion 224 having a groove formed on the ridge side. The edge of the transparent sheet keep piece 221 near the ridge is first upwardly bent and then bent toward the ridge to be formed into an engaging bent portion 225. A fastener engaging piece 226 is provided on the lower surface of the wing piece 220 such that the engaging piece 226 extends downwardly from the lower surace of the wing piece 220 and is further upwardly bent.

The lower horizontal sash member 23 has a wing piece 230 for mounting the lower horizontal sash member 23 thereon and a transparent sheet keep piece 231 provided on the wing piece 230 so as to be in parallel with the wing piece 230. The wing piece 230 and the transparent sheet keep piece 231 are connected with each other through a lower horizontal sash member connecting wall 232 extending in parallel with the transparent sheet 24 on the eaves side, and a tansparent sheet insertion groove 233 is defined by the wing piece 230, a portion of the transparent sheet keep piece 231 on the ridge side and the lower horizontal sash member connecting wall 232.

The lower horizontal sash member connecting wall 232 is provided with a longitudinal hollow curved portion 234 having a groove formed on the ridge side. and a downwardly curved water proof gutter 235 is provided at the edge of the wing piece 230 on the eaves side.

A cover portion 236 for covering the upper horizontal sash member 22 of the lighting frame B adjacent to the eaves from above is provided on the edge of the transparent sheet keep piece 231 on the eaves side, and a throating projection 237 is formed on the lower surface of the cover portion 236.

Figure 46:
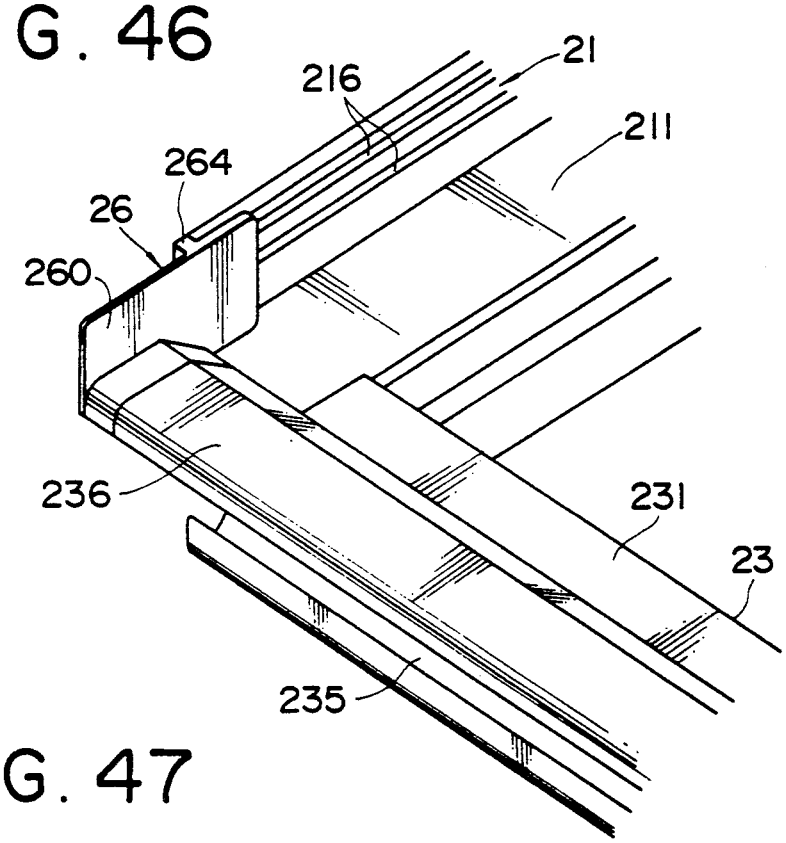
FIG. 46 is a perspective view, partly broken-away, showing the assembled lighting frame.

Referring to FIGS. 45 and 46, reference numeral 26 designates a lighting frame fitting for connecting the vertical sash member 21 with the lower horizontal sash member 23. The fitting 26 has a closing plate portion 260 provided in parallel with the vertical fit piece 215 of the vertical sash member 21 and having a portion overlapped with the inner surface of the end of the vertical fit piece 215. The closing plate portion 260 is provided at the intermediate portion on the outer surface with a contact projection 264 brought into contact with the eaves-side front surface of the vertical fit piece 215 of the vertical sash member 21, and at the eaves-side lower portion with a projecting fit portion 261 projecting toward the lower horizontal sash member 23 to fit to the lower surface of the end of the cover portion 236 of the lower horizontal sash member 23 at the side of the vertical sash member. The projection fit portion 261 on the ridge side is integrally provided with projection piece 262 inserted into the end of the transparent sheet insertion groove 214 of the vertical sash member 23 near the eaves, and a through hole 263 is bored in the projection piece 262 at a position corresponding to the through hole 217 of the vertical sash member 21.

Next will be explained the connection of the vertical sash member 21 and the lower horizontal sash member 23. First, the end of the closing plate portion 260 of the lighting frame fitting 26 near the ridge is overlapped with the inner surface of the eaves end of the vertical fit piece 215 of the vertical sash member 21, then the projection piece 262 is inserted into the transparent sheet insertion groove 214 of the vertical sash member 21 to be overlapped with the vertical insertion wall 210, and then the end of the wing piece 230 and that of the transparent sheet keep piece 231 of the lower horizontal sash member 23 are fitted to the horizontal sash member fitting portion 219 of the vertical sash member 21 to thereby fit the projecting fit portion 261 of the fitting 26 into the lower surface of the cover portion 236 of the lower horizontal sash member 23. Then, a tapping screw 27 having the tip formed with a small-diameter portion 270 is inserted into the through hole 217 of the vertical sash member 21, the through hole 263 of the fitting 26, and the hollow curved portion 234 of the lower horizontal sash member 23, so that the vertical sash member 21 and the lower horizontal sash member 23 are incorporated with each other, as shown in FIG. 46.

Figure 43:
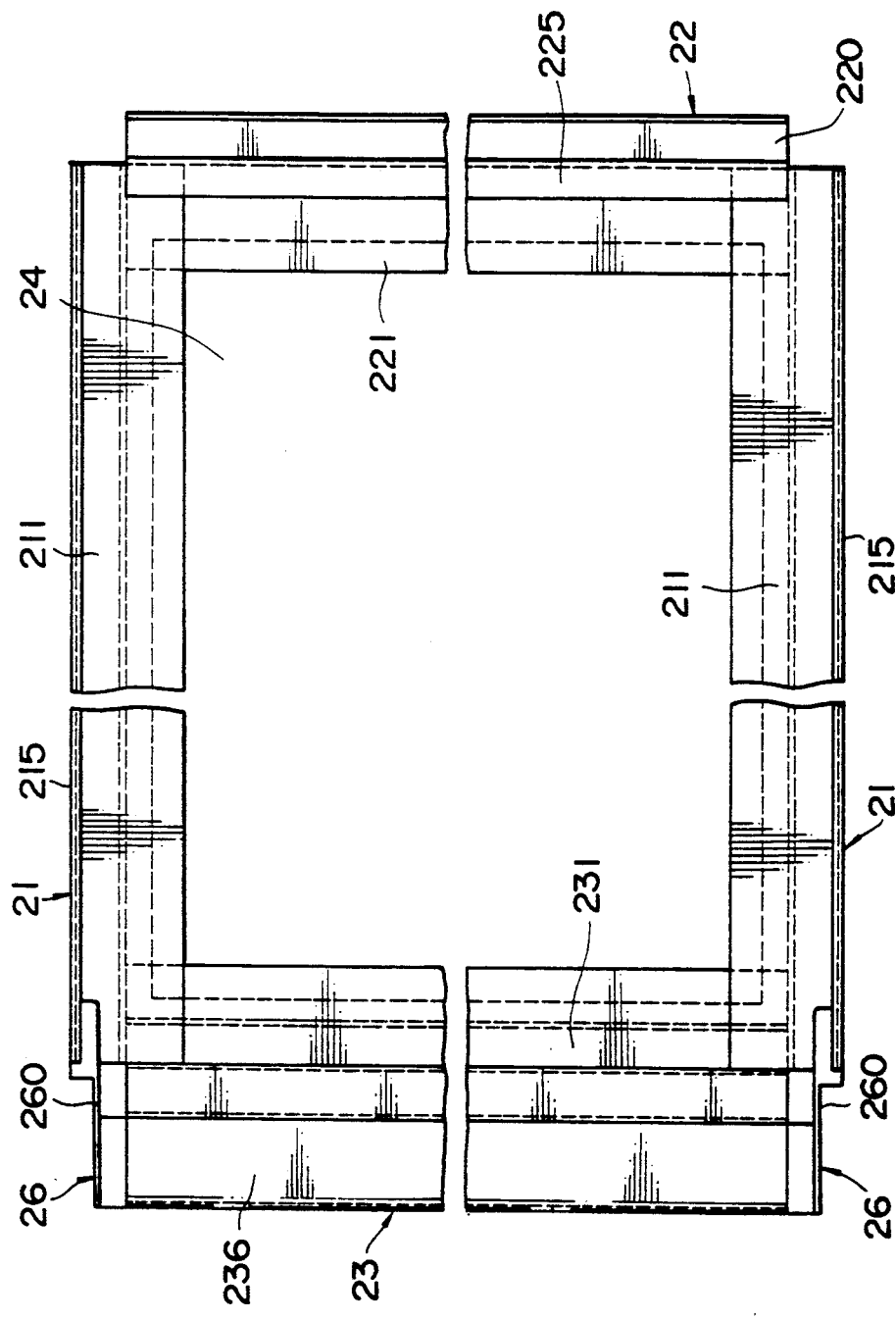
FIG. 43 is a plan view showing the lighting frame.

The vertical sash member 21 and the upper horizontal sash member 22 are connected with each other through the tapping screw 27 inserted into the through hole (not shown) of the vertical sash member 21 on the ridge side and the hollow curved portion 224 of the upper horizontal sash member 22. As a result, the left and right vertical sash members 21,21, the upper horizontal sash member 23 and the lower horizontal sash member 24 are assembled into the shape of a quadrilateral with the respective transparent sheet insertion grooves directed toward an inner periphery, as shown in FIG. 43.

A packing 241 taking the form of a groove in section and having an edge formed with an outward flange 240 is fitted to a peripheral edge of the transparent sheet 24. A portion of the transparent sheet 24 fitted to the packing 241 is inserted into each of the transparent sheet insertion grooves 214, 223 and 233 of the respective sash members, and the flange 240 is brought into contact with an end of each opening of the transparent sheet insertion grooves 214, 223 and 233.

Figure 47:
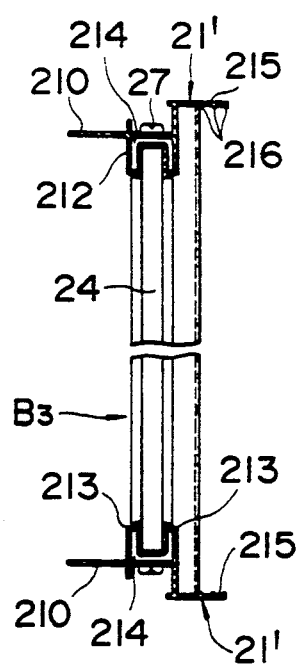
FIG. 47 is a cross-sectional view showing a ridge-side frame.
Figure 48:
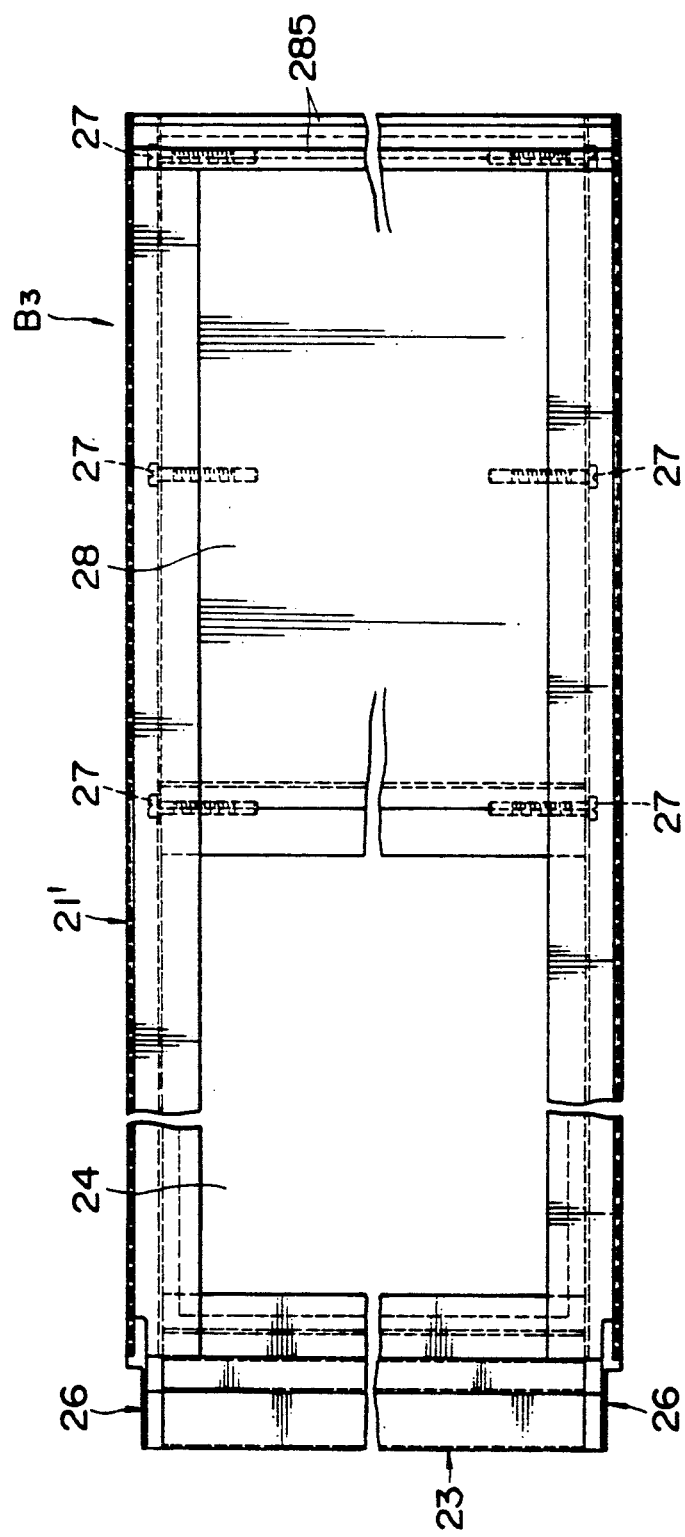
FIG. 48 is a plan view showing the ridge-side lighting frame.

FIGS. 47 through 49 show the ridge-side lighting frame B3, respectively. In the ridge-side lighting frame B3, instead of the upper horizontal sash member 22, a metal or plastic sheet 28 laid under the ridge and having the same width as the transparent sheet 24 is mounted to the edge of the transparent sheet 24 near the ridge.

A transparent sheet insertion groove 280 opening toward the eaves is formed at the edge of the laying sheet 28 on the eaves side. A hollow curved portion 282 having the groove on the eaves side is longitudinally provided in the center of a side wall 281 of the transparent sheet insertion groove 280, and a fastener engaging piece 283 having a lower end bending toward the eaves is provided so as to project from the lower portion of the side wall 281.

A pair of vertical upper walls 284, 284 extending in parallel with each other at an interval are provided at the edge of the laying sheet 28 on the ridge side, and an inwardly bent portion 285 is provided at each tip of the vertical upper walls 284 to confront each other. A fastener sliding engagement groove 286 is defined between a pair of vertical upper walls 284.

A vertical lower wall 287 is provided at a lower portion of the edge of the laying sheet 28 on the ridge side. The tip of the vertical lower wall 287 is bent toward the ridge, and a hollow curved portion 288 having the groove is longitudinally formed in the center of the vertical lower wall 287.

An intermediate suspending wall 289 provided with a hollow curved portion 290 having the groove is provided between the fastener engaging piece 283 and the vertical lower wall 287 on the lower surface of the laying sheet 28.

The vertical sash member 21' of the ridge-side lighting frame B3 has the length equal with the sum of the length of the transparent sheet 24 and that of the laying sheet 28. The vertical sash member 21' has a through hole formed in the tip of the side wall of the transparent sheet insertion groove 214 of the vertical sash member 21 on the eaves side, and a through hole formed in a position corresponding to each of the hollow curved portions 282, 290 and 288 of the laying sheet 28, respectively. The tapping screw 27 inserted into each through hole is screwed into each of the hollow curved portions 282, 290 and 288 of the laying sheet 28 and the hollow curved portion 234 of the lower horizontal sash member 23 to thereby assemble the ridge-side lighting frame B3, as shown in FIG. 48.

The other portion of the ridge-side lighting frame B3 is similarly structured to the above described lighting frame B.

Figure 19:
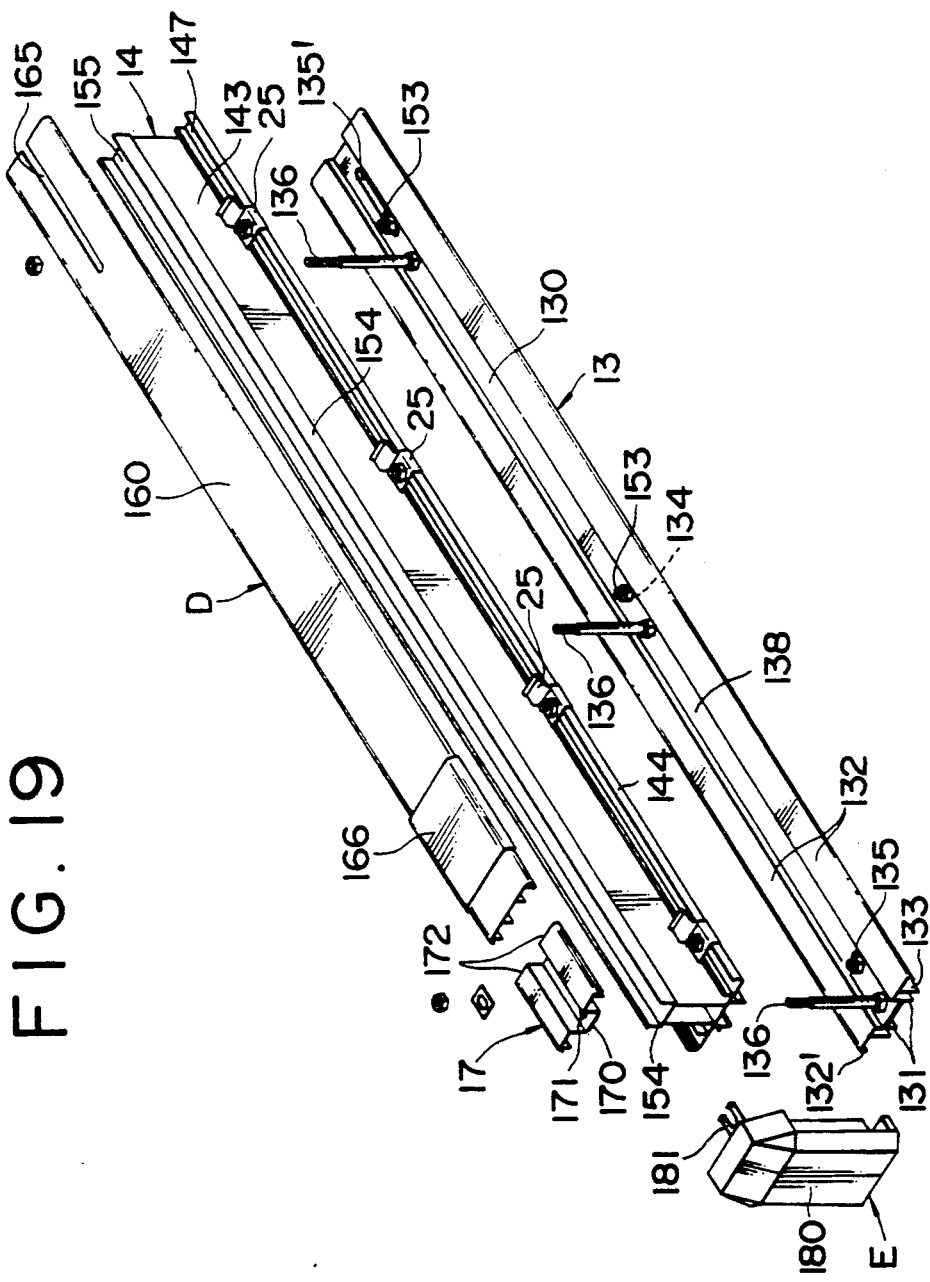
FIG. 19 is an exploded perspective view showing an intermediate connecting member.

Referring to FIGS. 50 through 52, reference numeral 25 designates a lighting frame fitting. The lighting frame fitting 25 is mounted so as to cover the groove 147 of the upper connecting member 14, as shown in FIGS. 19 and 20, and fixed in position by means of the bolt 250 and the nut by making use of the groove 147. This fitting 25 is provided at its upper portion on the ridge side with an engaging step portion 251 extending toward the ridge.

When fixing the lighting frame B, first, the lighting frame B is inclined such that the end of the frame B on the ridge side is placed down, as shown in FIG. 50. Then, the fastener engaging piece 226 of the upper horizontal sash member 22 is located below the engaging step portion 251 of the fitting 25, as shown in FIG. 51. Next, the lower horizontal sash member 23 is downwardly pressed, and then the curved water proof gutter 235 of the lower horizontal sash member 23 is brought into engagement with the lower surface of the wing piece 220 of the upper horizontal sash member 22 of the other lighting frame B adjacent to the lighting frame B closer to the eaves.

Figure 53:
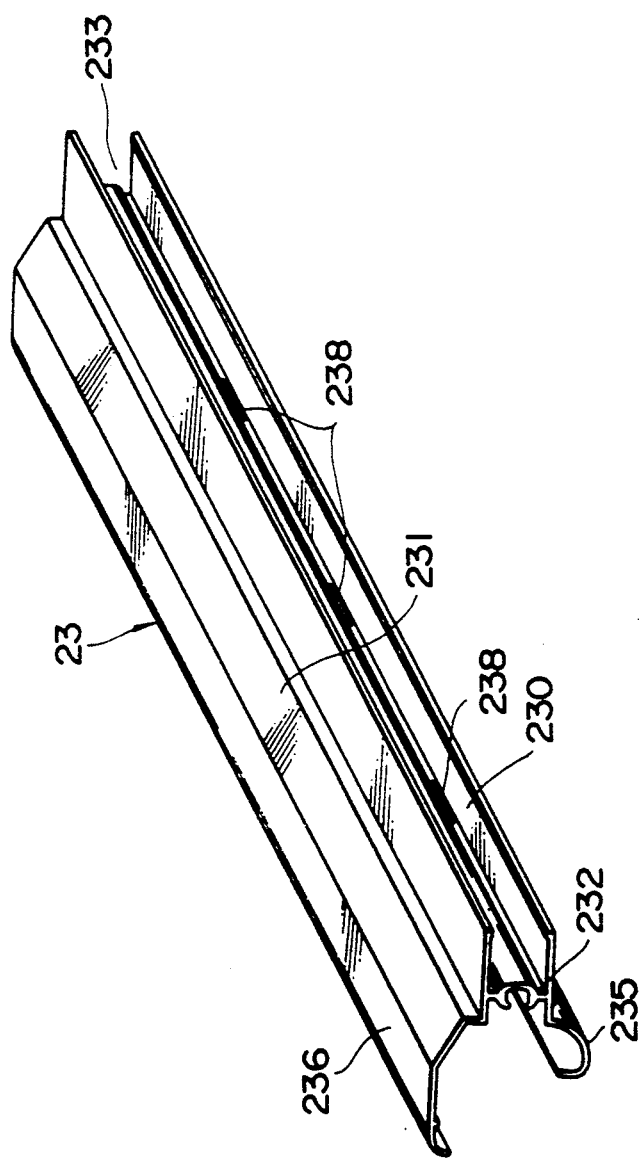
FIG. 53 is a perspective view showing a lower horizontal sash member.
Figure 54:
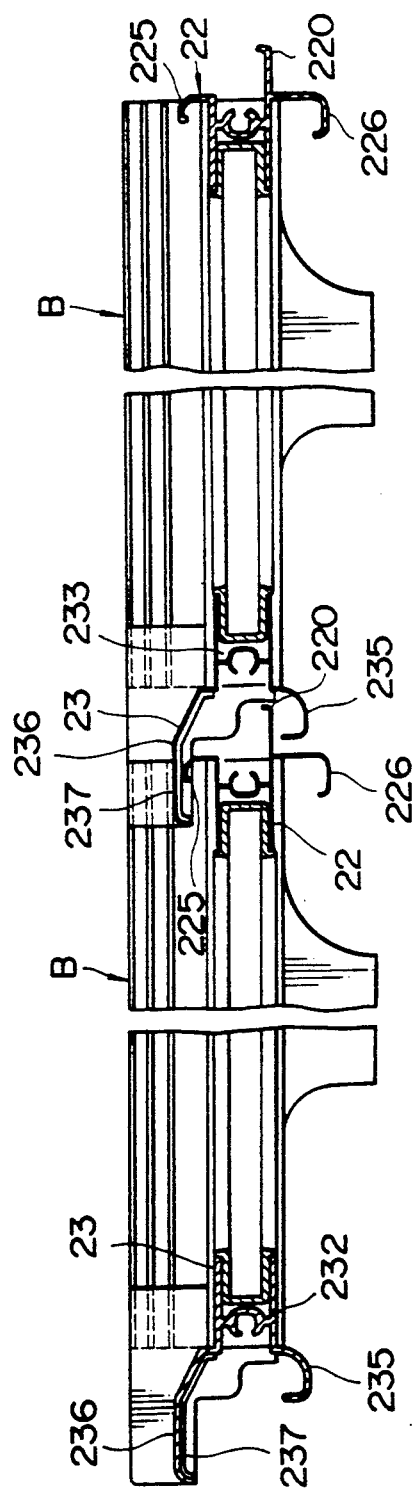
FIG. 54 is a longitudinal cross-sectional view showing the longitudinal connection of the lighting frames.

Since a plurality of drain holes 238 are bored in the lower portion of the lower horizontal sash member connection wall 232 at intervals as shown in FIG. 53, rain water flowing down along the upper surface of the transparent sheet 24 flows into the transparent sheet insertion groove 233 of the lower horizontal sash member 23, when roofing the lighting frame B. Then, the rain water flows into the curved water proof gutter 235 through each drain hole 238 to be further drained toward the eaves through the groove 147 of the upper connecting member 14, as shown in FIG. 54.

Further, since the cover portion 236 of the lower horizontal sash member 23 of the lighting frame B on the ridge side covers the upper portion of the upper horizontal sash member 22 of the lighting frame B on the eaves side, it is possible to prevent the flood of rain water flowing through the interconnection between the lighting frames B. Even if the flood of rain water occurs due to a spout of rain water, the flood water from the upper end of the wing piece 220 of the upper horizontal sash member drops down into the curved water proof gutter 235 to be drained toward the eaves similarly to the case as noted above.

Each of the lighting frames B1, B2 and B3 is respectively formed by the opposite vertical sash member 21, the lower horizontal sash member 23, the upper horizontal sash member 22, the transparent sheet 24, and the fitting 26 into the quadrilateral frame, and the rain water is drained toward the eaves by the use of the drain hole 338 and the curved water proof gutter 235. In addition, each of the lighting frames B1, B2 and B3 has the lower and upper horizontal sash members 23, 22 formed into the trebly and quadruplexly engaging water-proof structure, and is mounted on the upper connecting member 14 only through the engagement with the fitting 25 of the upper connecting member 14 to thereby absorb the vibration shocks, thermal expansion and elongation and contraction, so that the lighting frame having complete flashing structure may be mass-produced with simple manufacturing processes.

Next will be explained the horizontal connection of the lighting frames B.

As shown in FIG. 54, the lower end of the vertical insertion wall 210 of the vertical sash member 21 of the lighting frame B is inserted into the intermediate width adjusting section 147 defined by the outer confronting projection 146 and the inner confronting projection 146' of the upper connecting member 14, and then the upper end of the vertical fit piece 215 is inserted into the upper width adjusting section 164' defined by the throating suspending piece 163 of the connecting member cover D and the engaging projection piece 154 of the upper connecting member 14.

At this time, since the actual backing width of the roof varies depending upon the structure of a building, a lot area, and a regional building structure difference, the adjusting function such as the normal mounting, plus mounting and minus mounting, which facilitates the absorption of the error in the backing width, is necessary to easily execute the connection of the roof.

Next will be explained the structure of the width adjusting function.

Figure 56:
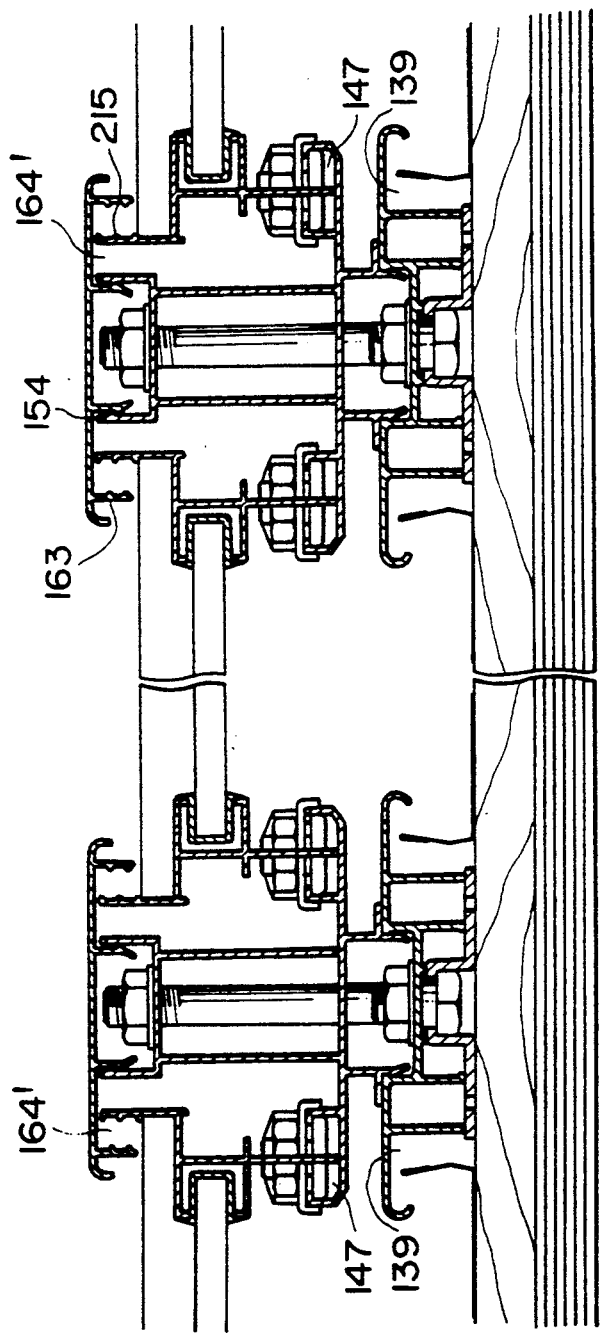
FIG. 56 is a cross-sectional view showing a portion of the intermediate connecting member when the width adjustment is normal.

A width adjusting method of the intermediate width adjusting section 147 is as follows. In the case where the backing is normal in width to be free from any adjustment as shown in FIG. 56, the vertical insertion wall 210 of the vertical sash member 21 of the lighting frame B is inserted into the central position of the intermediate width adjusting section 147 of the upper connecting member 14 to be mounted thereon, and then fixed in position to provide the normal mounting of the lighting frame.

Figure 55:
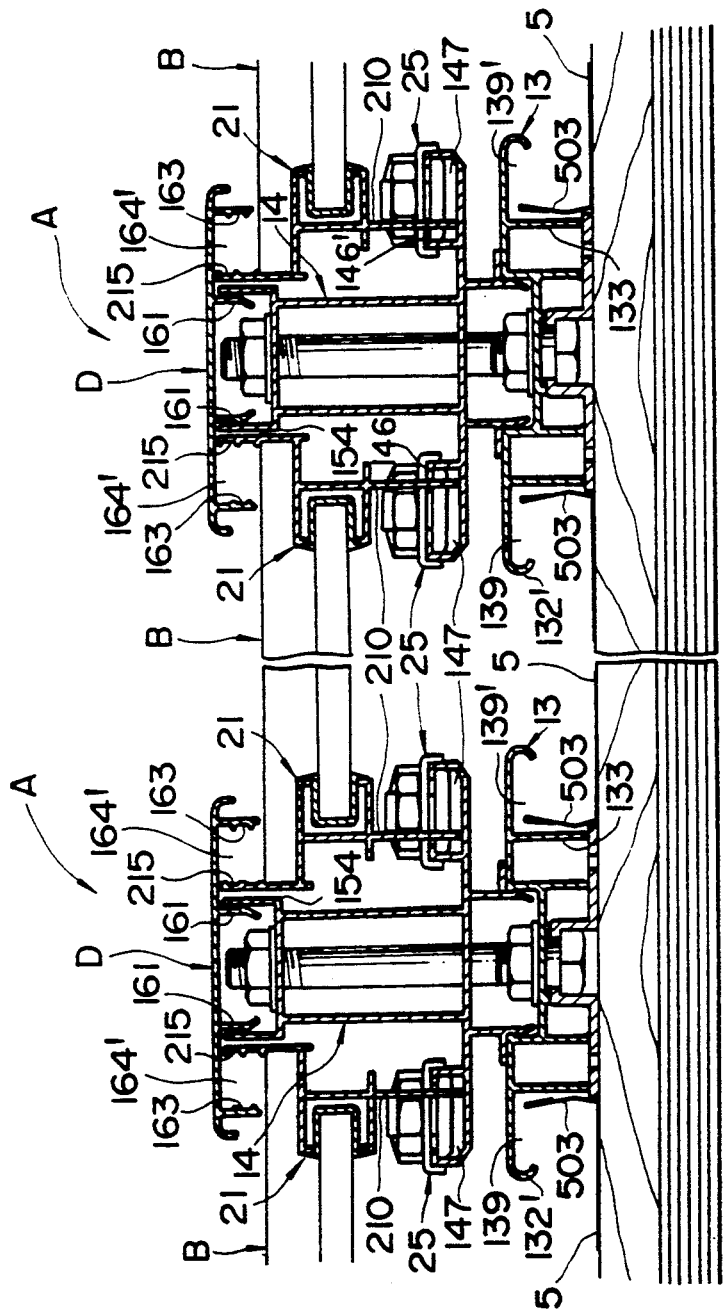
FIG. 55 is a cross-sectional view showing a portion of the intermediate connecting member when the minus adjustment in width is done.

In the case where the minus adjustment is done when the backing is narrower than a normal state as shown in FIG. 55, the vertical insertion wall 210 of the vertical sash member 21 of the lighting frame B is inserted into the intermediate width adjusting section 147 in close proximity to the inner confronting projection 146' thereof to be mounted thereon, and then fixed in position to provide the minus adjusted mounting of the lighting frame B.

Figure 57:
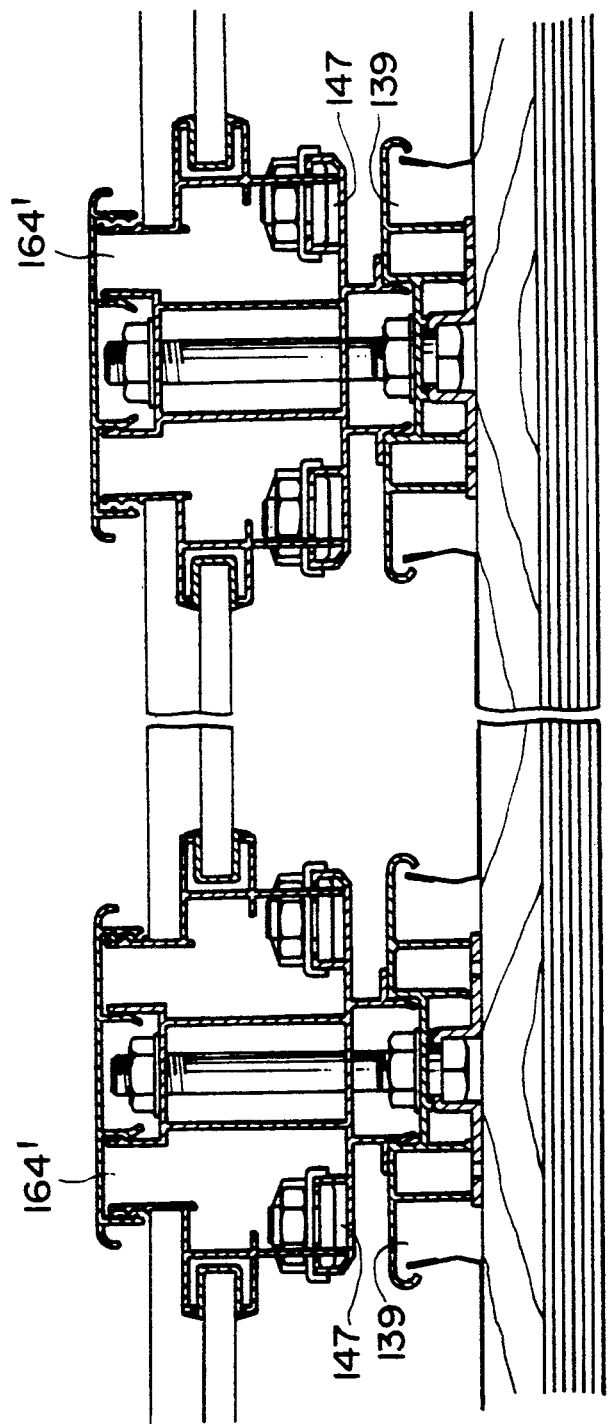
FIG. 57 is a cross-sectional view showing a portion of the intermediate connecting member when the plus adjustment in width is done in the connection.

In the case where the plus adjustment is done when the backing is wider than the normal state as shown in FIG. 57, the vertical insertion wall 210 of the vertical sash member 21 of the lighting frame B is inserted into the intermediate width adjusting section 147 in close proximity to the outer confronting projection 146' thereof to be mounted thereon, and then fixed in position to provide the plus adjusted mounting of the lighting frame B.

A width adjusting method of the upper width adjusting section 164' is as follows. In the case where the backing is normal in width to be free from any adjustment as shown in FIG. 56, the vertical fit piece 215 of the vertical sash member 21 of the lighting frame B is inserted into the central position of the upper width adjusting section 164' defined by the engaging projection piece 154 of the upper connecting member 14 and the throating suspension piece 163 of the intermediate connecting member cover D to provide the normal mounting of the lighting frame.

In the case where the minus adjustment is done when the backing is narrower than the normal state as shown in FIG. 55, the vertical fit piece 215 of the vertical sash member 21 of the lighting frame B is inserted into the upper width adjusting section 164' in close proximity to the inner engaging projection piece 154 thereof to provide the minus adjusted mounting of the lighting frame.

In the case where the plus adjustment is done when the backing is wider than the normal state as shown in FIG. 57, the vertical fit piece 215 of the vertical sash member 21 of the lighting frame B is inserted into the upper width adjusting section 164' in close proximity to the outer throating suspension piece 163 thereof to provide the plus adjusted mounting of the lighting frame.

Hereinafter will be explained the width adjusting method by the use of a numerical formula.

The width of the backing is defined as U, the width of the lighting frame as w, the width of the connecting member as b, and the adjustable dimension as y, whereby p obtained by adding the width w of the lighting frame, the width b of the connecting member and the adjustable dimension y together, that is, $(w+b+y)=p$, is defined as a reference pitch.

First, the width U of the backing divided by the reference pitch p gives a, which is the number of longitudinal rows of the lighting frames B, with remainder c, as follows:

$$U \div p = a \text{ with remainder } c$$

When the remainder c is equal with 0, that is, $c=0$, the lighting frames B and connecting members A, A' are received in their fixed positions relative to each other as shown in FIG. 56.

When the remainder c is less than the half of the reference pitch p ($c<p/2$), this case is referred to as the plus adjustment, while when the remainder c is larger than the half of the reference pitch p ($c>p/2$), this case is referred to as the minus adjustment. An individual width adjusting method employs for each case of plus adjustment and minus adjustment.

Plus adjustment

The width U of the backing divided by the reference pitch p gives a with remainder c, as follows:

$$U \div p + a \text{ with remainder } c \ (c<p/2)$$

Then the remainder c divided by a gives $\alpha$, as follows:

$$c \div a = \alpha$$

The resultant value $\alpha$ comes to a necessary adjusting amount per one row of the lighting frames. Accordingly, the value $\alpha$ is added to the reference pitch p to thereby obtain the pitch of the lighting frames B.

EXAMPLE

When the width U of the backing is equal with 9120, the width W of the lighting frame is equal with 566, the width b of the connecting member is equal with 30 and the adjustable dimension is equal with 10, the following formula will be obtained.

$$p = w + b + y = 606$$

$$9210 \div 606 = 15 \text{ with remainder } 120$$

Since the remainder 120 is less than the half of the reference pitch, that is, 606/2, the plus adjustment is done.

The adjusting amount $\alpha$ per one row of the lighting frames will be obtained as follows:

$$\alpha = 120 \div 15 = 8$$

The pitch of the lighting frames B will be obtained as follows:

$$606 + 8 = 614$$

whereby the pitch of the lighting frame B results in 614, and the number of rows a of the lighting frames B results in 15.

Minus adjustment

The width U of the backing divided by the reference pitch P gives a with remainder c, as follows:

$$U \div p = a \text{ with remainder } c \ (c > p/2)$$

A difference between the reference pitch p and the remainder c divided by a value obtained by adding 1 to the number of rows a of the lighting frames gives α, as follows:

$$(p - c) \div (a + 1) = \alpha$$

The calculated numerical value α results in the necessary adjusting amount per one row of the lighting frames, and then subtracting this value α from the reference pitch p gives the pitch of the lighting frames B.

EXAMPLE 2

When the width U of the backing is equal with 7852, the reference pitch p is equal with 606, the adjustable dimension y is equal with 10, the following formula will be obtained.

$$7852 \div 606 = 12 \text{ with remainder } 580$$

Since the remainder 580 is larger than the half of the reference pitch, that is, 606/2, the minus adjustment is done.

The necessary adjusting amount α will be obtained as follows:

$$\alpha = (606 - 580) \div (12 + 1) = 2$$

$$606 - 2 = 604$$

whereby the pitch of the lighting frames B results in 604, and the number of rows a of the lighting frames B results in 13.

The above formulae are applied to the width adjustment with reference to the specific examples.

Next will be explained the horizontal connection of the water proof sheets 5.

As shown in FIGS. 55 through 57, the engaging water proof wall 503 of the water proof sheet 5 is inserted into the lower width adjusting section 139 defined by the outer curved portion 132' and the inner suspending piece 133 of the lower connecting member 13 as being widely spaced apart from each other to be mounted in the lower width adjusting section 139. Further, the water proof sheet 5 has a width adjusting function capable of normal mounting, plus-adjusted mounting and minus-adjusted mounting corresponding to the error of the width dimension of the backing similarly to the above case.

Next will be explained the structure of the width adjusting function of the water proof sheet 5.

The width adjusting method of the water proof sheet 5 is identical with that of the lighting frame B as noted above, so that the water proof sheets 5 are adjustably connected with each other in cooperation with the lighting frames B.

The width adjusting method of the lower width adjusting section 139 is as follows. In the case where the width of the backing is normal to be free from any adjustment as shown in FIG. 56, the engaging water proof wall 503 of the water proof sheet 5 is inserted into the center of the lower width adjusting section 139 of the lower connecting member 13 and then mounted in the center thereof to provide the normal mounting.

In the case where the minus adjustment is done when the width of the backing is narrower than a normal state as shown in FIG. 55, the engaging water proof wall 503 of the water proof sheet 5 is inserted into the lower width adjusting section 139 of the lower connecting member 13 in close proximity to the inner suspending piece 133 thereof to provide the minus adjusted mounting.

In the case where the plus adjustment is done when the width of the backing is wider than the normal state as shown in FIG. 57, the engaging water proof wall 503 of the water proof sheet 5 is inserted into the lower width adjusting section 139 of the lower connecting member 13 in close proximity to the outer curved portion 132' thereof to provide the plus adjusted mounting.

Figure 58:
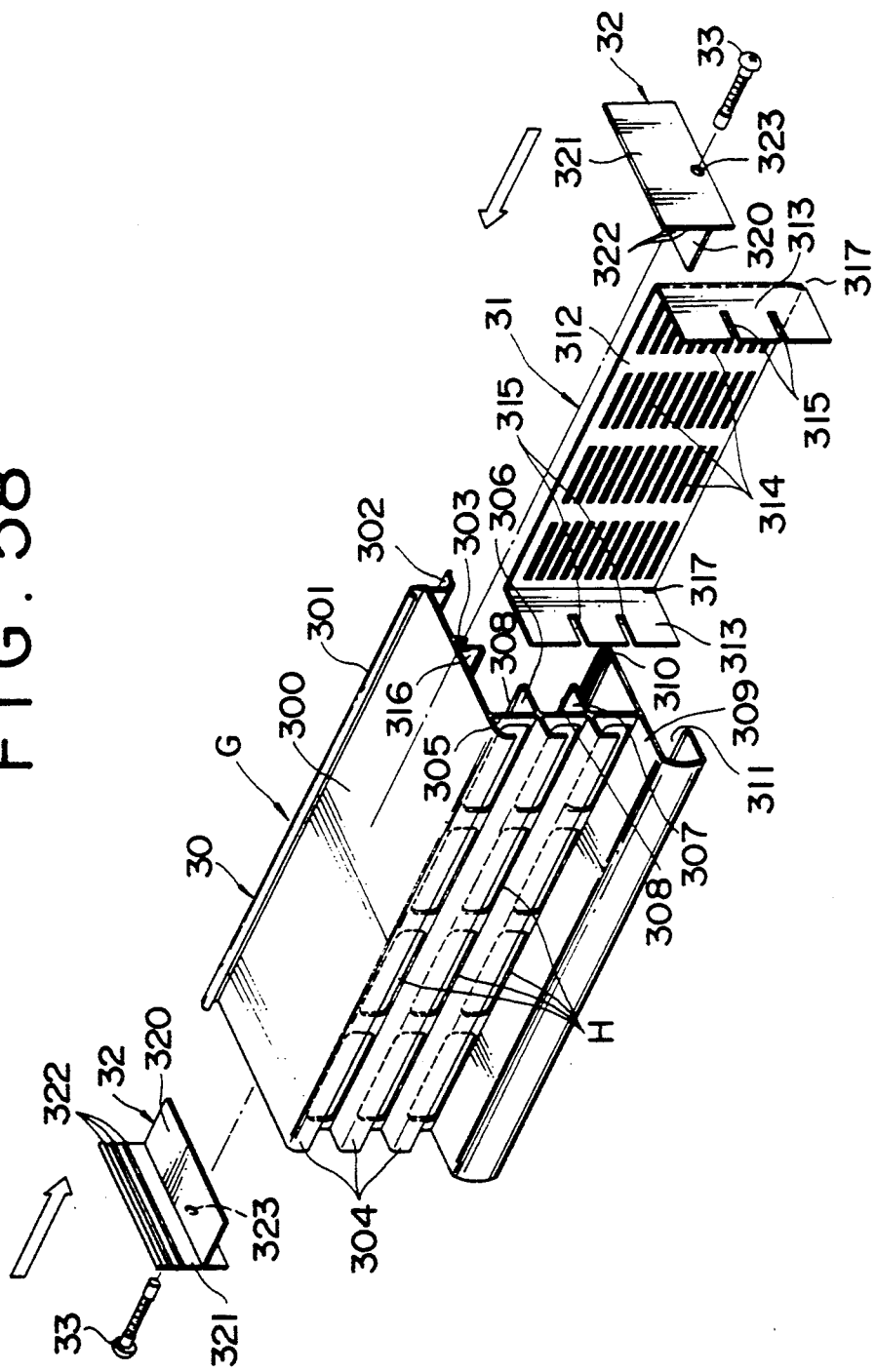
FIG. 58 is an exploded perspective view showing an eaves cover.
Figure 59:
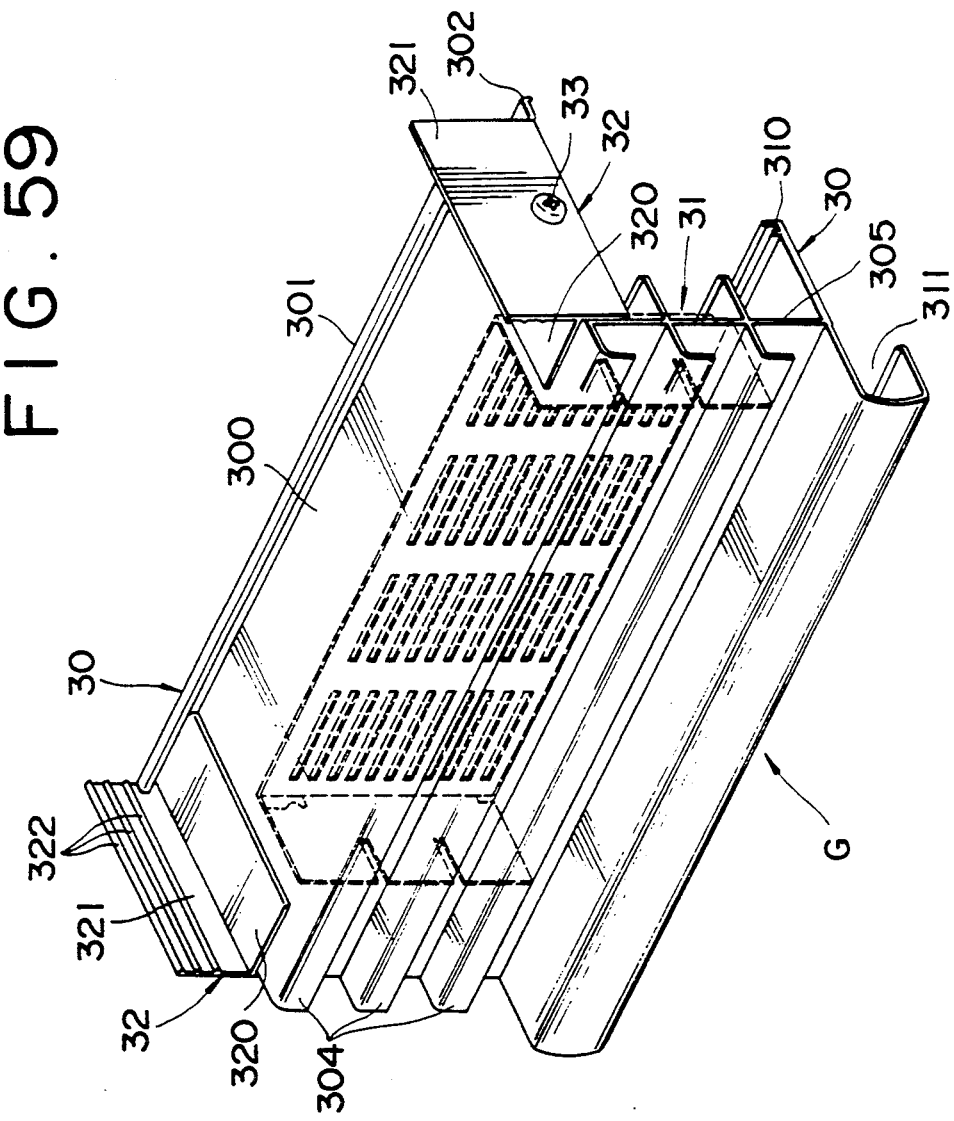
FIG. 59 is a perspective view showing the assembled eaves cover.

FIG. 58 is an exploded perspective view of the eaves cover G. The eaves cover G consists of a cover body 30, a porous sheet 31 and a flashing water proof wall 32.

The cover body 30 has a horizontal upper surface 300 provided at the upper edge near the ridge with an upright flashing projection piece 301, at the lower edge near the ridge with a throating guide piece 302 bent toward the ridge, and at the intermediate portion on the back with a screw receiver groove 303 for fixing the flashing water proof wall 32 so as to extend in the longitudinal direction.

The edge of the horizontal upper surface 300 near the eaves is downwardly bent to provide a suspending throating piece 304, and a dust proof suspending wall 305 is provided slightly inward of the suspending throating piece 304. Two parallel extending sheets 306, 307 are provided at an interval so as to cross the dust proof suspending wall 305. Each end of the parallel sheets 306, 307 near the ridge is bent downwardly to also provide a suspending throating piece 304, while the other each edge of the parallel sheets 306, 307 near the ridge is bent upwardly to provide a flashing projection piece 308. A support sheet 309 is provided so as to project from the lower end of the dust proof suspending wall 305 toward the ridge and the eaves.

An upward opening porous sheet support groove 310 is provided so as to extend along the edge of the support sheet 309 near the ridge, and the edge of the support sheet 309 on the eaves side is downwardly bent so as to be curved toward the eaves and then further bent toward the ridge, so that the tip of the bent portion of the support sheet 309 is upwardly stood to provide a drain groove 311. A plurality of eaves-side air inlet ports H are bored in each of three small wall portions of the dust proof suspending wall 305 partitioned by two parallel sheets 306, 307.

The porous sheet 31 has a vertical porous wall 312 having the upper end brought into engagement with a side wall 316 of the screw receiver groove 303 of the cover body 30 and the lower end brought into engagement with the porous sheet support groove 310. An engaging wall 313 brought into engagement with the corresponding parallel sheet is respectively provided so as to extend from the opposite ends of the vertical porous wall 312 toward the eaves, and a plurality of small vent holes 314 are bored in the vertical porous wall 312.

A pair of parallel sheet fitting notches 315, 315, into which the respective ends of the parallel sheets 306, 307 of the cover body 30 near the ridge are fitted, are formed in the front end of each parallel sheet engaging wall 313, and an engaging notch 317 brought into engagement with the porous sheet support groove is formed in each lower end corner of the connection, where the parallel sheet engaging wall 313 and the vertical porous wall 312 are connected with each other.

The flashing water proof wall 32 has a horizontal upper surface mounting piece 320 mounted on the upper side end portion of the horizontal upper surface 300 of the cover body 30, and a water proof fixed wall 321 is provided at outer end of each horizontal upper surface mounting piece 320. A plurality of water proof projections 322 are formed on the inner surface of each water proof fixed wall 321, and a through hole 323 is bored in a lower portion of each water proof fixed wall 321 at a position corresponding to the screw receiver groove 303.

Next will be explained the assemblage of the eaves cover G. The upper end of the vertical porous wall 312 of the porous sheet 31 is brought into engagement with the screw receiver groove side wall 316 of the cover body 30, then the lower end of the porous wall 312 is inserted into the porous sheet support groove 310, and then the parallel sheet fitting notches 315 are brought into engagement with the respective parallel sheets 306, 307 to slide the porous sheet 31 in the horizontal direction, whereby the dust proof suspending wall 305 of the cover body 30 is arranged in parallel with the vertical porous wall 312 of the porous sheet 31.

Then, the horizontal upper surface mounting piece 320 of the flashing water proof wall 32 is mounted on the horizontal upper surface 300 of the cover body 30, and then fixed together by the use of a tapping screw 33 inserted into each through hole 323 and corresponding receiver groove 303.

Figure 60:
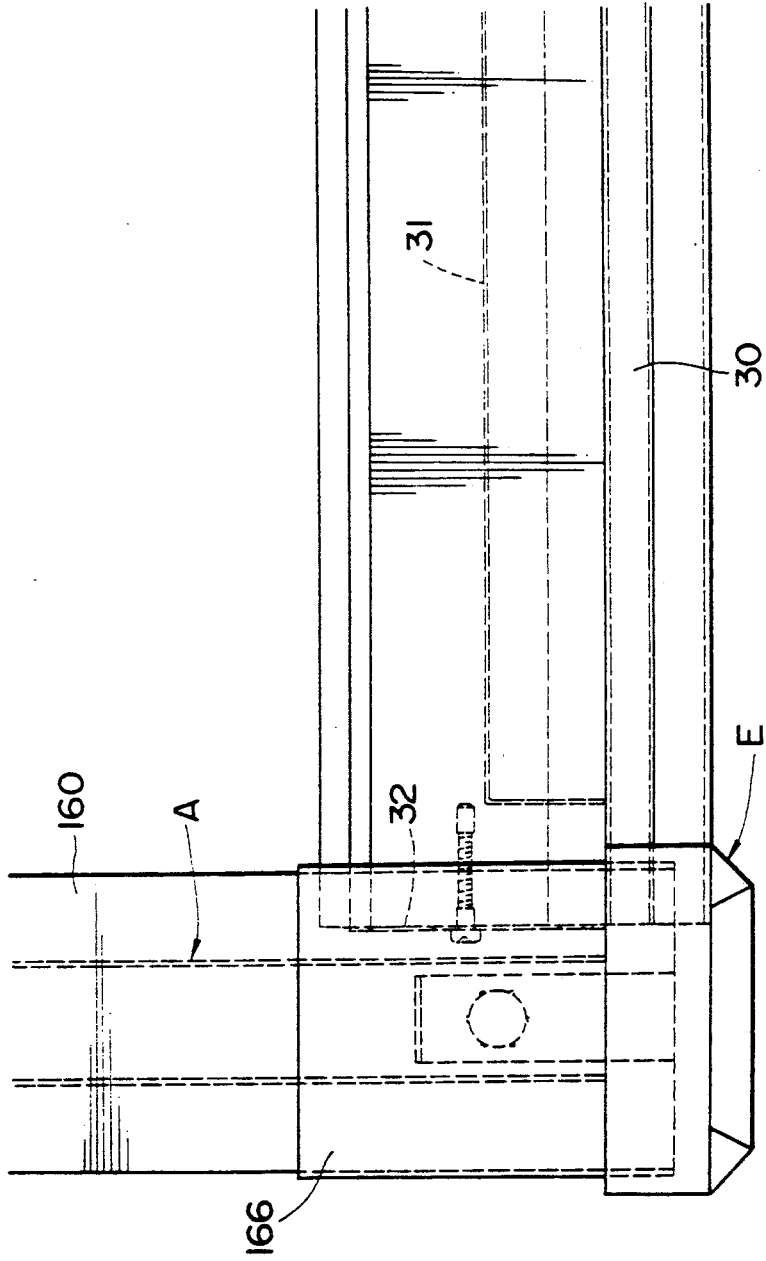
FIG. 60 is a plan view showing a portion of the intermediate connecting member provided at the eaves.
Figure 61:
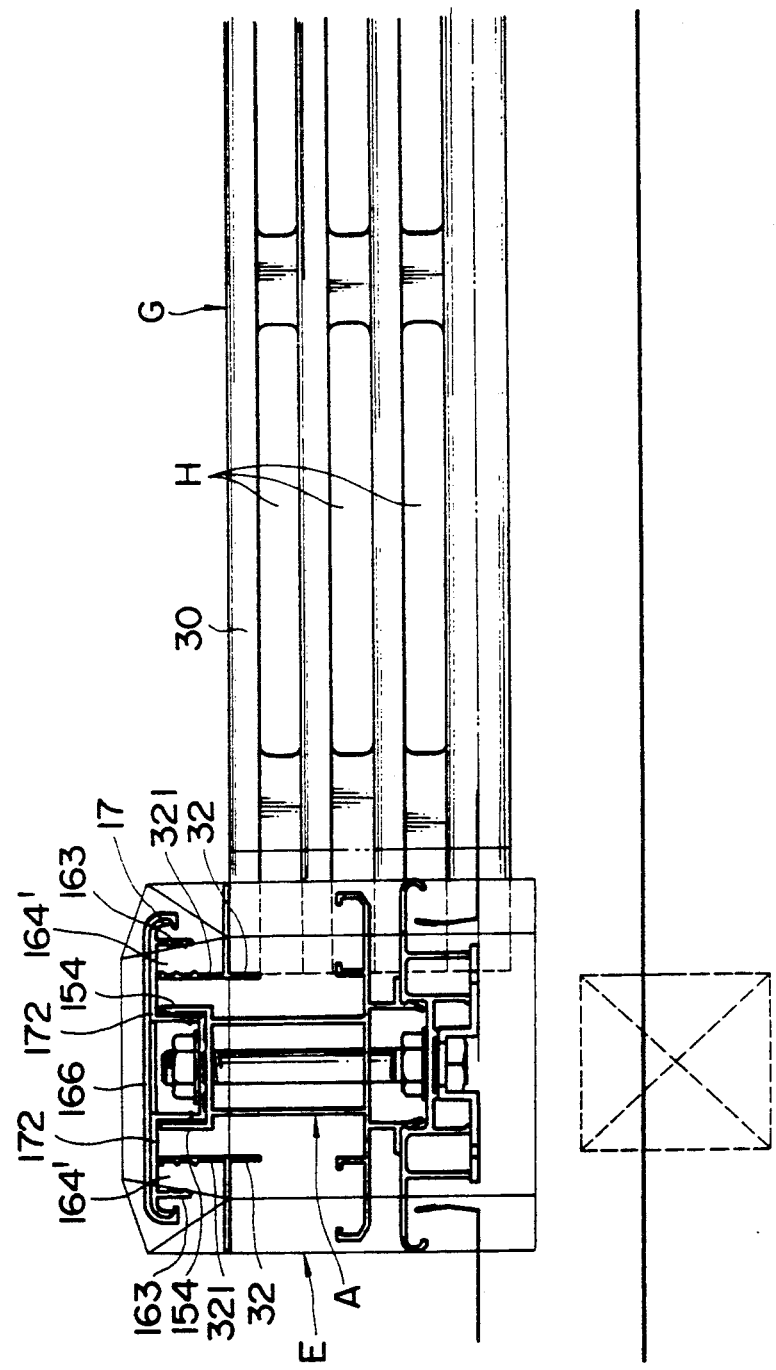
FIG. 61 is a front view showing the portion of the intermediate connecting member shown in FIG. 60.
Figure 62:
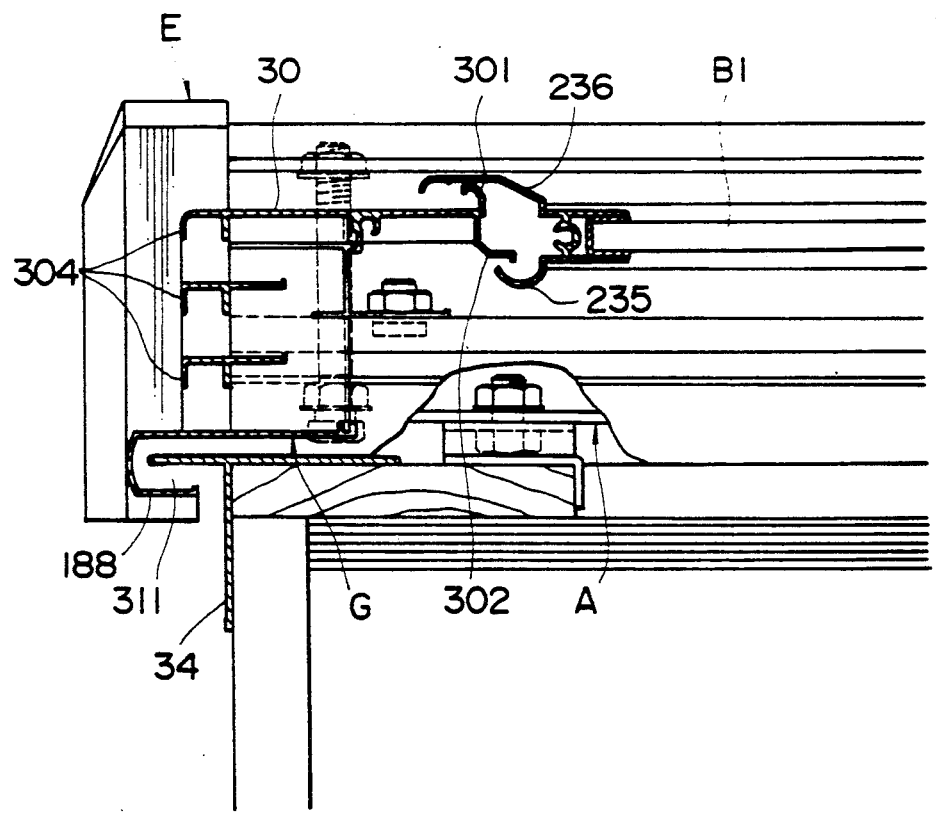
FIG. 62 is a longitudinal cross-sectional view showing the portion of the intermediate connecting member shown in FIG. 60.

FIGS. 60 through 62 show the mounting of the eaves cover G. The eaves cover G is placed on the front of the eaves of the roof as shown in FIG. 62, and then the upright flashing projection piece 301 is inserted into a portion below the cover portion 236 of the eaves-side lighting frame B1, while the throating guide piece 302 is inserted into a portion above the curved water proof gutter 235. The recess 311 of the eaves-side cover G is fitted from the outer side of the eaves sheet 34 mounted to the backing of the roof, and the dust proof cap E is mounted to the front of each of the connecting members A,A' on eaves side, so that the outer surface of the recess 311 is fitted to the recess 188 of the dust proof cap E.

An eaves fitting sheet 17 is mounted to the upper front surface of each of the connecting members A, A' on the eaves side, as shown in FIG. 61, and the throating suspension piece 163 is formed so as to suspend from the eaves fitting sheet 17. The water proof fixed wall 321 of the throating water proof wall 32 of the eaves cover G is fitted to a portion below the horizontal wing piece 172.

The eaves cover G has also a width adjusting function similar to the cases of the above-described lighting frame B and water proof sheet 5. The adjusting method of the eaves cover G is as follows. The engaging projection piece 154 of the upper connecting member 14 is widely spaced apart from the throating suspension piece 163 of the eaves fitting sheet 17 to define a width adjusting section therebetween similar to the aforementioned upper width adjusting section 164' of the lighting frame B, to thereby facilitate the adjustment of the width.

Figure 64:
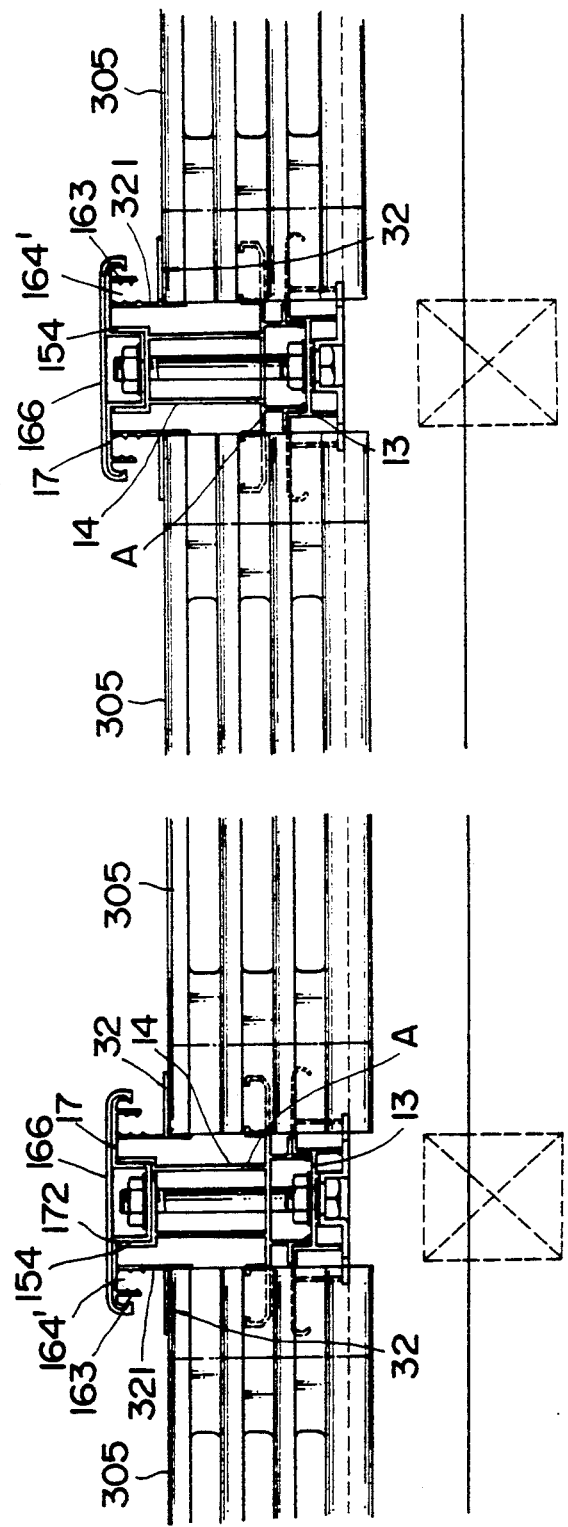
FIG. 64 is a cross-sectional view showing the eaves portion when the width adjustment is normal.

In the case where the width of the backing is normal to be free from any adjustment as shown in FIG. 64, the water proof fixed wall 321 of the eaves cover G is mounted so as to be located in the center of the upper width adjusting section 164' to provide the normal mounting.

Figure 63:
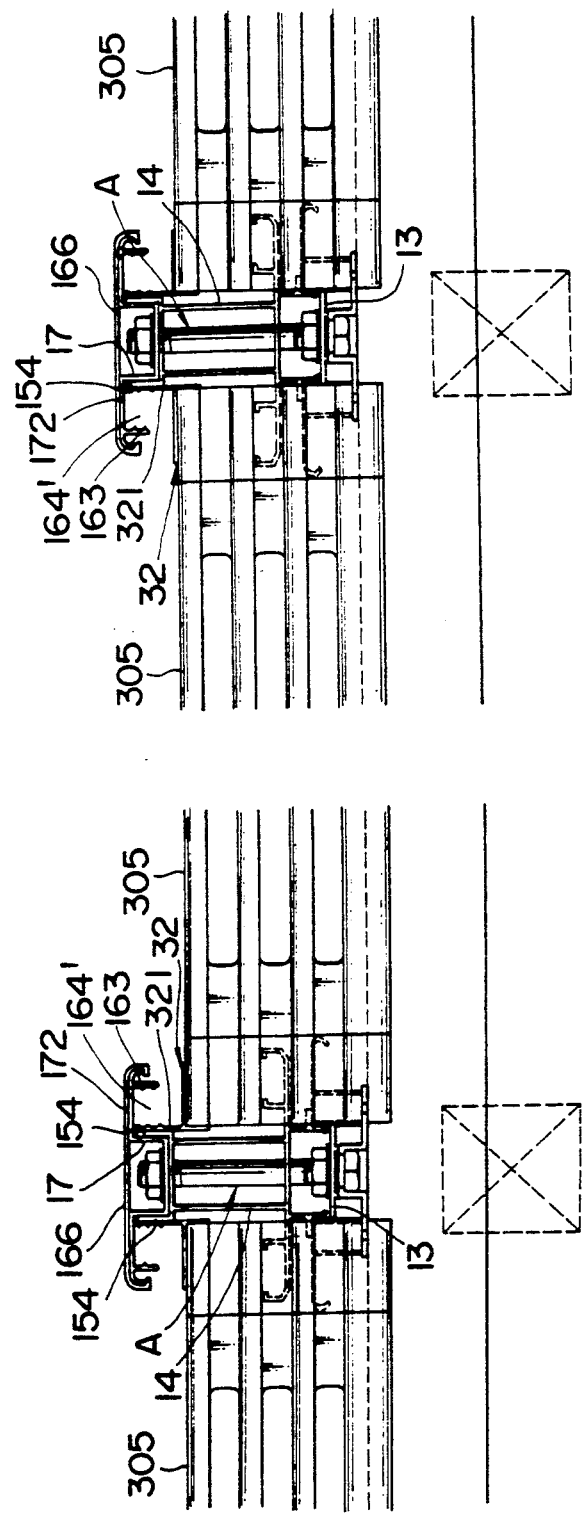
FIG. 63 is a cross-sectional view showing an eaves portion when the minus adjustment in width is done.

In the case where the minus adjustment is done when the width of the backing is narrower than the normal state as shown in FIG. 63, the water proof fixed wall 321 of the eaves cover G is mounted to be located at the inner side of the upper width adjusting section 164' in close proximity to the engaging projection piece 154 of the upper connecting member 14 to provide the minus adjusted mounting.

Figure 65:
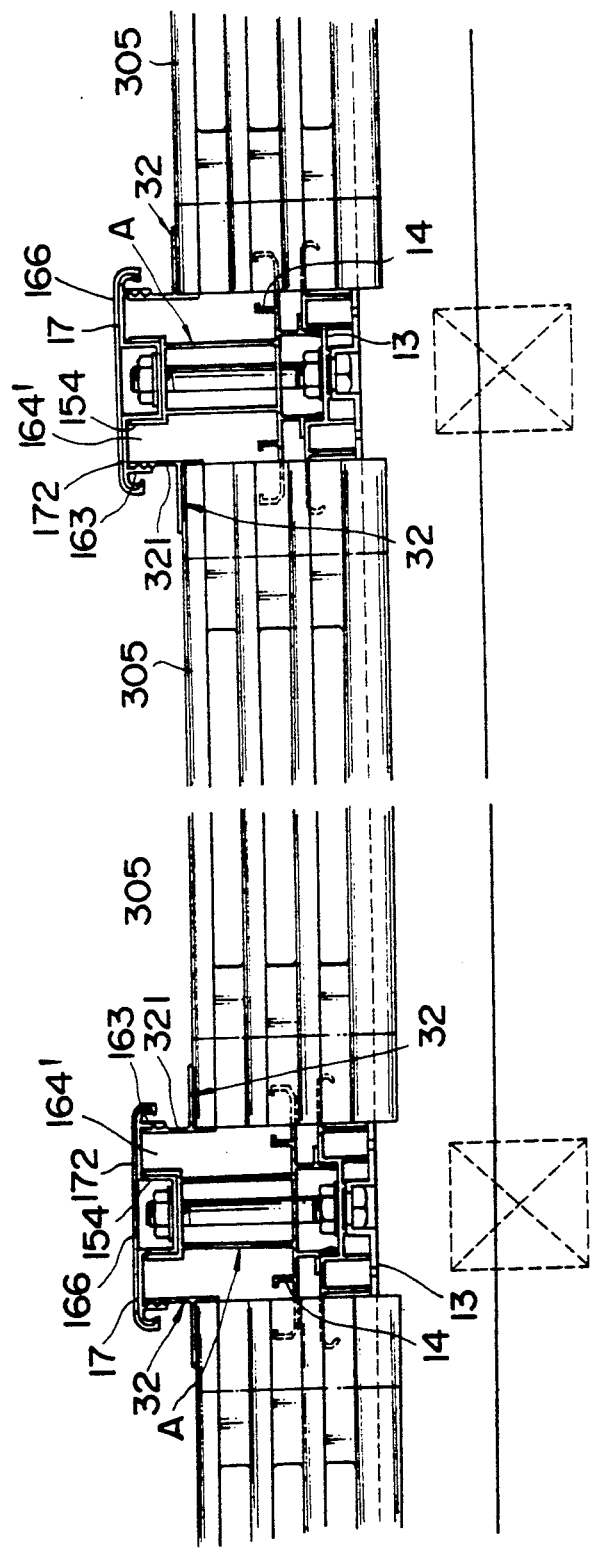
FIG. 65 is a cross-sectional view showing the eaves portion when the plus adjustment in width is done.

In the case where the plus adjustment is done when the width of the backing is wider than the normal state as shown in FIG. 65, the water proof fixed wall 321 of the eaves cover G is mounted to be located at the outer side of the upper width adjusting section 164' in close proximity to the throating suspension piece 163 of the eaves fitting sheet 17 to privide the plus adjusted mounting.

As described in the foregoing, the parallel mounting of the roof members is done with the lighting frame B, the water proof sheet 5, the eaves cover G, and each connecting member A, A' which are mounted corresponding to each other.

Further, since the eaves cover G is mounted only by means of insertion, the distortion due to earthquakes and thermal expansion may be absorbed, and the air inlet holes are efficiently formed to also facilitate the mounting thereof. The connecting member cover D, the upper connecting member 14, the fitting sheet 17 and the eaves cover G or like eaves constituting members are easily manufactured and worked. Further, the sliding cover 166 slidably mounted on the connecting member cover D is slidably moved toward the eaves, and then inserted into the cavity 184 of the dust proof cap E to unify the eaves section, so that the reinforcing structure which is strong in wind pressure resistance is obtained with oly one bolt.

Figure 67:
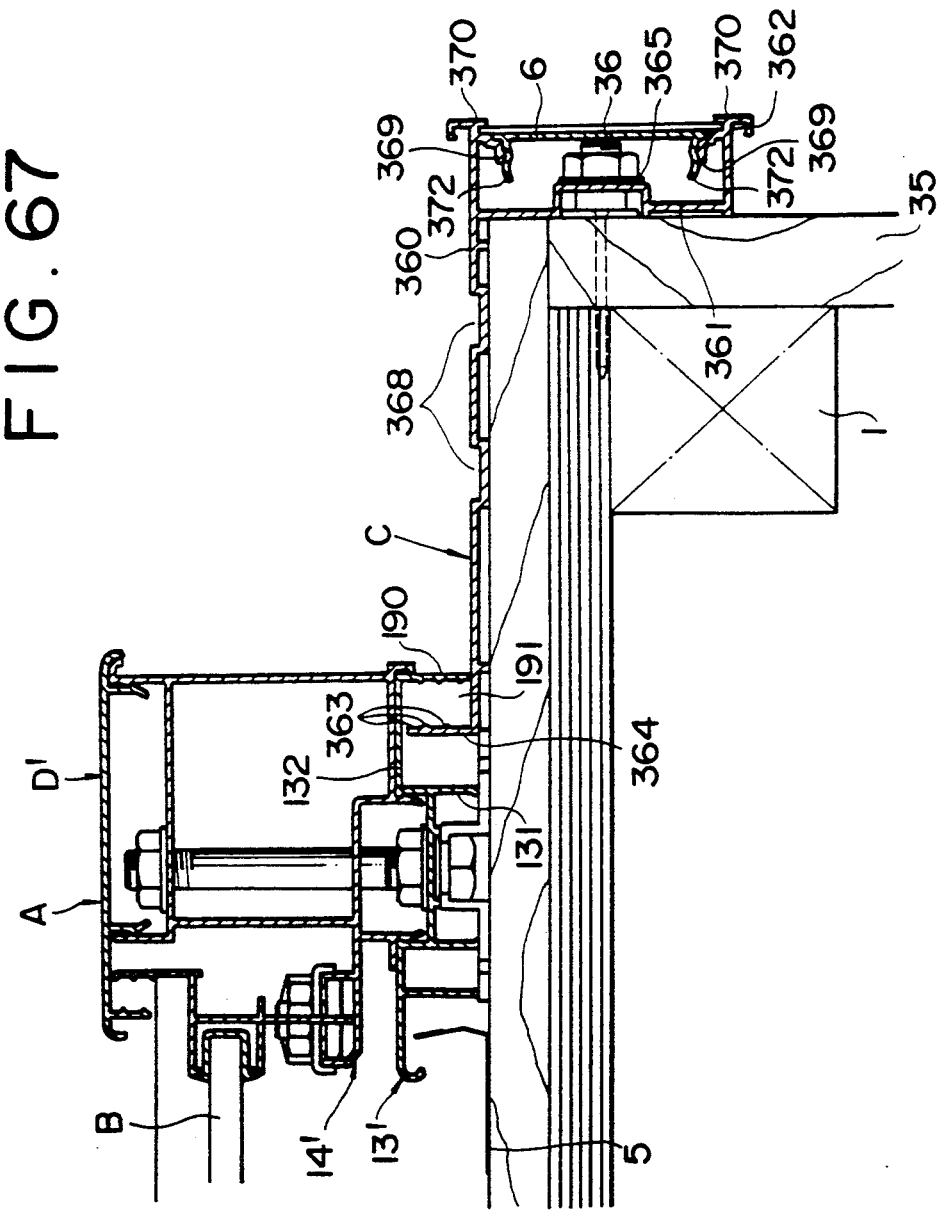
FIG. 67 is a cross-sectional view showing the side of the roof.

Next will be explained the structure of an end of the roof on the gable side. Referring to FIG. 67, reference numeral 35 designates a gable board fixedly attached to the rafter 1 by means of nails or the like, 36 a base member fitting fixedly attached to the side of the gable board 35, C a lateral front base member attached to the fitting 36, and 6 a lateral front cover fittingly mounted to the base member C.

The base member C has an upper horizontal portion 360 constituting a body. A vertical portion 361 constituting a suspending wall is integrally provided on the lower surface of the upper horizontal portion 360, and a lower horizontal portion 363 constituting an overhang portion is provided so as to outwardly project from the lower end of the vertical portion 361. A throating rise wall 364 having a plurality of throating projections 363 is provided on the upper surface of the upper horizontal portion 360 so as to project from the inner edge thereof, and the center of the vertical portion 361 is outwardly projected to define a support groove 365.

The other edges of the upper and lower horizontal portions 360, 362 of the base member C are respectively folded back downward and upward and then the folded ends thereof are respectively folded back inward to provide respective engaging projections 369. A pair of lateral front keep board support grooves 370 confronting each other are formed at the outer side of the respective engaging projections 369. A fixing circular hole 366 is bored in the neighborhood of the longitudinal center of the support groove 365 of the base member C, and a plurality of slide mounting holes 377, each of which is an elongate hole having a longer axis extending in parallel with a line connecting the eaves and the ridge, are bored in the support groove 365 at intervals so as to locate at the opposite sides of the circular hole 366. A plurality of rain water flowing-down grooves 368 are formed in the upper horizontal portion 360 so as to extend along the longitudinal direction.

Then, the base member C is mounted by the use of the fitting 36 mounted to the side of the gable board 35 through the circular hole 366 and the mounting holes 367. The throating rise wall 364 is inserted between a suspending leg piece 190 below the overhang portion 132' of the side lower connecting member 13' and the vertical wall 131 to be mounted therebetween.

Further, the suspending leg piece 190 is widely spaced apart from the vertical wall 131 to define a side lower width adjusting section 191 therebetween for adjusting the error of the width of the backing.

Figure 66:
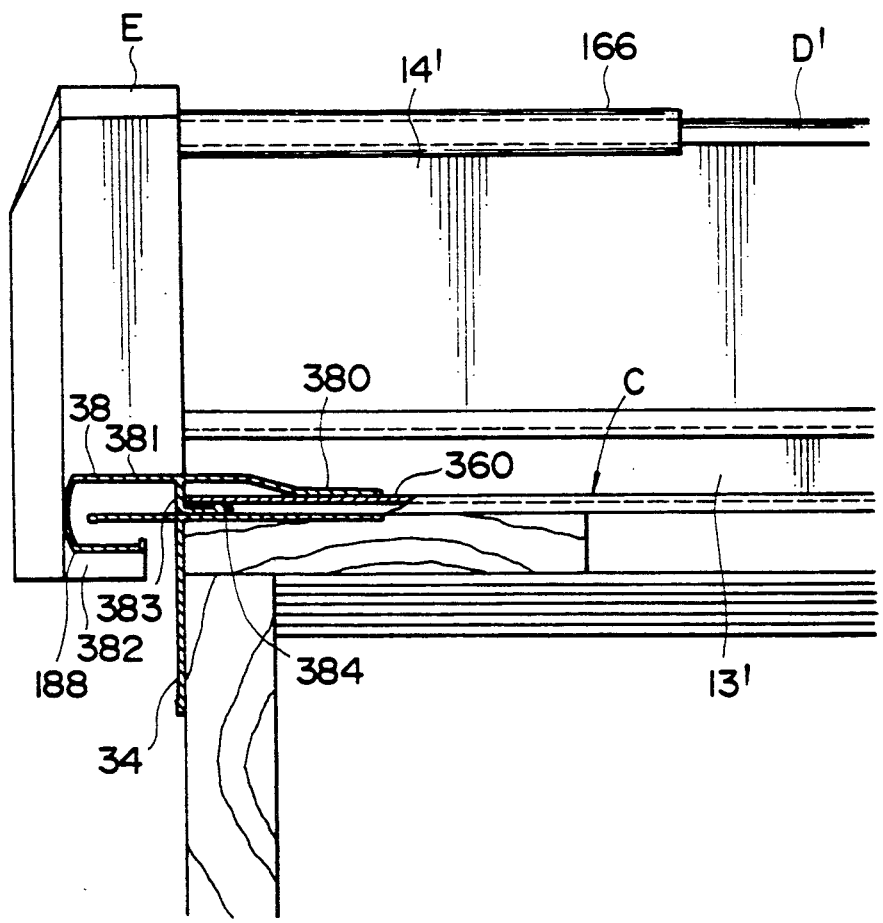
FIG. 66 is a cross-sectional view showing the eaves portion at the side of the roof.

The eaves lateral front member 38 is mounted to the upper front surface of the base member C on the eaves side, as shown in FIG. 66.

The eaves lateral front member 38 has a mounting surface 380 of the same width as the base member C and overlapped with the upper horizontal portion 360 of the base member C. The edge of the mounting surface 380 on the eaves side is folded slantly upward to provide a horizontal body 381, then the horizontal body 381 is projected, and the end of the horizontal body 381 is bent downward and further bent toward the ridge to define a recess 382. A vertical leg portion 383 is provided so as to project downward from the lower surface of the horizontal body 381, and an insertion piece 384 inserted into the convex lower surface of the base member C defined by the adjacent rain water flowing-down grooves 368 of the base member C is provided at the lower end of the eaves lateral front member 38.

The eaves-side end of the eaves sheet 34 is inserted into the recess 382 of the eaves lateral front member 38, and the outer surface of the recess 382 is fitted to the recess 188 of the dust proof cap E.

Further, a mounting notch 385 for mounting the side lower corner decorative cover F is formed in the lower end of the eaves lateral front member 38 on the verge side, and an engaging recessed groove 386 fitted to each rain water flowing down groove 368 is formed on the mounting surface 380.

Figure 68:
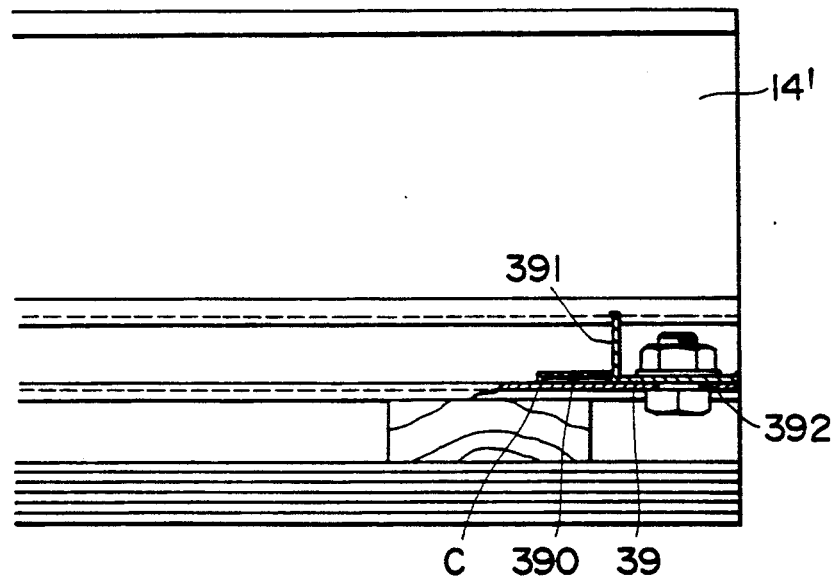
FIG. 68 is a longitudinal cross-sectional view showing a rid portion at the side of the roof.
Figure 69:
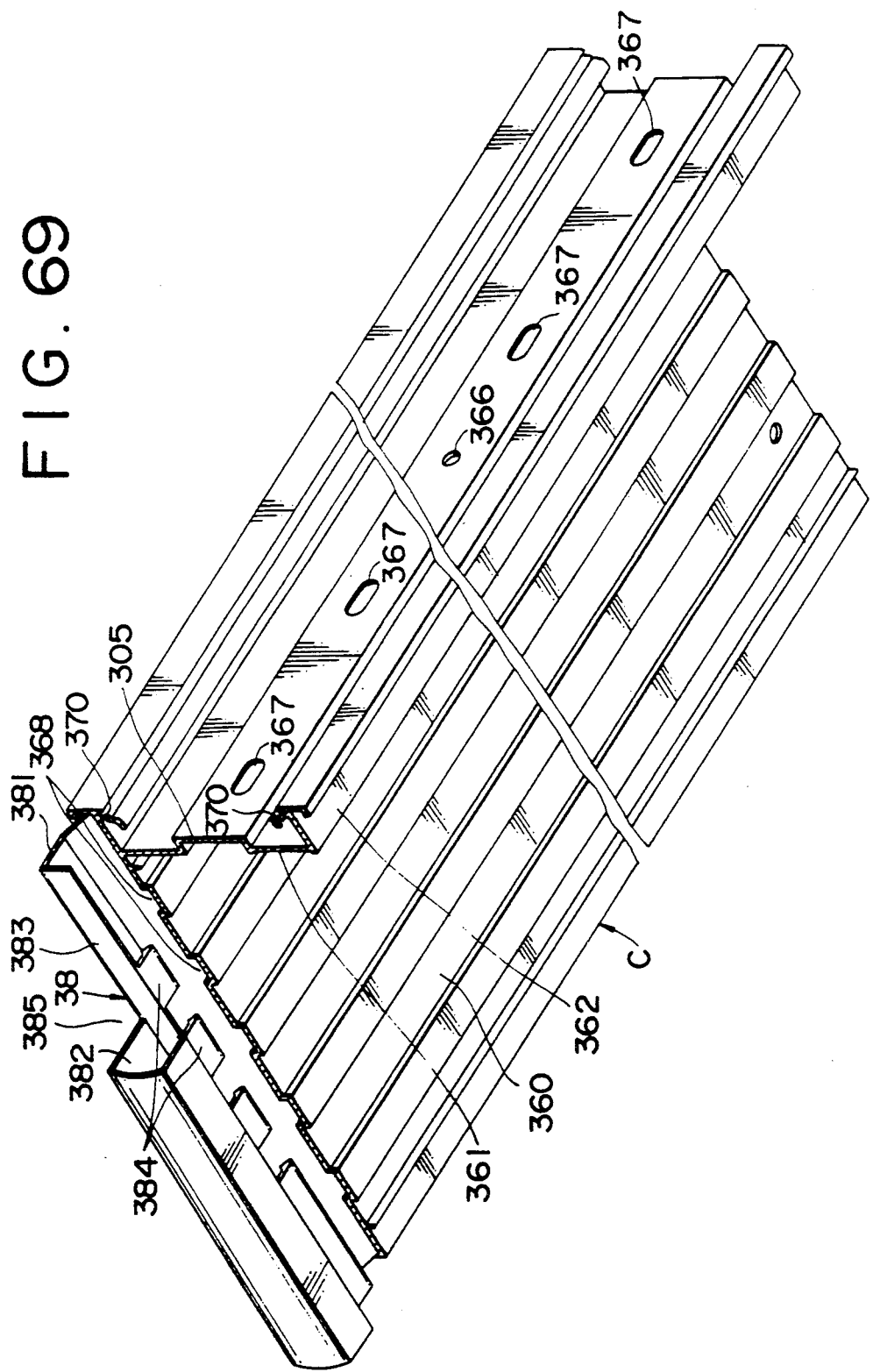
FIG. 69 is a perspective view showing the back surface of a lateral front base member.

A ridge lateral front member 39 is mounted to the upper front surface of the base member C on the ridge side, as shown in FIG. 68.

Figure 70:
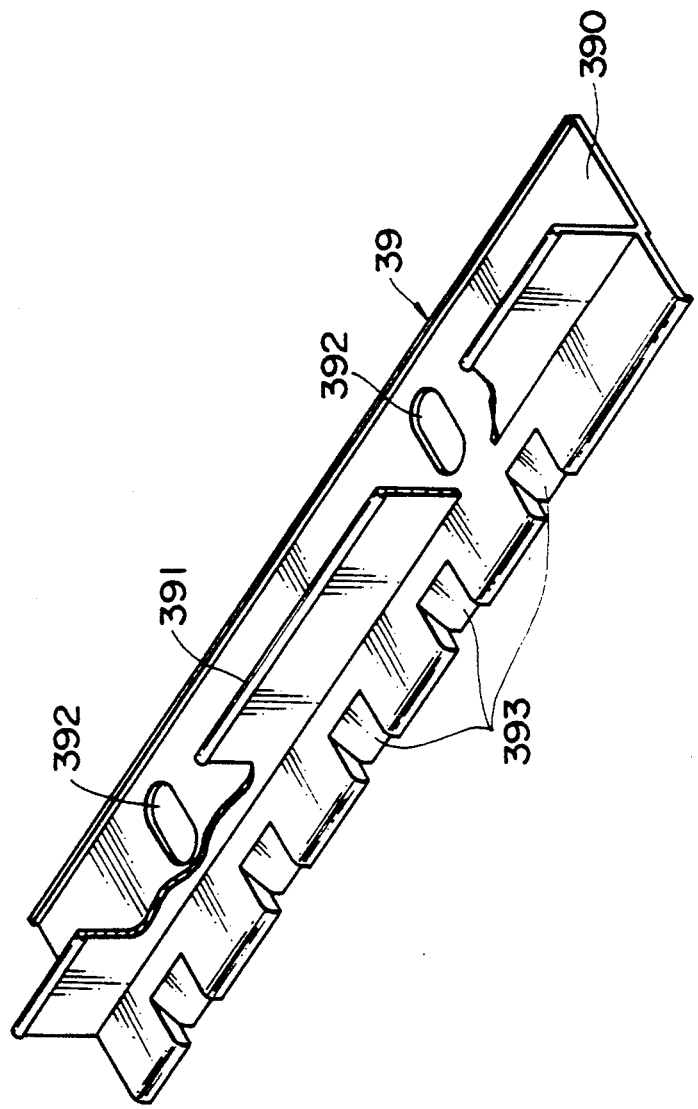
FIG. 70 is a perspective view showing a ridge-side lateral end member.

The ridge lateral front member 39 has a horizontal mounting surface 390 of the same width as the upper horizontal portion 360 of the base member C, as shown in FIG. 70. A throating projection wall 391 is provided on the upper surface of the horizontal mounting surface 390, and a plurality of mounting elongate holes 392, each of which has a longer axis extending in parallel with the line connecting the eaves and the ridge, are bored in the horizontal mounting surface 390 at the side closer to the ridge more than the throating projection wall 391. A plurality of lower bent tongue pieces 393 fitted to the corresponding rain water flowing-down grooves 368 of the base member C are provided at the end of the horizontal mounting surface 390 on the eaves side.

The ridge lateral front member 39 is mounted to the upper horizontal portion 360 of the base member C as shown in FIG. 71. The lower bent tongue pieces 393 are respectively fitted to the corresponding rain water flowing-down grooves 368, and a bolt 394 is inserted into each bolt hole bored in the base member C on the ridge side and each mounting elongate hole 392 to be fixed by the use of a nut, so that the ridge lateral front member 39 is mounted to the base member C.

The lateral front cover 6 is substantially of the same length as the base member C, and has a vertical covering sheet 371 having two engaging projections 372 provided at the inner surface of the vertical covering sheet 371 near the upper and lower ends thereof and respectively engaging the corresponding engaging projections 369 of the base member C.

Next will be explained a width adjusting method in the side of the roof.

Previously, a method for adjusting the error of the backing width in the intermediate portion of the roof by connecting the lighting frame B and the water proof sheet 5 in parallel with each other through the intermediate connecting member A has been described.

When actually mounting the roof members on the roof, the start of roofing and the end of roofing are important. Particularly, in the backing width, since the width on the ridge side is not necessarily identical with the width on eaves side, and the backing on the ridge side and the eaves side do not actually extend in parallel with each other, the width adjusting section for facilitating the start of roofing and the end of roofing is absolutely necessary for the side structure of the roof. While the width adjustment in the side of the roof is executed at opposite sides of the roof or at one side thereof, the members used in the embodiment of the present invention may be mounted in both cases where the width adjustment is done at the opposite sides and one side of the roof. FIGS. 72 through 74 show the normal mounting, the minus adjusted mounting and the plus adjusted mounting in the side of the roof, respectively. A width adjusting method in the side of the roof will be hereinafter explained.

As shown in FIG. 72, in the lower side connecting member 13' of the lower side connecting member A, the vertical wall 131 located at the outer side of the lower side connecting member 13' is widely spaced apart from the suspending leg piece 190 is define a lateral lower side width adjusting section 191 therebetween for adjusting the error of the backing width. Further, the base member C has a flashing rise wall 364 formed at the inner end on the upper surface of the base member C. In the case where the width of the backing is normal to be free from any adjustment, the flashing rise wall 364 of the base member C is mounted to be located in the center of the lateral lower width adjusting section 191.

In the case where the minus adjusted mounting is done when the backing width is narrower than the normal state as shown in FIG. 73, the flashing rise wall 364 of the base member C is mounted in close proximity to the vertical wall 131 of the lower side connecting member 13' located at the inner side of the lateral lower width adjusting section 191 to provide the minus adjusted mounting.

In the case where the plus adjusted mounted is done when the backing width is wider than the normal state as shown in FIG. 74, the flashing rise wall 364 of the base member C is mounted in close proximity to the suspending leg piece 190 of the lower side connecting member 130' located at the outer side of the lateral lower width adjusting section 191 to provide the plus adjusted mounting.

As described in the foregoing, the side of the roof is adjusted similarly to the adjustment of the intermediate portion of the roof to execute the fine adjustment of the roof at the outer side, so that the end of roofing with the roof members may be facilitated.

Next will be explained a method for adjustingly connecting the base member C in the side of the roof. The width of the backing of the existing roof is normally more than 3636 mm. In the execution of roofing work, the backing of 1818 mm in width may be roofed with two sheets of lighting frames B or three sheets of lighting frame B or four sheets of lighting frames B.

For instance, when the backing of 1818 mm in width is roofed with three sheets of lighting frames B, seven rows of lighting frames B are necessary to roof the backing of 4652 mm in width, while eight rows of lighting frames B are necessary to roof the backing of 4848 mm in width. When the width of the lighting frame is defined as w, and the width of the connecting member as b, the minimum backing width in seven rows of lighting frames B comes to as follows:

$$(w+b) \times 7 = e$$

The maximum dimension, in which the maximum width adjusting amount (dmm/per row) is added to the minimum backing width, is as follows:

$$(d \times 7) + e = f$$

Further, the minimum backing width in eight rows of lighting frames B comes to as follows:

$$(w+b) \times 8 = g$$

However, the problem is encountered in the case where the dimension h within the range of g to f, that is $g > h > f$, is produced. Since the actual dimension of the backing of the roof varies depending upon the structure of a building or a regional difference, the dimension of h within the range of seven to eight rows of lighting frames is naturally present. However, the width adjusting method of the intermediate portion of the roof and that of the side of the roof do not satisfy the adjustment of this dimension h to happen the case where the roof backing cannot be adjusted, so that the roofing work becomes impossible.

Now, the roof backing dimension which is in excess of the range of the width adjustment as noted above is determined to be absorbed into a combination of the side connecting member A' and the lateral front base member C, and some kinds of lateral front base members C different from each other in width are prepared to use the proper base member C corresponding to each dimension.

Namely, some kinds of lateral front base members C each having a value s is obtained by the following formula:

$$(g-f)-(7dx) = s$$

(where s being larger than 0, that is $s > 0$ and x being 0 or positive integer) are prepared to use the proper lateral front base member C corresponding to each dimension.

EXAMPLE

When the width w of the lighting frame, the width of the connecting member, and the width adjusting amount are respectively set to be equal with 566 mm, 30 mm, and 20 mm, the minimum backing width e in seven rows of lighting frames comes to 4172 mm according to the following formula:

$$e = (566 + 30) \times 7 = 4172 \text{ mm}$$

the maximum dimension f comes to 4312 mm according to the following formula:

$$\text{pi } f = (20 \times 7) + 4172 = 4312 \text{ mm, and}$$

the minimum width g in eight rows of lighting frames comes to 4768 mm according to the following formula:

$$g = (566 + 30) \times 8 = 4768 \text{ mm}$$

Accordingly, the dimension s of the lateral front base member C results in as follows:

When $x = 0$, $s = 4768 - 4312 = 456$ mm,

When $x = 1$, $s = 456 - (20 \times 7 \times 1) = 316$ mm

When $x = 2$, $s = 456 - (20 \times 7 \times 2) = 176$ mm, and

When $x = 3$, $s = 456 - (20 \times 7 \times 3) = 36$ mm

Now, if the backing width of the roof is set to be equal with 4530 mm, the backing width amount in excess of the range of the adjustment comes to 218 mm according to the following formula:

$$4530 - 4312 = 218 \text{ mm}$$

Therefore, the substantial backing width of the roof is calculated by the use of the lateral front base member C of 316 mm in width which is closest to the backing width amount of 218 mm in excess of the range of adjustment as follows, $$4530 - 316 = 4214 \text{ mm}$$

Since the total width adjusting amount results in 42 mm according to the following formula;

$$4214 \times 4172 = 42 \text{ mm,}$$

the maximum width adjusting amount results in 6 mm/per row according to the following formula:

$$42 \div 7 = 6 \text{ mm/per row}$$

Figure 76:
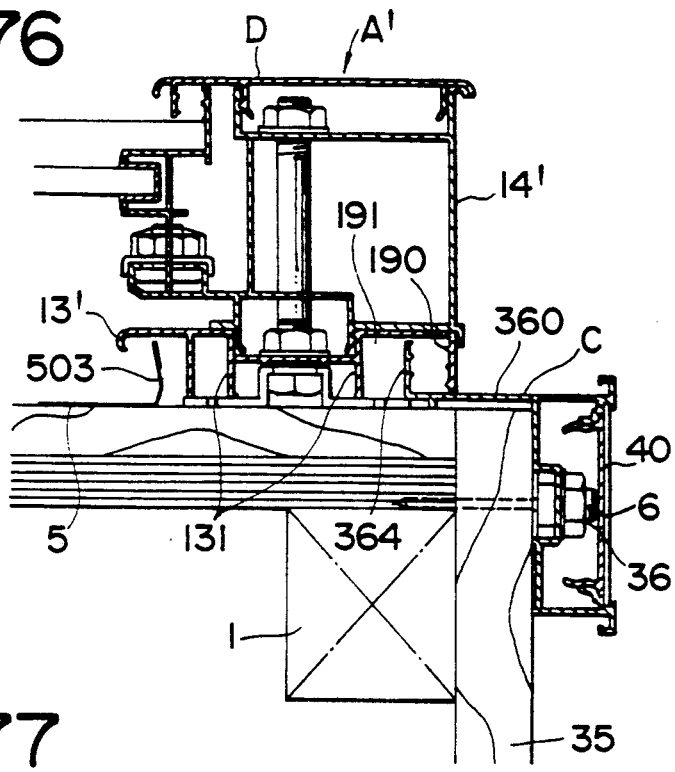
FIGS. 76 through 78 are cross-sectional views showing the side of the roof, in the case where the amount of adjustment in width is gradually increased, respectively.
Figure 77:
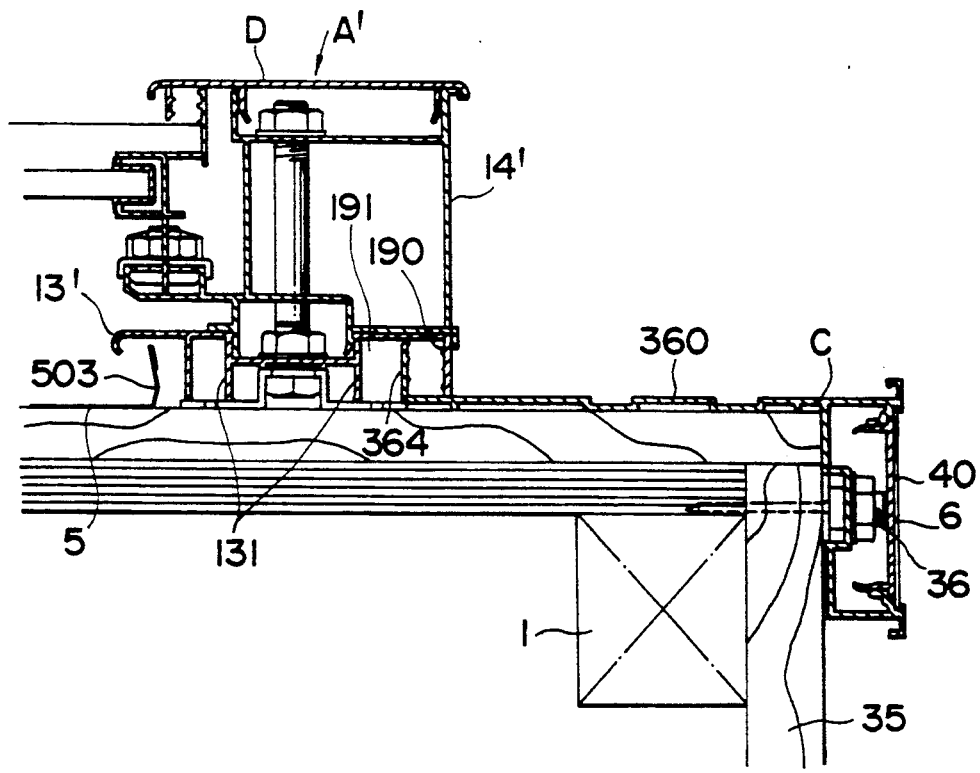
Figure 78:
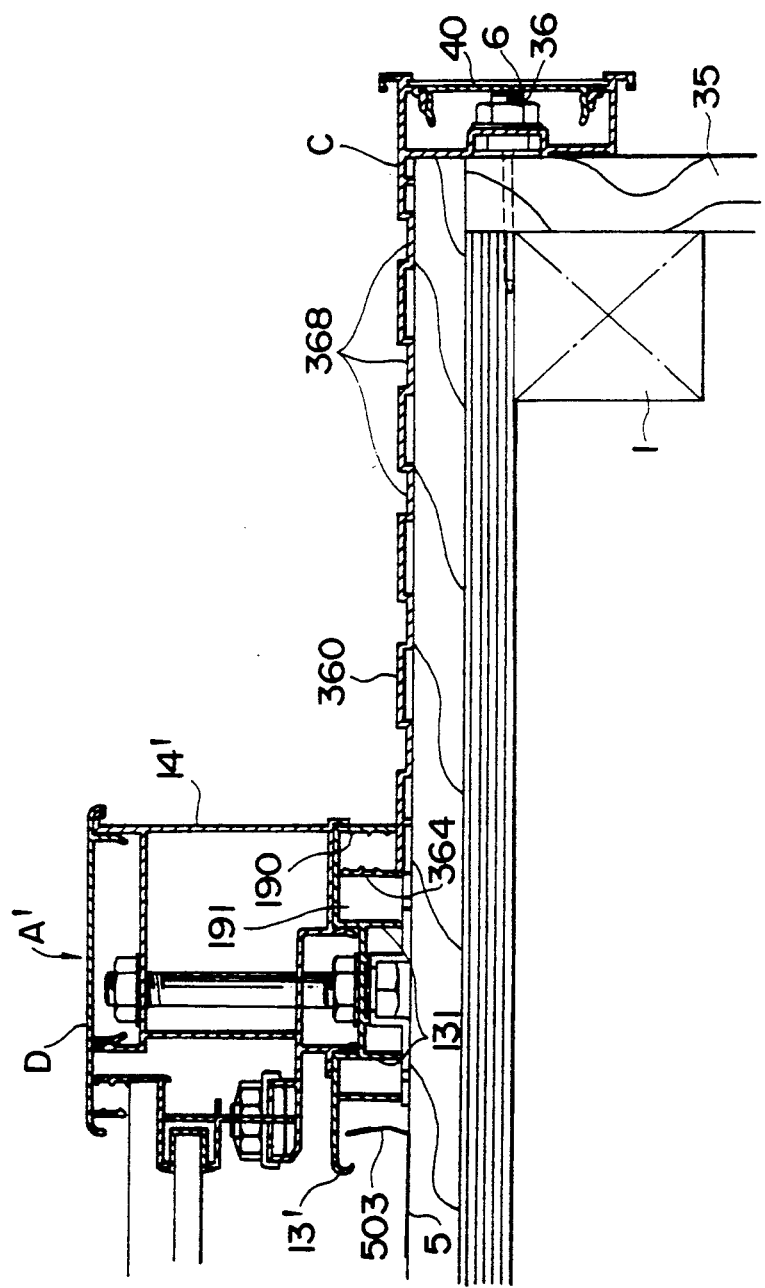

FIGS. 75 through 78 show various kinds of lateral front base members C prepared so as to correspond to each dimension s of the above described lateral front base members C. When s is equal with 0, the lateral front base member C shown in FIG. 75 is used, and thereafter the lateral front base members C shown in FIGS. 76 through 78 are properly used in order in proportion as the value s increases.

The kinds of lateral front base members C and the width dimension thereof vary depending upon how to determine the width w of the lighting frame and the width adjusting amount d. However, it is necessary that the energy collection area occupies as large as possible the limited roof area, in order to promote the efficiency in collection of solar energy. Consequently, the width of the connection member and the width adjusting amount are limited to the minimum of a demand and the lighting frame B is increased in size as much as possible to provide the reasonable and economical designing technique.

However, considering that the lighting frame B is carried by only one worker in a higher place, the lighting frame of approximately 606 mm in width is easy to handle, while the lighting frame larger in width than 606 mm involves a problem in the safety aspect. Accordingly, when the roof backing of 1818 mm in width is acutally roofed with three sheets of lighting frames B, it is possible to reduce the number of connecting members compared with the case where the above backing is roofed with four sheets of lighting frames. Further, the workability is good to become rich in resonability and economical property.

Further, the width adjusting amount d ranging from −10 mm to +10 mm is considered to be since the backing ranging from 7272 to 9090 mm in width, which has high frequency in use, may be covered by properly using three kinds of lateral front base members C in coformity with the width of the backing.

Next will be explained Tables 1 through 8.

Table 1 shows that the relation between the number of lighting frame rows and the dimension of the lateral front base member C is simply obtained from the applicable backing width, when the width w of the lighting frame, the width b of the connecting member, and the width adjusting amount d, that is, the reference pitch dimension are predetermined.

The relation between the number of lighting frame rows and the dimension of the lateral front base member will be explained with reference to the Table 1.

EXAMPLE 1

When the backing width of the roof is set to be equal with 4848 mm, the number of lighting frame rows comes to 8. The dimension of the lateral front base member C is 0 mm, and the adjusting amount is also identical with the reference backing width, so that the normal mounting is done.

EXAMPLE 2

When the backing width of the roof is set to be equal with 4652 mm, the number of lighting frame rows comes to 7. The dimension of the lateral front base member C is 240 mm, and the adjusting amount results in 70 mm, so that the minus adjustment of 10 mm per one row is executed. If the lateral front base member C of 180 mm in width is used, since the backing width is greater than the reference backing width of 4602 mm by 50 mm, so that the plus adjustment of 50/7 mm per one row is executed.

EXAMPLE 3

When the backing width is equal with 4524 mm, the number of lighting frame rows comes to 7, and the dimension of the lateral front base member C is 120 mm. The backing width is greater than the reference backing width of 4482 mm by 42 mm, so that the plus adjustment of 6 mm per one row is executed.

Tables 1 and 2 show the case where the reference pitch dimension p is set to be equal with 606 mm, and the width adjusting amount d is set to range from −10 mm to +10 mm.

Tables 3 and 4 show the case where the reference pitch dimension P is set to be equal with 606 mm, and the width adjusting amount d is set to range from −15 mm to +15 mm.

Tables 5 and 6 show the case where the reference pitch dimension P is set to be equal with 606 mm, and the width adjusting amount d is set to range from −20 mm to +20 mm.

Tables 7 and 8 show the case where the reference pitch dimension P is set to be equal with 455 mm, and the width adjusting amount d is set to range from −10 mm to +10 mm.

Further, since the width adjusting amount d every one row of the lighting frames is naturally equal with the adjustable dimension y, the adjusting amount d will be expressed by the adjustable dimension y in the Tables.

TABLE 1

| reference pitch dimension P | number of lighting frame rows n | reference pitch dimension × number of lighting frame rows $a = p \times n$ | dimension of lateral front member left s | dimension of lateral front member right s | $\beta = a + 2s$ | adjustable dimension of lighting frame $\pm y$ | adjusting dimension of lighting frame $\pm ny$ | applicable backing width of roof = U $\beta - ny$ | $\beta$ | $\beta + ny$ |
|---|---|---|---|---|---|---|---|---|---|---|
| 606 | 6 | 3636 | 0 | 0 | 3636 | ±10 | −60 | 3576 | | |
| | | | | | | | 0 | | 3636 | |
| | | | | | | | +60 | | | 3696 |
| 606 | 6 | 3636 | 60 | 60 | 3756 | ±10 | −60 | 3696 | | |
| | | | | | | | 0 | | 3756 | |
| | | | | | | | +60 | | | 3816 |
| 606 | 6 | 3636 | 120 | 120 | 3876 | ±10 | −60 | 3816 | | |
| | | | | | | | 0 | | 3876 | |
| | | | | | | | +60 | | | 3936 |
| 606 | 6 | 3636 | 180 | 180 | 3996 | ±10 | −60 | 3936 | | |
| | | | | | | | 0 | | 3996 | |
| | | | | | | | +60 | | | 4056 |
| 606 | 6 | 3636 | 240 | 240 | 4116 | ±10 | −60 | 4056 | | |
| | | | | | | | 0 | | 4116 | |
| | | | | | | | +60 | | | 4176 |
| 606 | 8 | 4848 | 0 | 0 | 4848 | ±10 | −80 | 4768 | | |
| | | | | | | | 0 | | 4848*1 | |
| | | | | | | | +80 | | | 4922 |
| 606 | 8 | 4848 | 60 | 60 | 4968 | ±10 | −80 | 4888 | | |
| | | | | | | | 0 | | 4968 | |
| | | | | | | | +80 | | | 5048 |
| 606 | 8 | 4848 | 120 | 120 | 5088 | ±10 | −80 | 5008 | | |
| | | | | | | | 0 | | 5088 | |

TABLE 1-continued

| reference pitch dimension P | number of lighting frame rows n | reference pitch dimension × number of lighting frame rows α = p × n | dimension of lateral front member left s | dimension of lateral front member right s | β = α + 2s | adjustable dimension of lighting frame ±y | adjusting dimension of lighting frame ±ny | applicable backing width of roof = U β − ny | applicable backing width of roof = U β | applicable backing width of roof = U β + ny |
|---|---|---|---|---|---|---|---|---|---|---|
| 606 | 8 | 4848 | 180 | 180 | 5208 | ±10 | +80 −80 0 | 5128 | 5208 | 5168 |
| 606 | 8 | 4848 | 240 | 240 | 5328 | ±10 | +80 −80 0 +80 | 5248 | 5328 | 5288 5408 |

*1: example 1

TABLE 2

| reference pitch dimension P | number of lighting frame rows n | reference pitch dimension × number of lighting frame rows α = p × n | dimension of lateral front member left s | dimension of lateral front member right s | β = α + 2s | adjustable dimension of lighting frame ±y | adjusting dimension of lighting frame ±ny | applicable backing width of roof = U β − ny | applicable backing width of roof = U β | applicable backing width of roof = U β + ny |
|---|---|---|---|---|---|---|---|---|---|---|
| 606 | 12 | 7272 | 0 | 0 | 7272 | ±10 | −120 0 +120 | 7152 | 7272 | 7392 |
| 606 | 12 | 7272 | 60 | 60 | 7392 | ±10 | −120 0 +120 | 7272 | 7392 | 7512 |
| 606 | 12 | 7272 | 180 | 180 | 7632 | ±10 | −120 0 +120 | 7512 | 7632 | 7752 |
| 606 | 13 | 7878 | 0 | 0 | 7878 | ±10 | −130 0 +130 | 7748 | 7878 | 8008 |
| 606 | 13 | 7878 | 60 | 60 | 7998 | ±10 | −130 0 +130 | 7868 | 7998 | 8128 |
| 606 | 13 | 7878 | 180 | 180 | 8238 | ±10 | −130 0 +130 | 8108 | 8238 | 8368 |
| 606 | 14 | 8484 | 0 | 0 | 8484 | ±10 | −140 0 +140 | 8344 | 8484 | 8624 |
| 606 | 14 | 8484 | 60 | 60 | 8604 | ±10 | −140 0 +140 | 8464 | 8604 | 8744 |
| 606 | 14 | 8484 | 180 | 180 | 8844 | ±10 | −140 0 +140 | 8704 | 8844 | 8984 |
| 606 | 15 | 9090 | 0 | 0 | 9090 | ±10 | −150 0 +150 | 8940 | 9090 | 9240 |
| 606 | 15 | 9090 | 60 | 60 | 9210 | ±10 | −150 0 +150 | 9060 | 9210 | 9360 |
| 606 | 15 | 9090 | 180 | 180 | 9450 | ±10 | +150 0 +150 | 9300 | 9450 | 9600 |
| 606 | 7 | 4242 | 0 | 0 | 4242 | ±10 | −70 0 +70 | 4172 | 4242 | 4312 |
| 606 | 7 | 4242 | 60 | 60 | 4362 | ±10 | −70 0 +70 | 4292 | 4362 | 4432 |
| 606 | 7 | 4242 | 120 | 120 | 4482 | ±10 | −70 0 +42 +70 | 4412 | 4482 4524*3 4552 | |
| 606 | 7 | 4242 | 180 | 180 | 4602 | ±10 | −70 0 +70 | 4532*2 | 4602 | 4672 |
| 606 | 7 | 4242 | 240 | 240 | 4722 | ±10 | −70 0 +70 | 4652 | 4722 | 4792 |
| 606 | 30 | 18180 | 0 | 0 | 18180 | ±10 | −300 0 +300 | 17880 | 18180 | 18480 |
| 606 | 31 | 18786 | 0 | 0 | 18786 | ±10 | −310 0 | 18476 | 18786 | |

TABLE 2-continued

| reference pitch dimension P | number of lighting frame rows n | reference pitch dimension × number of lighting frame rows $\alpha = p \times n$ | dimension of lateral front member left s | dimension of lateral front member right s | $\beta = \alpha + 2s$ | adjustable dimension of lighting frame $\pm y$ | adjusting dimension of lighting frame $\pm ny$ | applicable backing width of roof = U $\beta - ny$ | applicable backing width of roof = U $\beta$ | applicable backing width of roof = U $\beta + ny$ |
|---|---|---|---|---|---|---|---|---|---|---|
| | | | | | | | −310 | | | 19096 |

*2: example 2;
*3: example 3

TABLE 3

| reference pitch dimension P | number of lighting frame rows n | reference pitch dimension × number of lighting frame rows $\alpha = p \times n$ | dimension of lateral front member left s | dimension of lateral front member right s | $\beta = \alpha + 2s$ | adjustable dimension of lighting frame $\pm y$ | adjusting dimension of lighting frame $\pm ny$ | applicable backing width of roof = U $\beta - ny$ | applicable backing width of roof = U $\beta$ | applicable backing width of roof = U $\beta + ny$ |
|---|---|---|---|---|---|---|---|---|---|---|
| 606 | 6 | 3636 | 0 | 0 | 3636 | ±15 | −90 | 3546 | | |
| | | | | | | | 0 | | 3636 | |
| | | | | | | | +90 | | | 3726 |
| 606 | 6 | 3636 | 25.5 | 25.5 | 3687 | ±15 | −90 | 3597 | | |
| | | | | | | | 0 | | 3687 | |
| | | | | | | | +90 | | | 3777 |
| 606 | 6 | 3636 | 115.5 | 115.5 | 3867 | ±15 | −90 | 3777 | | |
| | | | | | | | 0 | | 3867 | |
| | | | | | | | +90 | | | 3957 |
| 606 | 6 | 3636 | 205.5 | 205.5 | 4047 | ±15 | −90 | 3957 | | |
| | | | | | | | 0 | | 4047 | |
| | | | | | | | +90 | | | 4137 |
| 606 | 7 | 4242 | 0 | 0 | 4242 | ±15 | −105 | 4137 | | |
| | | | | | | | 0 | | 4242 | |
| | | | | | | | +105 | | | 4347 |
| 606 | 7 | 4242 | 25.5 | 25.5 | 4293 | ±15 | −105 | 4188 | | |
| | | | | | | | 0 | | 4293 | |
| | | | | | | | +105 | | | 4398 |
| 606 | 7 | 4242 | 115.5 | 115.5 | 4473 | ±15 | −105 | 4368 | | |
| | | | | | | | 0 | | 4473 | |
| | | | | | | | +105 | | | 4578 |
| 606 | 7 | 4242 | 205.5 | 205.5 | 4653 | ±15 | −105 | 4548 | | |
| | | | | | | | 0 | | 4653 | |
| | | | | | | | +105 | | | 4758 |
| 606 | 8 | 4848 | 0 | 0 | 4848 | ±15 | −120 | 4728 | | |
| | | | | | | | 0 | | 4848 | |
| | | | | | | | +120 | | | 4968 |
| 606 | 8 | 4848 | 25.5 | 25.5 | 4899 | ±15 | −120 | 4779 | | |
| | | | | | | | 0 | | 4899 | |
| | | | | | | | +120 | | | 5019 |
| 606 | 8 | 4848 | 115.5 | 115.5 | 5079 | ±15 | −120 | 4959 | | |
| | | | | | | | 0 | | 5079 | |
| | | | | | | | +120 | | | 5199 |
| 606 | 8 | 4848 | 205.5 | 205.5 | 5259 | ±15 | −120 | 5139 | | |
| | | | | | | | 0 | | 5259 | |
| | | | | | | | +120 | | | 5379 |

TABLE 4

| reference pitch dimension P | number of lighting frame rows n | reference pitch dimension × number of lighting frame rows $\alpha = p \times n$ | dimension of lateral front member left s | dimension of lateral front member right s | $\beta = \alpha + 2s$ | adjustable dimension of lighting frame $\pm y$ | adjusting dimension of lighting frame $\pm ny$ | applicable backing width of roof = U $\beta - ny$ | applicable backing width of roof = U $\beta$ | applicable backing width of roof = U $\beta + ny$ |
|---|---|---|---|---|---|---|---|---|---|---|
| 606 | 12 | 7272 | 0 | 0 | 7272 | ±15 | −180 | 7092 | | |
| | | | | | | | 0 | | 7272 | |
| | | | | | | | +180 | | | 7452 |
| 606 | 12 | 7272 | 115.5 | 115.5 | 7503 | ±15 | −180 | 7323 | | |
| | | | | | | | 0 | | 7503 | |
| | | | | | | | +180 | | | 7683 |
| 606 | 13 | 7878 | 0 | 0 | 7878 | ±15 | −195 | 7683 | | |
| | | | | | | | 0 | | 7878 | |
| | | | | | | | +195 | | | 8073 |
| 606 | 13 | 7878 | 115.5 | 115.5 | 8109 | ±15 | −195 | 7914 | | |
| | | | | | | | 0 | | 8109 | |
| | | | | | | | +195 | | | 8304 |
| 606 | 14 | 8484 | 0 | 0 | 8484 | ±15 | −210 | 8274 | | |
| | | | | | | | 0 | | 8484 | |
| | | | | | | | +210 | | | 8694 |
| 606 | 14 | 8484 | 115.5 | 115.5 | 8715 | ±15 | −210 | 8505 | | |
| | | | | | | | 0 | | 8715 | |
| | | | | | | | +210 | | | 8925 |

TABLE 4-continued

| reference pitch dimension P | number of lighting frame rows n | reference pitch dimension × number of lighting frame rows α = p × n | dimension of lateral front member | | β = α + 2s | adjustable dimension of lighting frame ±y | adjusting dimension of lighting frame ±ny | applicable backing width of roof = U | | |
|---|---|---|---|---|---|---|---|---|---|---|
| | | | left s | right s | | | | β − ny | β | β + ny |
| 606 | 15 | 9090 | 0 | 0 | 9090 | ±15 | −225 | 8865 | | |
| | | | | | | | 0 | | 9090 | |
| | | | | | | | +225 | | | 9315 |
| 606 | 15 | 9090 | 115.5 | 115.5 | 9321 | ±15 | −225 | 9096 | | |
| | | | | | | | 0 | | 9321 | |
| | | | | | | | +225 | | | 9546 |
| 606 | 21 | 12726 | 0 | 0 | 12726 | ±15 | −315 | 12411 | | |
| | | | | | | | 0 | | 12726 | |
| | | | | | | | +315 | | | 13041 |
| 606 | 22 | 13332 | 0 | 0 | 13332 | ±15 | −330 | 13002 | | |
| | | | | | | | 0 | | 13332 | |
| | | | | | | | +330 | | | 13662 |

TABLE 5

| reference pitch dimension P | number of lighting frame rows n | reference pitch dimension × number of lighting frame rows α = p × n | dimension of lateral front member | | β = α + 2s | adjustable dimension of lighting frame ±y | adjusting dimension of lighting frame ±ny | applicable backing width of roof = U | | |
|---|---|---|---|---|---|---|---|---|---|---|
| | | | left s | right s | | | | β − ny | β | β + ny |
| 606 | 6 | 3636 | 0 | 0 | 3636 | ±20 | −120 | 3516 | | |
| | | | | | | | 0 | | 3636 | |
| | | | | | | | +120 | | | 3756 |
| 606 | 6 | 3636 | 53 | 53 | 3742 | ±20 | −120 | 3622 | | |
| | | | | | | | 0 | | 3742 | |
| | | | | | | | +120 | | | 3862 |
| 606 | 6 | 3636 | 173 | 173 | 3982 | ±20 | −120 | 3862 | | |
| | | | | | | | 0 | | 3982 | |
| | | | | | | | +120 | | | 4102 |
| 606 | 7 | 4242 | 0 | 0 | 4242 | ±20 | −140 | 4102 | | |
| | | | | | | | 0 | | 4242 | |
| | | | | | | | +140 | | | 4382 |
| 606 | 7 | 4242 | 53 | 53 | 4348 | ±20 | −140 | 4208 | | |
| | | | | | | | 0 | | 4348 | |
| | | | | | | | +140 | | | 4488 |
| 606 | 7 | 4242 | 173 | 173 | 4588 | ±20 | −140 | 4448 | | |
| | | | | | | | 0 | | 4588 | |
| | | | | | | | +140 | | | 4728 |
| 606 | 8 | 4848 | 0 | 0 | 4848 | ±20 | −160 | 4688 | | |
| | | | | | | | 0 | | 4848 | |
| | | | | | | | +160 | | | 5008 |
| 606 | 8 | 4848 | 53 | 53 | 4954 | ±20 | −160 | 4794 | | |
| | | | | | | | 0 | | 4954 | |
| | | | | | | | +160 | | | 5114 |
| 606 | 8 | 4848 | 173 | 173 | 5194 | ±20 | −160 | 5034 | | |
| | | | | | | | 0 | | 5194 | |
| | | | | | | | +160 | | | 5354 |

TABLE 6

| reference pitch dimension P | number of lighting frame rows n | reference pitch dimension × number of lighting frame rows α = p × n | dimension of lateral front member | | β = α + 2s | adjustable dimension of lighting frame ±y | adjusting dimension of lighting frame ±ny | applicable backing width of roof = U | | |
|---|---|---|---|---|---|---|---|---|---|---|
| | | | left s | right s | | | | β − ny | β | β + ny |
| 606 | 12 | 7272 | 0 | 0 | 7272 | ±20 | −240 | 7032 | | |
| | | | | | | | 0 | | 7272 | |
| | | | | | | | +240 | | | 7512 |
| 606 | 12 | 7272 | 53 | 53 | 7378 | ±20 | −240 | 7138 | | |
| | | | | | | | 0 | | 7378 | |
| | | | | | | | +240 | | | 7618 |
| 606 | 12 | 727 | 173 | 173 | 7618 | ±20 | −240 | 7378 | | |
| | | | | | | | 0 | | 7618 | |
| | | | | | | | +240 | | | 7878 |
| 606 | 13 | 7878 | 0 | 0 | 7878 | ±20 | −260 | 7618 | | |
| | | | | | | | 0 | | 7878 | |
| | | | | | | | +260 | | | 8138 |
| 606 | 13 | 7878 | 53 | 53 | 7984 | ±20 | −260 | 7724 | | |
| | | | | | | | 0 | | 7984 | |
| | | | | | | | +260 | | | 8224 |
| 606 | 13 | 7878 | 173 | 173 | 8224 | ±20 | −260 | 7964 | | |
| | | | | | | | 0 | | 8224 | |
| | | | | | | | +260 | | | 8484 |

TABLE 6-continued

| reference pitch dimension P | number of lighting frame rows n | reference pitch dimension × number of lighting frame rows α = p × n | dimension of lateral front member left s | dimension of lateral front member right s | β = α + 2s | adjustable dimension of lighting frame ±y | adjusting dimension of lighting frame ±ny | applicable backing width of roof = U β − ny | applicable backing width of roof = U β | applicable backing width of roof = U β + ny |
|---|---|---|---|---|---|---|---|---|---|---|
| 606 | 14 | 8484 | 0 | 0 | 8484 | ±20 | −280 | 8204 | | |
| | | | | | | | 0 | | 8484 | |
| | | | | | | | +280 | | | 8764 |
| 606 | 14 | 8484 | 53 | 53 | 8590 | ±20 | −280 | 8310 | | |
| | | | | | | | 0 | | 8590 | |
| | | | | | | | +280 | | | 8870 |
| 606 | 14 | 8484 | 173 | 173 | 8830 | ±20 | −280 | 8550 | | |
| | | | | | | | 0 | | 8830 | |
| | | | | | | | +280 | | | 9110 |
| 606 | 15 | 9090 | 0 | 0 | 9090 | ±20 | −300 | 8790 | | |
| | | | | | | | 0 | | 9090 | |
| | | | | | | | +300 | | | 9390 |
| 606 | 15 | 9090 | 53 | 53 | 9196 | ±20 | −300 | 8896 | | |
| | | | | | | | 0 | | 9196 | |
| | | | | | | | +300 | | | 9496 |
| 606 | 15 | 9090 | 173 | 173 | 9436 | ±20 | −300 | 9136 | | |
| | | | | | | | 0 | | 9436 | |
| | | | | | | | +300 | | | 9736 |
| 606 | 16 | 9696 | 0 | 0 | 9696 | ±20 | −320 | 9376 | | |
| | | | | | | | 0 | | 9696 | |
| | | | | | | | +320 | | | 10016 |

TABLE 7

| reference pitch dimension P | number of lighting frame rows n | reference pitch dimension x number of lighting frame rows α = p × n | dimension of lateral front member left s | dimension of lateral front member right s | β = α + 2s | adjustable dimension of lighting frame ±y | adjusting dimension of lighting frame ±ny | applicable backing width of roof = U β − ny | applicable backing width of roof = U β | applicable backing width of roof = U β + ny |
|---|---|---|---|---|---|---|---|---|---|---|
| 455 | 8 | 3640 | 0 | 0 | 3640 | ±10 | −80 | 3560 | | |
| | | | | | | | 0 | | 3640 | |
| | | | | | | | +80 | | | 3720 |
| 455 | 8 | 3640 | 62.5 | 62.5 | 3765 | ±10 | −80 | 3685 | | |
| | | | | | | | 0 | | 3742 | |
| | | | | | | | +80 | | | 3845 |
| 455 | 8 | 3640 | 142.5 | 142.5 | 3925 | ±10 | −80 | 3845 | | |
| | | | | | | | 0 | | 3925 | |
| | | | | | | | +80 | | | 4005 |
| 455 | 9 | 4095 | 0 | 0 | 4095 | ±10 | −90 | 4005 | | |
| | | | | | | | 0 | | 4095 | |
| | | | | | | | +90 | | | 4185 |
| 455 | 9 | 4095 | 62.5 | 62.5 | 4220 | ±10 | −90 | 4130 | | |
| | | | | | | | 0 | | 4220 | |
| | | | | | | | +90 | | | 4310 |
| 455 | 9 | 4095 | 142.5 | 142.5 | 4380 | ±10 | −90 | 4290 | | |
| | | | | | | | 0 | | 4380 | |
| | | | | | | | +90 | | | 4470 |
| 455 | 10 | 4545 | 0 | 0 | 4545 | ±10 | −100 | 4445 | | |
| | | | | | | | 0 | | 4545 | |
| | | | | | | | +100 | | | 4645 |
| 455 | 10 | 4545 | 62.5 | 62.5 | 4670 | ±10 | −100 | 4570 | | |
| | | | | | | | 0 | | 4670 | |
| | | | | | | | +100 | | | 4770 |
| 455 | 10 | 4545 | 142.5 | 142.5 | 4830 | ±10 | −100 | 4730 | | |
| | | | | | | | 0 | | 4830 | |
| | | | | | | | +100 | | | 4930 |
| 455 | 11 | 5005 | 0 | 0 | 5005 | ±10 | −100 | 4895 | | |
| | | | | | | | 0 | | 5005 | |
| | | | | | | | +100 | | | 5115 |
| 455 | 11 | 5005 | 62.5 | 62.5 | 5130 | ±10 | −110 | 5020 | | |
| | | | | | | | 0 | | 5130 | |
| | | | | | | | +110 | | | 5240 |
| 455 | 11 | 5005 | 142.5 | 142.5 | 5290 | ±10 | −110 | 5180 | | |
| | | | | | | | 0 | | 5290 | |
| | | | | | | | +110 | | | 5400 |

TABLE 8

| reference pitch dimension P | number of lighting frame rows n | reference pitch dimension x number of lighting frame rows a = p × n | dimension of lateral front member | | β = a + 2s | adjustable dimension of lighting frame ±y | adjusting dimension of lighting frame ±ny | applicable backing width of roof = U | | |
|---|---|---|---|---|---|---|---|---|---|---|
| | | | left s | right s | | | | β − ny | β | β + ny |
| 455 | 16 | 7280 | 0 | 0 | 7280 | ±10 | −160 | 7120 | | |
| | | | | | | | 0 | | 7280 | |
| | | | | | | | +160 | | | 7440 |
| 455 | 16 | 7280 | 62.5 | 62.5 | 7405 | ±10 | −160 | 7245 | | |
| | | | | | | | 0 | | 7405 | |
| | | | | | | | +160 | | | 7565 |
| 455 | 16 | 7280 | 142.5 | 142.5 | 7565 | ±10 | −160 | 7405 | | |
| | | | | | | | 0 | | 7565 | |
| | | | | | | | +160 | | | 7725 |
| 455 | 17 | 7735 | 0 | 0 | 7735 | ±10 | −170 | 7565 | | |
| | | | | | | | 0 | | 7735 | |
| | | | | | | | +170 | | | 7905 |
| 455 | 17 | 7735 | 62.5 | 62.5 | 7860 | ±10 | −170 | 7690 | | |
| | | | | | | | 0 | | 7860 | |
| | | | | | | | +170 | | | 8030 |
| 455 | 17 | 7735 | 142.5 | 142.5 | 8020 | ±10 | −170 | 7850 | | |
| | | | | | | | 0 | | 8020 | |
| | | | | | | | +170 | | | 8190 |
| 455 | 18 | 8190 | 0 | 0 | 8190 | ±10 | −180 | 8010 | | |
| | | | | | | | 0 | | 8190 | |
| | | | | | | | +180 | | | 8370 |
| 455 | 18 | 8190 | 62.5 | 62.5 | 8315 | ±10 | −180 | 8135 | | |
| | | | | | | | 0 | | 8315 | |
| | | | | | | | +180 | | | 8495 |
| 455 | 18 | 8190 | 142.5 | 142.5 | 8475 | ±10 | −180 | 8295 | | |
| | | | | | | | 0 | | 8475 | |
| | | | | | | | +180 | | | 8655 |
| 455 | 19 | 8645 | 0 | 0 | 8645 | ±10 | −190 | 8455 | | |
| | | | | | | | 0 | | 8645 | |
| | | | | | | | +190 | | | 8835 |
| 445 | 19 | 8645 | 62.5 | 62.5 | 8770 | ±10 | −190 | 8580 | | |
| | | | | | | | 0 | | 8770 | |
| | | | | | | | +190 | | | 8960 |
| 455 | 19 | 8645 | 142.5 | 142.5 | 8930 | ±10 | −190 | 8740 | | |
| | | | | | | | 0 | | 8930 | |
| | | | | | | | +190 | | | 9120 |
| 455 | 23 | 10465 | 0 | 0 | 10465 | ±10 | −230 | 10235 | | |
| | | | | | | | 0 | | 10465 | |
| | | | | | | | +230 | | | 10695 |
| 455 | 24 | 10920 | 0 | 0 | 10920 | ±10 | −240 | 10680 | | |
| | | | | | | | 0 | | 10920 | |
| | | | | | | | +240 | | | 11160 |

Next will be explained a method for mounting the lateral front base member C.

Figure 79:
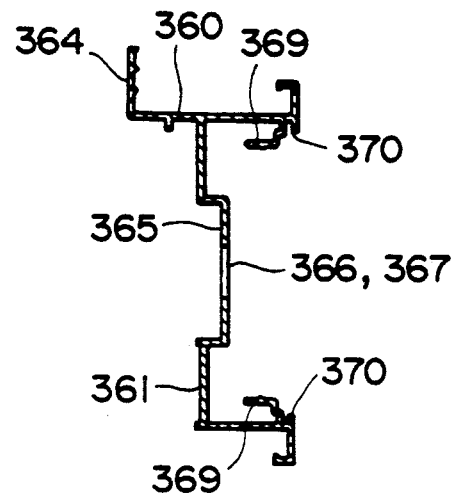
FIG. 79 is a cross-sectional view showing the lateral front base member.
Figure 80:
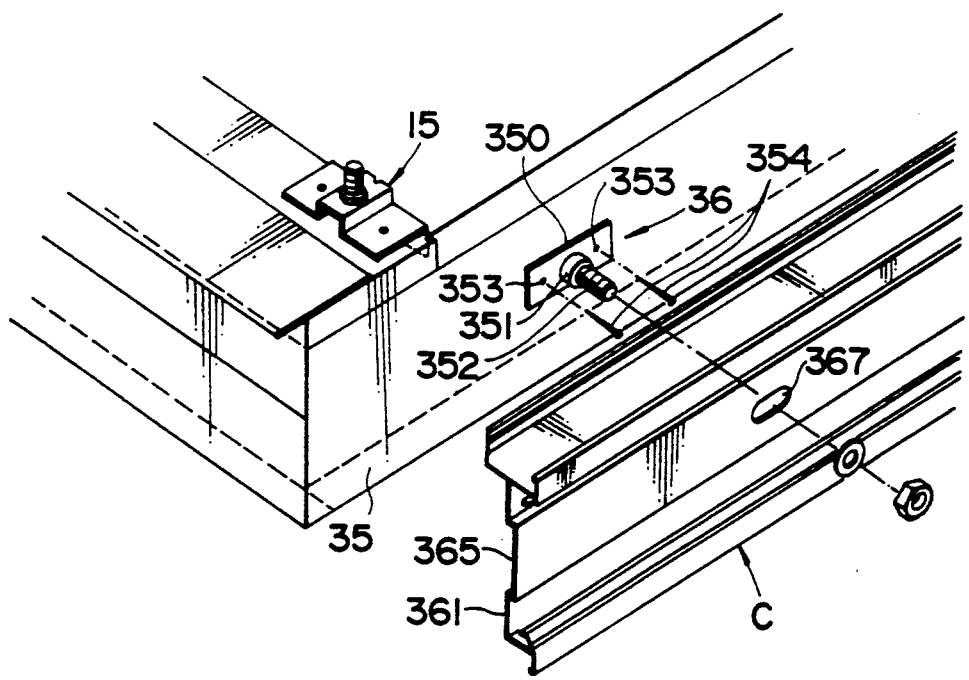
FIG. 80 is a perspective view showing the side of the roof before the lateral front base member is mounted thereon.

As shown in FIGS. 79 and 80, the base member fitting 36 has a mounting flat portion 350 brought into contact with the side of the gable-board 35. A shaft portion 351 inserted into each of the circular hole 366 and the slide mounting holes 367 provided in the support groove 365 of the lateral front base member C is provided in the center of the flat portion 350, and a bolt 352 inserted into each of the circular hole 366 and the slide mounting holes 367 is provided at the end of the shaft portion 351. A pair of mounting holes 353, 353 are respectively bored in the flat portion 350 at portions close to the opposite sides of the flat portion 350.

After the flat portion 350 is brought into contact with the side of the gable-board 35, the base member fitting 36 is fixed to the gable-board 35 by the use of nails 354 driven into the respective mounting holes 353 bored in the flat portion 350.

Figure 81:
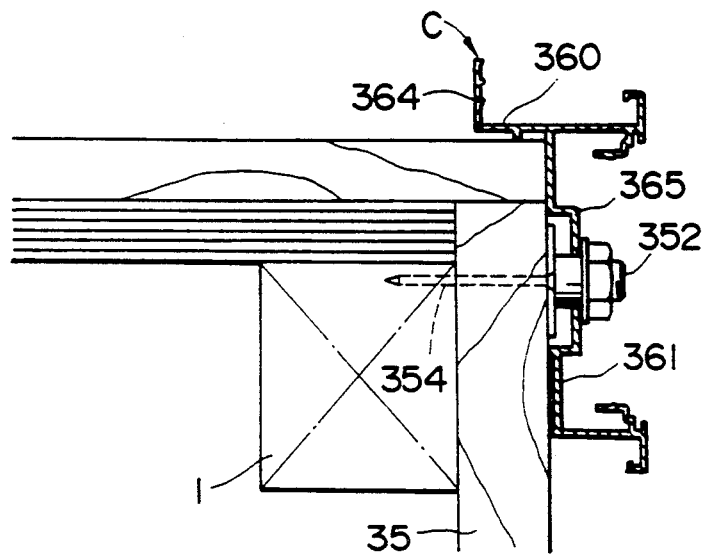
Figure 82:
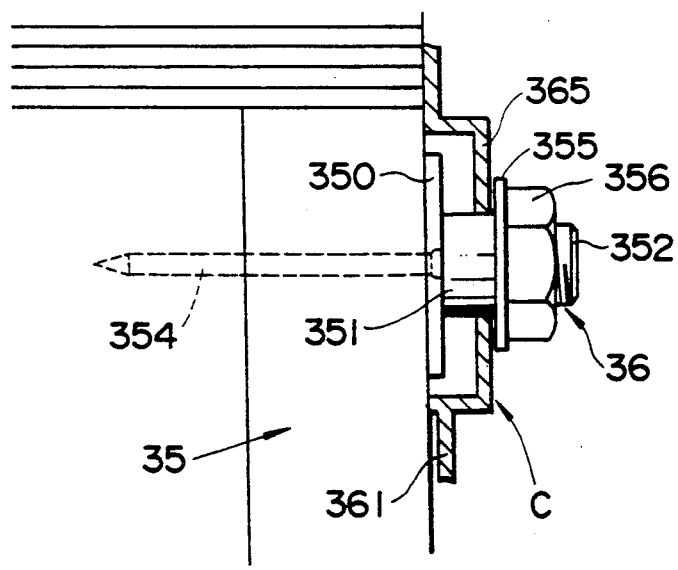
FIG. 82 is a fragmentary enlarged scale view of FIG. 81.
Figure 83:
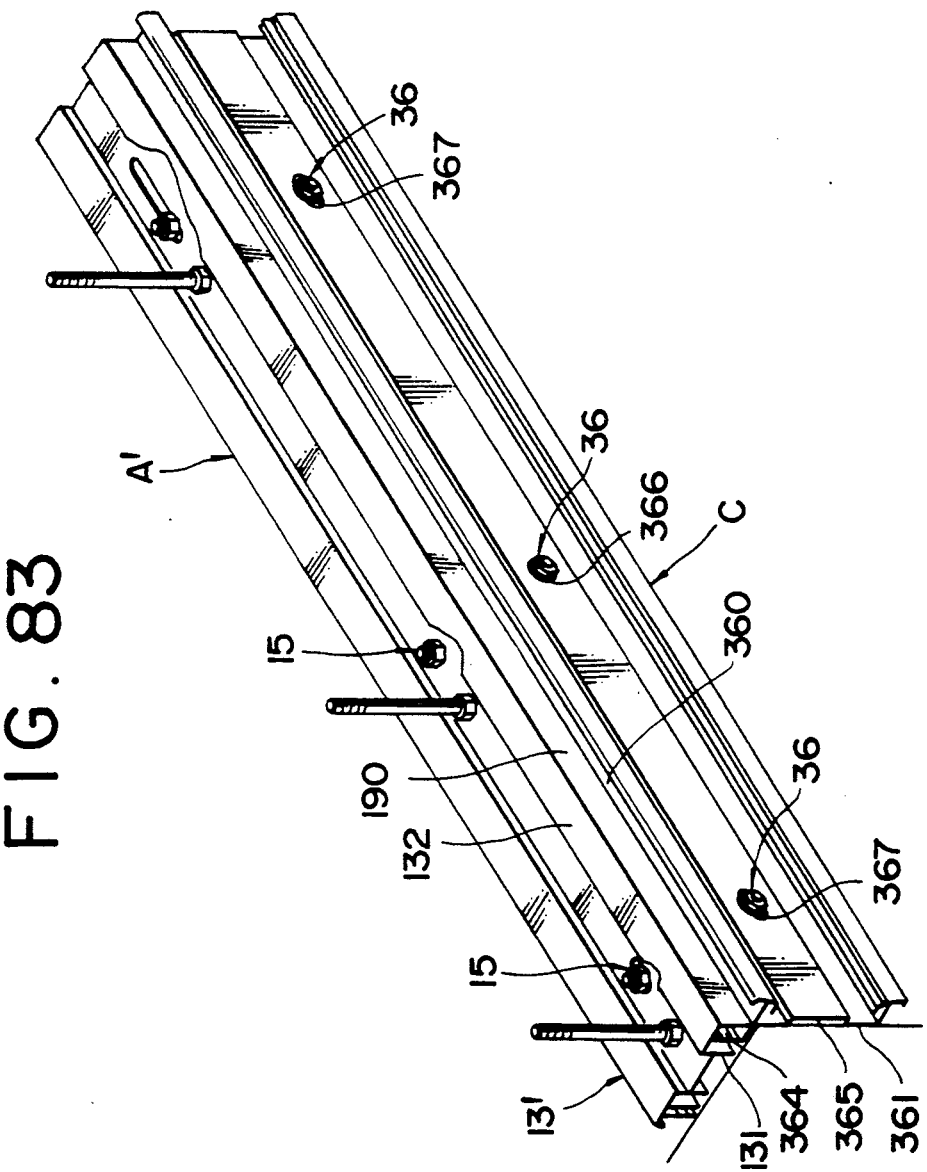
FIG. 83 is a perspective view showing the side of the roof after the lateral front base member is mounted thereon.

The lateral front base member C is mounted to the side of the roof as follows. After the base member fitting 36 is previously fixed to the side of the gable-board at a predetermined position by the use of the nails 354 driven into the respective mounting holes 353, the bolt 352 of the fitting 36 is inserted into each of the circular hole 366 and the slide mounting holes 367 bored in the support groove 365 of the lateral front base member C, as shown in FIG. 81, while the upper horizontal portion 360 of the lateral front base member C is brought into contact with the upper surface of the gable-board 35. Then, the vertical portion 361 of the lateral front base member C is brought into contact with the side of the gable-board 35, and the nut 356 is screwed onto the bolt 352 of the fitting 36 through a washer 355, as shown in FIG. 82, so that the lateral front base member C is fixed to the gable-board 35 through the fitting 36, as shown in FIG. 83. Next, the side connecting member A' is mounted to the connecting member fitting 15, and the throating rise wall 364 of the lateral front base member C is fitted to the lower surface of the overhang portion 132 of the side lower connecting member 13'.

Figure 84:
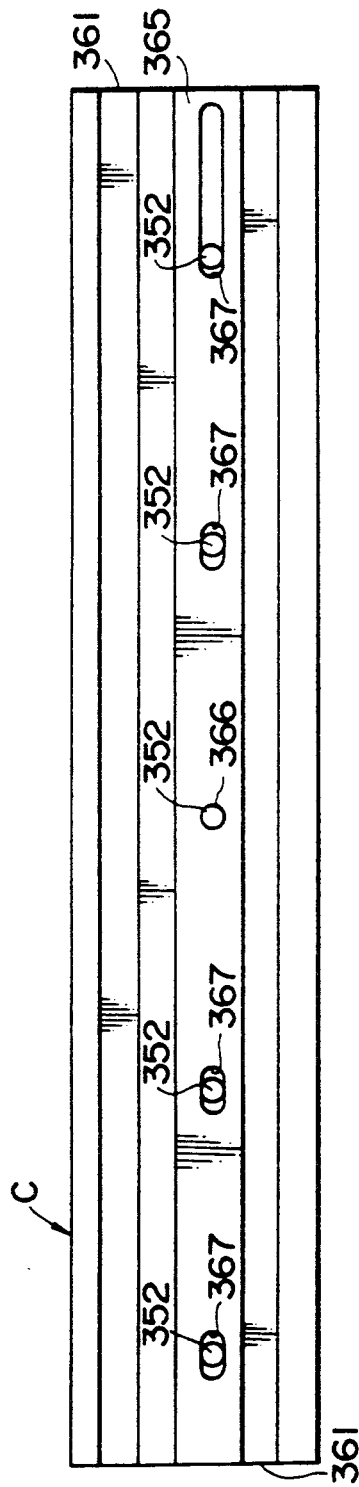
FIG. 84 a side view showing the lateral front base member when mounted in a normal state.
Figure 85:
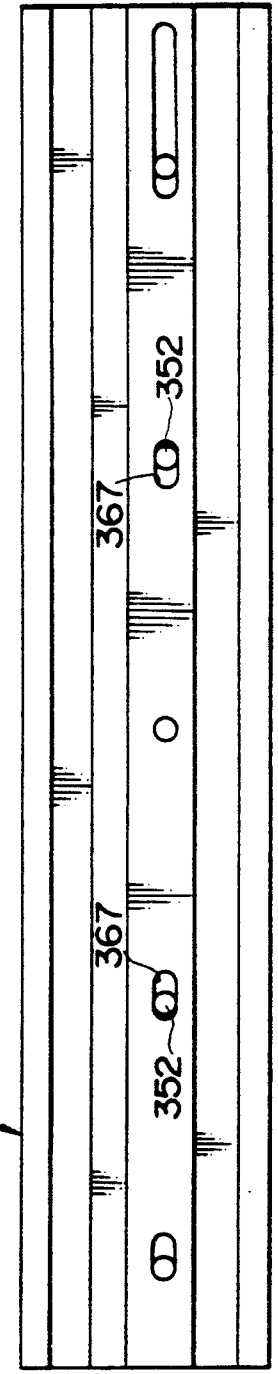
FIG. 85 is a side view showing the lateral front base member when contracted.
Figure 86:
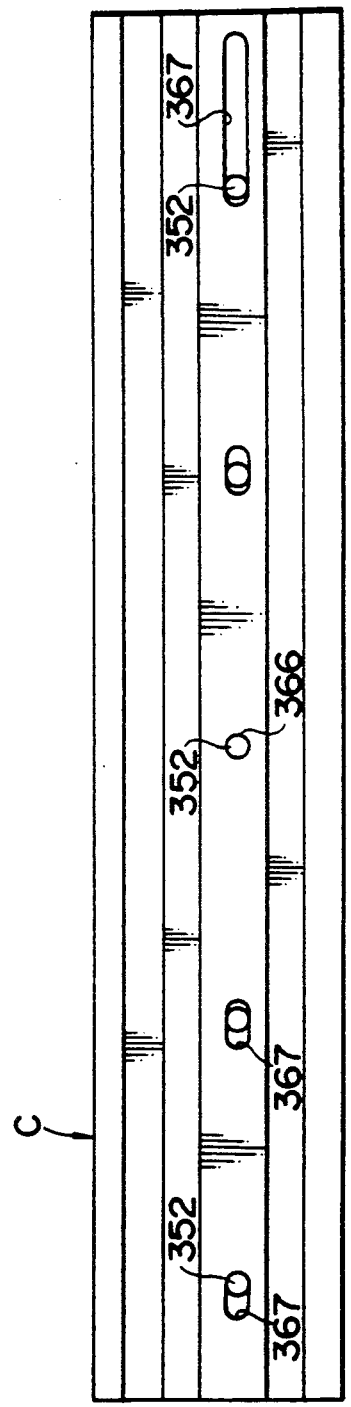
FIG. 86 ia a side view showing the lateral front base member when expanded.

In the case where the base member C is normally mounted, each bolt 352 of the base member fitting 36 is located in the center of each slide mounting hole 367 provided in the support groove 365 of the lateral front base member C, as shown in FIG. 84. When the lateral front base member C is contracted from the normal state, each bolt 352 of the base member fitting 36 is located close to the longitudinal end of the base member C relative to the center of each slide mounting hole 367 of the base member C, as shown in FIG. 85. When the lateral front base member C is expanded due to solar heat or the like, each bolt 352 of the base member fitting 36 is located close to the longitudinal center of the base member C relative to the center of each slide mounting hole 367 of the base member C.

Figure 87:
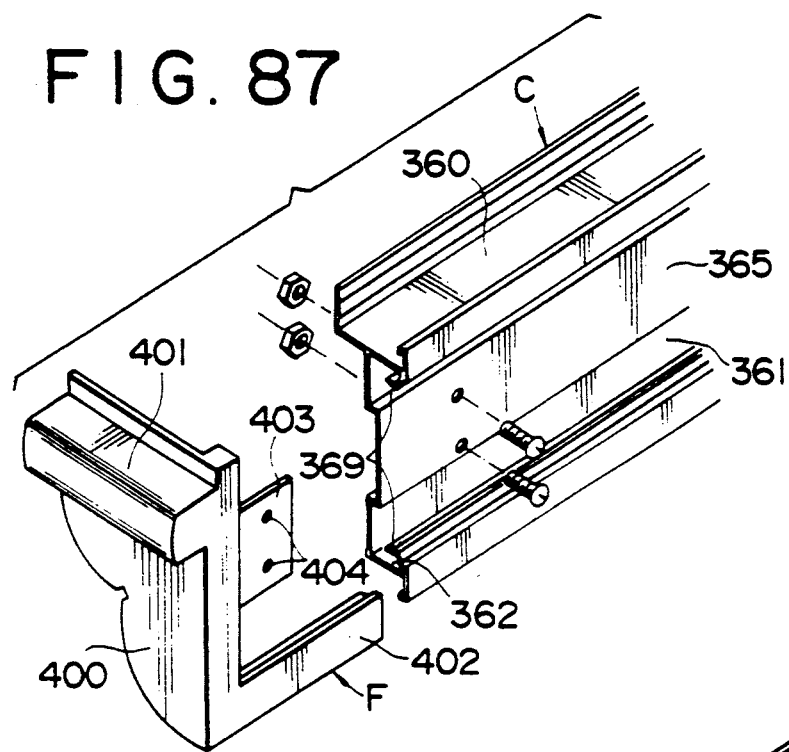
FIG. 87 is a perspective view showing the lateral front base member before the side lower corner decorative cover is mounted thereon.
Figure 88:
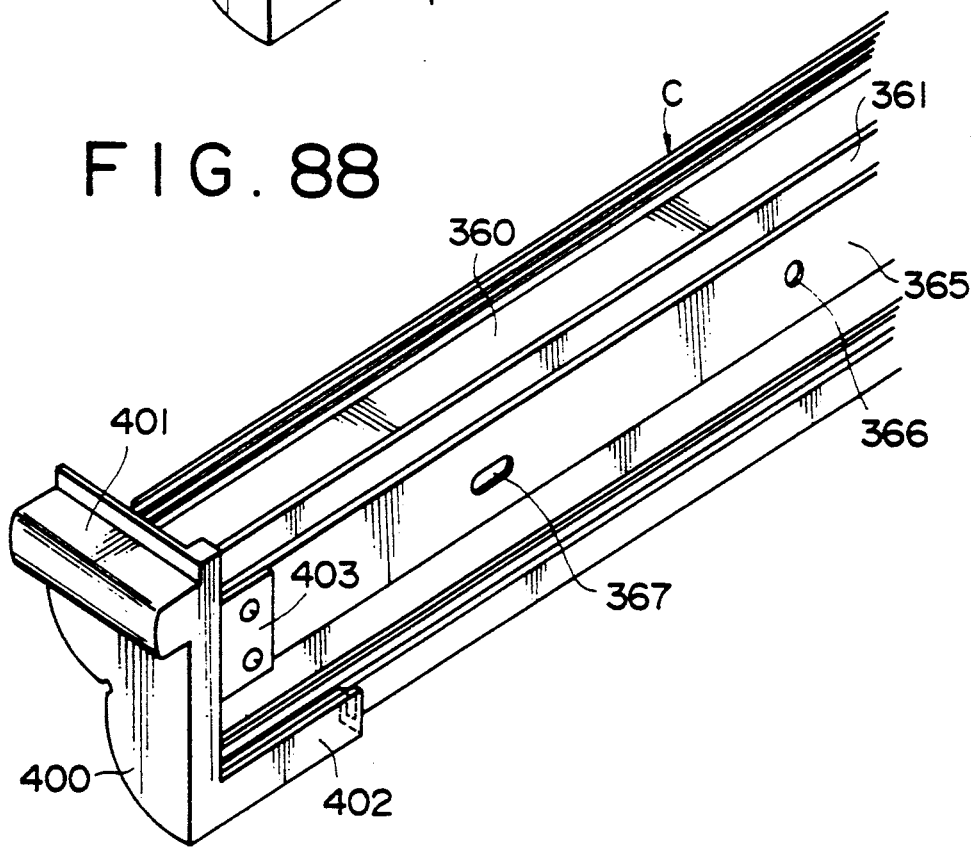
FIG. 88 is a perspective view showing the lateral front base member after the side lower corner decorative cover is mounted thereon.

Referring to FIG. 87, reference symbol F designates a decorative cover provided in the lower corner of the side of the roof. The decorative cover F has a plate 400 for closing the clearance of a main body, and provided at the upper end on the front side with a projection 401 fitted to the notch 385 of the lateral front eaves member 38, at the lower end on the back side with a rearward projection 402, which is provided integrally with the plate 400, and in the center at the side end on the back side with a mounting piece 403 to be mounted to the lateral front base member C. A pair of through holes 404 are bored in the mounting piece 403. Further, each mounting hole bored in the end of the lateral front base member C on the eaves side conforms in position with the corresponding through hole 404 of the decorative cover F to be fixed to each other by the use of the bolt and nut, so that the decorative cover F is mounted to the lateral front base member C, as shown in FIG. 88.

Figure 89:
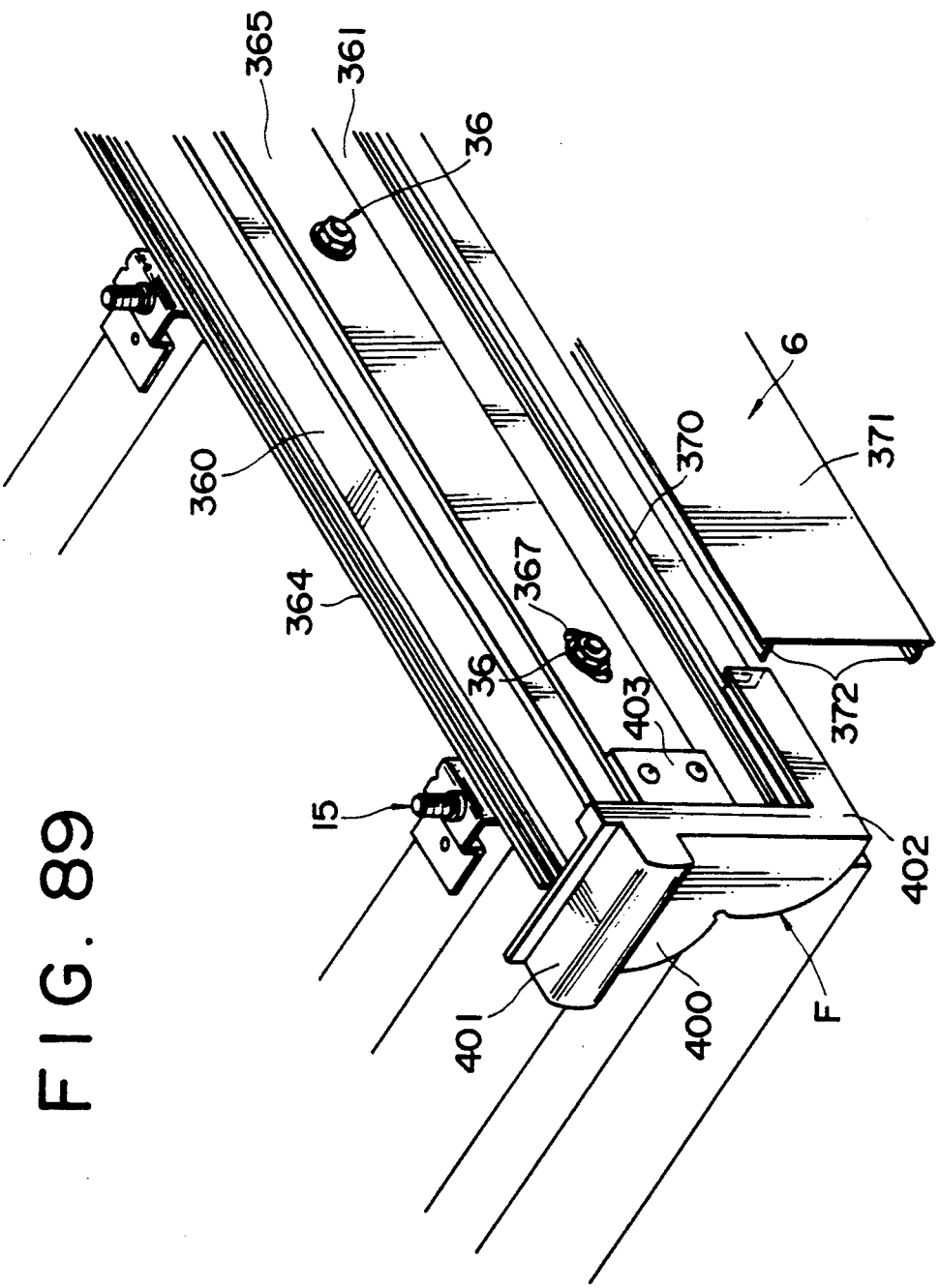
FIG. 89 is a perspective view showing the side of the roof before the lateral front cover is mounted thereon.
Figure 90:
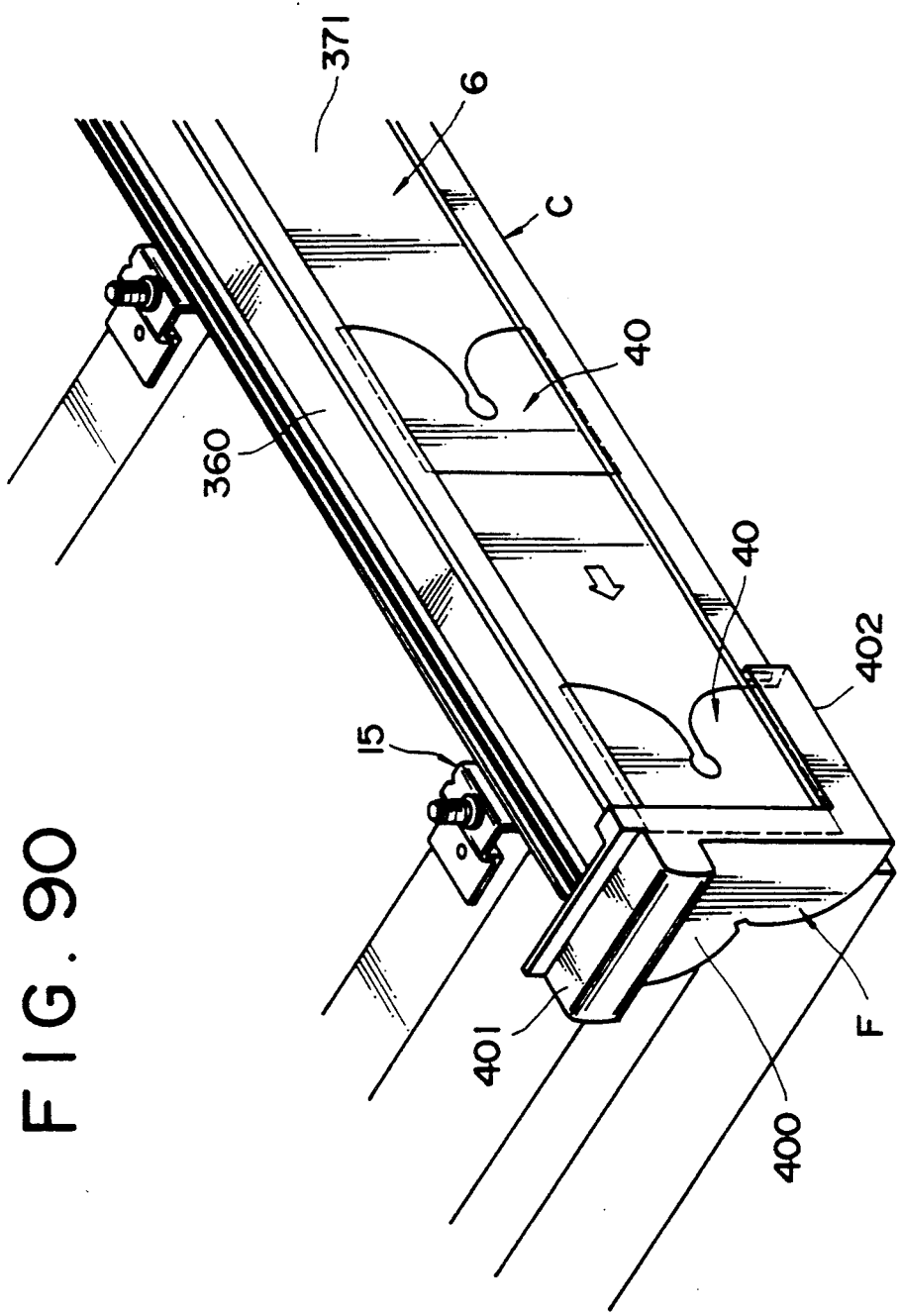
FIG. 90 is a perspective view showing the side of the roof after a lateral front keep plate is mounted thereon.

Further, as shown in FIG. 89, the engaging recessed groove 372 of the lateral front cover 6 is brought into engagement with the engaging projection 369 of the lateral front base member C to mount the lateral front cover 6 to the outer surface of the base member C. Further, as shown in FIG. 90, the upper and lower ends of the lateral front keep plate 40 are fitted into the support groove 370 of the lateral front base member C, and the end of the keep plate 40 on the eaves side is inserted between the decorative cover F and the lateral front cover 6 by sliding the keep plate 40 in the direction indicated by an arrow to thereby mount the keep plate 40 to the outer surface of the lateral front cover 6.

Figure 93:
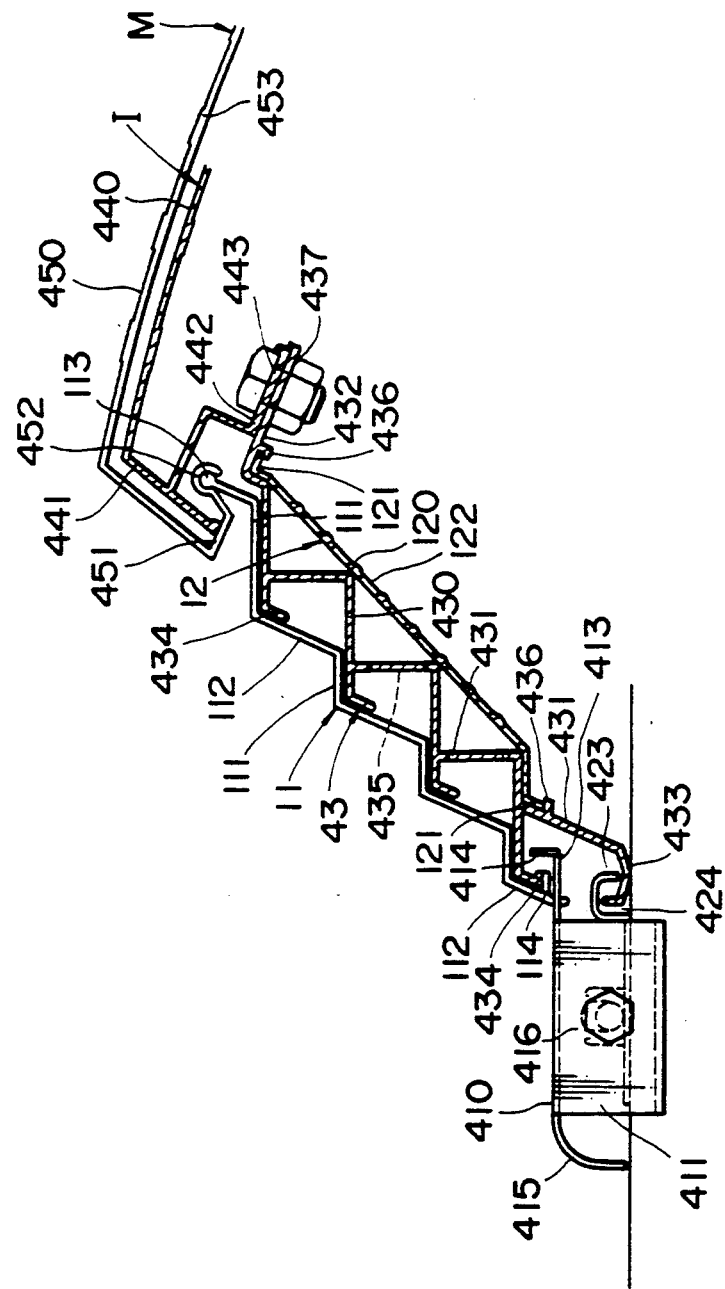
FIG. 93 is a longitudinal cross-sectional view showing the ridge member fixing portion.
Figure 98:
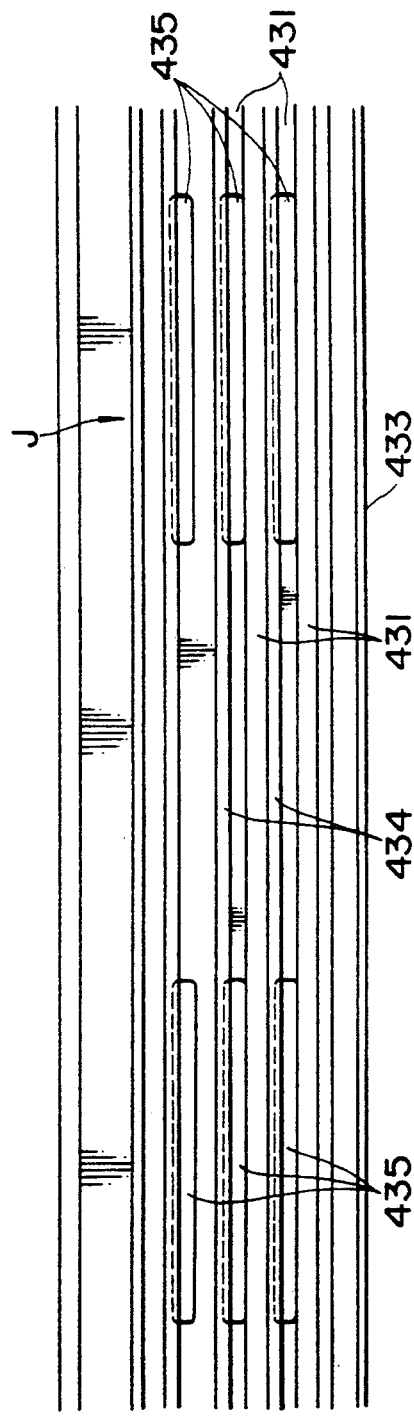
FIG. 98 is a side view showing a ridge side member.

Next will be explained the ridge of the roof. As shown in FIGS. 3 and 93, the ridge of the roof is composed of a pair of ridge side members J provided in parallel with each other along the top edge of the roof surface, the ridge cap I provided so as to bestride between the respective upper ends of the side members J, a ridge water proof sheet 12 overlapped with the back surface of each side member J, the ridge cap connecting member M for interconnecting the adjacent ridge caps I, and the connecting member 11 for interconnecting the adjacent ridge side members J. The ridge side member J has a stepped body 43 including a side overhang surface 430 and a rising surface 431, which are continuous with each other into the shape of stairs. The upper end of the stepped body 43 is horizontally bent toward the back to form a bent fixing portion 432. A bolt hole 437 is bored in the bent fixing portion 432, and the lower end of the stepped body 43 is bent downward to the outer side and further bent upward to the outer side to form a ridge member fixing piece 433. Each side overhang surface 430 extends outward from the corresponding rising surface 431, and the tip of each side overhang surface is inclined downward to the outer side to provide a pentroof 434. A plurality of ventilating openings 435 are formed in each rising surface 431, as shown in FIG. 98, and a ridge water proof sheet support groove 436 is provided on the back surface of the bent fixing portion 432 and that of the lowermost rising surface 431, respectively.

Figure 96:
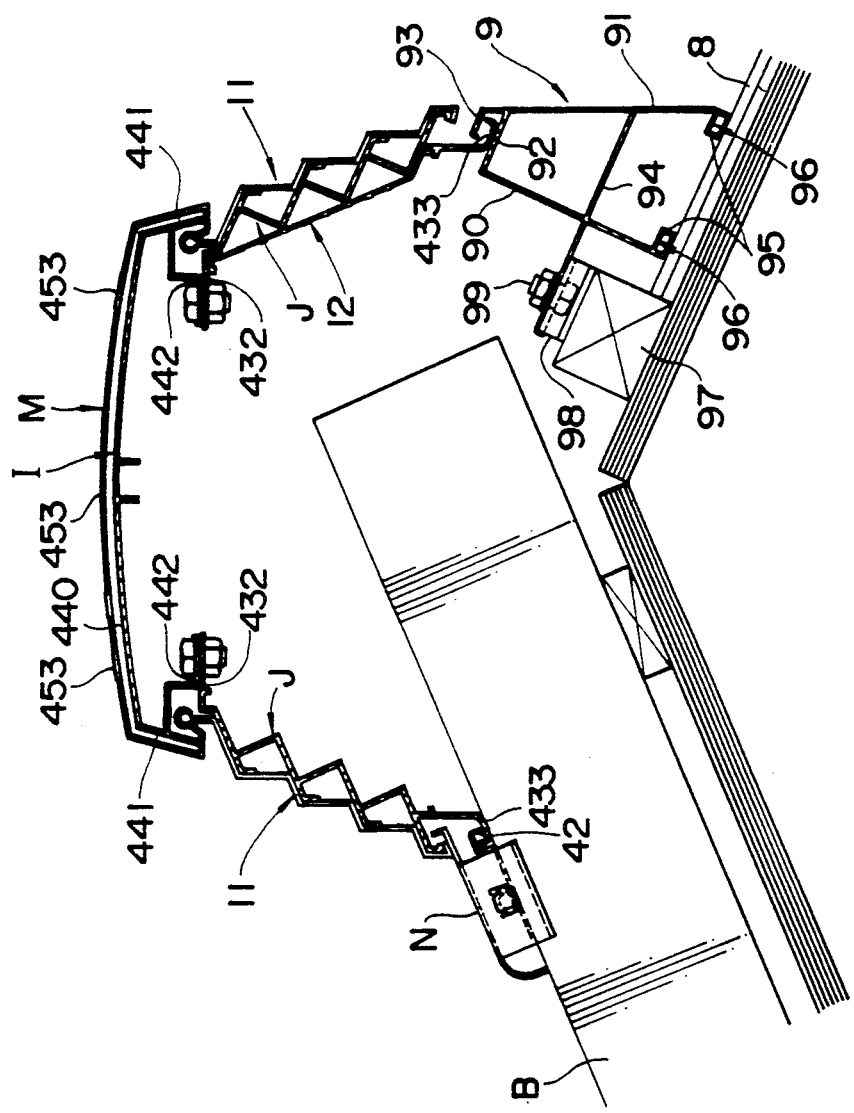
FIG. 96 is a cross-sectional view showing a ridge.
Figure 97:
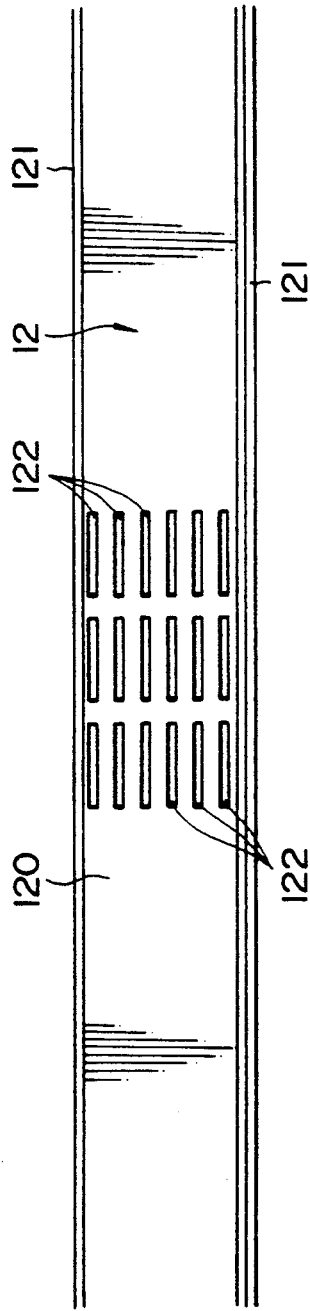
FIG. 97 is a side view showing a ridge water proof sheet.

As shown in FIG. 96, the ridge cap I has an inclined pentroof 441 inclindly extending outwardly downward from each of opposite edges of a slightly upward bent top surface 440 of the ridge cap. The inclined pentroof 441 is provided on the back with a bent mounting piece 442, which is projected inward from the center of the pentroof 441 on the back, and further bent downward and thereafter inward. The mounting piece 442 is mounted to the upper surface of the bent fixing portion 432 of the ridge side member J. A bolt hole 443 is bored in each bent mounting piece 442.

The ridge cap I is provided so as to bestride between the respective upper ends of a pair of ridge side members J provided in parallel with each other on the top surface of the roof, and the bent mounting piece 442 of the ridge cap I and the bent fixing portion 432 of the ridge side member J are overlapped with each other, so that the ridge cap I is attached to the ridge side member J by the use of the bolts inserted into the respective bolt holes 437.

The ridge cap connecting member M has a beltlike body 450 for covering the connection of the adjacent ridge caps I along the outer surface thereof. Each of the opposite lower ends of the belt-like body 450 is bent inward to form an inward bent piece 451 engaging the tip of the inclined pentroof 441 of the ridge cap I. The tip of the inward bent piece 451 is further bent upward to the inner side, and a curved projection 452 is provided at the bent tip of the inward bent piece 451. A plurality of throating convex and concave portions 453 are formed on the top surface of the belt-like body 450.

The connecting member 11 for interconnecting the ridge side members has a belt-like mounting piece 111 and an inclined piece 112, which are continuous with each other into the shape of stairs at an angle substantially equal with the bent angle defined by the side overhang surface 430 and the pentroof 434 of the ridge side member J. The end of the uppermost mounting piece 111 is bent upward, and an expanded portion engaging the curved projection 452 of the ridge cap connecting member M is provided at the bent tip of the uppermost mounting piece 111.

Further, the lowermost inclined piece 112 is provided on the back with an inward tongue piece 114 engaging the tip of the lowermost pentroof 434 of the ridge side member J. A notch 110 (see FIG. 94), into which the tip of the ridge mounting member N is inserted, is formed in the lower portion of the inward tongue piece 114.

Figure 7:
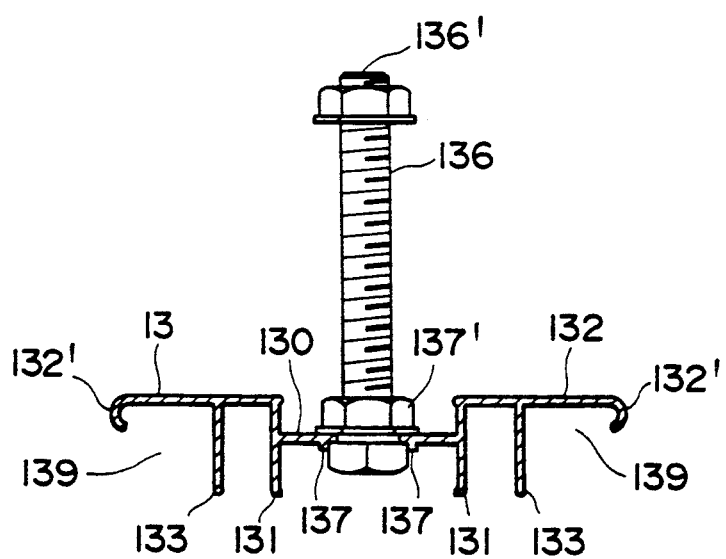
FIG. 7 is a sectional view showing a portion of the lower connecting member, through which a connection bolt is inserted.

The ridge water proof sheet 12 has an ovelapping sheet 12 brought into contact with each reentrant part of the ridge side member J, and a back bent portion 121 formed at each of the upper and lower ends of the sheet 2 and engaging the ridge water proof sheet support groove 436 of the ridge side member J. As shown in FIG. 7, a plurality of exhaust ports 122 are provided in the sheet 12.

Figure 100:
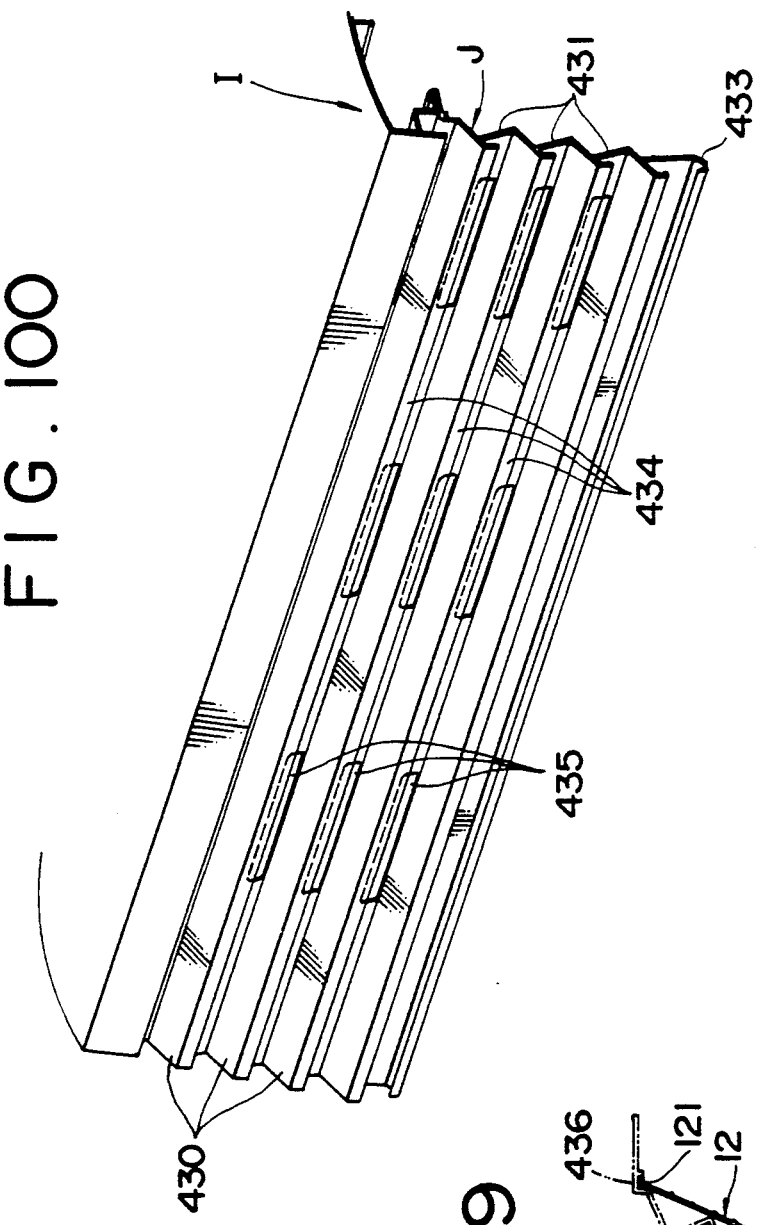
FIG. 100 is a perspective view showing the ridge side member when a ridge cap is mounted thereon.
Figure 99:
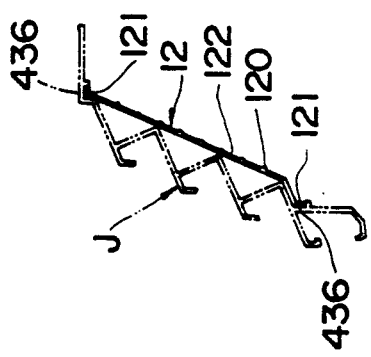
FIG. 99 is a cross-sectional view showing the ridge side member and the ridge water proof sheet when incorporated together.
Figure 103:
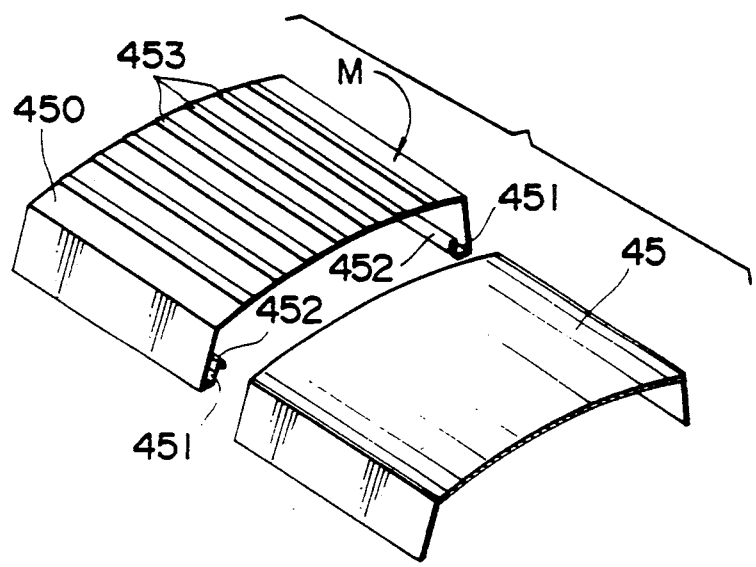
FIG. 103 is a perspective view showing a ridge cap connecting member.

As shown in FIGS. 100 and 101, since the exhaust ports 122 of the ridge water proof sheet 12 and the ventilating openings 435 of the ridge side member J are so provided that they do not coincide in position with each other in the longitudinal direction of the ridge. Therefore, when both the back bent portions 121 of the ridge water proof sheet 12 are brought into engagement with the ridge water proof sheet support groove 436 of the ridge side member J, and the ridge water proof sheet 2 is overlapped with the back surface of the ridge side member J, as shown in FIG. 99, each ventilating opening 435 and each exhaust port 122 are so arranged that they are deviated from each other, as shown in FIG. 102, to thereby prevent rain water from directly coming in therethrough.

FIGS. 103 through 106 show the interconnectin of the adjacent ridge members, respectively. The ridge cap connecting member M has the lower surface overlapped with a rubber or synthetic resin water proof overlapping sheet 45 to be fitted to the upper surface of the ridge cap I in the neighborhood of the end of the connection of the adjacent ridge caps I.

Figure 104:
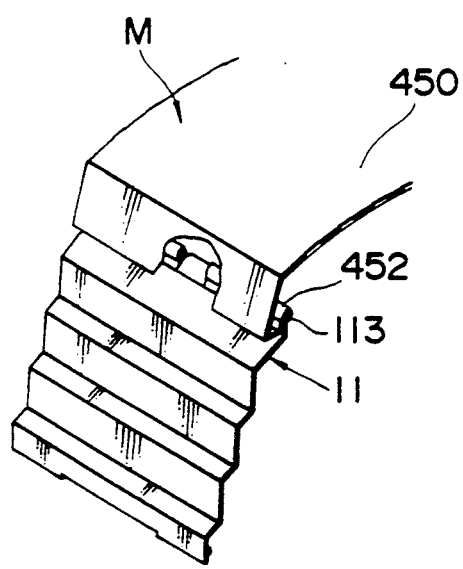
FIG. 104 is a perspective view showing the ridge cap connecting member and the ridge side connecting member when incorporated together.
Figure 105:
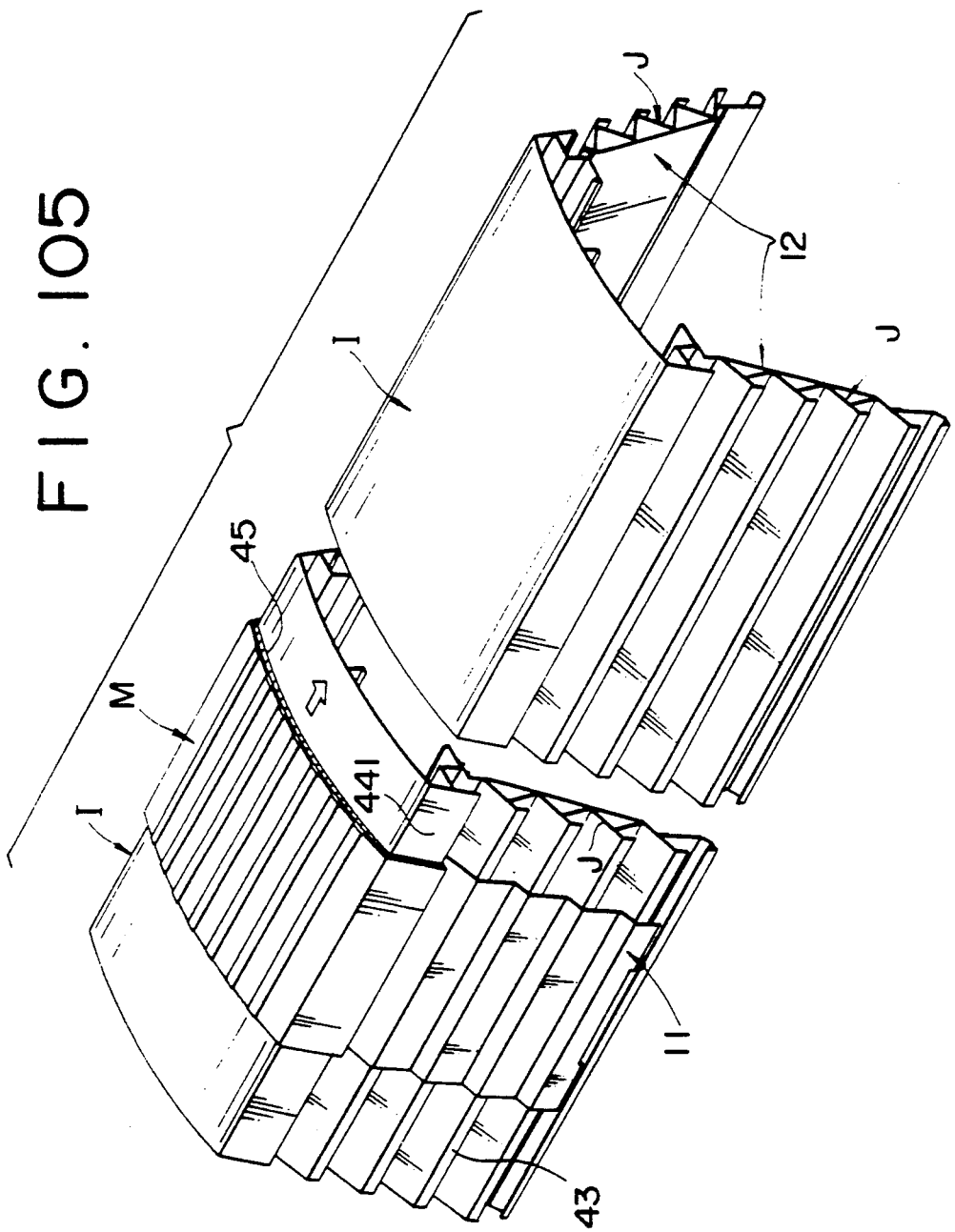
FIG. 105 is a perspective view showing the ridge before the connection.
Figure 106:
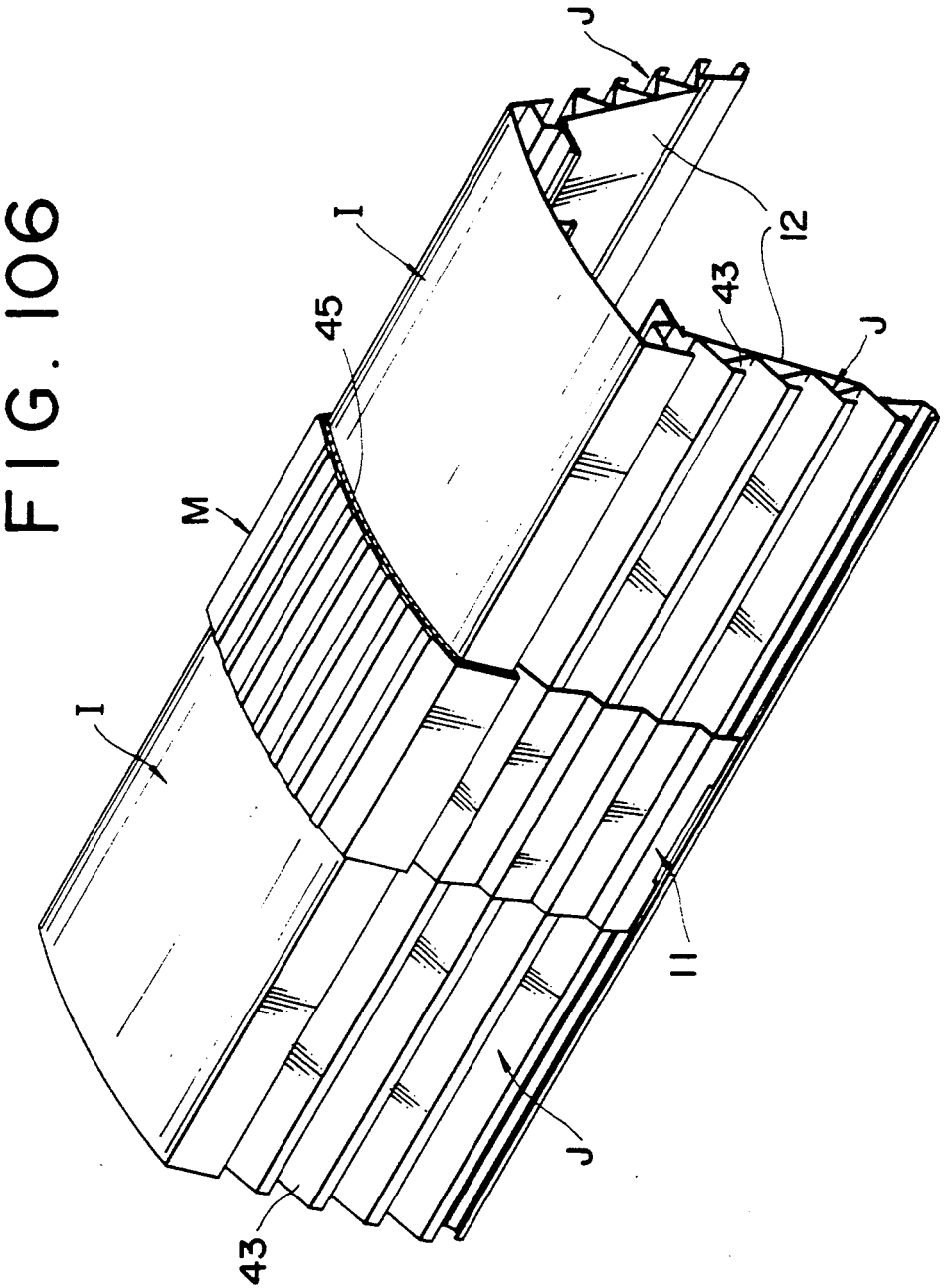
FIG. 106 is a perspective view showing the ridge after the connection.

Then, each inward bent piece 451 of the ridge cap connecting member M is brought into engagement with the lower end of the corresponding inclined pentroof 441 of the ridge cap I, and each expanded portion 113 of the ridge side connecting member 11 fitted to the outer surface of the stepped body 43 of the ridge side member J is fitted into the corresponding curved projection 452 of the ridge cap connecting member M, as shown in FIG. 104.

Further, another similarly assembled ridge side member J and ridge cap I are mounted on the same line as the ridge side member J and the ridge cap I, on which the ridge side connecting member 11 and the ridge cap connecting member M are mounted, such that a slight gap is provided in between the respective connecting ends thereof, and then the ridge cover connecting member M and the ridge side connecting member 11 are made to slide in the direction indicated by an arrow to cover the interconnection of the adjacent ridge members.

Next will be explained the connection of the connecting member cover D with the ridge of the roof.

Figure 91:
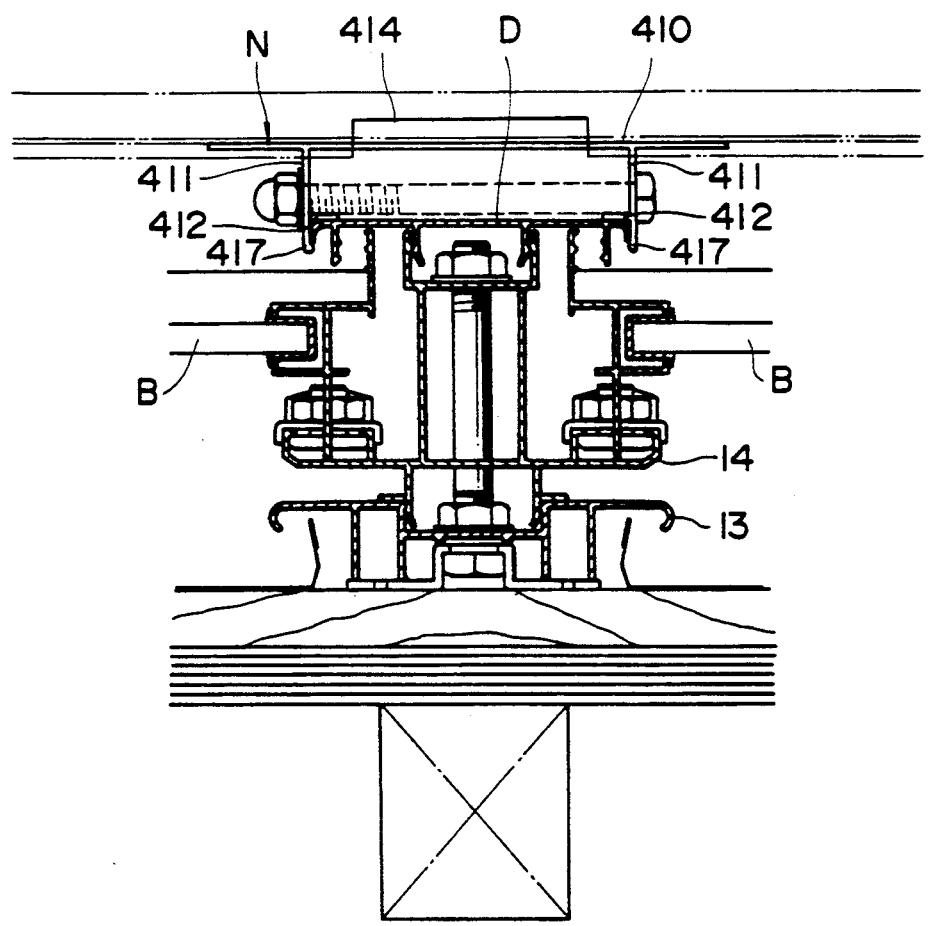
FIG. 91 is a cross-sectional view showing a ridge member fixing portion.

The ridge mounting member N has a horizontal body 410, as shown in FIG. 91. A pair of downward vertical mounting walls 411 are provided at the same interval as the width of the connecting member cover D so as to extend downward from the lower surface of the horizontal body 410. Each of the mounting walls 411 is provided in the center of the inner surface with a mounting projection 412 mounted on the upper surface of the connecting member cover D, and at the lower end of the inner surface with an engaging projectin 417 engaging the lateral end of the connecting member cover D.

Figure 92:
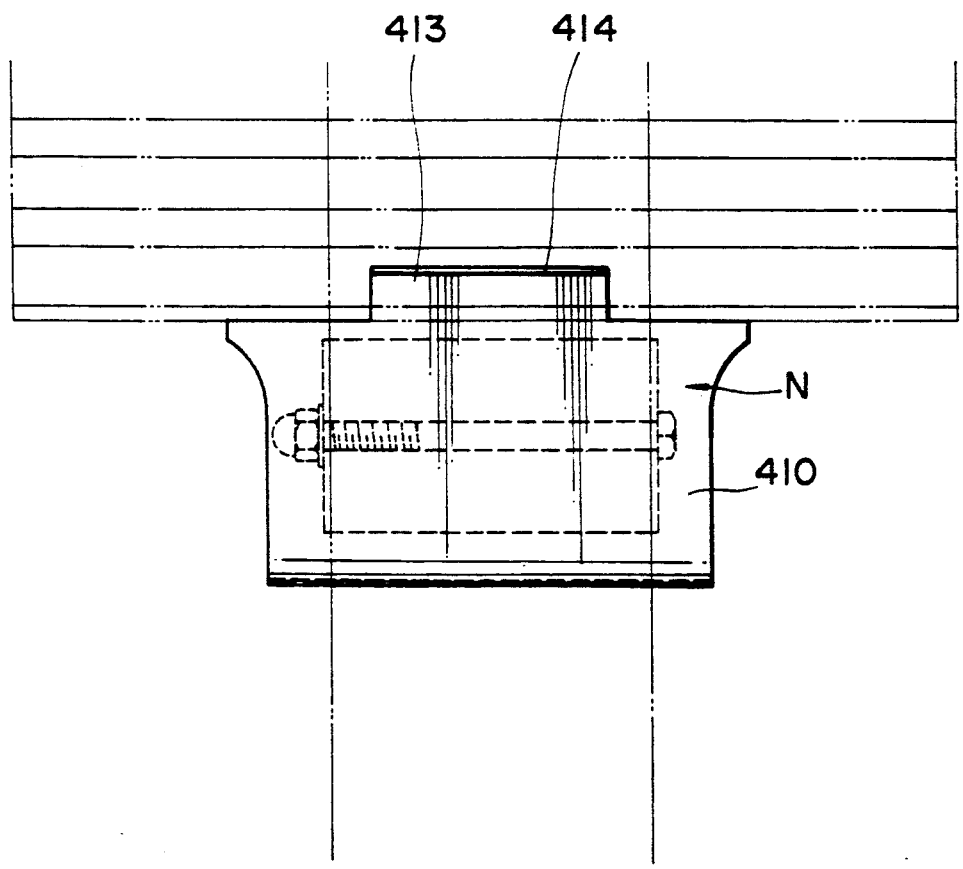
FIG. 92 is a plan view showing the ridge member fixing portion.

The end of the horizontal body 410 on the ridge side is wide, as shown i FIG. 92, and an insertion piece 413 engaging the lower end of the ridge side connecting member 11 is provided so as to project from the center of the horizontal body 410. An upward bent rising wall 414 is formed at the tip of the insertion piece 413, as shown in FIG. 93.

A downward curved portion 415 is provided at the other end of the horizontal body 410, and a longitudinally elongate bolt hole 416 is bored in each mounting wall 411.

Figure 94:
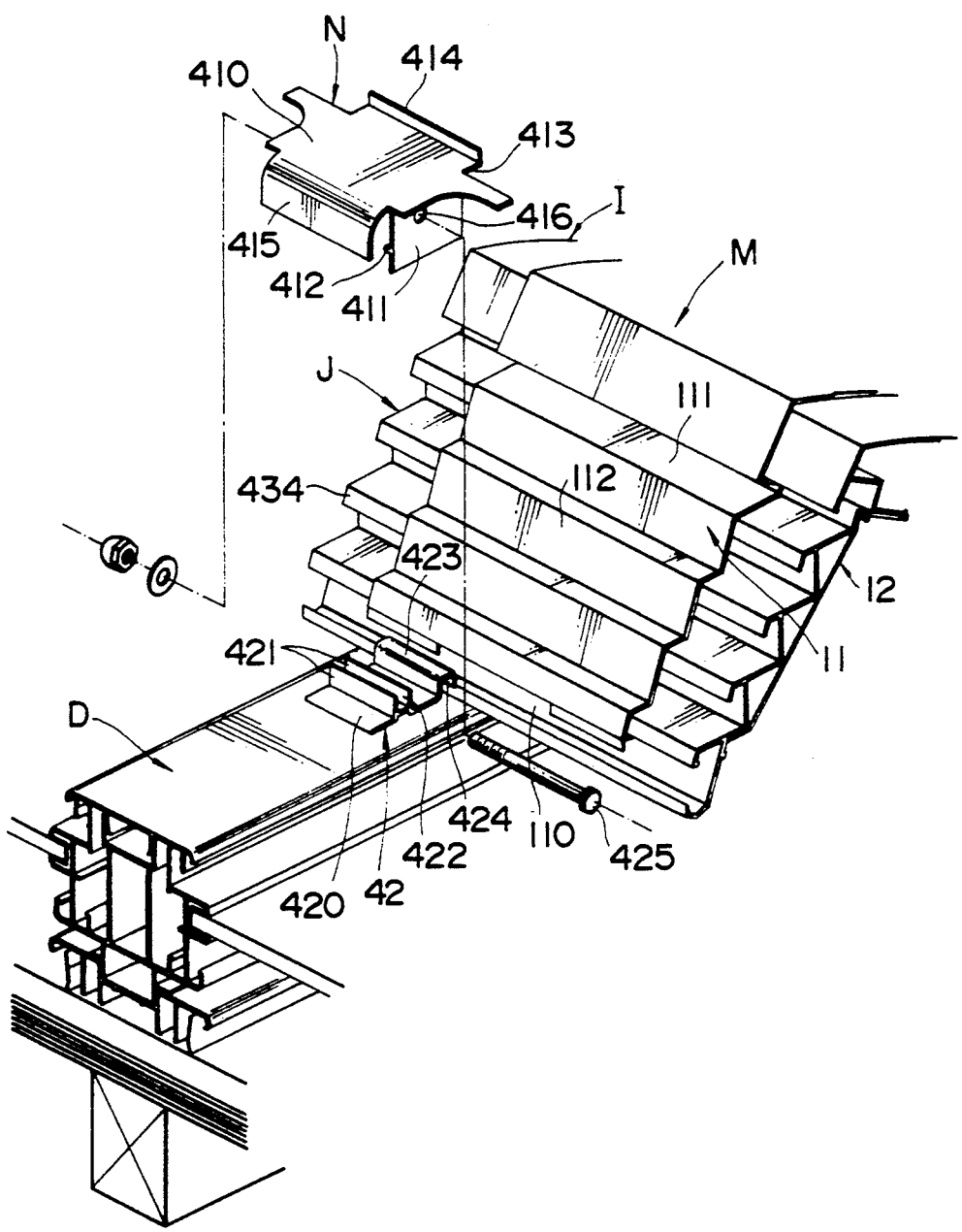
FIG. 94 is a perspective view showing the ridge member fixing portion before a ridge mounting member is mounted thereon.

Referring to FIG. 94, reference numeral 42 designates a connector member mounted on the upper surface of the connecting member cover D and connecting the ridge mounting member N with the connecting member cover D. The connector member 42 has an extended plane 420 provided in the center of the upper surface with a pair of parallel projecting walls 421 extending at an interval along the ridge. A bolt insertion groove 422 is defined between the parallel projecting walls 421. The edge of the extended plane 420 on the ridge side is upward bent, then horizontally extended and furtehr bent downward to intergrally provide an engaging bent portion 423. An engaging recessed groove 424 fitted to the ridge member fixing piece 433 of the ridge side member J is defined on the lower surface of the engaging curved portion 423.

Figure 95:
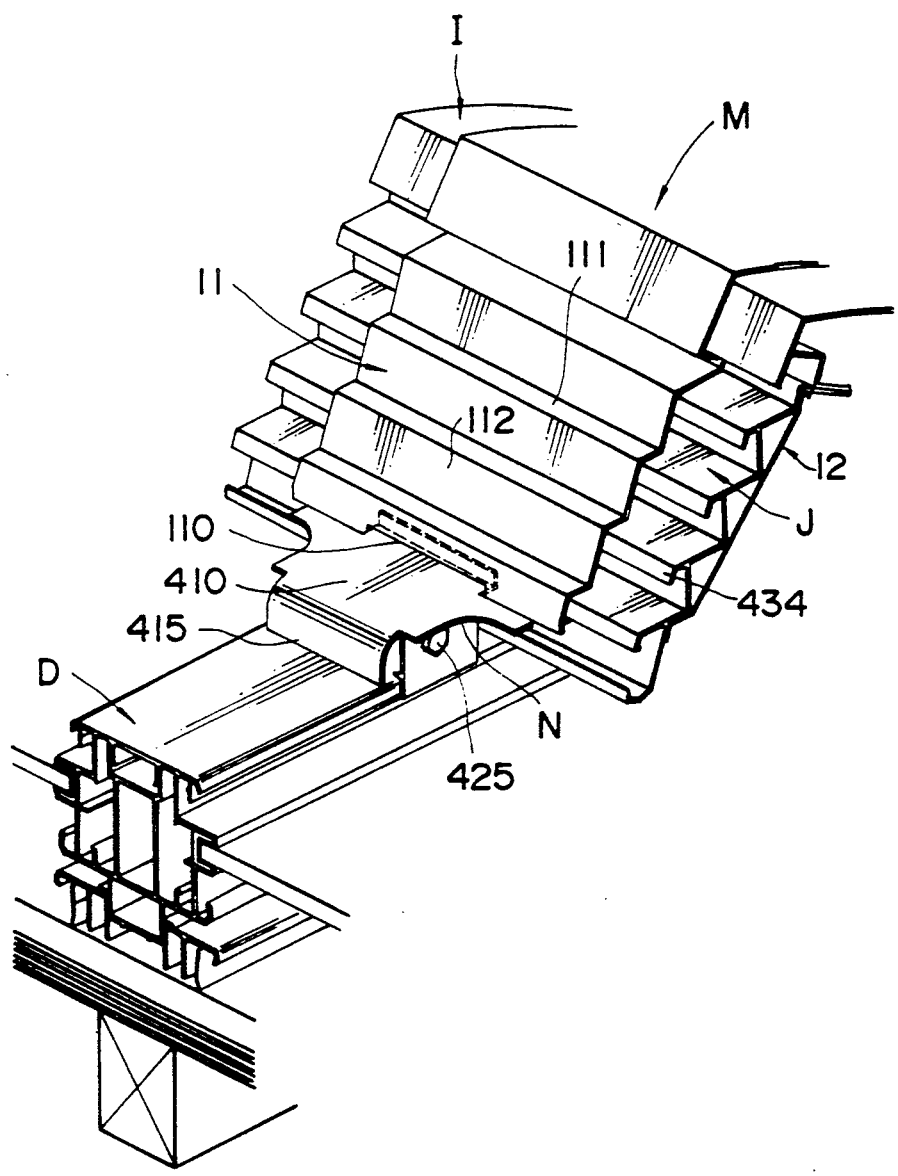
FIG. 95 is a perspective view showing the ridge member fixing portion after the ridge mounting member is mounted thereon.

Then, the upper portion of the connector member 42 is covered with the ridge mounting member N, in which the insertion piece 413 is inserted into the notch 110 formed in the center of the lower end of the ridge side connecting member 11, and the bolt 425 is inserted through the bolt hole 416 of the ridge connecting member N and the bolt insertion groove 422 of the connector member 42 to be fastened to each other by the use of a nut through a washer, so that the ridge mounting member N and the connector member 42 are connected with each other, as shown in FIG. 95.

Next will be explained the process of fixing the ridge of the roof. First, the engaging recessed groove 424 of the connector member 42 is put on the ridge member fixing piece 433 of the ridge side member J from above, then the extended plane 420 is mounted on the connecting member cover D, and then the rising engagement wall 414 of the ridge mounting member N is brought into engagement with the lower end of the lowermost pentroof 434 of the ridge side member J.

Next, the curved portion 415 of the ridge mounting member N is pressed down to be brought the tip of the curved portion 415 into contact with the upper surface of the connecting member cover D, then the bolt holes 416 of the ridge mounting member N are set to be located at the opposite ends of the bolt insertion groove 422, and then the bolt 425 is inserted through each bolt hole 416 and the bolt insertion groove 422 to be fixed to each other.

Since each of the bolt insertion groove 422 and the engaging recessed groove 424 of the connecting member 42 gives the play to its width and height, and the bolt hole 416 of the ridge mounting member N is formed into an elongate hole, the bolt 425 and the ridge member fixing piece 433 of the ridge side member J are movable upward and downward or leftward and rightward, so that even if the members are expanded or contracted due to heat or get warped in dimension, the ridge member may be mounted to the ridge of the roof corresponding to the expansion or contraction or dimensional warp of the ridge member.

Further, as shown in FIG. 123, since the ridge member fixing piece 433 of the ridge side member J is so formed that the lower end of the upright surface 431 is once inclined downward to the outer side and then bent upward to the outer side, the ridge member fixing piece 433 is brought into point contact with the connecting member cover D, so that the ridge member fixing piece 433 may be mounted to the connecting member cover D irrespective of the inclination of the backing surface. Therefore, the solar energy collecting roof may be combined with the opposite roof member 8 firmly and simply.

As shown in FIGS. 4 and 94, in the case where one roof surface is roofed with the lighting frames B, and the other roof surface is roofed with the roof sheet 8 such as metal sheet, slate, and fiber reinforced cement, both finishing roof surfaces vary from each other in height. In order to correct the height difference between both finishing roof surfaces, a ridge member support bed 9 is mounted on the upper surface of the roof sheet 8.

The ridge member support bed 9 has an upright surface 90, an inclined surface 91 and a connecting plate 92 interconnecting the respective upper ends of the upright and inclined surfaces 90, 91 so as to take the shape of a trapezoid in section having the lower side wider than the upper side. The upper end of the inclined surface 91 is further extended to have the tip formed with an inward engaging bent portion 93. A connecting plate 94 is provided so as to extend from the center of the back of the inclined surface 91 inward through the upright surface 90. A bolt hole is bored in the tip of the connecting plate 94, and a packing fit groove 95 is provided at each lower end of the inner inclined and upright surfaces 91, 90.

After the packing 96 is sealed in each fit groove 95, the ridge member support bed 9 is installed on the upper surface of the roof sheet 8 along the edge thereof on the ridge side, and is fixed to the roof backing by the use of a bolt 99 inserted through both of the bolt hole of the connecting plate 94 and the fitting 98 attached to the horizontal sash member 97.

Then, the ridge side member J is mounted to the upper end of the ridge member support bed 9, and the ridge member fixing piece 433 of the ridge side member J is brought into engagement with the engaging bent portion 93 of the ridge member support bed 9.

Figure 107:
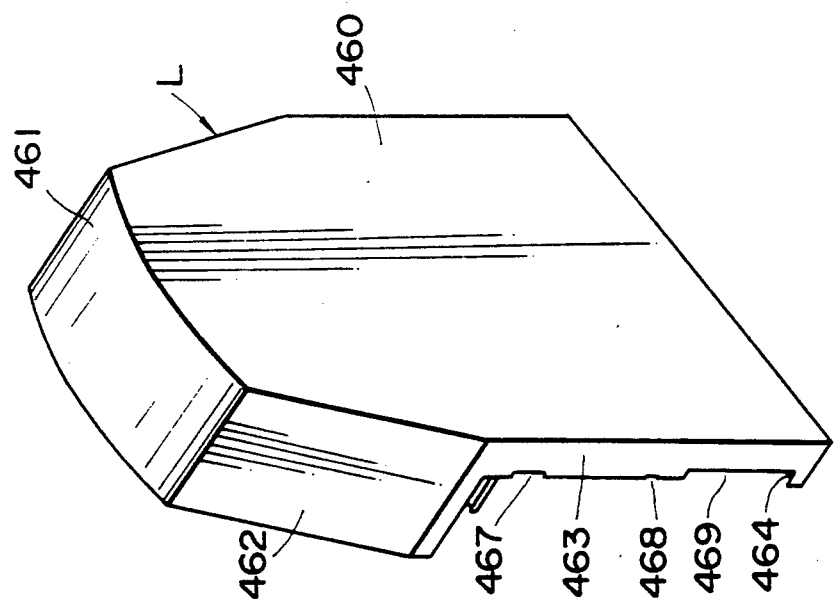
FIG. 107 is a perspective view showing the surface of the ridge front member.

Referring to FIG. 107, the ridge front member L has a ridge front plate 460 having the trapezoidal upper half. The peripheral edge of the ridge front plate 460 is bent inward to continuously form an upper bent edge 461, an inclined bent edge 462, a side bent edge 463, and a lower bent edge 464.

Figure 108:
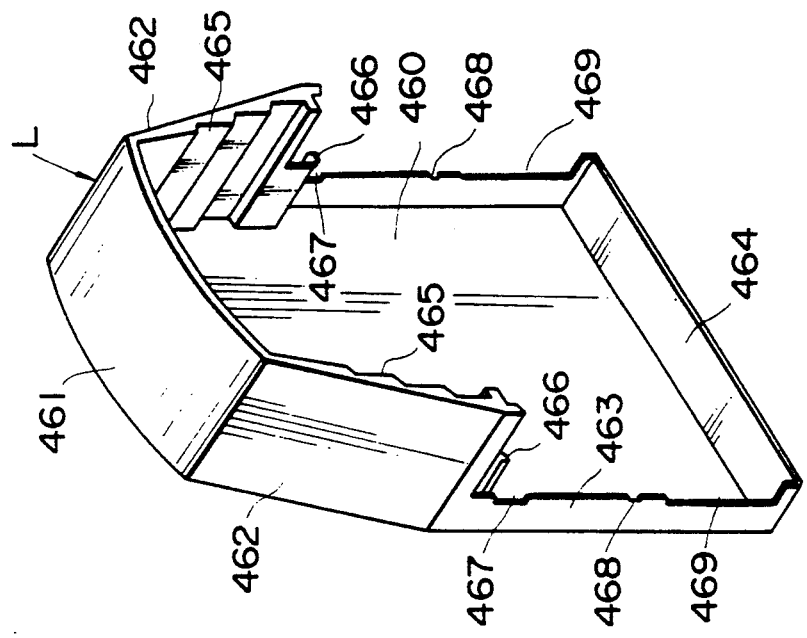
FIG. 108 is a perspective view showing the back surface of the ridge front member.

The upper bent edge 461 is substantially equal in width with each inclined bent edge 462. As shown in FIG. 108, an irregular portion 465 fitted to the outer surface of the stepped body 43 of the ridge side member J is formed on the inner surface of the inclined bent edge 462. The tip of each inward projection formed at the lower end of the inclined bent edge 462 is downward bent, and then curved downward to the outer side to provide a water proof suspending piece 466 brought into contact with the front face of the ridge member fixing piece 433 of the ridge side member J.

Each side bent edge 463 has a width smaller than that of the inclined bent edge 462 and is successively provided at its side end with an upper concave notch 467, into which the tip of the horizontal cover 160 of the side connecting member cover D' on the verge side is fitted, an intermediate concave notch 468, into which the tip of the lower connecting member contact piece 200 of the lateral upper connecting member 14' is fitted, and a lower concave notch 469, into which the lateral front base member C is fitted.

Figure 109:
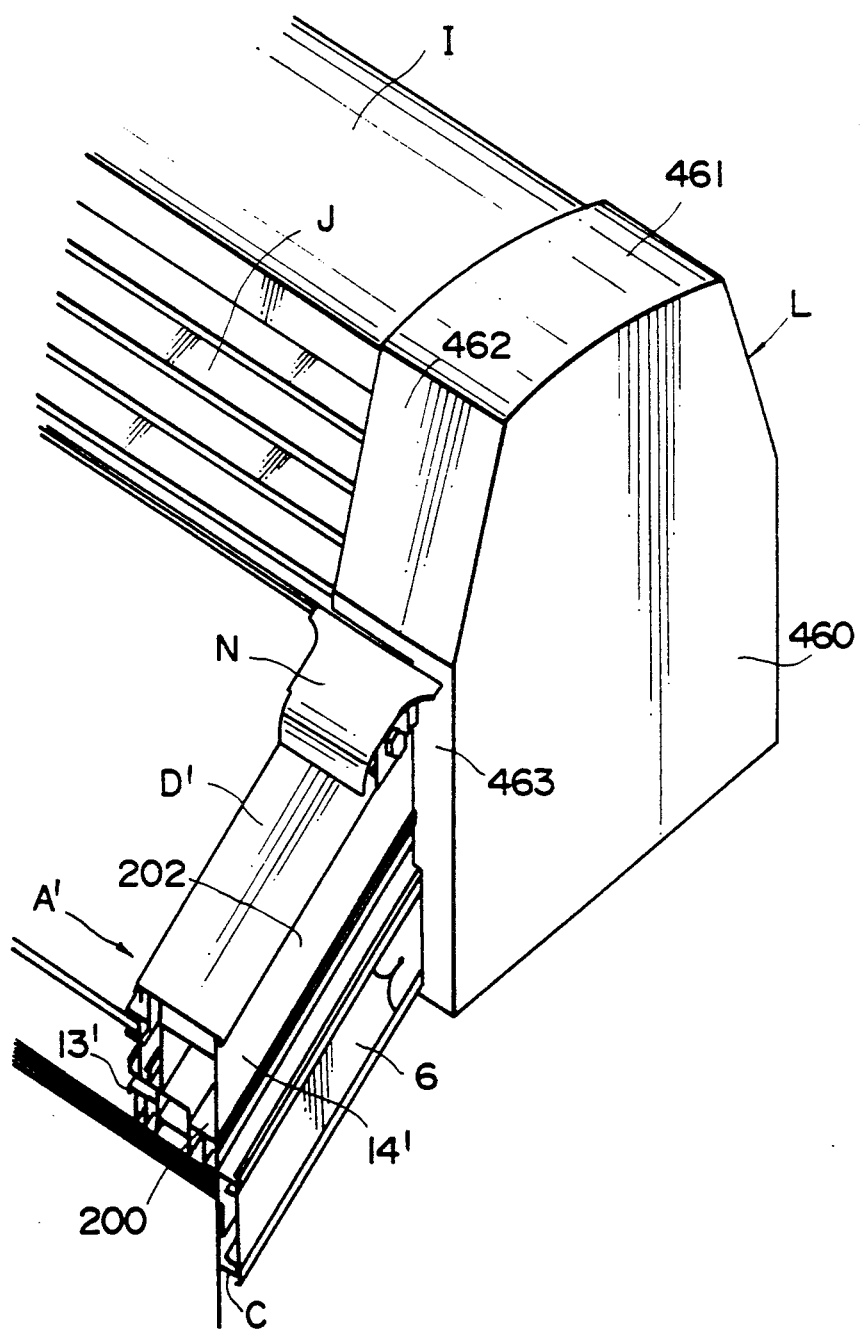
FIG. 109 is a perspective view showing the end of the ridge after the ridge front member is mounted thereon.

When the width of the roof is adjusted, the ridge front member L is used in the case where the width adjustment in the front of the roof results in 0, so that as shown in FIG. 109, the ridge front member L is mounted to the end of the ridge cap I and the side connecting member A' is fitted to the lower side of the inclined bent edge 462.

Then, the tip of the lateral front vertical wall 202 of the upper connecting member 14' and the tip of the horizontal cover 160 of the side connectig member cover D' on the verge side are fitted to the upper concave notch 467, the tip of the lower connecting member contact piece 200 of the upper connecting member 14' is fitted to the intermediate concave notch 468, and the lateral front base member C is fitted to the lower concave notch 469, respectively, so that the ridge front member L is mounted as shown in FIG. 109.

Figure 110:
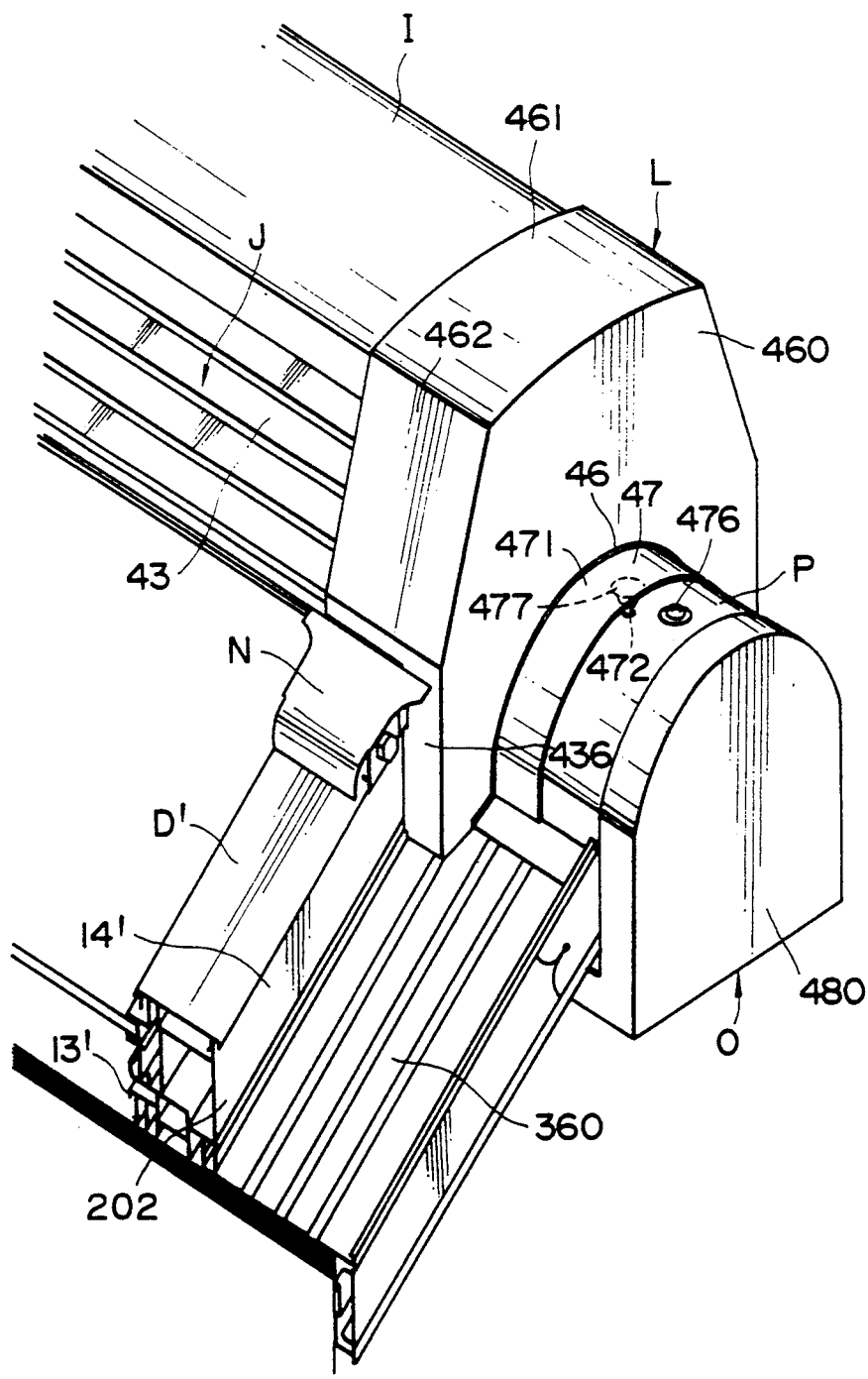
FIG. 110 is a perspective view showing the end of the ridge when another ridge front member is mounted thereon.

FIG. 110 shows the structure of the front of the ridge in the case where the width adjusting amount in the lateral front of the roof is large and the upper horizontal portion 360 of the lateral front base member C is wide. In this case, the ridge front member L is connected with the ridge decorative member 0 by the use of the slide connector P.

Figure 111:
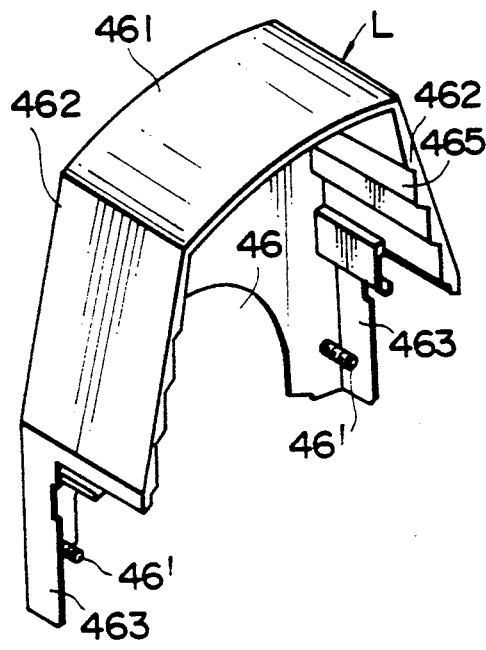
FIG. 111 is a perspective view showing the back surface of the ridge front member shown in FIG. 110.
Figure 112:
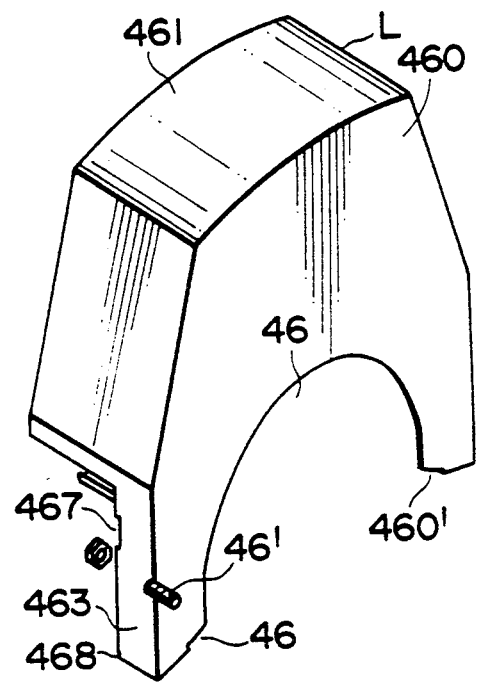
FIG. 112 is a perspective view showing the surface of the ridge front member shown in FIG. 110.

As shown in FIGS. 111 and 112, an opening 46 having an upwardly curved upper edge is formed in the lower end of the ridge front plate 460 of the ridge front member L, and a pair of bolts 46' are planted in the inner surface of the ridge front plate 460 at the opposite sides of the opening 46.

Further, a curved notch 460', to which a roof pitch contact curved portion 478 (see FIG. 114) of the slide connector P which will be later described, is formed in each lower end of the ridge front plate 460 on the outer side of the opening 46.

Since the ridge front member L shown in FIGS. 111 and 112 is structured similarly to the aforementioned ridge front member L shown in FIGS. 107 and 108 except that the ridge front member L shown in FIGS. 111 and 112 has the ridge front plate 460 shorter than that of the aforementioned ridge front member L shown in FIGS. 107 and 108 and is not provided with any lower bent edge 464 and lower notch 469, the detailed description thereof will be omitted by designating the corresponding portions with the same reference numerals.

Figure 113:
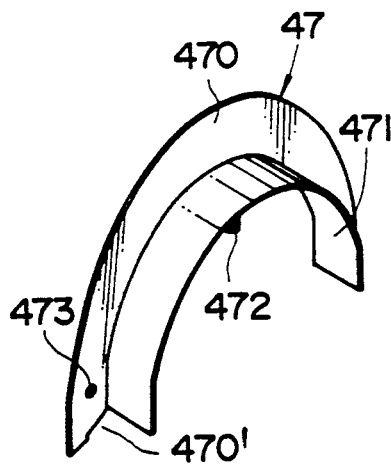
FIG. 113 is a perspective view showing a fit frame member.

As shown in FIG. 113, a frame member 47 fitted to the opening 46 of the ridge front member L is provided at the edge with an overlapping plate 470 overlapped with the back surface of the ridge front plate 460 along the peripheral edge of the opening 46, and a curved projecting edge 471 having the same shape as the peripheral edge of the opening 46 and projecting outward from the inner edge of the overlapping plate 470. A bolt 472 is planted in the lower surface of the top of the curved projecting edge 471, and a bolt hole 473 is bored in each of the opposite sides of the overlapping plate 470. A notch 470' similar to the curved notch 460' of the ridge front member L is formed in each of the opposite lower ends of the overlapping plate 470.

Figure 114:
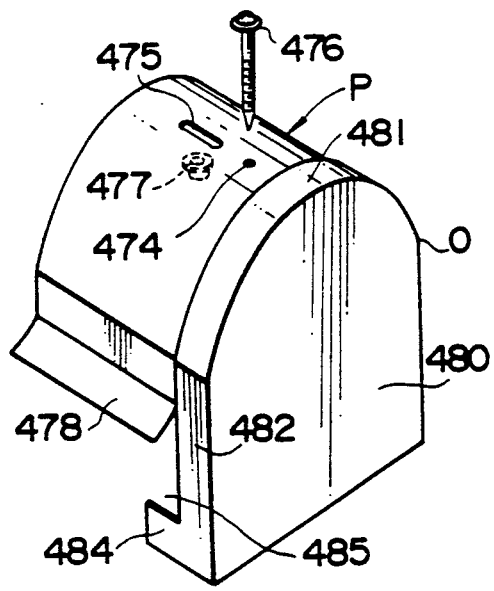
FIG. 114 is a perspective view showing a ridge decorative member and a slide connector.
Figure 115:
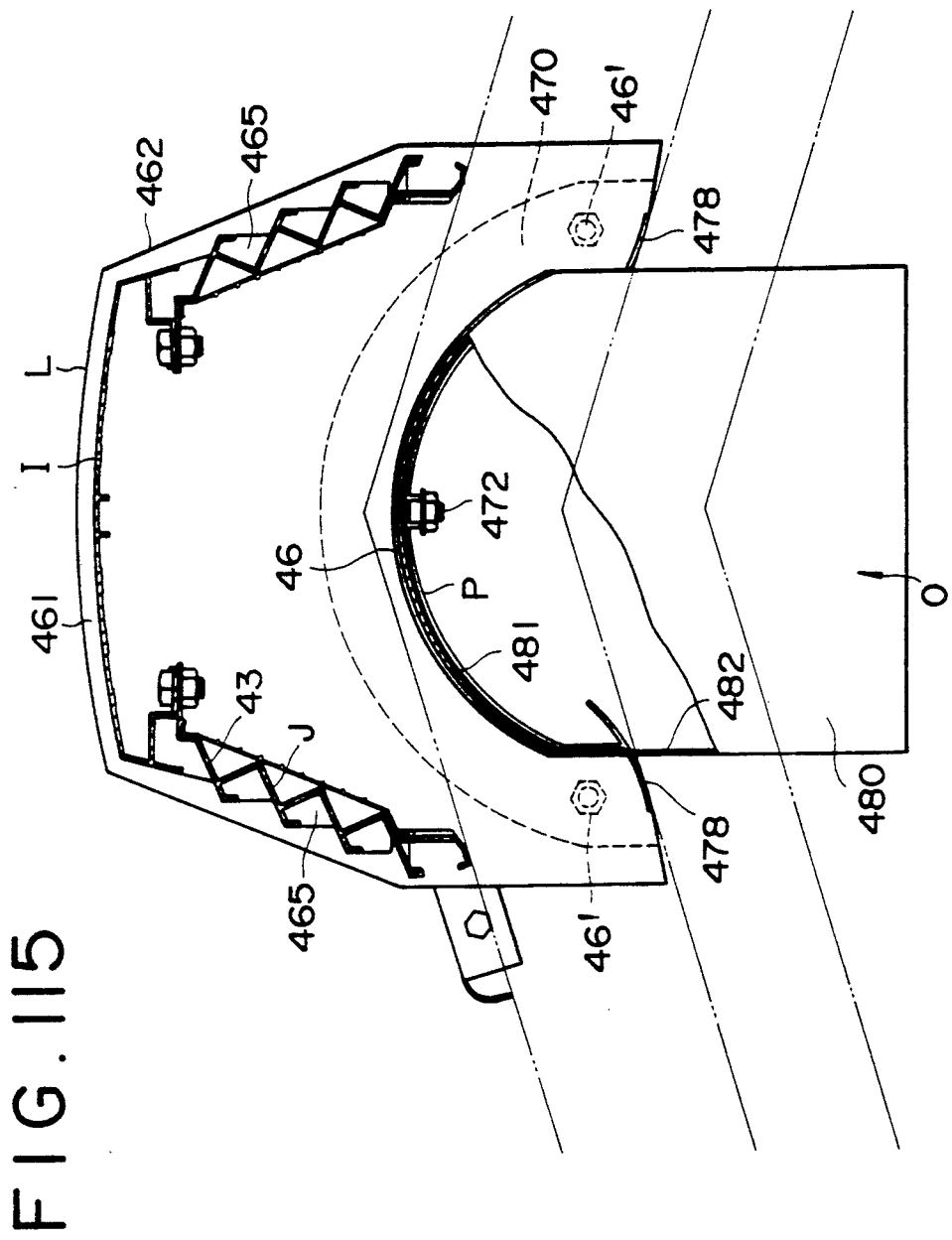
FIG. 115 is a cross-sectional view of FIG. 110.

The slide connector P is overlapped with the lower surface of the curved projecting edge 471 of the frame member 47. A fixing hole 474 is bored in the substantial center of the top of the connector P as shown in FIG. 114. An elongate hole 475 having a longer axis extending in parallel with the line of ridge is bored in the top of the connector P as being spaced apart from the hole 475 and close to the ridge front member L. As shown in FIG. 115, the connector P is provided at each lower end with a roof pitch contact curved portion 478 which is inclined upward toward the inner side and also bent downward.

The ridge decorative member 0 has a ridge front closing plate 480 for closing the forefront of the ridge, and having the peripheral edge bent toward the back. The closing plate 480 is provided at the upper edge with an upper overlapping edge 481 overlapped with the upper surface of the slide connector P, at the side edge with a side overlapping edge 482, and at the lower edge with a lower bent edge 483 (See FIG. 116).

The lower portion of the side overlapped edge 482 is formed with a lower inward projecting piece 484 extending toward the gable-board 35 to be increased in width. A narrow portion 485, with which the vertical portion 361 of the lateral front base member C is brought into engagement, is defined above the lower inward projection piece 484.

Next will be explained the interconnection of the ridge front member L, the frame member 47, the slide connector P and the ridge decorative member 0. The irregular portion 465 of the ridge front member L is fitted to the end of the ridge cap I and that of the ridge side member J so that the irregular portion 465 of the ridge front member L is brought into engagement with the outer surface of the stepped body 43 of the ridge side member J.

Figure 116:
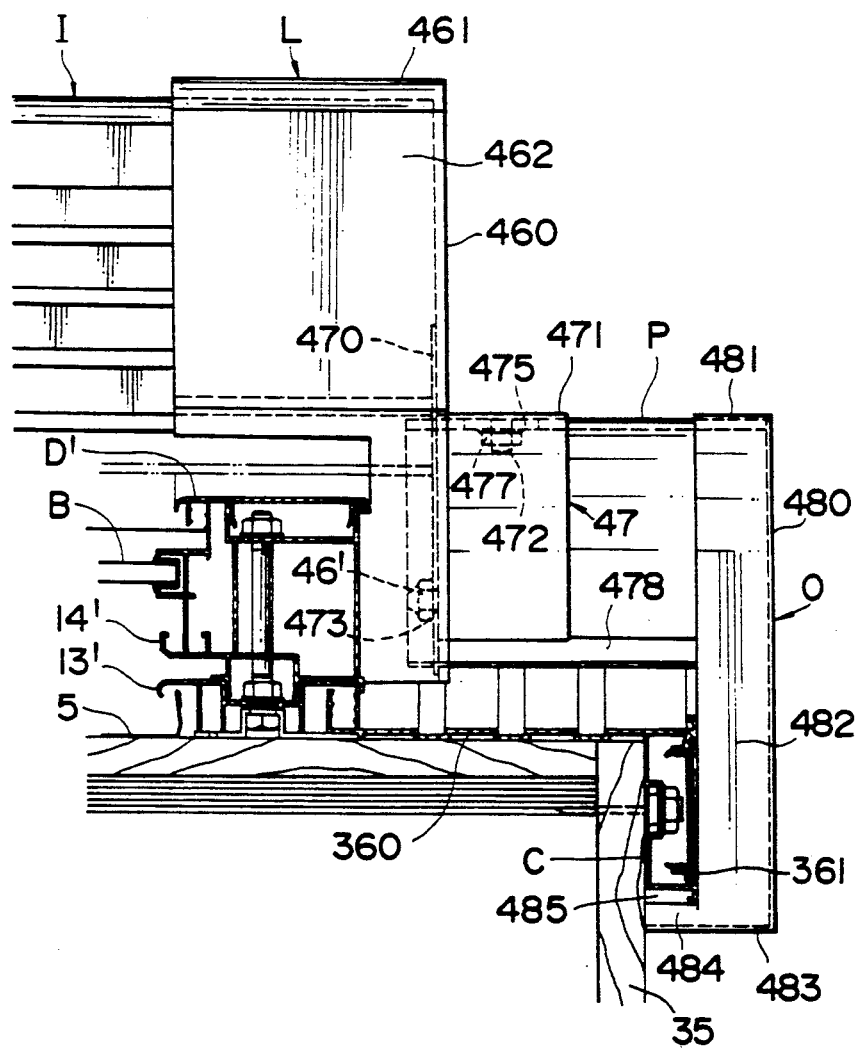
FIG. 116 is a longitudinal cross-sectional view of FIG. 110.

As shown in FIG. 116, the overlapping edge plate 470 of the frame member 47 is overlapped with the lower back surface of the ridge front plate 460 of the ridge front member L, and the bolt 46' of the ridge front member L inserted into the bolt hole 473 of the frame member 47 is fastened by the nut, so that the curved projecting edge 471 of the frame member 47 projects outward from the opening 46 of the ridge front member L.

The connector P is provided at the opposite lower ends respectively with the roof pitch contact curved portions 478, each of which maintains the mounting height of the roof always constant corresponding to a change in pitch of the roof. One end of the connector P at the side of the elongate hole 475 is overlapped with the lower surface of the curved projection edge 471 of the frame member 47 so that the contact curved portions 478 are respectively fitted to the notch 470' of the frame member 47 and the notch 460' of the ridge front member L, and a nut 477 is screwed onto the bolt 472 of the frame member 47 inserted into the elongate hole 475. Further, the screw 476 is screwed into the hole 474 to fix the connector P.

The ridge decorative member O is fitted to the upper surface of the other end of the connector P, and the vertical portion 361 of the lateral front base member C is brought into engagement with the narrow portion 485 of the ridge decorative member O.

The length of the ridge is adjusted at the end by the use of the frame member 47 and the elongate hole 475 provided in the connector P in cooperation with the width adjustment of the lateral front base member C.

Figure 117:
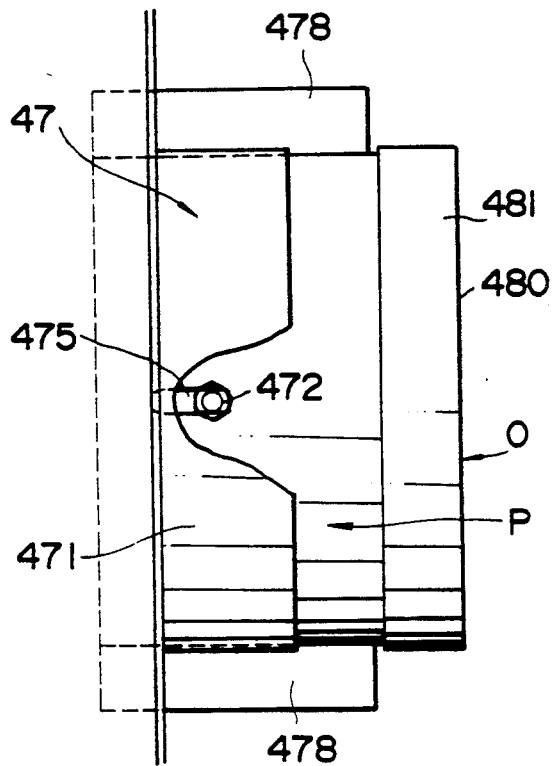
FIG. 117 is a plan view showing the ridge end of the roof when minus mounting is done.
Figure 118:
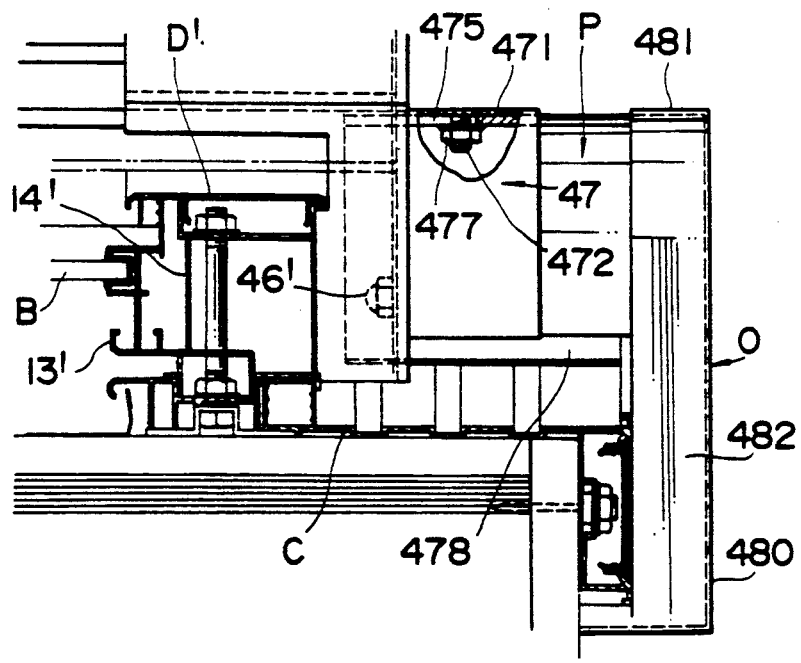
FIG. 118 is a longitudinal cross-sectional view of FIG. 117.
Figure 119:
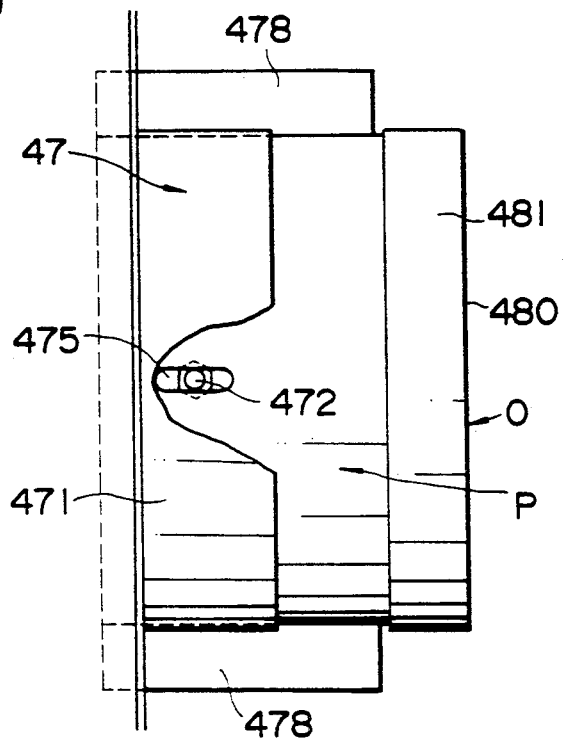
FIG. 119 is a plan view showing the ridge end of the roof when the normal mounting is done.
Figure 120:
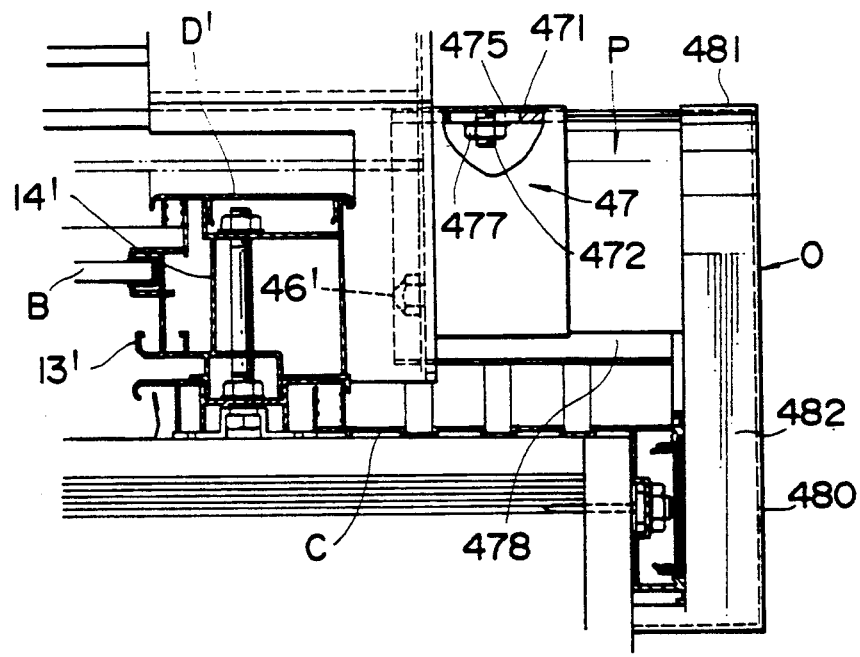
FIG. 120 is a longitudinal cross-sectional view of FIG. 119.
Figure 121:
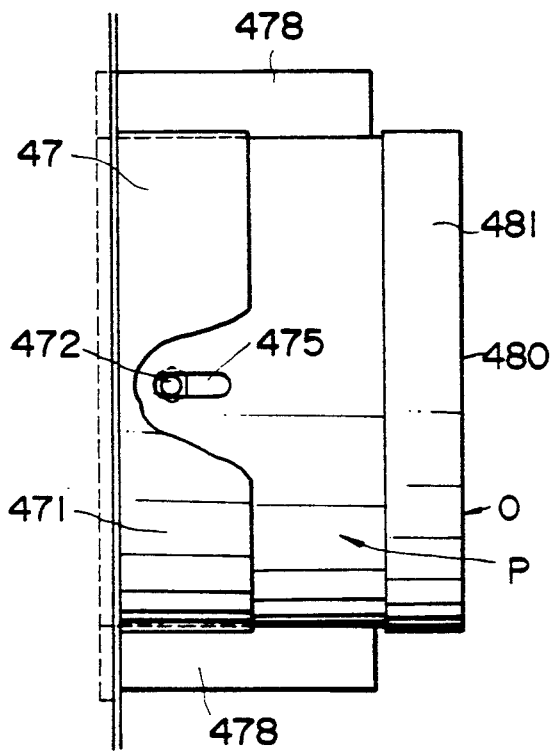
FIG. 121 is a longitudinal cross-sectional view showing the ridge end of the roof when the plus mounting is done.
Figure 122:
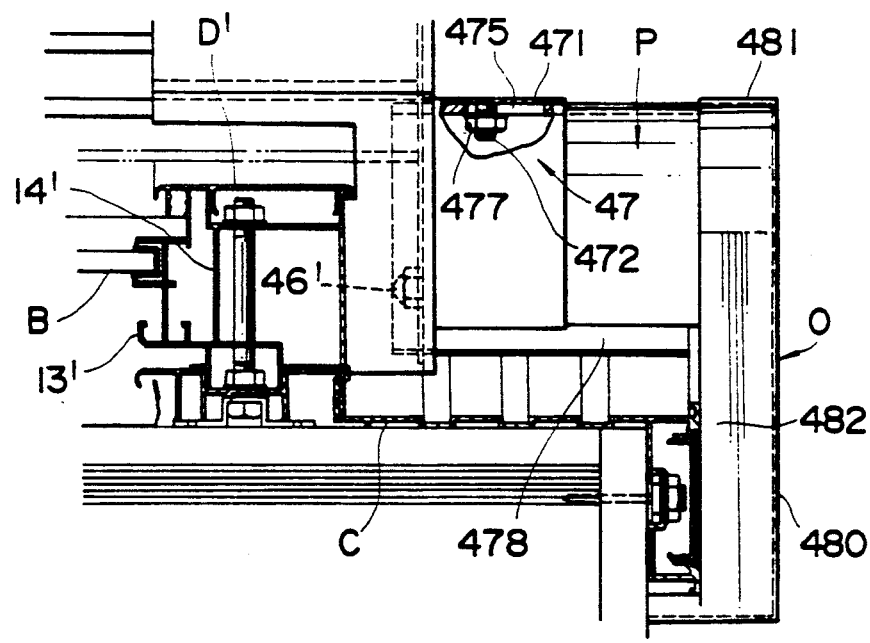
FIG. 122 is a longitudinal cross-sectional view of FIG. 121.

As shown in FIGS. 119 and 120, the bolt 472 of the frame member 47 is located in the center of the elongate hole 475 when the normal mounting in done. As shown in FIGS. 117 and 118, the bolt 472 is located at the outer side of the hole 475 when the minus-adjusted mounting is done. As shown in FIGS. 121 and 122, the bolt 472 is located at the inner side of the hole 475 when the plus-adjusted mounting is done.

Further, by changing only the length of the connector P, it is possible to cope with the case where the width adjusting amount in the side of the roof is large to greatly change the width of the upper horizontal portion 360 of the lateral front base member C, varied in length to suffice for the above case, and use may be made of the same ridge front member L, the same frame member 47 and the same ridge decorative member O irrespective of the width adjusting amount.

Further, with respect to the steep or gentle change in pitch of the roof, since the roof pitch contact curved portion 478 of the connector P is formed as a part of an arc with the contact R of the ridge member fixing piece 433 of the ridge side member J as the center, as shown in FIG. 124, even if the pitch of the roof is changed about the contact R, one point of the arc is properly moved to be brought into contact with the upper horizontal portion 360 of the lateral front base member C, so that the curved surface function is effectively displayed in conformity with the change in roof pitch to hold the height to be always constant with respect to the frame member 47. Accordingly, use may be made of standard members as respective roof members to correspond to the change in length and pitch of the roof, and further the respective roof members may be formed into the roof having the firm and complete flashing structure.

Figure 125:
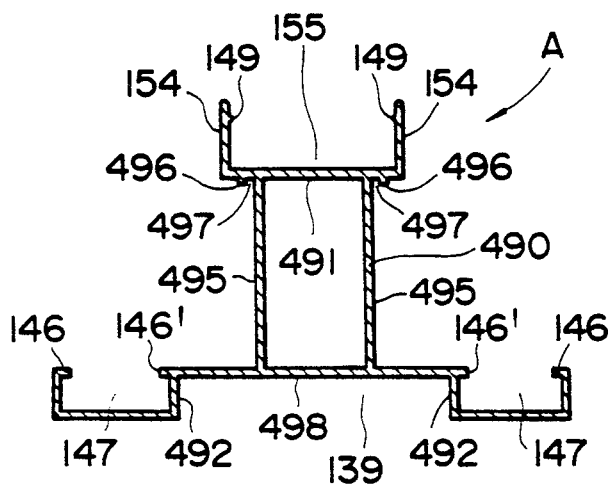

FIG. 125 shows another embodiment of the intermediate connecting member A, which is formed as a single body without dividing into upper and lower portions, and has an elongate hollow body 490 formed into a quadrilateral shape in section. The upper horizontal surface 491 of the elongate hollow body 490 slightly extends sideways, and an engaging projection piece 154 is provided so as to project upward from each of the opposite extended ends of the upper horizontal surface 491. An engaging projection 149 is provided on the inner surface of each engaging projection piece 154, and an upward opening 155 is defined between both the engaging projection pieces 154.

A projection 496 is provided at the lower side of the upper horizontal surface 491 as being slightly spaced apart from each side wall 495 of the hollow body 490, and an insertion gap 497, into which an intermediate connecting member connector 51 (see FIG. 130), which will be later described, is inserted, is defined between the side wall 495 and the projection 496.

The lower horizontal surface 498 of the hollow body 490 extends sideways leftward and rightward so as to be longer than the upper horizontal surface 491, and is provided at each of the opposite ends with an intermediate width adjusting section 147 having the open top and projecting downward from the lower horizontal surface 498.

An outer projection 146 and an inner projection 146' confronting inward each other are provided on the respective opening edges of each intermediate width adjusting section 147 as being widely spaced apart from each other, and a lower width adjusting section 139, which is capable of plus and minus adjustment ccoresponding to the backing width of the roof and, into which the end of the water proof sheet 5 is received, is defined by both the inner side walls 492 of the respective intermediate width adjusting sections 147 and the lower horizontal surface 498.

Figure 129:
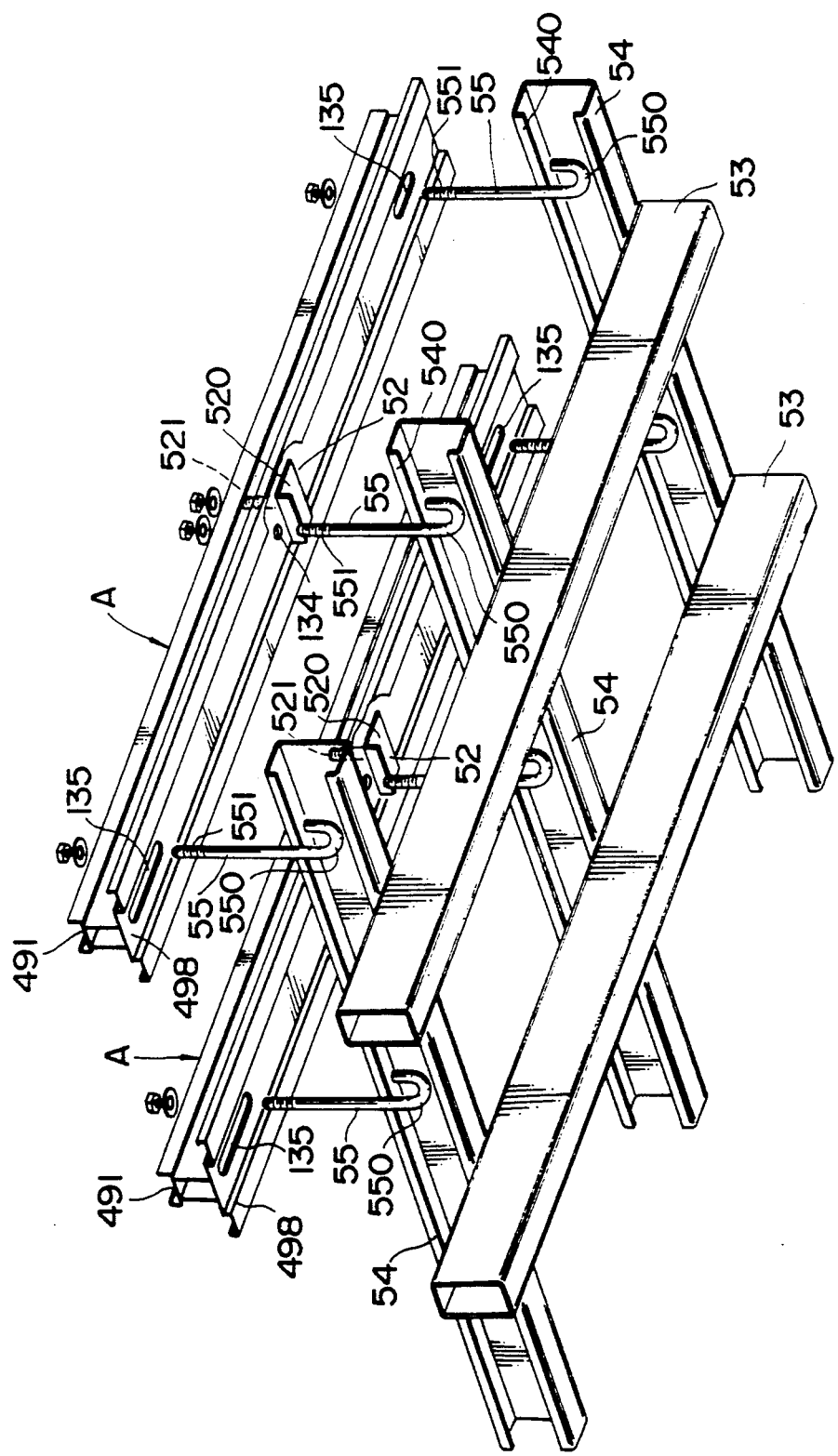

As shown in FIG. 129, the upper and lower horizontal surfaces 491, 498 are provided in the substantially longitudinal center with a circular hole 134 and at the ridge side and the eaves side with elongate holes 135, respectively.

Figure 127:
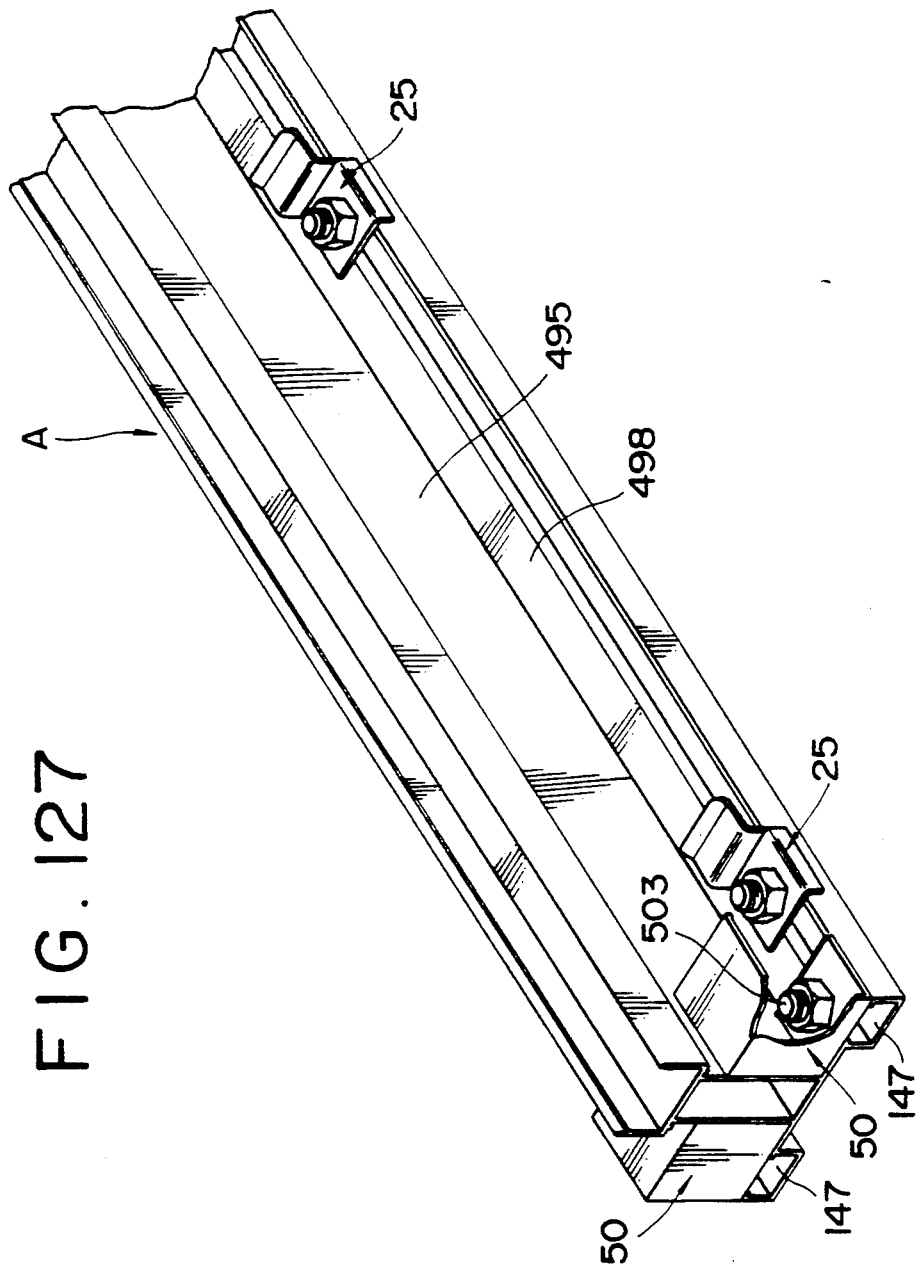

As shown in FIG. 127, a lighting frame fitting 25 is supported to the intermediate width adjusting section 147 of the intermediate connecting member A, and the eaves closing member 50 is attached to the upper surface of the lower horizontal plate 498 at the eaves end.

Figure 126:
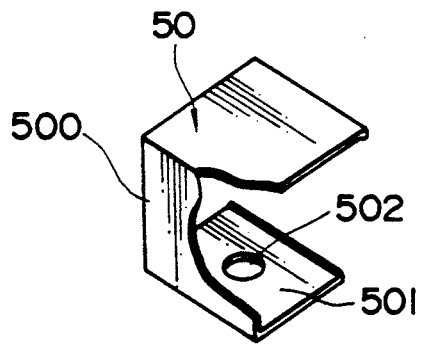

As shown in FIG. 126, the eaves closing member 50 has a closing plate 500 facing to the edge of the side wall 495. The upper and lower ends of the closing plate 500 are bent toward the ridge, and a hole 502 is bored in the lower bent plate 501.

The head of the bolt 503 for fixing the eaves closing member 50 is fitted into the intermediate width adjusting section 147, then the shaft portion of the bolt 503 is inserted into the hole 502 of the lower bent plate 501, and the nut is screwed onto the bolt 503, so that the eaves closing member 50 is mounted to the intermediate connecting member A.

Next will be explained the mounting of the intermediate connecting member A.

Referring to FIG. 126, reference numeral 52 designates a temporary fitting, which has a temporary fixing plate 520 having the downwardly bent ridge-side end, and a bolt 521 planted on the upper surface of the plate 520.

The temporary fitting 52 is preliminarily attached to the intermediate connecting member A such that the nut is screwed onto the bolt 521 inserted into the lower and upper horizontal surfaces 498, 491 of the intermediate connecting member A, and the temporary fixing plate 520 is located to be adjacent to the ridge side of the circular hole 134 bored in the lower surface of the intermediate connecting member A.

Further, channel steels 54 are mounted on the upper surfaces of beams 53 so as to be perpendicular to each other, and the intermediate connecting members A are disposed on the channel steels 54 so as to be perpendicular to the channel steels 54. Each intermediate connecting member A is fixed to the corresponding one of the channel steels 54 by the steps of engaging the bent portion of the plate 520 of the temporary fitting 52 with the end of the channel steel 54 near the ridge to prevent the intermediate connecting member A from slipping out of the channel steel 54, then hooking the hook 550 of the hook bolt 55 on an upper lip 540 of the channel steel 50, inserting the external thread portion 551 of the hook bolt 55 into the circular and elongate holes 134, 135 of the intermediate connecting member A, and then fastening the external thread portion 551 by the nut.

Figure 128:
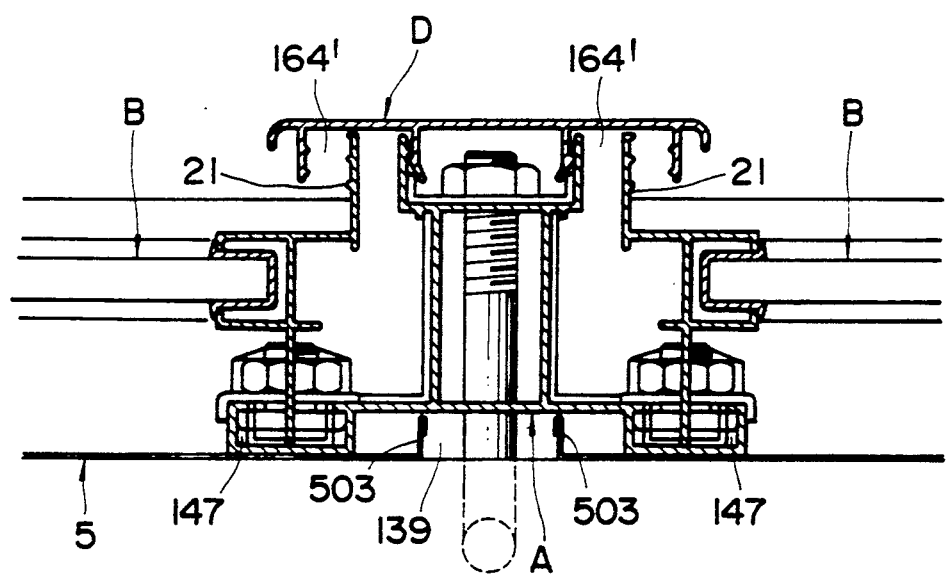

The intermediate connecting member cover D has the similar structure to that of the previously described embodiment, and is mounted on the upper portion of the intermediate connecting member A, as shown in FIG. 128.

Further, the engaging water proof wall 503 of the water proof sheet 5 may be provided to be uprightly erected without being bent, whereby the uprightly erected engaging water proof wall 503 is inserted into the lower width adjusting section 139 of the intermediate connecting member A.

The way of mounting the lighting frame B is similar to that of the previously described embodiment.

Figure 130:
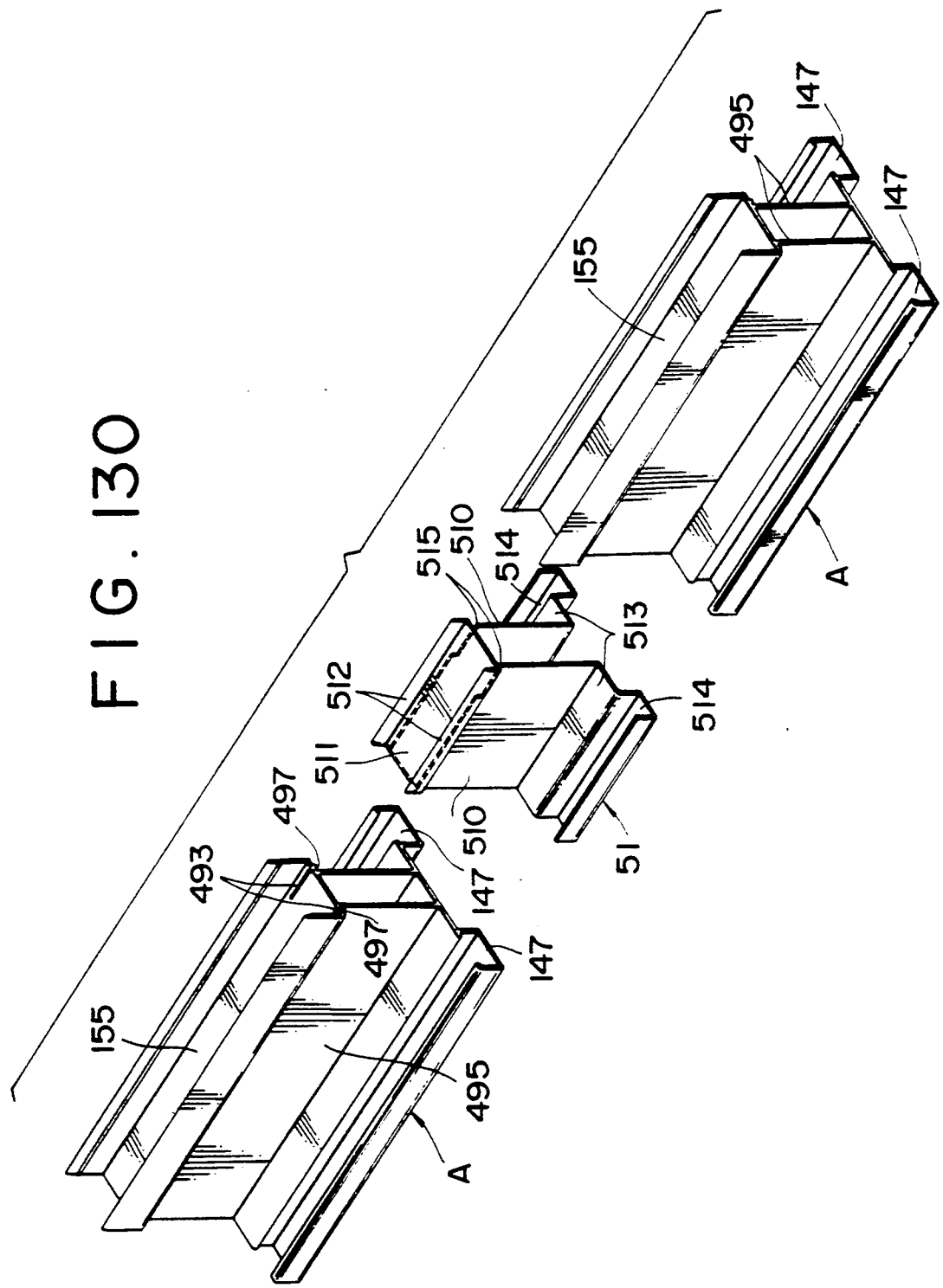

Referring to FIG. 130, reference numeral 51 designates an intermediate connecting member connector for connecting the intermediate connecting members A with each other in the longitudinal direction. The connector 51 has a pair of connecting side walls 510 respectively brought into contact with the outer surfaces of the side walls 495 of the intermediate connecting member A. A connecting upper horizontal surface 511 is provided so as to bestride between the upper ends of the side walls 510, and has the opposite ends respectively provided with rising walls 512.

A lower mounting piece 513 is projected sideways from the lower end of each connecting side wall 510, and a connecting groove 514 fitted to the intermediate width adjusting section 147 of the intermediate connecting member A is provided so as to project downward to the outer side from the end of each lower mounting piece 513. A notched groove 515 is formed in one longitudinal end of each side wall 510 along the upper edge thereof.

Figure 131:
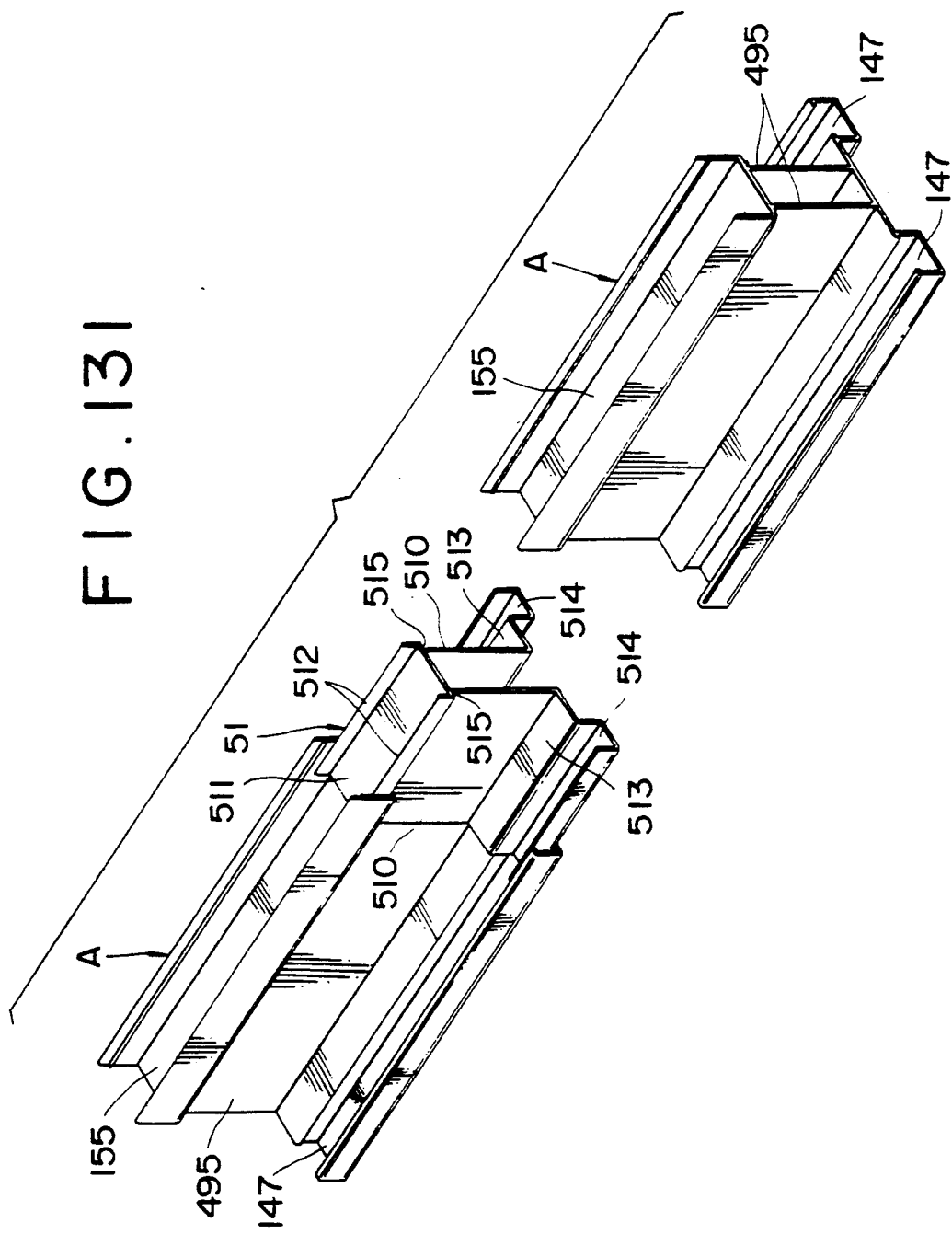

Connector insertion notches 493 are formed in one end of the intermediate connecting member A at the side of the upper horizontal surface 511 near the eaves so as to extend along the insertion gaps 497. When the intermediate connecting members A are connected with each other, the opposite longitudinal end of each side wall 510 of the connector 51 is inserted into the corresponding insertion notch 493. Then, the opposite longitudinal end of the connector 51 is overlapped with the outer surface of the intermediate connecting member A at the eaves-side end, as shown in FIG. 131, and the overlapped portion is sealed with a water tight material.

Figure 132:
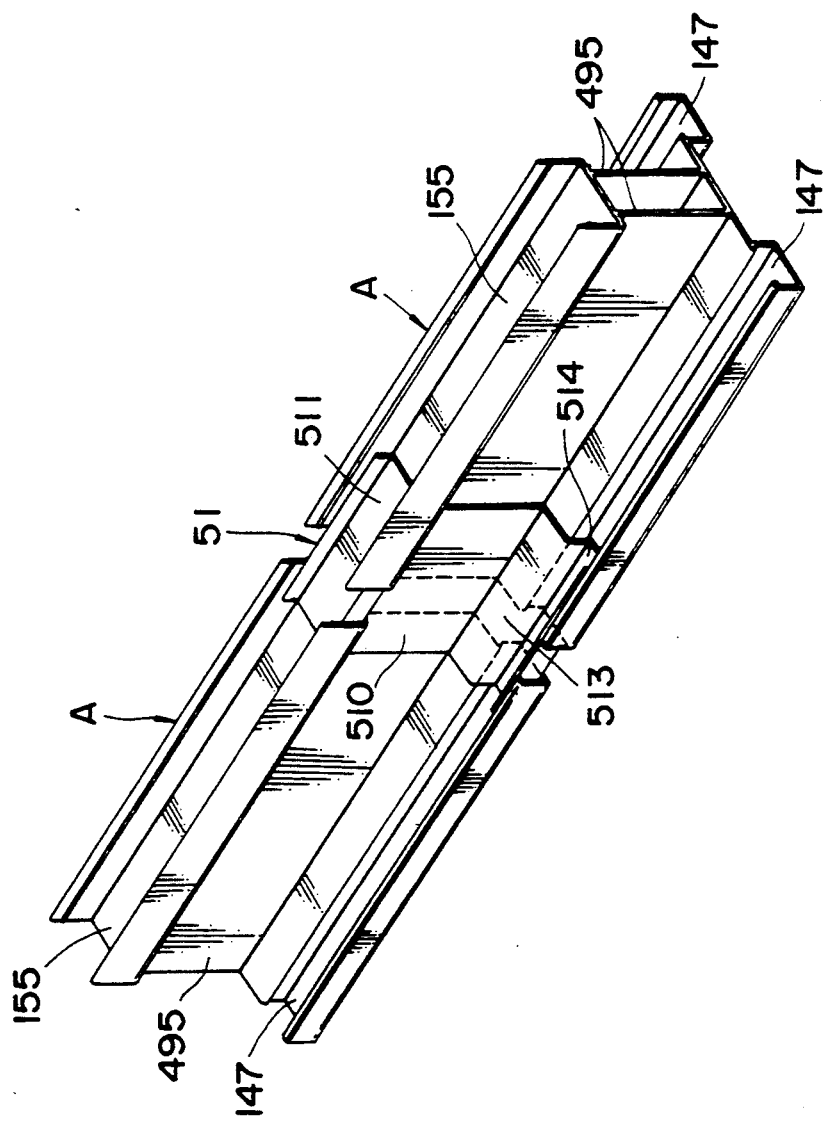

Next, the end of the other intermediate connecting member A on the ridge side is inserted into the groove 515 of the connector 51, so that the end of the intermediate connecting member A on the ridge side is overlapped with the inner surface of one longitudinal end of the connector 51, as shown in FIG. 132.

Figure 133:
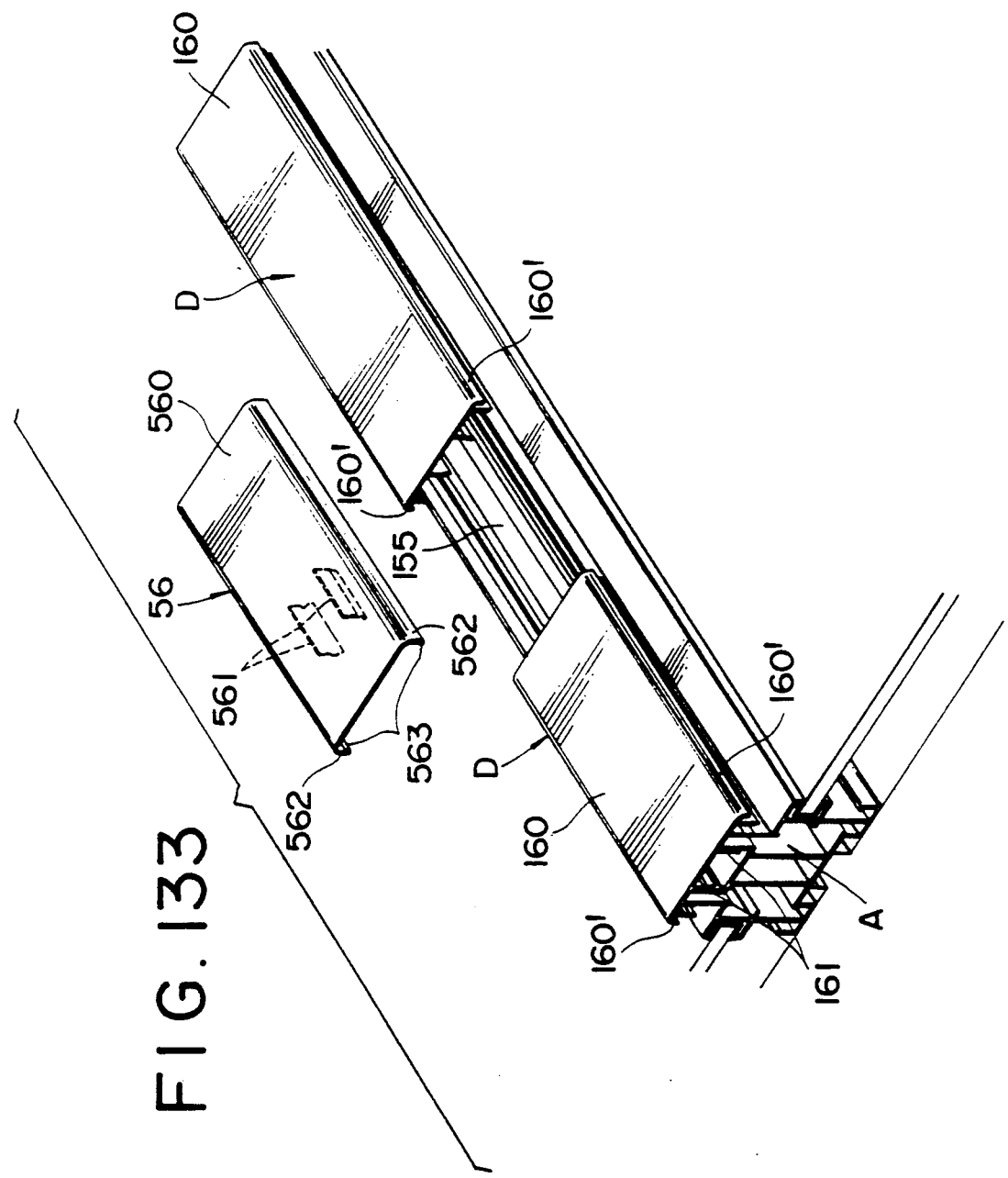

Referring to FIG. 133, reference numeral 56 designates a connecting cover connector, which has a horizontal cover 560 fitted to the outer surface of the horizontal cover 160 of the intermediate connecting member cover D. Connecting engagement legs 561 of the same shape as the engaging legs 161 of the cover D are provided on the lower surface of the horizontal cover 560 at portions near the longitudinal center. Each of the opposite ends of the horizontal cover 560 is downwardly bent to provide a curved suspension piece 562, and an engaging projection piece 563 is formed at the inside of the lower end of each curved suspension piece 562.

When connecting the intermediate connecting member covers D with each other, the connecting cover connector 56 is fitted to the outer surface of each end of the intermediate connecting member cover D on the ridge side and that on the eaves side to be connected with each other, then each engaging projection piece of the connector is brought into engagement with the lower end of the corresponding engaging piece 160' of the cover D, each engaging leg 561 is fitted to the upward opening of the intermediate connecting member A, and then the eaves-side edge of each engaging leg 561 is fitted at an interval to the edge of the intermediate connecting member cover D on the eaves side, and also fitted at an interval to the edge of the intermediate connecting member cover D on the ridge side.

Thereby, since two intermediate connecting members A and two intermediate connecting member covers D are respectively overlapped as being connected with each other at intervals, the thermal expansion may be absorbed to prevent the distortion from being produced anywhere.

Figure 135:
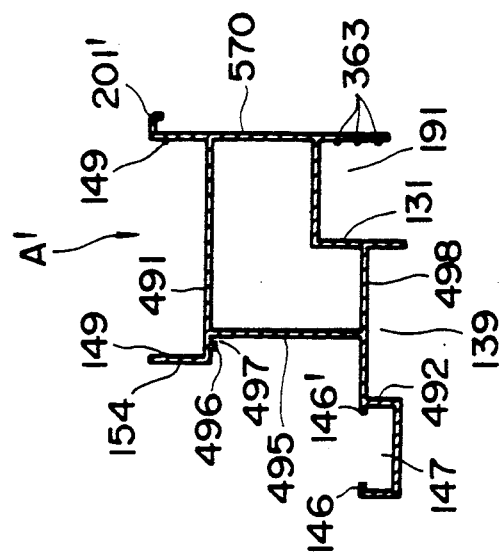
Figure 134:
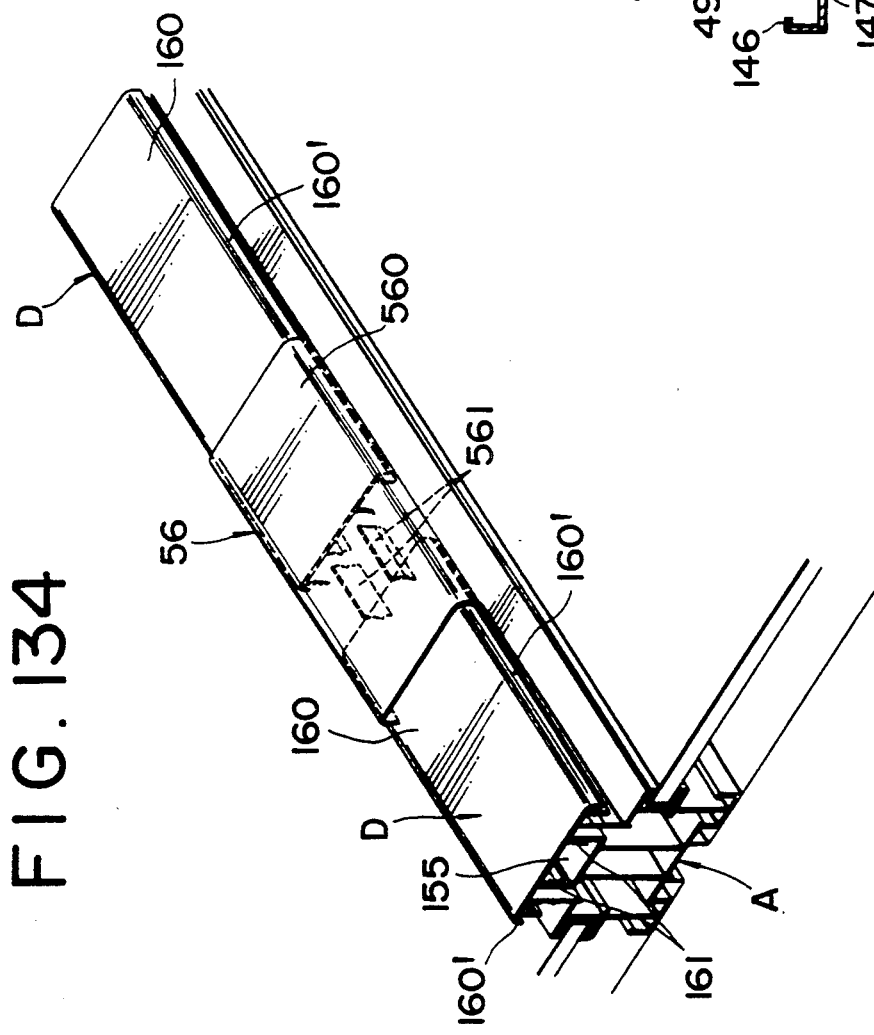
Figure 136:
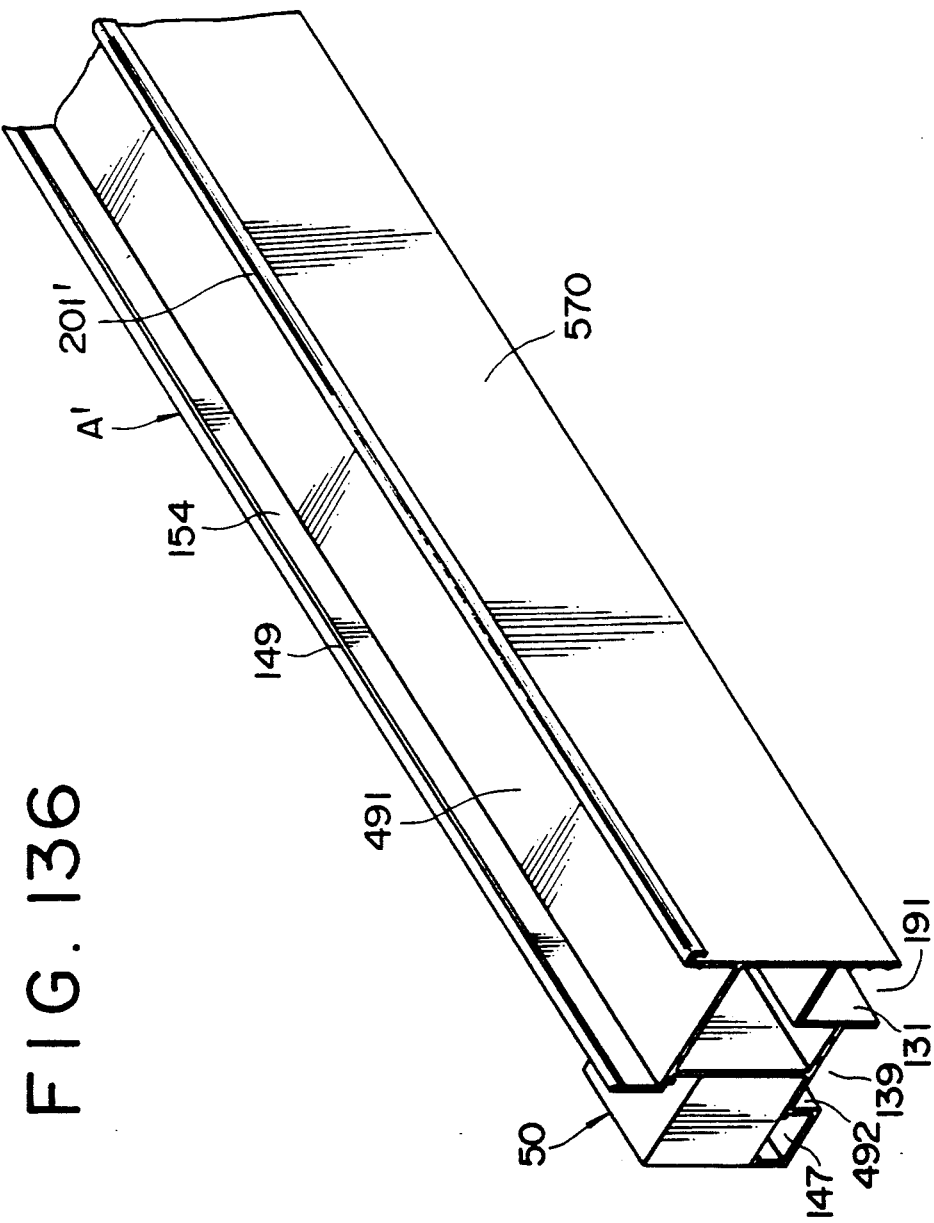

FIG. 135 is a cross-sectional view of the side conencting member A'. Since the inner half of the side connecting member A' is structured so as to be identical with that of the intermediate connecting member A, the detailed description thereof will be omitted by designating the corresponding portions with the same reference numerals. Since the lighting frame B and the water proof sheet 5 are not mounted on the other half of the side connecting member A', the side connecting member A' is not provided with any side wall 495 and any intermediate width adjusting section 147, while a vertical wall 131 is provided at the end of the short lower horizontal surface 498, and the upper end of the vertical wall 131 is bent sideways to form the overhang portion 132.

Further, the upper horizontal surface 491 extends sideways and has a vertical side front wall 570 extending through the end of the upper horizontal surface 491 and that of the overhang portion 132. An outwardly bent engaging projection 201' is formed at the upper end of the side front wall 570, and an engaging projection 149 is provided on the inner surface of the upper end of the side front wall 570. A plurality of throating projections 363 are provided on the inner surface of the lower end of the wall 570, and a side lower width adjusting section 191 is defined between the side front wall 570 and the vertical wall 131.

The eaves side closing member 50 and the lighting frame fitting 20 are mounted on the inner half of the side connecting member A' structured similarly to that of the intermediate connecting member A.

Referring to FIG. 137, reference numeral 58 designates a side connecting member connector for interconnecting the side connecting member A' in the longitudinal direction. Since the inner half of the side connecting member connector 58 is structured similarly to that of the intermediate connecting member connector 51, the detailed description thereof will be omitted by designating the corresponding portions with the same reference numerals.

The side connecting member connector 58 has an upper horizontal surface 511 which is wider than that of the intermediate connecting member connector 50 and provided on the outer side. A side front wall 580 brought into contact with the outer surface of the side front wall 570 of the side connecting member A' is provided at the outer edge of the upper horizontal surface 511.

Further, one longitudinal end of the side front wall 580 extends longer than the side wall 510, and the longitudinal end of the upper horizontal surface 511 opposite to the side wall is formed with an upper horizontal surface insertion notch 581 so as to extend along the side front wall 580.

When connecting the side connecting member A' with each other, one longitudinal end of the side front wall 510 of the connector 58 confronting one side connecting member A' to be connected is brought into engagement with the notch 493 formed in the connecting end of one side connecting member A', and then the side front wall 570 of the side connecting member A' is brought into engagement with the notch 581 of the side connecting member connector 58. Further, the connector 58 is overlapped with the outer surface of the connecting end of the side connecting member A', as shown in FIG. 138, and then the overlapped portion is sealed with a water tight material.

The side front wall 570 of the other side connecting member A' is formed slightly shorter than the upper horizontal surface 491 in the connection end. The upper horizontal surface 491 is overlapped with the lower side of the upper horizontal surface 511 of the connector 58, and then the side wall 495 is brought into engagement with the notched groove 515 of the connector 58, so that the side connecting member A' is continuously slidably connected with the other side connecting member A' as being spaced apart from each other.

Next will be explained the width adjustment in accordance with another embodiment.

Since the lighting frame B and the lateral front base member C are adjusted in width similarly to that of the first embodiment, the detailed description thereof will be omitted.

Since the lower width adjusting section 139 of the intermediate connecting member A' is defined between the opposite intermediate width adjusting sections 147, the engaging water proof wall 503 of the water proof sheet 5 is located between the inner side wall 492 of the intermediate width adjusting section 147 and the center axis of the intermediate connecting member A, as shown in FIG. 141, when the backing width of the roof is normal. On the other hand, when the backing width is narrower than the normal state, the engaging water proof wall 503 is located close to the center axis of the intermediate connecting member A to be minus-adjusted, as shown in FIG. 140.

Further, when the backing width is greater than the normal state, the engaging water proof wall 503 is located close to the inner side wall 492 to be plus-adjusted.

FIG. 143 shows another embodiment of the eaves cover G. The eaves cover G in this embodiment consists of a cover body 30 and opposite throating water proof walls 32.

The lower portion of the dust proof suspension wall 305 of the cover body 30 in this embodiment is corrugatedly bent toward the eaves and further bent toward the ridge to provide a corrugated bent piece 590. The end of the bent piece 590 is further bent downward to provide a channel steel contact piece 591.

When the eaves cover G is mounted, the channel steel contact piece 591 is brought into contact with a web of the channel steel 54 disposed closest to the eaves. The corrugated bent piece 590 is fitted into the recess 188 of the dust proof cap E to press on the lower surface of the water proof sheet 5 and the lower edge of the recess 188 under the action of elasticity of the bent piece 590, so that it is possible to prevent the eaves cover G from being dropped off.

FIG. 146 shows a solar energy collecting roof, in which the lighting frames B are only laid in the center of the roof surface. A side adjusting sheet 61 formed of a corrugated sheet such as corrugated asbesto-cement sheet, FRP or metal sheet is laid inside the side connecting member A' such that one end of the side adjusting sheet 61 is located to be adjacent to the side connecting member A' and the other end thereof is located to be adjacent to the intermediate connecting member A. The upper surface portions of the sheet 61 at the opposite sides are respectively pressed by the flashing covers 60.

As shown in FIG. 147, the flashing cover 60 has a horizontal pressing surface 600, first and second pressing pieces 601, 602 respectively provided on the lower side of the horizontal pressing surface 600 so as to suspend from one end and the center thereof, and a vertical rising wall 603 provided at the other end of the horizontal pressing surface 600 so as to extend from the surface 600 upward and downward. A first receiving space 604 is defined between the first and second pressing pieces 601, 602, and a second receiving space 605 is defined between the second pressing piece 602 and the vertical rising wall 603.

The upper end of the vertical rising wall 603 is bent inward, and the lower end thereof is projected outward to provide a mounting piece 606. As shown in FIG. 148, a plurality of fixing holes 607 are bored in the mounting piece 606 at proper intervals.

Next will be explained the structure of a mounting section of the side adjusting sheet 61. As shown in FIG. 149, a side water proof sheet 62 having the opposite sides respectively provided with bent pieces 620 is laid on the lower surface of the side adjusting sheet 61 so as to be located at each of the opposite sides of the sheet 61. The inner bent piece 620 of the side water proof sheet 62 is inserted into the lower surface of the outermost conical projection 610 of the side adjusting sheet 61, and the outer bent piece 620 is inserted into the lower width adjusting section 139 of each of the connecting member A, A'.

Then, the flashing cover 60 is mounted on the upper surface of the lateral end of the side adjusting sheet 61 such that the conical projection 610 of the side adjusting sheet 61 and the conical projection 611 adjacent to the conical projection 610 are respectively located inside the second and first receiving sections 605, 604. The mounting piece 606 of the flashing cover 60 is disposed on the intermediate width adjusting section 147 of the connecting member A or A', and the bolt 608 having the head inserted into the intermediate width adjusting section 147 is inserted through the hole 607 to be fastened by the nut.

Each of the intermediate and side connecting member covers D and D' respectively mounted on the intermediate and side connecting members A, A' has the horizontal cover 160 so formed that its length at the side of the flashing cover 60 is set to be longer than that at the other side, and covering the upper portion of the vertical wall 603 of each flashing cover 60.

Also, in the case where the corrugated sheet 63 (see FIG. 156) is laid on the roof surface opposite to the solar energy collecting surface of the gable roof, the upper surface of the side edge of the corrugated sheet 63 is covered with the flashing cover 60.

Referring to FIG. 150, reference numeral 64 designates a flashing cover connector for interconnecting the flashing covers 60 in the longitudinal direction. The flashing cover connector 64 has a horizontal pressing surface connecting surface 640 mounted to the upper side of the horizontal pressing surface 600 of the flashing cover 60. One end of the connecting surface 640 is bent downward, and the bent lower end thereof is bent inward to provide a first pressing piece connecting portion 641, and the other end of the connecting surface 640 is upward bent or provide a vertical rising wall connecting portion 642.

When connecting the flashing covers 60 with each other, one end of the flashing cover connector 64, which extends along a line connecting the eaves and the ridge, is overlapped with the outer surface of the end of one flashing cover 60 to be connected, as shown in FIG. 151, and the end of the other flashing cover 60 to be connected is overlapped with the lower surface of the other end of the flashing cover connector 64, which extends along the line connecting the eaves and the ridge, as shown in FIG. 152, to slidably connect two flashing covers 60 with each other as being spaced apart from each other, so that the thermal expansion is absorbed to provide the connecting structure which is free from any direction.

As has been described in the foregoing, the flashing cover 60 is so structured that the flashing cover 60 covers the side adjusting sheet 61 to prevent water from leakage, and the side water proof sheet 62 is laid on the lower surface of the side adjusting sheet 61 to drain the water from the eaves to the outside through the side water proof sheet 62, even if the leakage of water occurs.

Referring to FIG. 153, reference numeral 65 designates a lateral front member connector for interconnecting the lateral front base members C in the longitudinal direction. This connector 65 consists of a rising wall 651 provided at the inner end of the horizontal portion 650 mounted on the upper surface of the upper horizontal portion 360 of the lateral front base member C, an angle projection 652 provided at the outer end of the horizontal portion 650, a suspension wall 653 provided so as to suspend from the lower end of the angle projection 652, and a horizontal portion 654 formed by bending the lower end of the suspension wall 653 inward. This connector 65 is fitted to the outer surfaces of the ends of two lateral front base members C mounted at an interval, and the base member portions to be connected by the connector are overlapped with the connector 65 as being slidably covered therewith, as shown in FIG. 155, so that the lateral front base members C are connected with each other at an interval so as to absorb the thermal expansion and the shrinkage to form an elongate lateral front member. Accordingly, this elongate lateral front member may be easily mounted on the elongate roof of a factory, a warehouse and a gymnasium.

Next will be explained another embodiment of the ridge member support bed 9 mounted on the other roof surface roofed with the corrugated sheet 63 or the like with reference to FIG. 157. This ridge member support bed 9 has an inclined surface 660 inclined to the eaves, a ridge facing surface 661 having a vertically extending portion, a bent portion bending from the upper end of the vertically extending portion toward the ridge and an upper bent portion bending from the bent end of the bent portion upward, and an upper connecting surface 662 for connecting the upper end of the inclined surface 660 and that of the ridge facing surface 661. The upper connecting surface 662 extends from the ridge facing surface 661 toward the ridge, and a ridge member support recess 663 is defined by the upper connecting surface 662 and the bent portions of the ridge facing surface 661.

Further, this support bed 9 has a lower connecting surface 664 extending from a lower end portion of the inclined surface 660 toward the ridge through the ridge facing surface 661. The tip of the lower connecting surface 664 is downward bent, and a plurality of elongate holes 665, each of which has a longer axis extending along a line of the ridge, are bored in the extended portion of the lower connecting surface 664, as shown in FIG. 158.

The ridge member is connected with the ridge member support bed 9 by the steps of aligning the circular hole 630, which is bored in the end of the corrugated sheet 563 on the ridge side, with the corresponding elongate hole 665 of the ridge member support bed 9, inserting the hook portion at the lower end into the channel steel 54 while inserting the upper end of the engaged hook bolt 67 into the circular and elongate holes 630, 665, as shown in FIG. 159, then fixing the hook bolt 67 by the nut 68, then mounting the ridge member support bed 9 along the edge of the corrugated sheet 63 on the ridge side, which is a roofing member of the roof surface opposite to the roof surface roofed with the lighting frames B, and then fitting the ridge member fix piece 433 provided on the lower end of the ridge side member J into the ridge member support recess 663.

Further, while the adjustment in width of the roof has been described in the foregoing, the length of the roof may be adjusted by the use of the flashing board 69 (see FIG. 160). The description of the adjustment in length of the roof is as follows.

As shown in FIG. 160; a high water proof wall 680 having a back sheet is formed on the end of the ridge lower laying board 28 of the ridge-side lighting frame B3 near the ridge, and the flashing board 69 is mounted on the upper surface of the sheet 28 at its intermediate position so as to be slidable along the inclined surface of the roof. The flashing board 69 seves as the usual roof clearance closing board and also has the water proof structure. As shown in FIG. 161, the flashing board 69 takes the shape of L-like letter in section, and has a back board 690 provided on the upper end of the vertical portion 693, and elongate holes 691, each of which has a longer axis extending along the inclination of the roof, respectively bored in the opposite sides of the horizontal portion of the back board 69.

Then, the bolt 692 inserted through the elongate hole 691 of the flashing board 69 and mounting the flashing board 69 to the ridge lower laying sheet 28 of the ridge-side lighting frame B3 is slidably moved within the elongate hole 691, so that the error in length of the roof may be absorbed.

When the roof is normal in length, the flashing board 69 is located at a fixed position, as shown in FIG. 162, to provide the water proof wall. As shown in FIG. 163, when the backing surface is longer than the normal state, the ridge-side lighting frame B3 is installed as being separated away from the ridge cap I, that is, the lighting frame B3 is not located at the fixed position, to become impossible to provide the flashing board water proof structure of the ridge cap I, the flashing board 69 is mounted at the opposite side to slide the flashing board 69 toward the top of the ridge so as to provide the water proof structure to the flashing board.

Further, as shown in FIG. 164, when the backing surface is shorter than the normal state, the ridge-side lighting frame B3 is not installed at the fixed position, but installed in the deeper portion of the ridge cap I, and the flashing board 69 is not installed in the fixed position to become impossible to provide the structure of the board and the water proof wall, the flashing board is made to slide toward the eaves.

FIG. 165 shows another embodiment of the ridge clearance closing unit. In this embodiment, an adjusting mount section 701 having a throating 700 is provided at the end of the ridge lower laying sheet 28 of the ridge-side lighting frame B3 near the ridge, and the flashing board 69 is mounted on the upper surface of the ridge lower laying sheet 28 so as to be slidable along the inclination of the roof.

Adjusting scales 710 at intervals of 100 mm are provided on each side of the elongate hole 691 of the flashing board 69 in this embodiment, and a mounting hole 71 is provided in each side of the vertical portion 693. A water proof wall 714 having the upper end provided with a throating piece 712 and the lower portion provided with a throating board 713 is provided on the flashing board 69 near the eaves. Reference numeral 715 designates a notch provided near each of the opposite sides of the water proof wall 714, 716 an engaging piece engaging the sprinkling pipe K and 717 a support leg portion provided on the lower surface of the horizontal portion of the flashing board 69 near the eaves.

Next will be explained the mounting of the flashing board 69 to the ridge-side lighting frame B3. The flashing board 69 is mounted on the ridge-side lighting frame B3 by the steps of inserting the bolt 719 into the hole 718 bored in the adjusting mount section 701 of the lighting frame B3, then fitting the elongate hole 691 of the flashing board 69 to the bolt 719, thereafter inserting the bolt 719 through an indicator 720 engaging the elongate hole 691, then fastening the bolt 719 and the indicator 720 to each other by the nut 722 through a washer 721, and then engaging the support leg portion 717 with the ridge lower laying sheet 28.

Then, as shown in FIG. 166, after the flashing board 69 is mounted to the ridge-side lighting frame B3, the connection 723 of the cleaning unit Q with the sprinkling pipe K is brought into engagement with the notch 715 of the flashing board 69 from above, and then the sprinkling pipe K is mounted on the engaging piece 716. The partition plate 73 having a fit portion 730 fitted to both the throating piece 712 of the flashing board 69 and a notch 731 laterally engaging the connection 723 is mounted to the throating piece 712 from the lateral direction, and the connection 723 is brought into engagement with the notch 238, as shown in FIG. 167, to engage the sprinkling pipe K, so that the cleaning unit Q is located above the horizontal surface of the flashing board 69.

Reference numeral 74 designates a water proof cover, which has a horizontal portion 740, a rising water proof wall 743 provided along the edge of the horizontal portion 740 on the ridge side and having the upper end provided with a throating piece 741 and the opposite side portions respectively provided with elongate holes 742 each having a longer axis extending along the line of the ridge, a fit pentroof 744 provided along the edge of the horizontal portion 740 on the eaves side and covering the cleaning unit Q from above, and a support leg portion 745 provided on the lower surface of the horizontal portion 740 and supporting the water proof cover 74 mounted to the intermediate connecting member cover D.

The water proof cover 74 is mounted to the flashing board 69 by the steps of inserting the bolt 746 into the hole 711 bored in the vertical portion 693 of the flashing board 69, then fitting the hole 742 to the bolt 246 so as to cover the cleaning unit Q with the fit pentroof 744, and then screwing the nut 748 onto the bolt 246 through a washer 747.

Hereinafter will be explained a mounting process for adjusting the error of the ridge and that of the eaves according to this embodiment.

Referring to FIG. 168, reference symbol W is defined as the length of frontage of a house, T as the length of the eaves, S as the length obtained by adding the shed-roof frontage W/2 and the eaves length T together, l as the length of the batten, l1 as the eaves wiring space, l2 as the ridge wiring space, l3 as the effective adjusting length and l4 as the lighting space.

Then, as shown in FIG. 169, the roof is considered as a right triangle, in which the base is defined as i, the height is defined as j, the hypotenuse is defined as m and an angle made by the base i and the hypotenuse m is defined as $\theta$.

The eaves wiring space (distance between the eaves edge of the eaves-side lighting frame B1 and the eaves edge of the batten 2) l1 is set to be equal with 100 mm, the ridge wiring space (half of the width of the ridge cap I) l2 is set to be equal with 120 mm, and the effective adjusting length (distance between the edge of the ridge-side lighting frame B3 near the ridge and the side surface of the ridge cap I) l3 is set to be equal with 70 mm. Three kinds of frames, i.e., the frames A1 of 700 mm, A2 of 800 mm and A3 of 900 mm in length, which vary uniformly in length at an interval of 100 mm, are prepared for the standard lighting frames B. However, the length of the ridge-side lighting frame B3 does not include the length of the ridge lower laying sheet 28. Then, in the case where the pitch of the roof is 45/100, since the base 1 is 100, and the height j is 45, the hypotenuse m comes to 109.5 and the angle $\theta$ comes to 24.1°. Assuming that the frontage W varies in length from 3636 mm to 9090 mm at intervals of 909 mm, and the eaves length T is 455 mm, the shed-roof frontage W/2, the length S obtained by adding the shed-roof frontage W/2 and the eaves length T together, the length l of the batten, the lighting space l4=l−(l1+l2+l3), the resultant dimension by the combination of the lighting frames B and the error adjusting dimension of the ridge may be respectively calculated, as shown in Table 9.

Further, in the case where the pitch of the roof is 30/100, since the base i is 100, and the height 3 is 30, the hypotenuse m comes to 104.4 and the angle $\theta$ comes to 16.4°. Assuming that the eaves length T is 606 mm, the combination of the lighting frames B is obtained as shown in Table 10, and the error adjusting dimension of the ridge may be calculated.

When the ridge is normally mounted, that is, the ridge error adjusting dimension is 0, the end of the ridge-side lighting frame B3 is located in the substantial center of the ridge cap I, as shown in FIGS. 170 and 171, and the indicator 720 brought into engagement with the elongate hole 691 of the flashing board 69 is mounted so as to show 0 of the adjusting scale 710 to form the water proof wall, so that the effective adjusting length l4 results in 70 mm.

As shown in FIGS. 172 and 173, when the backing surface of the roof is shorter than the normal state, and the end of the ridge-side lighting frame B3 is located near the eaves to become impossible to provide the water proof structure of the ridge cap I, the flashing board 69 is made to slide toward the eaves, and the indicator 720 is mounted so as to show the minus-side division of the adjusting scale 710 at the side near the ridge, so that the effective adjusting length comes to be shorter and the energy collecting glass surface of the ridge-side lighting frame B3 is located as being spaced apart from the ridge cap I. Then, the entire lighting glass surface of the ridge-side lighting frame B3 effectively collects the energy without giving the loss to the energy collection even if the minus adjustment is done.

Further, as shown in FIGS. 174 and 175, when the backing surface is longer than the normal state, and the end of the ridge-side lighting frame B3 is located beyond the center of the ridge cap I to become impossible to set the flashing board 69 to the fixed position, the flashing board 69 is made to slide toward the ridge, and the indicator 720 is mounted so as to show the plus-side division of the adjusting scale 720 at the side near the eaves, so that the effective adjusting length comes to be longer.

TABLE 9 pitch of roof 45/100 (j = 45, m = 109.5, $\theta$ = 24.1°)
length of eaves (pentroof) T = 455 mm, eaves wiring space l1 = 100 mm
ridge wiring space l2 = 120 mm, effective adjusting length l3 = 70 mm
light frame standard dimension (A1: 700 mm, A2: 800 mm, A3: 900 mm)

| frontage | ken | 2.0 | 2.5 | 3.0 | 3.5 | 4.0 | 4.5 | 5.0 |
|---|---|---|---|---|---|---|---|---|
| W | mm | 3636 | 4545 | 5454 | 6363 | 7272 | 8181 | 9090 |
| shed-roof frontage W/2 | mm | 1818 | 2273 | 2727 | 3182 | 3636 | 4091 | 4545 |
| S = W/2 + T | mm | 2273 | 2728 | 3182 | 3637 | 4091 | 4546 | 5000 |
| length of batten l = S × 1.095 | mm | 2490 | 2990 | 3480 | 3980 | 4480 | 4980 | 5480 |
| l4 = l − (l1 + l2 + l3) | mm | 2200 | 2700 | 3190 | 3690 | 4190 | 4690 | 5190 |
| combination of lighting frames | | A1, A1, A2 | A3, A3, A3 | A2, A2 A2, A2 | A1, A1, A1 A1, A3 | A2, A2, A2 A3, A3 | A1, A2 A2, A2 A2, A2 | A2, A2 A3, A3 A3, A3 |
| total dimension by combination of lighting frames | mm | 2200 | 2700 | 3200 | 3700 | 4200 | 4700 | 5200 |
| ridge error adjusting amount | mm | 0 | 0 | −10 | −10 | −10 | −10 | −10 |

TABLE 10 pitch of roof 30/100 (j = 30, m = 104.4, $\theta$ = 16.4°)
length of eaves (pentroof) T = 606 mm, eaves wiring space l1 = 100 mm
ridge wiring space l2 = 120 mm, effective adjusting length l3 = 70 mm
light frame standard dimension (A1: 700 mm, A2: 800 mm, A3: 900 mm)

| frontage | ken | 2.0 | 2.5 | 3.0 | 3.5 | 4.0 | 4.5 | 5.0 |
|---|---|---|---|---|---|---|---|---|
| W | mm | 3636 | 4545 | 5454 | 6363 | 7272 | 8181 | 9090 |
| shed-roof frontage W/2 | mm | 1818 | 2273 | 2727 | 3182 | 3636 | 4091 | 4545 |
| S = W/2 + T | mm | 2424 | 2879 | 3333 | 3788 | 4242 | 4697 | 5151 |
| length of batten l = S × 1.044 | mm | 2530 | 3010 | 3480 | 3950 | 4430 | 4900 | 5380 |
| l4 = l − (l1 + l2 + l3) | mm | 2240 | 2720 | 3190 | 3660 | 4140 | 4610 | 5090 |
| combination of lighting frames | | A1, A1, A2 | A3, A3, A3 | A2, A2 A2, A2 | A1, A1, A1 A1, A3 | A2, A2, A2 A2, A3 | A1, A1 A1, A1 A3, A3 | A2, A2 A2, A3 A3, A3 |
| total dimension by combination of lighting frames | mm | 2200 | 2700 | 3200 | 3700 | 4100 | 4600 | 5100 |
| ridge error adjusting amount | mm | +40 | +20 | −10 | −40 | +40 | +10 | −10 |

Accordingly, in the case where the frontage W is 4545 mm as shown in Table 9, the lighting space l4 comes to 2700 mm. Then, when three sheets of lighting frames B3 are combined together, the total dimension of the combined lighting frames B comes to 2700 mm, and the ridge error adjusting amount results in 0 mm, so that the ridge may be normally mounted as shown in FIG. 170.

Further, in the case where the frontage W is 6363 mm as shown in Table 10, the lighting space comes to 3660 mm. Then, when four sheets of lighting frames B are combined together, the total dimension of the combined lighting frames B comes to 3700 mm, and the ridge error adjusting amount results in −40 mm, the flashing board 69 is made to slide toward the eaves, and the indicator 720 is mounted by screwing the nut 722 onto the bolt 719 in a position where the indicator 720 shows 40 mm of the adjusting scale 710, as shown in FIG. 172.

TABLE 11

2.0 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 2692 | A3, A3, A3 | 2700 |
| 815 | 2593 | A2, A3, A3 | 2600 |
| 725 | 2495 | A2, A2, A3 | 2500 |
| 635 | 2396 | A2, A2, A2 | 2400 |
| 545 | 2298 | A1, A2, A2 | 2300 |
| 455 (standard) | 2200 | A1, A1, A2 | 2200 |
| 365 | 2100 | A1, A1, A1 | 2100 |
| 275 | 2002 | — | — |
| 185 | 1903 | — | — |
| 95 | 1805 | A3, A3 | 1800 |
| 5 | 1706 | A2, A3 | 1700 |

TABLE 12

2.5 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 3190 | A2, A2, A2, A2 | 3200 |
| 815 | 3091 | A1, A2, A2, A2 | 3100 |
| 725 | 2993 | A1, A1, A1, A3 | 3000 |
| 635 | 2894 | A1, A1, A1, A2 | 2900 |
| 545 | 2796 | A1, A1, A1, A1 | 2800 |
| 455 (standard) | 2700 | A3, A3, A3 | 2700 |
| 365 | 2599 | A2, A3, A3 | 2600 |
| 275 | 2500 | A2, A2, A3 | 2500 |
| 185 | 2401 | A2, A2, A2 | 2400 |
| 95 | 2303 | A1, A2, A2 | 2300 |
| 5 | 2204 | A1, A1, A2 | 2200 |

TABLE 13

3.0 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 3687 | A1, A1, A1, A1, A3 | 3700 |
| 815 | 3588 | A3, A3, A3, A3 | 3600 |
| 725 | 3490 | A2, A3, A3, A3 | 3500 |
| 635 | 3391 | A1, A3, A3, A3 | 3400 |
| 545 | 3293 | A2, A2, A2, A3 | 3300 |
| 455 (standard) | 3200 | A2, A2, A2, A2 | 3200 |
| 365 | 3096 | A1, A2, A2, A2 | 3100 |
| 275 | 2997 | A1, A1, A1, A3 | 3000 |
| 185 | 2899 | A1, A1, A1, A2 | 2900 |
| 95 | 2800 | A1, A1, A1, A1 | 2800 |

TABLE 13-continued 3.0 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 5 | 2701 | A3, A3, A3 | 2700 |

TABLE 14

3.5 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 4185 | A2, A2, A2, A3, A3 | 4200 |
| 815 | 4087 | A2, A2, A2, A2, A3 | 4100 |
| 725 | 3988 | A2, A2, A2, A2, A2 | 4000 |
| 635 | 3890 | A1, A2, A2, A2, A2 | 3900 |
| 545 | 3971 | A1, A1, A2, A2, A2 | 3800 |
| 455 (standard) | 3700 | A1, A1, A1, A1, A3 | 3700 |
| 365 | 3594 | A3, A3, A3, A3 | 3600 |
| 275 | 3495 | A2, A3, A3, A3 | 3500 |
| 185 | 3397 | A1, A3, A3, A3 | 3400 |
| 95 | 3298 | A2, A2, A2, A3 | 3300 |
| 5 | 3200 | A2, A2, A2, A2 | 3200 |

TABLE 15

4.0 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 4682 | A1, A2, A2, A2, A2, A2 | 4700 |
| 815 | 4584 | A1, A1, A1, A1, A3, A3 | 4600 |
| 725 | 4485 | A3, A3, A3, A3, A3 | 4500 |
| 635 | 4387 | A2, A3, A3, A3, A3 | 4400 |
| 545 | 4288 | A2, A2, A3, A3, A3 | 4300 |
| 455 (standard) | 4200 | A2, A2, A2, A3, A3 | 4200 |
| 365 | 4091 | A2, A2, A2, A2, A3 | 4100 |
| 275 | 3993 | A2, A2, A2, A2, A2 | 4000 |
| 185 | 3894 | A1, A2, A2, A2, A2 | 3900 |
| 95 | 3795 | A1, A1, A2, A2, A2 | 3800 |
| 5 | 3697 | A1, A1, A1, A1, A3 | 3700 |

TABLE 16

4.5 in frontage

| eaves length (mm) | lighting space 14 = 1 − (l1 + l2 + l3) (mm) | combination of lighting frames | |
|---|---|---|---|
| | | combination of standard dimensions | total dimension (mm) |
| 905 | 5181 | A2, A2, A3, A3, A3, A3 | 5200 |
| 815 | 5082 | A2, A2, A2, A3, A3, A3 | 5100 |
| 725 | 4984 | A2, A2, A2, A2, A3, A3 | 5000 |
| 635 | 4885 | A2, A2, A2, A2, A2, A3 | 4900 |
| 545 | 4786 | A2, A2, A2, A2, A2, A2 | 4800 |
| 455 (standard) | 4700 | A1, A2, A2, A2, A2, A2 | 4700 |
| 365 | 4589 | A1, A1, A1, A1, A3, A3 | 4600 |
| 275 | 4491 | A3, A3, A3, A3, A3 | 4500 |
| 185 | 4392 | A2, A3, A3, A3, A3 | 4400 |

TABLE 16-continued

| | 4.5 in frontage | | |
|---|---|---|---|
| eaves length (mm) | lighting space l4 = l − (l1 + l2 + l3) (mm) | combination of lighting frames | |
| | | combination of standard dimensions | total dimension (mm) |
| 95 | 4294 | A2, A2, A3, A3, A3 | 4300 |
| 5 | 4195 | A2, A2, A2, A3, A3 | 4200 |

TABLE 17

| | 5.0 in frontage | | |
|---|---|---|---|
| eaves length (mm) | lighting space l4 = l − (l1 + l2 + l3) (mm) | combination of lighting frames | |
| | | combination of standard dimensions | total dimension (mm) |
| 905 | 5678 | A2, A2, A2, A2, A2, A2, A3 | 5700 |
| 815 | 5579 | A2, A2, A2, A2, A2, A2, A2 | 5600 |
| 725 | 5481 | A1, A1, A1, A1, A3, A3, A3 | 5500 |
| 635 | 5382 | A3, A3, A3, A3, A3, A3 | 5400 |
| 545 | 5284 | A2, A3, A3, A3, A3, A3 | 5300 |
| 455 (standard) | 5200 | A2, A2, A3, A3, A3, A3 | 5200 |
| 365 | 5086 | A2, A2, A2, A3, A3, A3 | 5100 |
| 275 | 4988 | A2, A2, A2, A2, A3, A3 | 5000 |
| 185 | 4889 | A2, A2, A2, A2, A2, A3 | 4900 |
| 95 | 4791 | A2, A2, A2, A2, A2, A2 | 4800 |
| 5 | 4692 | A1, A2, A2, A2, A2, A2 | 4700 |

The flashing board 69 is provided so as to be movable along the inclination of the roof with respect to the ridge lower laying sheet 28 of the ridge-side lighting frame B3 by a distance of 100 mm, and the error between the lighting space 14 and the total dimension of the combined lighting frames B may be adjusted by respectively sliding the flashing board 69 within the range of the distance of 100 mm, which is a difference in length of each lighting frame B1, B2, B3, from the standard position toward the plus side by 50 mm or toward the minus side by 50 mm.

Further, Tables 11 through 17 represent the relation between the combinations of the lighting frames B and the lighting space 14 in the case where the eaves length is increased or decreased by 90 mm relative to each frontage within the range from 3636 mm to 9090 mm at intervals of 909 mm.

In consequence, if three kinds of lighting frames B which uniformly vary in length at an interval of 100 mm, i.e., the lighting frames of 700 mm, 800 mm and 900 mm in length are prepared for the lighting frames B, the lighting frames B may be easily mounted by adjusting the error to the extend of ±50 mm corresponding to the difference in length, and the combinations of the lighting frames B in conformity to the lighting space by the use of the flashing board 69 movable along the inclination of the roof by the distance of 100 mm.

Then, as shown in FIGS. 170 through 172, since the flashing board 69 mounted on the ridge-side lighting frame B3 is located above the ridge lower laying sheet 28 of the lighting frame B3 even in any case of normal mounting, plus-adjusted mounting and minus-adjusted mounting, there is not possibility of covering the lighting sheet 24 of the ridge-side lighting frame B3 with a part of the ridge cap I, so that the solar light is not blocked to collect the solar energy.

Further, if three kinds of frames, i.e., A1 of 400 mm, A2 of 450 mm and A3 of 500 mm in length which uniformly vary in length at an interval of 50 mm are prepared for the standard lighting frames B, the adjustment may be done by the flashing board 69 movable along the inclination of the roof by the distance of 100 mm, and if the ridge wiring space 12 and the effective adjusting length 13 are varied, the error to the extent of ±25 mm may be adjusted by the flashing board 69 movable along the inclination of the roof by the distance of 50 mm.

Furthermore, the elongate hole 691 having the adjusting scale 710 movable along the inclination of the roof by the distance of 200 mm is bored in the flashing board 69 and three kinds of frames, i.e., A1 of 800 mm, A2 of 1000 mm and A3 of 1200 mm in length which uniformly vary in length at an interval of 200 mm may be prepared for the lighting frames B to obtain a larger value of the ridge wiring space 12 and the effective adjusting value 13.

What is claimed is:

1. A roof, comprising;
    a connecting member including an overhang portion provided at a lower portion on at least one side, a curved element provided above an upper end of said overhang portion so as to extend downward over the overhang portion and be curved outward in a convex shape, a wide lower width-adjusting element defined below said overhang portion, and a wide groove-like intermediate width-adjusting element defined at an intermediate portion at least to said one side;
    a water-proof sheet having a side edge received in said lower width-adjusting element, said sheet being supported to be movable sideways within a range of adjustment of said lower width-adjusting element; and
    a lighting frame having a lower end of a side edge supported by said intermediate width-adjusting element, said lighting frame being supported to be movable sideways within a range of adjustment of said intermediate width adjusting element.

2. A roof according to claim 1, further comprising:
    a connecting member cover mounted to an upper end of said connecting member, and including a wide upper width-adjusting element define on a lower surface of said connecting member on one side thereof and receiving an upper end of a side edge of said lighting frame.

3. A roof, comprising:
    a plurality of lighting frames, laid on a first portion of a roof surface;
    a corrugated sheet having a ridge at one side, laid on a second portion of said roof surface;
    a connecting member, for laterally connecting the plurality of lighting frames to each other and for connecting said corrugated sheet and said plurality of lighting frames, said connecting member being provided at one side with a wide groove-like intermediate width-adjusting element for supporting a lower end of side edges of said plurality of lighting frames; and
    a flashing cover, for covering an upper side of said corrugated sheet, said flashing cover being provided at one side with a mounting piece mounted to said connecting member and at another side with a receiving space for receiving the ridge of said corrugated sheet.

* * * * *